US010848764B2

(12) United States Patent
Ikai et al.

(10) Patent No.: US 10,848,764 B2
(45) Date of Patent: Nov. 24, 2020

(54) ARITHMETIC DECODING DEVICE, IMAGE DECODING APPARATUS, ARITHMETIC CODING DEVICE, AND IMAGE CODING APPARATUS

(71) Applicant: Velos Media, LLC, Dallas, TX (US)

(72) Inventors: Tomohiro Ikai, Sakai (JP); Takeshi Tsukuba, Sakai (JP)

(73) Assignee: Velos Media, LLC, Dallas, TX (US)

( * ) Notice: Subject to any disclaimer, the term of this patent is extended or adjusted under 35 U.S.C. 154(b) by 0 days.

(21) Appl. No.: 16/596,354

(22) Filed: Oct. 8, 2019

(65) Prior Publication Data

US 2020/0045317 A1 Feb. 6, 2020

Related U.S. Application Data

(63) Continuation of application No. 15/635,238, filed on Jun. 28, 2017, now Pat. No. 10,491,900, which is a (Continued)

(30) Foreign Application Priority Data

Jun. 1, 2012 (JP) ................................ 2012-126567
Aug. 10, 2012 (JP) ................................ 2012-178842

(51) Int. Cl.
*H04N 11/02* (2006.01)
*H04N 19/13* (2014.01)
*H04N 19/44* (2014.01)
*H04N 19/91* (2014.01)
*H04N 19/60* (2014.01)

(Continued)

(52) U.S. Cl.
CPC ........... *H04N 19/13* (2014.11); *H04N 19/117* (2014.11); *H04N 19/124* (2014.11); *H04N 19/159* (2014.11); *H04N 19/176* (2014.11); *H04N 19/44* (2014.11); *H04N 19/46* (2014.11); *H04N 19/513* (2014.11); *H04N 19/60* (2014.11);

(Continued)

(58) Field of Classification Search
CPC ...................................................... H04N 19/13
USPC ....................................... 375/240.01–240.29
See application file for complete search history.

(56) References Cited

U.S. PATENT DOCUMENTS 6,996,280 B1 * 2/2006 Matsukawa ............. G06T 9/004
382/236
9,106,918 B2 * 8/2015 Xu ........................ H04N 19/18

(Continued)

OTHER PUBLICATIONS

Kung et al, "Zone Partition for Significance Map Coding of Large TU", Joint Collaborative Team on Video Coding (JCT-VC) of ITU-T SG16 WP3 and ISO/EIC JTC1/SC29/WG11, $9^{th}$ Meeting: Geneva, CH, Apr. 27-May 7, 2012, Document: JCTVC-10372.

(Continued)

*Primary Examiner* — Leron Beck
(74) *Attorney, Agent, or Firm* — Nixon & Vanderhye P.C.

(57) ABSTRACT

There is provided a terminal device capable of efficiently performing communication in a communication system in which a base station device and the terminal device communicate with each other. The terminal device that communicates with the base station device by using a plurality of aggregated cells recognizes that a serving cell is stopped in a first state, recognizes that the serving cell is started in a second state, and switches from the first state to the second state based on a received PDCCH.

8 Claims, 66 Drawing Sheets

Related U.S. Application Data continuation of application No. 15/468,142, filed on Mar. 24, 2017, now Pat. No. 9,794,572, which is a continuation of application No. 15/341,019, filed on Nov. 2, 2016, now Pat. No. 9,699,479, which is a continuation of application No. 14/402,114, filed as application No. PCT/JP2013/064447 on May 24, 2013, now Pat. No. 9,538,205.

(51) Int. Cl.

| | |
|---|---|
| ***H04N 19/117*** | (2014.01) |
| ***H04N 19/124*** | (2014.01) |
| ***H04N 19/159*** | (2014.01) |
| ***H04N 19/176*** | (2014.01) |
| ***H04N 19/46*** | (2014.01) |
| ***H04N 19/513*** | (2014.01) |
| ***H04N 19/61*** | (2014.01) |
| ***H04N 19/70*** | (2014.01) |

(52) U.S. Cl.
CPC ............ *H04N 19/61* (2014.11); *H04N 19/70* (2014.11); *H04N 19/91* (2014.11)

(56) References Cited

U.S. PATENT DOCUMENTS

| | | | | |
|---|---|---|---|---|
| 9,538,205 | B2 | 1/2017 | Ikai et al. | |
| 9,699,479 | B2 | 7/2017 | Ikai et al. | |
| 9,794,572 | B2 | 10/2017 | Ikai et al. | |
| 2005/0052294 | A1* | 3/2005 | Liang | H04N 19/86 341/63 |
| 2005/0123207 | A1* | 6/2005 | Marpe | H04N 19/196 382/239 |
| 2009/0002379 | A1* | 1/2009 | Baeza | H04N 19/436 345/522 |
| 2009/0003446 | A1* | 1/2009 | Wu | H04N 19/587 375/240.16 |
| 2009/0003447 | A1* | 1/2009 | Christoffersen | H04N 19/192 375/240.16 |
| 2012/0163469 | A1* | 6/2012 | Kim | H04N 19/46 375/240.18 |
| 2013/0003858 | A1* | 1/2013 | Sze | H04N 19/122 375/240.18 |
| 2013/0024488 | A1* | 1/2013 | Yamada | G06F 9/3001 708/230 |
| 2013/0188684 | A1* | 7/2013 | Terada | H04N 19/18 375/240.02 |
| 2013/0188726 | A1 | 7/2013 | Ji et al. | |
| 2013/0272379 | A1* | 10/2013 | Sole Rojals | H04N 19/176 375/240.02 |
| 2017/0302934 | A1 | 10/2017 | Ikai et al. | |

OTHER PUBLICATIONS

English Translation of CN Office Action and Search Report dated Jul. 23, 2018 in CN application 201380028394.5.

Hsu et al, "Non-CE11: Unification of transform coefficient coding", Joint Collaborative Team on Video Coding (JCT-VC) of ITU-T SG16 WP3 and ISO/EIC JTC1/SC29/WG11, 8th Meeting: San José, CA, USA, Feb. 1-10, 2012, Document: JCTVC-H0284.

Office Action dated Jun. 9, 2017 in U.S. Appl. No. 15/468,142.

Ikai et al., "Arithmetic Decoding Device, Image Decoding Apparatus, Arithmetic Coding Device, and Image Coding Apparatus", U.S. Appl. No. 15/341,019, filed Nov. 2, 2016.

Office Action dated Feb. 21, 2017 in U.S. Appl. No. 15/341,019.

Ikai et al., "Arithmetic Decoding Device, Image Decoding Apparatus, Arithmetic Coding Device, and Image Coding Apparatus", U.S. Appl. No. 14/402,114, filed Nov. 19, 2014.

Office Action dated Aug. 17, 2016 in U.S. Appl. No. 14/402,114.

Official Communication issued in corresponding European Patent Application No. 13796751.9, dated Dec. 23, 2015.

Tsukuba et al., "Refined Significance Map Context Derivation for Large TU", Joint Collaborative Team on Video Coding of ITU-T SG 16 WP 3 and ISO/IEC JTC 1/SC 29/WG 11, JCTVC-J0068, 10th Meeting, Jul. 11-20, 2012, pp. 1-4.

Official Communication issued in International Patent Application No. PCT/JP2013/064447, dated Aug. 6, 2013.

Sole et al., "Removal of the 8x2/2x8 Coefficient Groups (JCTVC-J0256)," Joint Collaborative Team on Video Coding (JCT-VC) of ITU-T SG 16 WP 3 and ISO-IEC JTC 1/SC 29/WG 11,10th Meeting: Stockholm, SE, Jul. 11-20, 2012, pp. 1-11.

Joshi et al., "Modification of Context Assignment for Significance Flag Coding for Large TUs (JCTVC-J0354)," Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 1-5.

Kumakura et al., "Non-CE3: Simplified Context Derivation for Significance Map (JCTVC-10296)," Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, pp. 1-11.

Bross, "Suggested Bug-Fixes for HEVC Text Specification Draft 6 (JCTVC-10030)," Joint Collaborative Team on Video Coding (JCT-VC) of ITU-T SG16 WP3 and ISO/IEC JTC1/SC29/WG11, 9th Meeting: Geneva CH, Apr. 27-May 7, 2012, 270 pages.

Ikai et al., "Arithmetic Decoding Device, Image Decoding Apparatus, Arithmetic Coding Device, and Image Coding Apparatus", U.S. Appl. No. 15/468,142, filed Mar. 24, 2017.

* cited by examiner

| Intra prediction mode | Associated names |
|---|---|
| 0 | Intra_Planar |
| 1 | Intra_DC |
| Otherwise (2..34) | Intra_Angular |
| 35 | Intra_FromLuma (used only for chroma) |

| IntraPredMode | log2TrafoSize−2 | | | |
|---|---|---|---|---|
| | 0 | 1 | 2 | 3 |
| 0 | 0 | 0 | 0 | 0 |
| 1 | 0 | 0 | 0 | 0 |
| 2 – 5 | 0 | 0 | 0 | 0 |
| 6 – 14 | 2 | 2 | 0 | 0 |
| 15 – 21 | 0 | 0 | 0 | 0 |
| 22 – 30 | 1 | 1 | 0 | 0 |
| 31 – 35 | 0 | 0 | 0 | 0 |

(a)

| scanIndex | ScanType |
|---|---|
| 0 | Up-right diagonal scan |
| 1 | horizontal fast scan |
| 2 | vertical fast scan |

(b) (c) (d)

horizontal fast scan — vertical fast scan — up-right diagonal scan (a)

LAST COEFFICIENT

| 5 0 0 0<br>0 0 0 0<br>0 2 0 0<br>0 0 0 0 | 1 0 0 0<br>0 0 0 0<br>0 1 0 0<br>0 0 0 0 | 1 0 0 0<br>0 0 0 0<br>0 0 0 0<br>0 0 0 0 | 0 0 ① 0<br>0 0 0 0<br>0 0 0 0<br>0 0 0 0 |
|---|---|---|---|
| 0 0 0 0<br>0 0 0 0<br>0 0 0 0<br>0 0 0 0 | 0 0 0 0<br>0 0 0 0<br>0 0 0 0<br>0 0 0 0 | 0 0 0 0<br>0 0 0 0<br>0 0 0 0<br>0 0 0 0 | 0 0 0 0<br>0 0 0 0<br>0 0 0 0<br>0 0 0 0 |
| 0 0 0 0<br>0 0 0 0<br>0 0 0 0<br>0 0 0 0 | 0 0 0 0<br>0 0 0 0<br>0 0 0 0<br>0 0 0 0 | 0 0 0 0<br>0 0 0 0<br>0 0 0 0<br>0 0 0 0 | 0 0 0 0<br>0 0 0 0<br>0 0 0 0<br>0 0 0 0 |
| 0 0 0 0<br>0 0 0 0<br>0 0 0 0<br>0 0 0 0 | 0 0 0 0<br>0 0 0 0<br>0 0 0 0<br>0 0 0 0 | 0 0 0 0<br>0 0 0 0<br>0 0 0 0<br>0 0 0 0 | 0 0 0 0<br>0 0 0 0<br>0 0 0 0<br>0 0 0 0 |

(b)

| 1 | 1 | 1 | ① | — SUB-BLOCK HAVING LAST COEFFICIENT |
|---|---|---|---|---|
| 0 | 0 | 0 | 0 | |
| 0 | 0 | 0 | 0 | |
| 0 | 0 | 0 | 0 | |

FIG. 19

```
if (idxCG == 0)
{
   // PATTERN 0
   sigCtx  =  (xB + yB <= 2) ? 1 : 0
}
else if (idxCG == 1)
{
   // PATTERN 1
   tbl1[16] = {1, 1, 1, 1, 1, 1, 1, 0, 1, 0, 0, 0, 0, 0, 0, 0}
   sigCtx  = tbl1[xB+(yB<<2)]
}
else if (idxCG == 2)
{
   // PATTERN 2
   tbl2[16] = {1, 1, 1, 0, 1, 1, 0, 0, 1, 1, 0, 0, 1, 0, 0, 0}
   sigCtx  = tbl2[xB+(yB<<2)]
}
else if (idxCG == 3)
{
   // PATTERN 3
   sigCtx  =  (xB + yB <= 4) ? 2 : 1
}
```

| | | | |
|---|---|---|---|
| 1 | 1 | 1 | 0 |
| 1 | 1 | 0 | 0 |
| 1 | 0 | 0 | 0 |
| 0 | 0 | 0 | 0 |

(b)

| | | | |
|---|---|---|---|
| 1 | 1 | 1 | 1 |
| 1 | 1 | 1 | 0 |
| 1 | 0 | 0 | 0 |
| 0 | 0 | 0 | 0 |

(c)

| | | | |
|---|---|---|---|
| 1 | 1 | 1 | 0 |
| 1 | 1 | 0 | 0 |
| 1 | 1 | 0 | 0 |
| 1 | 0 | 0 | 0 |

(d)

| | | | |
|---|---|---|---|
| 2 | 2 | 2 | 2 |
| 2 | 2 | 2 | 2 |
| 2 | 2 | 2 | 1 |
| 2 | 2 | 1 | 1 |

FIG. 23

```
if (idxCG == 0)
{
   // PATTERN 0
   sigCtx  =  (xB + yB <= 2) ? 1 : 0
}
else if (idxCG == 1)
{
   // PATTERN 1
   sigCtx  =  (xB + yB <= 3) ? 1 : 0
}
else if (idxCG == 2)
{
   // PATTERN 2
   sigCtx  =  (xB + yB <= 4) ? 2 : 1
}
```

| | | | |
|---|---|---|---|
| 1 | 1 | 1 | 0 |
| 1 | 1 | 0 | 0 |
| 1 | 0 | 0 | 0 |
| 0 | 0 | 0 | 0 |

(b)

| | | | |
|---|---|---|---|
| 1 | 1 | 1 | 1 |
| 1 | 1 | 1 | 0 |
| 1 | 1 | 0 | 0 |
| 1 | 0 | 0 | 0 |

(c)

| | | | |
|---|---|---|---|
| 2 | 2 | 2 | 2 |
| 2 | 2 | 2 | 2 |
| 2 | 2 | 2 | 1 |
| 2 | 2 | 1 | 1 |

FIG. 25

```
if (idxCG == 0)
{
   // PATTERN 0
   sigCtx = (xB >> 1) + (yB >> 1) <= 0) ? 1 : 0
}
else if (idxCG == 1)
{
   // PATTERN 1
   sigCtx = (yB >> 1) <= 0) ? 1 : 0
}
else if (idxCG == 2)
{
   // PATTERN 2
   sigCtx = (xB >> 1) <= 0) ? 1 : 0
}
else if (idxCG == 3)
{
   // PATTERN 3
   sigCtx = (xB >> 1) + (yB >> 1) <= 1) ? 2 : 1
}
```

| | | | |
|---|---|---|---|
| 1 | 1 | 0 | 0 |
| 1 | 1 | 0 | 0 |
| 0 | 0 | 0 | 0 |
| 0 | 0 | 0 | 0 |

(b)

| | | | |
|---|---|---|---|
| 1 | 1 | 1 | 1 |
| 1 | 1 | 1 | 1 |
| 0 | 0 | 0 | 0 |
| 0 | 0 | 0 | 0 |

(c)

| | | | |
|---|---|---|---|
| 1 | 1 | 0 | 0 |
| 1 | 1 | 0 | 0 |
| 1 | 1 | 0 | 0 |
| 1 | 1 | 0 | 0 |

(d)

| | | | |
|---|---|---|---|
| 2 | 2 | 2 | 2 |
| 2 | 2 | 2 | 2 |
| 2 | 2 | 1 | 1 |
| 2 | 2 | 1 | 1 |

FIG. 27
(a)
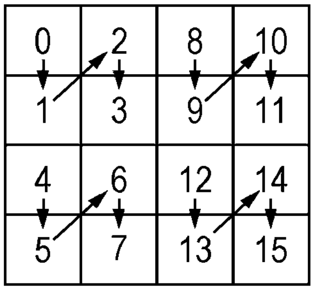
(b)
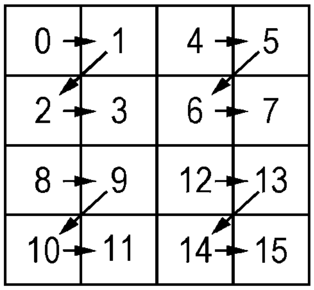

FIG. 28

```
if (idxCG == 0)
{
    if (xB + yB <= 0) sigCtx = 2
    else if (xB + yB <= 2) sigCtx = 1
    else sigCtx = 0
}
else if (idxCG == 1)
{
    if (yB <= 0) sigCtx = 2
    else if (yB <= 1) sigCtx = 1
    else sigCtx = 0
}
else if (idxCG == 2)
{
    if (xB <= 0) sigCtx = 2
    else if (xB <= 1) sigCtx = 1
    else sigCtx = 0
}
else if (idxCG == 3)
{
    sigCtx  =  2
}
```

FIG. 30

```
if (idxCG == 0)
{
     if (xB + yB <= TH1) sigCtx = 2
     else if (xB + yB <= TH2) sigCtx = 1
     else sigCtx = 0
}
else if (idxCG == 1)
{
     if (yB <= TH3) sigCtx = 2
     else if (yB <= TH4) sigCtx = 1
     else sigCtx = 0
}
else if (idxCG == 2)
{
     if (xB <= TH3) sigCtx = 2
     else if (xB <= TH4) sigCtx = 1
     else sigCtx = 0
}
else if (idxCG == 3)
{
     sigCtx =  (xB + yB <= TH5) ? 2: 1
}
```

| | | | |
|---|---|---|---|
| 1 | 1 | 1 | 0 |
| 1 | 1 | 0 | 0 |
| 1 | 0 | 0 | 0 |
| 0 | 0 | 0 | 0 |

(b)

| | | | |
|---|---|---|---|
| 2 | 2 | 2 | 2 |
| 1 | 1 | 1 | 1 |
| 1 | 1 | 1 | 1 |
| 0 | 0 | 0 | 0 |

(c)

| | | | |
|---|---|---|---|
| 2 | 1 | 1 | 0 |
| 2 | 1 | 1 | 0 |
| 2 | 1 | 1 | 0 |
| 2 | 1 | 1 | 0 |

(d)

| | | | |
|---|---|---|---|
| 2 | 2 | 2 | 2 |
| 2 | 2 | 2 | 2 |
| 2 | 2 | 2 | 1 |
| 2 | 2 | 1 | 1 |

(a)

| 2 | 2 | 1 | 1 |
|---|---|---|---|
| 2 | 1 | 1 | 0 |
| 1 | 1 | 0 | 0 |
| 1 | 0 | 0 | 0 |

(b)

| 2 | 2 | 2 | 2 |
|---|---|---|---|
| 1 | 1 | 1 | 1 |
| 1 | 1 | 1 | 1 |
| 0 | 0 | 0 | 0 |

(c)

| 2 | 1 | 1 | 0 |
|---|---|---|---|
| 2 | 1 | 1 | 0 |
| 2 | 1 | 1 | 0 |
| 2 | 1 | 1 | 0 |

(d)

| 2 | 2 | 2 | 2 |
|---|---|---|---|
| 2 | 2 | 2 | 2 |
| 2 | 2 | 2 | 2 |
| 2 | 2 | 2 | 2 |

FIG. 34

```
if (idxCG == 0)
{
   // PATTERN 0
   sigCtx  =  (xB + yB <= 2) ? 1 : 0
}
else if (idxCG == 1)
{
   if (yC == 0)
     sigCtx = 2
   else
     sigCtx  = (yB <= 1) ? 1 : 0
}
else if (idxCG == 2)
{
   if (xC == 0)
     sigCtx = 2
   else
     sigCtx  =  (xB <= 1) ? 1 : 0
}
else if (idxCG == 3)
{
   // PATTERN 3
   sigCtx  =  (xB + yB <= 4) ? 2 : 1
}
```

| | | | |
|---|---|---|---|
| 1 | 1 | 1 | 0 |
| 1 | 1 | 0 | 0 |
| 1 | 0 | 0 | 0 |
| 0 | 0 | 0 | 0 |

(b)

| | | | |
|---|---|---|---|
| 1 | 1 | 1 | 1 |
| 1 | 1 | 1 | 1 |
| 0 | 0 | 0 | 0 |
| 0 | 0 | 0 | 0 |

(c)

| | | | |
|---|---|---|---|
| 1 | 1 | 0 | 0 |
| 1 | 1 | 0 | 0 |
| 1 | 1 | 0 | 0 |
| 1 | 1 | 0 | 0 |

(d)

| | | | |
|---|---|---|---|
| 2 | 2 | 2 | 2 |
| 2 | 2 | 2 | 2 |
| 2 | 2 | 2 | 1 |
| 2 | 2 | 1 | 1 |

(e)

| | | | |
|---|---|---|---|
| 2 | 2 | 2 | 2 |
| 1 | 1 | 1 | 1 |
| 0 | 0 | 0 | 0 |
| 0 | 0 | 0 | 0 |

(f)

| | | | |
|---|---|---|---|
| 2 | 1 | 0 | 0 |
| 2 | 1 | 0 | 0 |
| 2 | 1 | 0 | 0 |
| 2 | 1 | 0 | 0 |

```
if (idxCG == 7)
{
   // PATTERN 4
   sigCtx  =  2
}
else if ((idxCG&3) == 0)
{
   // PATTERN 0
   sigCtx  =  (xB + yB <= 2) ? 1 : 0
}
else if ((idxCG&3) == 1)
{
   // PATTERN 1
   sigCtx  = (yB <= 1) ? 1 : 0
}
else if ((idxCG&3) == 2)
{
   // PATTERN 2
   sigCtx  =  (xB <= 1) ? 1 : 0
}
else if ((idxCG&3) == 3)
{
   // PATTERN 3
   sigCtx  =  (xB + yB <= 4) ? 2 : 1
}
```

| | | | |
|---|---|---|---|
| 1 | 1 | 1 | 0 |
| 1 | 1 | 0 | 0 |
| 1 | 0 | 0 | 0 |
| 0 | 0 | 0 | 0 |

(b)

| | | | |
|---|---|---|---|
| 1 | 1 | 1 | 1 |
| 1 | 1 | 1 | 1 |
| 0 | 0 | 0 | 0 |
| 0 | 0 | 0 | 0 |

(c)

| | | | |
|---|---|---|---|
| 1 | 1 | 0 | 0 |
| 1 | 1 | 0 | 0 |
| 1 | 1 | 0 | 0 |
| 1 | 1 | 0 | 0 |

(d)

| | | | |
|---|---|---|---|
| 2 | 2 | 2 | 2 |
| 2 | 2 | 2 | 2 |
| 2 | 2 | 2 | 1 |
| 2 | 2 | 1 | 1 |

(e)

| | | | |
|---|---|---|---|
| 2 | 2 | 2 | 2 |
| 2 | 2 | 2 | 2 |
| 2 | 2 | 2 | 2 |
| 2 | 2 | 2 | 2 |

FIG. 48
(a)
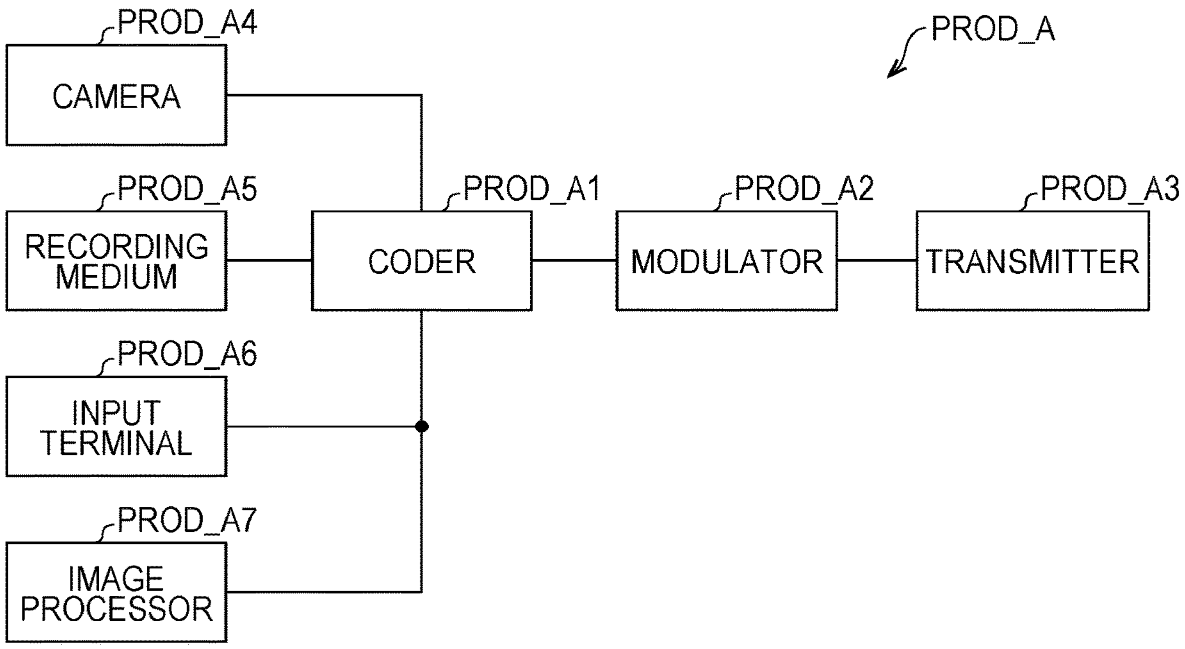
(b)
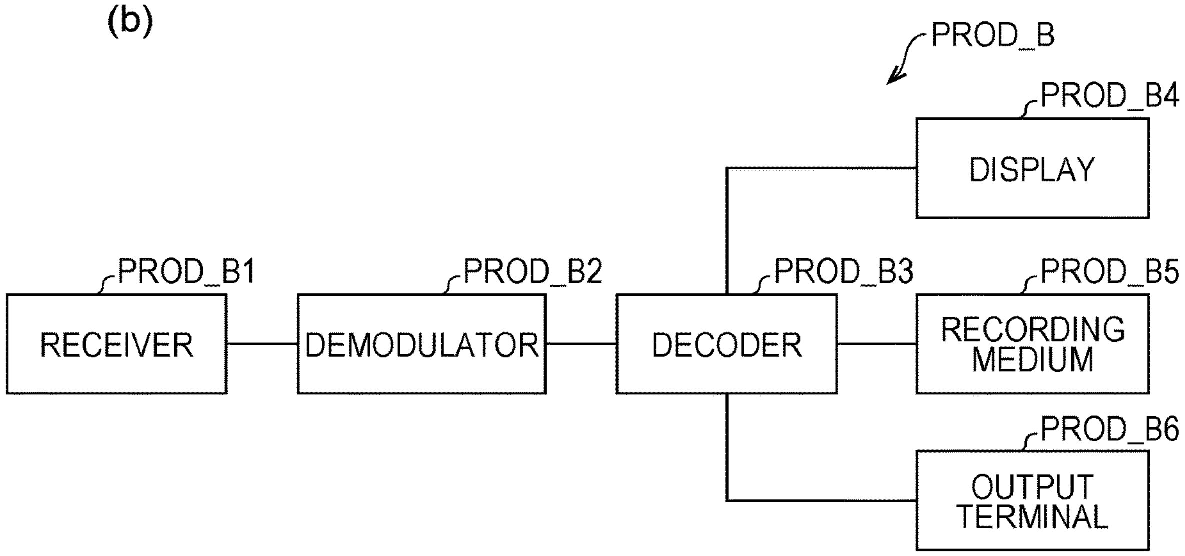

```
if (idxCG == 0)
{
   // PATTERN 0
   sigCtx  =  (xB + yB <= 2) ? 1 : 0
}
else if (idxCG == 1)
{
   // PATTERN 1
   sigCtx  = (yB <= 1) ? 1 : 0
}
else if (idxCG == 2)
{
   // PATTERN 2
   sigCtx  =  (xB <= 1) ? 1 : 0
}
else if (idxCG == 3)
{
   // PATTERN 3
   sigCtx  =  (xB + yB <= 4) ? 2 : 1
}
```

| | | | |
|---|---|---|---|
| 1 | 1 | 1 | 0 |
| 1 | 1 | 0 | 0 |
| 1 | 0 | 0 | 0 |
| 0 | 0 | 0 | 0 |

(b)

| | | | |
|---|---|---|---|
| 1 | 1 | 1 | 1 |
| 1 | 1 | 1 | 1 |
| 0 | 0 | 0 | 0 |
| 0 | 0 | 0 | 0 |

(c)

| | | | |
|---|---|---|---|
| 1 | 1 | 0 | 0 |
| 1 | 1 | 0 | 0 |
| 1 | 1 | 0 | 0 |
| 1 | 1 | 0 | 0 |

(d)

| | | | |
|---|---|---|---|
| 2 | 2 | 2 | 2 |
| 2 | 2 | 2 | 2 |
| 2 | 2 | 2 | 1 |
| 2 | 2 | 1 | 1 |

| | | | |
|---|---|---|---|
| 1 | 1 | 1 | 0 |
| 1 | 1 | 0 | 0 |
| 1 | 0 | 0 | 0 |
| 0 | 0 | 0 | 0 |

(b)

| | | | |
|---|---|---|---|
| 1 | 1 | 1 | 1 |
| 1 | 1 | 1 | 1 |
| 0 | 0 | 0 | 0 |
| 0 | 0 | 0 | 0 |

(c)

| | | | |
|---|---|---|---|
| 1 | 1 | 0 | 0 |
| 1 | 1 | 0 | 0 |
| 1 | 1 | 0 | 0 |
| 1 | 1 | 0 | 0 |

(d)

| | | | |
|---|---|---|---|
| 2 | 2 | 2 | 2 |
| 2 | 2 | 2 | 2 |
| 2 | 2 | 2 | 2 |
| 2 | 2 | 2 | 2 |

FIG. 54

```
if (idxCG == 0)
{
    if (xB + yB <= TH1) sigCtx = 2
    else if (xB + yB <= TH2) sigCtx = 1
    else sigCtx = 0
}
else if (idxCG == 1)
{
    if (xB + yB <= TH3) sigCtx = 2
    else if (xB + yB <= TH4) sigCtx = 1
    else sigCtx = 0
}
else if (idxCG == 2)
{
    sigCtx =  (xB + yB <= TH5) ? 2 : 1
}
```

| | | | |
|---|---|---|---|
| 2 | 1 | 1 | 0 |
| 1 | 1 | 0 | 0 |
| 1 | 0 | 0 | 0 |
| 0 | 0 | 0 | 0 |

(b)

| | | | |
|---|---|---|---|
| 2 | 2 | 1 | 1 |
| 2 | 1 | 1 | 0 |
| 1 | 1 | 0 | 0 |
| 1 | 0 | 0 | 0 |

FIG. 56

```
if (idxCG == 0)
{
    // PATTERN 0
    if (xB + yB == 0)        sigCtx = 2
    if (xB + yB < 3)         sigCtx = 1
    else                     sigCtx = 0
}
else if (idxCG == 1)
{
    // PATTERN 1
    if( yB == 0 )            sigCtx = 2
    if (yB == 1 )            sigCtx = 1
    else                     sigCtx = 0
}
else if (idxCG == 2)
{
    // PATTERN 2
    if (xB == 0 )            sigCtx = 2
    if (xB == 1)             sigCtx = 1
    else                     sigCtx = 0
}
else if (idxCG == 3)
{
    // PATTERN 3
    sigCtx = 2
}
```

FIG. 57

```
if (idxCG == 0)
{
    // PATTERN 0
    if (xB + yB < 3)          sigCtx = 1
    else                      sigCtx = 0
}
else if (idxCG == 1)
{
    // PATTERN 1
    if( yB==0 )               sigCtx = 2
    if (yB==1 )               sigCtx = 1
    else                      sigCtx = 0
}
else if (idxCG == 2)
{
    // PATTERN 2
    if (xB==0 )               sigCtx = 2
    if (xB ==1)               sigCtx = 1
    else                      sigCtx = 0
}
else if (idxCG == 3)
{
    // PATTERN 3
    sigCtx =  2
}
```

FIG. 58

```
if (idxCG == 0)
{
    // PATTERN 0
    if (xB + yB < 3)          sigCtx = 1
    else                      sigCtx = 0
}
else if (idxCG == 1)
{
    // PATTERN 1
    if (yB == 0)              sigCtx = 2
    else if (yB < 2)          sigCtx = 1
    else                      sigCtx = 0
}
else if (idxCG == 2)
{
    // PATTERN 2
    if (xB == 0)              sigCtx = 2
    else if (xB < 2)          sigCtx = 1
    else                      sigCtx = 0
}
else if (idxCG == 3)
{
    // PATTERN 3
    sigCtx = (xB + yB < 5) ? 2 : 1
}
```

FIG. 59

```
if (idxCG == 0)
{
    // PATTERN 0
    if (xB + yB < 2)            sigCtx = 2
    else if (xB + yB < 3)       sigCtx = 1
    else                        sigCtx = 0
}
else if (idxCG == 1)
{
    // PATTERN 1
    if (yB == 0)                sigCtx = 2
    else if (yB < 2)            sigCtx = 1
    else                        sigCtx = 0
}
else if (idxCG == 2)
{
    // PATTERN 2
    if (xB ==0)                 sigCtx = 2
    else if (xB < 2)            sigCtx = 1
    else                        sigCtx = 0
}
else if (idxCG == 3)
{
    // PATTERN 3
    sigCtx =  2
}
```

FIG. 60

```
if (idxCG == 0)
{
    // PATTERN 0
    if (xB + yB < 3)          sigCtx = 1
    else                      sigCtx = 0
}
else if (idxCG == 1)
{
    // PATTERN 1
    if (yB < 2)               sigCtx = 1
    else                      sigCtx = 0
}
else if (idxCG == 2)
{
    // PATTERN 2
    if (xB < 2)               sigCtx = 1
    else                      sigCtx = 0
}
else if (idxCG == 3)
{
    // PATTERN 3
    sigCtx =  2
}
```

| | | | |
|---|---|---|---|
| 2 | 2 | 1 | 0 |
| 2 | 1 | 0 | 0 |
| 1 | 0 | 0 | 0 |
| 0 | 0 | 0 | 0 |

(b)

| | | | |
|---|---|---|---|
| 2 | 2 | 2 | 2 |
| 1 | 1 | 1 | 1 |
| 0 | 0 | 0 | 0 |
| 0 | 0 | 0 | 0 |

(c)

| | | | |
|---|---|---|---|
| 2 | 1 | 0 | 0 |
| 2 | 1 | 0 | 0 |
| 2 | 1 | 0 | 0 |
| 2 | 1 | 0 | 0 |

(d)

| | | | |
|---|---|---|---|
| 2 | 2 | 2 | 2 |
| 2 | 2 | 2 | 2 |
| 2 | 2 | 2 | 2 |
| 2 | 2 | 2 | 2 |

FIG. 62

```
if (idxCG == 0)
{
    // PATTERN 0
    if (xB + yB < 2)          sigCtx = 2
    else if (xB + yB < 3)     sigCtx = 1
    else                      sigCtx = 0
}
else if (idxCG == 1)
{
    // PATTERN 1
    if (yB == 0)              sigCtx = 2
    else if (yB == 1)         sigCtx = 1
    else                      sigCtx = 0
}
else if (idxCG == 2)
{
    // PATTERN 2
    if (xB ==0)               sigCtx = 2
    else if (xB == 1)         sigCtx = 1
    else                      sigCtx = 0
}
else if (idxCG == 3)
{
    // PATTERN 3
    sigCtx =  2
}
```

| | | | |
|---|---|---|---|
| 2 | 2 | 1 | 1 |
| 2 | 1 | 1 | 0 |
| 1 | 1 | 0 | 0 |
| 1 | 0 | 0 | 0 |

(b)

| | | | |
|---|---|---|---|
| 2 | 2 | 2 | 2 |
| 1 | 1 | 1 | 1 |
| 0 | 0 | 0 | 0 |
| 0 | 0 | 0 | 0 |

(c)

| | | | |
|---|---|---|---|
| 2 | 1 | 0 | 0 |
| 2 | 1 | 0 | 0 |
| 2 | 1 | 0 | 0 |
| 2 | 1 | 0 | 0 |

(d)

| | | | |
|---|---|---|---|
| 2 | 2 | 2 | 2 |
| 2 | 2 | 2 | 2 |
| 2 | 2 | 2 | 2 |
| 2 | 2 | 2 | 2 |

FIG. 64

```
if (idxCG == 0)
{
    // PATTERN 0
    if (xB + yB < 2)          sigCtx = 2
    else if (xB + yB < 4)     sigCtx = 1
    else                      sigCtx = 0
}
else if (idxCG == 1)
{
    // PATTERN 1
    if (yB == 0)              sigCtx = 2
    else if (yB == 1)         sigCtx = 1
    else                      sigCtx = 0
}
else if (idxCG == 2)
{
    // PATTERN 2
    if (xB == 0)              sigCtx = 2
    else if (xB == 1)         sigCtx = 1
    else                      sigCtx = 0
}
else if (idxCG == 3)
{
    // PATTERN 3
    sigCtx = 2
}
```

| ctxIdx | REMARKS |
|---|---|
| 0 | CONTEXT INDEX FOR DC COMPONENT |
| 1–8 | CONTEXT INDEX FOR 4x4 TU |
| 9–11 | CONTEXT INDEX FOR 8x8 TU (LOW FREQUENCY) |
| 12–14 | CONTEXT INDEX FOR 8x8 TU (HIGH FREQUENCY) |
| 15–17 | CONTEXT INDEX FOR 16x16 TU TO 32x32 TU (LOW FREQUENCY) |
| 18–20 | CONTEXT INDEX FOR 16x16 TU TO 32x32 TU (HIGH FREQUENCY) |

FIG. 69

| ctxIdx | REMARKS |
|---|---|
| 0 | CONTEXT INDEX FOR DC COMPONENT |
| 1−8 | CONTEXT INDEX FOR 4x4 TU |
| 9−11 | CONTEXT INDEX FOR UP-RIGHT DIAGONAL SCAN OF 8x8 TU (LOW FREQUENCY) |
| 12−14 | CONTEXT INDEX FOR UP-RIGHT DIAGONAL SCAN OF 8x8 TU (HIGH FREQUENCY) |
| 15−17 | CONTEXT INDEX FOR VERTICAL FAST SCAN OR HORIZONTAL FAST SCAN OF 8x8 TU (LOW FREQUENCY) |
| 18−20 | CONTEXT INDEX FOR VERTICAL FAST SCAN OR HORIZONTAL FAST SCAN OF 8x8 TU (HIGH FREQUENCY) |
| 21−23 | CONTEXT INDEX FOR 16x16 TU TO 32x32 TU (LOW FREQUENCY) |
| 24−26 | CONTEXT INDEX FOR 16x16 TU TO 32x32 TU (HIGH FREQUENCY) |

FIG. 70

```
if (idxCG == 0)
{
    // PATTERN 0
    if( scanIdx==0 ){//UP-RIGHT DIAGONAL SCAN
      sigCtx = (xB+yB<2) ? 2 : (xB+yB<3) ? 1 : 0
    }
    else if (scanIdx==1){//HORIZONTAL FAST SCAN
      sigCtx = (xB+2*yB<3) ? 2 : (xB+2*yB<5) ? 1 : 0
    }
    else{//VERTICAL FAST SCAN
      sigCtx = (2*xB+yB<3) ? 2 : (2*xB+yB<5) ? 1 : 0
    }
}
else if (idxCG == 1)
{
    // PATTERN 1
    sigCtx = (yB==0) ? 2 : (yB==1) ? 1 : 0
}
else if (idxCG == 2)
{
    // PATTERN 2
    sigCtx = (xB==0) ? 2 : (xB==1) ? 1 : 0
}
else if (idxCG == 3)
{
    // PATTERN 3
    sigCtx =  2
}
```

| | | | |
|---|---|---|---|
| 2 | 2 | 1 | 0 |
| 2 | 1 | 0 | 0 |
| 1 | 0 | 0 | 0 |
| 0 | 0 | 0 | 0 |

(b)

| | | | |
|---|---|---|---|
| 2 | 2 | 2 | 1 |
| 2 | 1 | 1 | 0 |
| 1 | 0 | 0 | 0 |
| 0 | 0 | 0 | 0 |

(c)

| | | | |
|---|---|---|---|
| 2 | 2 | 1 | 0 |
| 2 | 1 | 0 | 0 |
| 2 | 1 | 0 | 0 |
| 1 | 0 | 0 | 0 |

(d)

| | | | |
|---|---|---|---|
| 2 | 2 | 2 | 2 |
| 1 | 1 | 1 | 1 |
| 0 | 0 | 0 | 0 |
| 0 | 0 | 0 | 0 |

(e)

| | | | |
|---|---|---|---|
| 2 | 1 | 0 | 0 |
| 2 | 1 | 0 | 0 |
| 2 | 1 | 0 | 0 |
| 2 | 1 | 0 | 0 |

(f)

| | | | |
|---|---|---|---|
| 2 | 2 | 2 | 2 |
| 2 | 2 | 2 | 2 |
| 2 | 2 | 2 | 2 |
| 2 | 2 | 2 | 2 |

| | | | |
|---|---|---|---|
| 2 | 2 | 2 | 2 |
| 2 | 1 | 1 | 1 |
| 1 | 1 | 0 | 0 |
| 0 | 0 | 0 | 0 |

(b)

| | | | |
|---|---|---|---|
| 2 | 2 | 1 | 0 |
| 2 | 1 | 1 | 0 |
| 2 | 1 | 0 | 0 |
| 2 | 1 | 0 | 0 |

FIG. 73

```
if (idxCG == 0)
{
    // PATTERN 0
    if( scanIdx==0 ){//UP-RIGHT DIAGONAL SCAN
      sigCtx = (xB+yB<2) ? 2 : (xB+yB<3) ? 1 : 0
    }
    else if (scanIdx==1){//HORIZONTAL FAST SCAN
      sigCtx = (xB+2*yB<3) ? 2 : (xB+2*yB<5) ? 1 : 0
    }
    else{//VERTICAL FAST SCAN
      sigCtx = (2*xB+yB<3) ? 2 : (2*xB+yB<5) ? 1 : 0
    }
}
else if (idxCG == 1)
{
    // PATTERN 1
    if( scanIdx==0){
      //UP-RIGHT DIAGONAL SCAN
      sigCtx = (yB==0) ? 2 : (yB==1) ? 1 : 0
    }
    else if (scanIdx==1){//HORIZONTAL FAST SCAN
      sigCtx = (xB+3*yB<4) ? 2 : (xB+3*yB<8) ? 1 : 0
    }
    else{//VERTICAL FAST SCAN
      sigCtx = (3*xB+yB<4) ? 2 : (3*xB+yB<8) ? 1 : 0
    }
}
else if (idxCG == 2)
{
    // PATTERN 2
    if( scanIdx==0){
      //UP-RIGHT DIAGONAL SCAN
      sigCtx = (yB==0) ? 2 : (yB==1) ? 1 : 0
    }
    else if (scanIdx==1){//HORIZONTAL FAST SCAN
      sigCtx = (xB+3*yB<4) ? 2 : (xB+3*yB<8) ? 1 : 0
    }
    else{//VERTICAL FAST SCAN
      sigCtx = (3*xB+yB<4) ? 2 : (3*xB+yB<8) ? 1 : 0
    }
}
else if (idxCG == 3)
{
    // PATTERN 3
    sigCtx = 2
}
```

ARITHMETIC DECODING DEVICE, IMAGE DECODING APPARATUS, ARITHMETIC CODING DEVICE, AND IMAGE CODING APPARATUS

This application is a continuation of U.S. patent application Ser. No. 15/635,238 filed Jun. 28, 2017 (pending, which is a continuation of U.S. patent application Ser. No. 15/468,142 filed Mar. 24, 2017 (granted as U.S. Pat. No. 9,794,572), which is a continuation of U.S. patent application Ser. No. 15/341,019 filed Nov. 2, 2016 (granted as U.S. Pat. No. 9,699,479), which is a continuation of U.S. patent application Ser. No. 14/402,114 filed Nov. 19, 2014 (granted as U.S. Pat. No. 9,538,205), which is the national stage of PCT application PCT/JP2013/064447 filed May 24, 2013, which claims priority of JP Application 2012-126567 filed Jun. 1, 2012 and JP Application 2012-178842 filed Aug. 10, 2012, the entire content of each of which is incorporated herein by reference.

TECHNICAL FIELD

The present invention relates to an arithmetic decoding device which decodes coded data that is arithmetically coded, and an image decoding apparatus including the arithmetic decoding device. In addition, the present invention relates to an arithmetic coding device which generates coded data that is arithmetically coded, and an image coding apparatus including the arithmetic coding device.

BACKGROUND ART

In order to efficiently transmit or record moving images, a moving image coding apparatus (image coding apparatus) which generates coded data by coding a moving image, and a moving image decoding apparatus (image decoding apparatus) which generates a decoded image by decoding the coded data, are used.

As a specific moving image coding method, for example, there are methods (NPL 1) proposed in H. 264/MPEG-4. AVC, and High-Efficiency Video Coding (HEVC) which is a succeeding codec thereof.

In such moving image coding methods, an image (picture) forming a moving image is managed in a layer structure which is constituted by a slice obtained by dividing the image, a coding unit obtained by dividing the slice, and a block and a partition obtained by dividing the coding unit, and the image is commonly coded and decoded for each block.

In addition, in these coding methods, typically, a predicted image is generated on the basis of a local coded image obtained by coding and decoding an input image, and coding is performed on a transform coefficient which is obtained by performing frequency transform such as discrete cosine transform (DCT) on a difference image (also referred to as a "residual image" or "prediction residual" in some cases) between the predicted image and the input image for each block.

As a specific method of coding a transform coefficient, context-based adaptive variable length coding (CAVLC) and context-based adaptive binary arithmetic coding (CABAC) are known.

In CAVLC, a one-dimensional vector is generated by sequentially scanning each transform coefficient, and syntax indicating a value of each transform coefficient, syntax indicating a length (also referred to as a run) of consecutive 0s, and the like are coded.

In CABAC, a binarization process is performed on various syntax elements indicating a transform coefficient, and binary data obtained through the binarization process is arithmetically coded. Here, the various syntax elements include a flag indicating whether or not a transform coefficient is 0, that is, a flag significant_coeff_flag (also referred to as transform coefficient presence/absence flag) indicating whether or not non-zero transform coefficient is present, syntax elements last_significant_coeff_x and last_significant_coeff_y indicating a position of the last non-zero transform coefficient in a process order, and the like.

In addition, in CABAC, when a single symbol (also referred to as 1 bit of binary data, or a Bin) is coded, a context index assigned to a process target frequency component is referred to, and arithmetic coding is performed corresponding to probability of occurrence indicated by a probability state index included in a context variable designated by the context index. In addition, the probability of occurrence designated by the probability state index is updated whenever a single symbol is coded.

In addition, in NPL 1, two-layer coding is employed as a method of coding a non-zero transform coefficient. In the two-layer coding, the transform unit is split into a plurality of sub-blocks, a flag (significant_coeff_flag) indicating whether or not a transform coefficient is non-zero is coded for each transform coefficient included in each sub-block, and a flag (also referred to as significant_coeff_group_flag, or coded_sub_block_flag) indicating whether or not a non-zero transform coefficient is included in each sub-block is coded in the sub-block units.

Further, in NPL 1, the following coding is performed in accordance with a size of the transform unit (TU). In other words, in the small TU (4×4 or 8×8), 4×4 or 8×2 is used as a sub-block size, and a context which is assigned to a frequency component is derived on the basis of a position. In the context derivation based on a position, a context index (also referred to as a position context) which is defined in accordance with a position of a frequency component in a frequency domain is assigned to the frequency component.

In addition, in the large TU (16×16, 32×32, 16×4, 4×16, 32×8, or 8×32), 4×4 is used as a sub-block size, and a context which is assigned to a frequency component on the basis of periphery reference is derived. In the context derivation based on periphery reference, a context index (also referred to as a periphery reference context) which is defined in accordance with the number of non-zero transform coefficients (that is, significant_coeff_flag is referred to) in peripheral frequency components of a corresponding frequency component is assigned to the frequency component.

In contrast, NPL 2 submits a proposal to abolish the context derivation based on periphery reference as described above, and this proposal is expected to be accepted in the next version (HM7) of an HEVC test model.

NPL 2 proposes that a derivation pattern is selected in accordance with whether or not a non-zero transform coefficient is present in an adjacent sub-block, and a context index is derived from a position in a sub-block according to the selected derivation pattern.

With reference to FIGS. 50 to 52, the proposed content in NPL 2 will be described below. In relation to a process target sub-block X illustrated in FIG. 50, the following patterns are obtained from a state of a non-zero transform coefficient in a sub-block A adjacent to the right side of the sub-block X and a sub-block B adjacent to the lower side thereof.

(Pattern 0) A case where a value of a sub-block coefficient presence/absence flag is 0 in both the right adjacent sub-block (xCG+1,yCG) and the lower adjacent sub-block (xCG,yCG+1)

(Pattern 1) A case where a value of the sub-block coefficient presence/absence flag is 1 in the right adjacent sub-block (xCG+1,yCG), a value of the sub-block coefficient presence/absence flag is 0 in the lower adjacent sub-block (xCG,yCG+1)

(Pattern 2) A case where a value of the sub-block coefficient presence/absence flag is 0 in the right adjacent sub-block (xCG+1,yCG), a value of the sub-block coefficient presence/absence flag is 1 in the lower adjacent sub-block (xCG,yCG+1)

(Pattern 3) A case where a value of the sub-block coefficient presence/absence flag is 1 in both the right adjacent sub-block (xCG+1,yCG) and the lower adjacent sub-block (xCG,yCG+1)

According to NPL 2, a pattern index idxCG indicating the patterns is obtained by using the following Equation (X).

$$idxCG = significant\_coeff\_group\_flag[xCG+1][yCG] + (significant\_coeff\_group\_flag[xCG][yCG+1] << 1) \quad (X)$$

In addition, a context index is derived by using coordinates (xB,yB) in the sub-block X in a method illustrated in FIG. 51 in accordance with the pattern index idxCG. With reference to FIG. 51, description will be made of a value of a context index which is derived in each case of the patterns 0 to 3.

(Case of Pattern 0)

In a case of the pattern 0, a context index is derived by sigCtx=(xB+yB<=2)?1:0.

Values of the context index are arranged as illustrated in FIG. 52 (*a*).

(Case of Pattern 1)

In a case of the pattern 1, a context index is derived by sigCtx=(yB<=1)?1:0.

Therefore, as illustrated in FIG. 52(*b*), values of the context indexes are 1 in the first and second rows of the sub-block, and values of the context indexes are 0 in the third and fourth rows of the sub-block.

(Case of Pattern 2)

In a case of the pattern 2, a context index is derived by sigCtx=(xB<=1)?1:0.

Therefore, as illustrated in FIG. 52(*c*), values of the context indexes are 1 in the first and second columns of the sub-block, and values of the context indexes are 0 in the third and fourth columns of the sub-block.

(Case of Pattern 3)

In a case of the pattern 3, a context index is derived by sigCtx=(xB+yB<=4)?2:1.

Therefore, in a case of the pattern 3, if a sum of the coordinate xB in the horizontal direction and the coordinate yB in the vertical direction of the coordinates (xB,yB) in the sub-block is 4 or less, a value of the context index is 1, and, otherwise, a value of the context index is 0.

Therefore, values of the context indexes are arranged as illustrated in FIG. 52(*d*).

In addition, NPL 3 proposes that, in an 8×8 TU, shapes of sub-blocks which are different from each other in each scan direction are unified to a 4×4 sub-block, and also in 8×8 TU to 32×32 TU, a derivation pattern is selected in accordance with whether or not a non-zero transform coefficient is present in an adjacent sub-block, and a context index regarding a transform coefficient presence/absence flag is derived from a position in the sub-block according to the selected derivation pattern. Further, according to NPL 3, a proposal is submitted that, in relation to an 8×8 TU of luminance, contexts regarding a transform coefficient presence/absence flag are differentiated from each other according to scan directions which are an up-right diagonal direction and a horizontal or vertical direction. In other words, a context is shared in a vertical scan and horizontal scan separately from a context in an up-right diagonal scan.

CITATION LIST

Non Patent Literature

NPL 1: "Suggested bug-fixes for HEVC text specification draft 6 (JCTVC-I0030)", Joint Collaborative Team on Video Coding (JCT-VC) of ITU-T SG16 WP3 and ISO/IEC JTC1/SC29/WG11 9th Meeting: Geneva, CH, 27 Apr. to 7 May 2012 (published in April, 2012)

NPL 2: "Non-CE3: Simplified context derivation for significance map (JCTVC-I0296)", Joint Collaborative Team on Video Coding (JCT-VC) of ITU-T SG 16 WP 3 and ISO/IEC JTC 1/SC 29/WG 11 9th Meeting: Geneva, CH, 27 Apr. to 7 May 2012 (published in April, 2012)

NPL 3: "Removal of the 8×2/2×8 coefficient groups (JCTVC-J0256)", Joint Collaborative Team on Video Coding (JCT-VC) of ITU-T SG 16 WP 3 and ISO/IEC JTC 1/SC 29/WG 11 10th Meeting: Stockholm, SW, 11 to 20 Jul. 2012 (published in July, 2012)

SUMMARY OF INVENTION

Technical Problem

However, in the above-described related art, there remains a problem in that processes related to coding and decoding of a transform coefficient are complex, and coding efficiency is not sufficient.

The present invention has been made in light of the problems, and an object thereof is to realize an arithmetic decoding device, an image decoding apparatus, an arithmetic coding device, and an image coding apparatus, in which hardware is simplified by simplifying processes related to coding and decoding of a transform coefficient, and coding efficiency is improved.

Solution to Problem

In order to solve the above-described problems, an arithmetic decoding device according to an embodiment of the present invention decodes coded data of a transform coefficient obtained by performing frequency transform on a target image for each unit domain, the device including sub-block coefficient presence/absence flag decoding means for decoding a sub-block coefficient presence/absence flag indicating whether or not at least one non-zero transform coefficient is included in each of a plurality of sub-blocks into which the unit domain is split; and context index deriving means for deriving a context index corresponding to a transform coefficient presence/absence flag indicating whether or not the transform coefficient of a process target is 0, in which, in a case where the non-zero transform coefficient is not included in at least two adjacent sub-blocks which are adjacent to a process target sub-block, the context index deriving means derives three context indexes having different values.

In order to solve the above-described problems, an arithmetic decoding device according to an embodiment of the present invention decodes coded data of a transform coefficient obtained by performing frequency transform on a target image for each unit domain, the device including sub-block coefficient presence/absence flag decoding means for decoding a sub-block coefficient presence/absence flag indicating whether or not at least one non-zero transform coefficient is included in each of a plurality of sub-blocks into which the unit domain is split; and context index deriving means for deriving a context index corresponding to a transform coefficient presence/absence flag indicating whether or not the transform coefficient of a process target is 0, in which the number of derived context indexes is different depending on whether or not the non-zero transform coefficient is included in at least two adjacent sub-blocks which are adjacent to a process target sub-block.

In order to solve the above-described problems, an image decoding apparatus according to an embodiment of the present invention includes the arithmetic decoding device; inverse frequency transform means for generating a residual image by performing inverse frequency transform on a transform coefficient which is decoded by the arithmetic decoding device; and decoded image generating means for generating a decoded image by adding up the residual image generated by the inverse frequency transform means and a predicted image which is predicted from a generated decoded image.

In order to solve the above-described problems, an arithmetic coding device according to an embodiment of the present invention arithmetically codes each element of syntax indicating a transform coefficient obtained by performing frequency transform on a target image for each unit domain, the device including sub-block coefficient presence/absence flag coding means for coding a sub-block coefficient presence/absence flag indicating whether or not at least one non-zero transform coefficient is included in each of a plurality of sub-blocks into which the unit domain is split; and context index deriving means for deriving a context index corresponding to a transform coefficient presence/absence flag indicating whether or not the process target transform coefficient is 0, in which, in a case where the non-zero transform coefficient is not included in at least two adjacent sub-blocks which are adjacent to a process target sub-block, the context index deriving means derives three context indexes having different values.

In order to solve the above-described problems, an arithmetic coding device according to an embodiment of the present invention arithmetically codes each element of syntax indicating a transform coefficient obtained by performing frequency transform on a target image for each unit domain, the device including sub-block coefficient presence/absence flag decoding means for coding a sub-block coefficient presence/absence flag indicating whether or not at least one non-zero transform coefficient is included in each of a plurality of sub-blocks into which the unit domain is split; and context index deriving means for deriving a context index corresponding to a transform coefficient presence/absence flag indicating whether or not the process target transform coefficient is 0, in which the number of derived context indexes is different depending on whether or not the non-zero transform coefficient is included in at least two adjacent sub-blocks which are adjacent to a process target sub-block.

In order to solve the above-described problems, an image coding apparatus according to an embodiment of the present invention includes transform coefficient generating means for generating a transform coefficient by performing frequency transform on a residual image between a coding target image and a predicted image for each unit domain; and any one of the arithmetic coding devices, in which the arithmetic coding device generates coded data by arithmetically coding syntax which is a transform coefficient generated by the transform coefficient generating means.

Advantageous Effects of Invention

As described above, in the arithmetic decoding device according to the present invention, when a non-zero transform coefficient is not present in any of sub-blocks adjacent to the process target sub-block, on the basis of the determination result, the context index deriving means derives the context indexes which respectively correspond to a case where an occurrence probability of a non-zero transform coefficient is low, a case where an occurrence probability of a non-zero transform coefficient is high, and a case where an occurrence probability of a non-zero transform coefficient is intermediate between the high case and the low case, according to a position of a process target transform coefficient in the process target sub-block.

Therefore, it is possible to realize a context derivation pattern which is more suitable for an actual occurrence probability of a transform coefficient, and thus it is possible to improve coding efficiency.

As mentioned above, in the arithmetic decoding device according to the present invention, if coordinates of the sub-block having the 4×4 size are set to (xB,yB) (where xB is a coordinate in a horizontal direction, yB is a coordinate in a vertical direction, and the upper left side of the sub-block is set to an origin (0,0)), when a scan order applied to the sub-block is up-right diagonal scan, in a case where a determined directivity is a vertical direction, the context index deriving means derives the context index corresponding to a case where an occurrence probability of a transform coefficient is higher than in domains other than a domain formed by (0,0) to (0,3), (1,0) to (1,2), and (2,0), and in a case where a determined directivity is a horizontal direction, the context index deriving means derives the context index corresponding to a case where an occurrence probability of a transform coefficient is higher than in domains other than a domain formed by (0,0) to (3,0), (0,1) to (2,1), and (0,2).

Therefore, it is possible to suppress changes in context indexes in a sub-block when compared with the related art. Accordingly, as described above, in hardware which defines the number of repeated 0s and 1s, mounting of the hardware is simplified.

As mentioned above, the arithmetic decoding device according to the present invention include transform coefficient decoding means for decoding a transform coefficient by using a scan order according to a directivity which is determined by directivity determining means for determining a directivity of a distribution of a transform coefficient.

According to the configuration, it is possible to decode a transform coefficient by using a scan order according to a directivity of a distribution of a transform coefficient. Accordingly, as described above, in hardware which defines the number of repeated 0s and 1s, mounting of the hardware is simplified.

As mentioned above, in the arithmetic decoding device according to the present invention, the context index deriving means derives the context index by using a sum of a coordinate in a horizontal direction and a coordinate in a vertical direction of a process target transform coefficient in the process target sub-block according to the number counted by coefficient-present-sub-block number counting means for counting the number of sub-blocks including at least one non-zero transform coefficient for each sub-block adjacent to a process target sub-block on the basis of the sub-block coefficient presence/absence flag.

In the configuration, since a sub-block coefficient presence/absence flag is not differentiated between a right adjacent sub-block and a lower adjacent sub-block, it is possible to achieve and effect of simplifying mounting of hardware.

As mentioned above, in the arithmetic decoding device according to the present invention, the context index deriving means derives the context index by using higher-order bits in 2-bit expression of each of coordinates in a horizontal direction and a vertical direction of a process target transform coefficient in the process target sub-block according to a determination result from pattern determining means for determining a pattern of a value of a sub-block coefficient presence/absence flag which is decoded for each sub-block adjacent to a process target sub-block.

As mentioned above, the arithmetic decoding device according to the present invention includes transform coefficient decoding means for decoding a transform coefficient by using a scan order in a partial domain with respect to respective partial domains each having a 2×2 size, obtained by splitting a sub-block having a 4×4 size into four domains.

According to the configuration, since coordinates in a scan order (for example, coordinates of frequency components adjacent to each other in the scan order) can be prevented from being considerably changed, transform coefficients which have spatially the same kinds of characteristics as each other can be sequentially decoded. As a result, coding efficiency is improved.

As mentioned above, in the arithmetic decoding device according to the present invention, the context index deriving means derives the context index by using coordinates in the unit domain of the process target in the process target sub-block according to a directivity determined by directivity determining means for determining a directivity of a distribution of transform coefficients on the basis of a sub-block coefficient presence/absence flag in a sub-block adjacent to a process target sub-block.

According to the configuration, since a context index corresponding to a case where an occurrence probability of a non-zero transform coefficient is high is used in a case where a probability of the presence of the horizontal edge or the vertical edge is high, it is possible to improve coding efficiency.

As mentioned above, in the arithmetic decoding device according to the present invention, in a case where at least one non-zero transform coefficient is included in sub-blocks of a predetermined number or more as a result of determining whether or not at least one non-zero transform coefficient is included in each of sub-blocks adjacent to a process target sub-block on the basis of the sub-block coefficient presence/absence flag, the context index deriving means derives the context index corresponding to a case where an occurrence probability of a non-zero transform coefficient is high, equally in the process target sub-block.

Therefore, in a case where an occurrence probability of a non-zero transform coefficient is equally high, it is possible to derive the context index corresponding to a case where an occurrence probability of a non-zero transform coefficient is high, equally in the process target sub-block, and thus it is possible to improve coding efficiency.

As described above, according to the present invention, it is possible to realize hardware simplification by simplifying processes related to coding and decoding of a transform coefficient, and to improve coding efficiency when compared with the configuration of the related art.

In addition, the arithmetic coding device having a configuration corresponding to the configuration can achieve the same effects.

Figure 3:
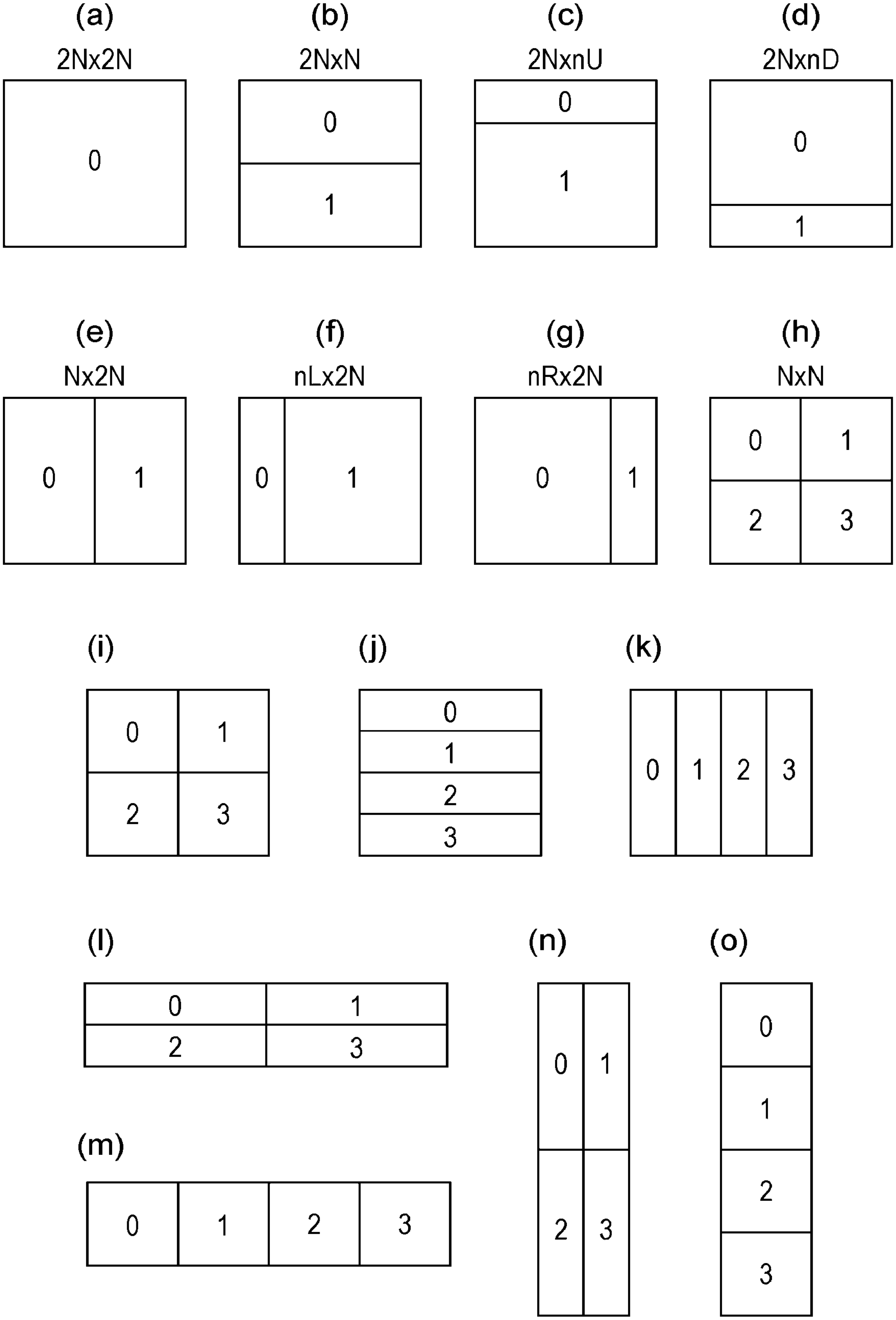

(a) to (h) in FIG. 3 are diagrams illustrating a PU split type pattern, and respectively illustrate partition shapes in cases of 2N×2N, 2N×N, 2N×nU, 2N×nD, N×2N, nL×2N, and nR×2D; (i) to (o) in FIG. 3 are diagrams illustrating split methods in which a square node is subdivided into square or non-square quadtrees in which (i) in FIG. 3 illustrates split into square shapes, (j) in FIG. 3 illustrates split into rectangular shapes which are transversely long, (k) in FIG. 3 illustrates split into rectangular shapes which are longitudinally long, (1) in FIG. 3 illustrates that a transversely long node is split into rectangular shapes which are transversely long, (m) in FIG. 3 illustrates that a transversely long node is split into square shapes, (n) in FIG. 3 illustrates that a longitudinally long node is split into rectangular shapes which are longitudinally long, and (o) in FIG. 3 illustrates that a longitudinally long node is split into square shapes.

Figure 4:
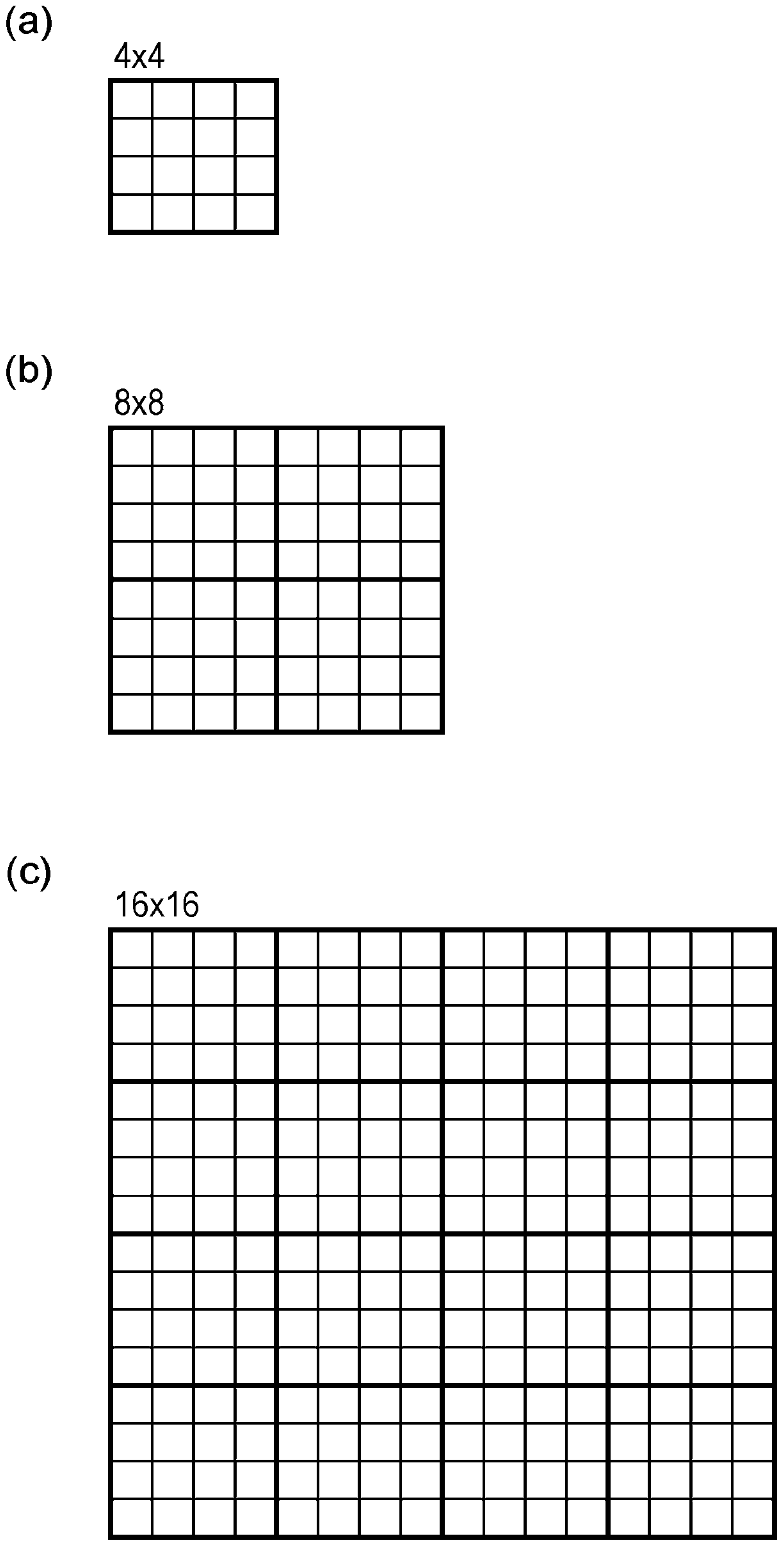

FIG. 4 illustrates a relationship between a block and a sub-block, in which (a) in FIG. 4 illustrates an example in which a 4×4 TU is formed by a single sub-block including 4×4 components; (b) in FIG. 4 illustrates an example in which an 8×8 TU is formed by four sub-blocks each including 4×4 components; and (c) in FIG. 4 illustrates an example in which a 16×16 TU is formed by sixteen sub-blocks each including 4×4 components.

Figure 5:
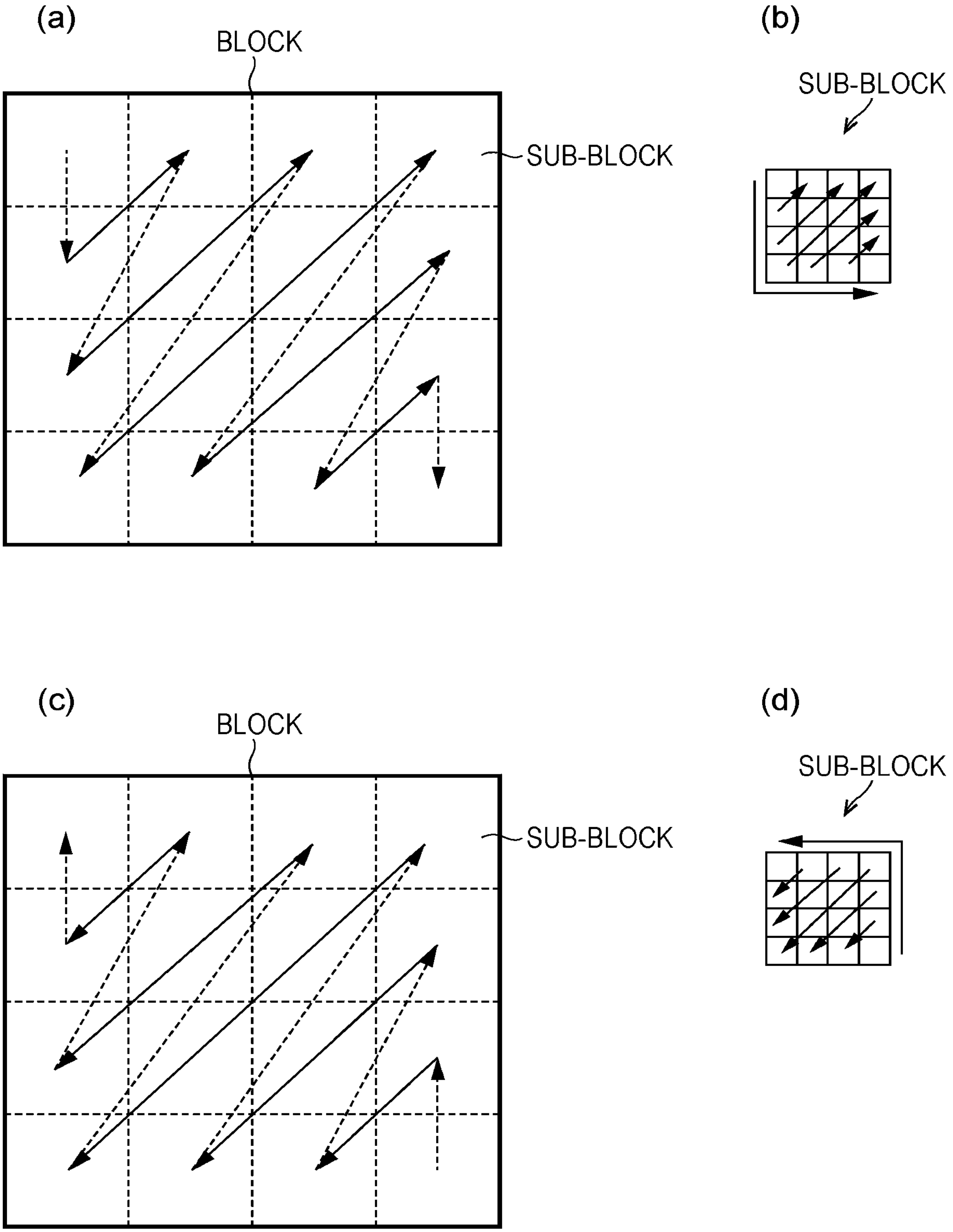

FIG. 5 illustrates a scan order in a decoding process and a coding process according to the embodiment, in which (a) in FIG. 5 illustrates that a sub-block scan is a forward scan, (b) in FIG. 5 illustrates that a scan in a sub-block is a forward scan, (c) in FIG. 5 illustrates that a sub-block scan is a backward scan, and (d) in FIG. 5 illustrates that a scan in a sub-block is a backward scan.

Figure 6:
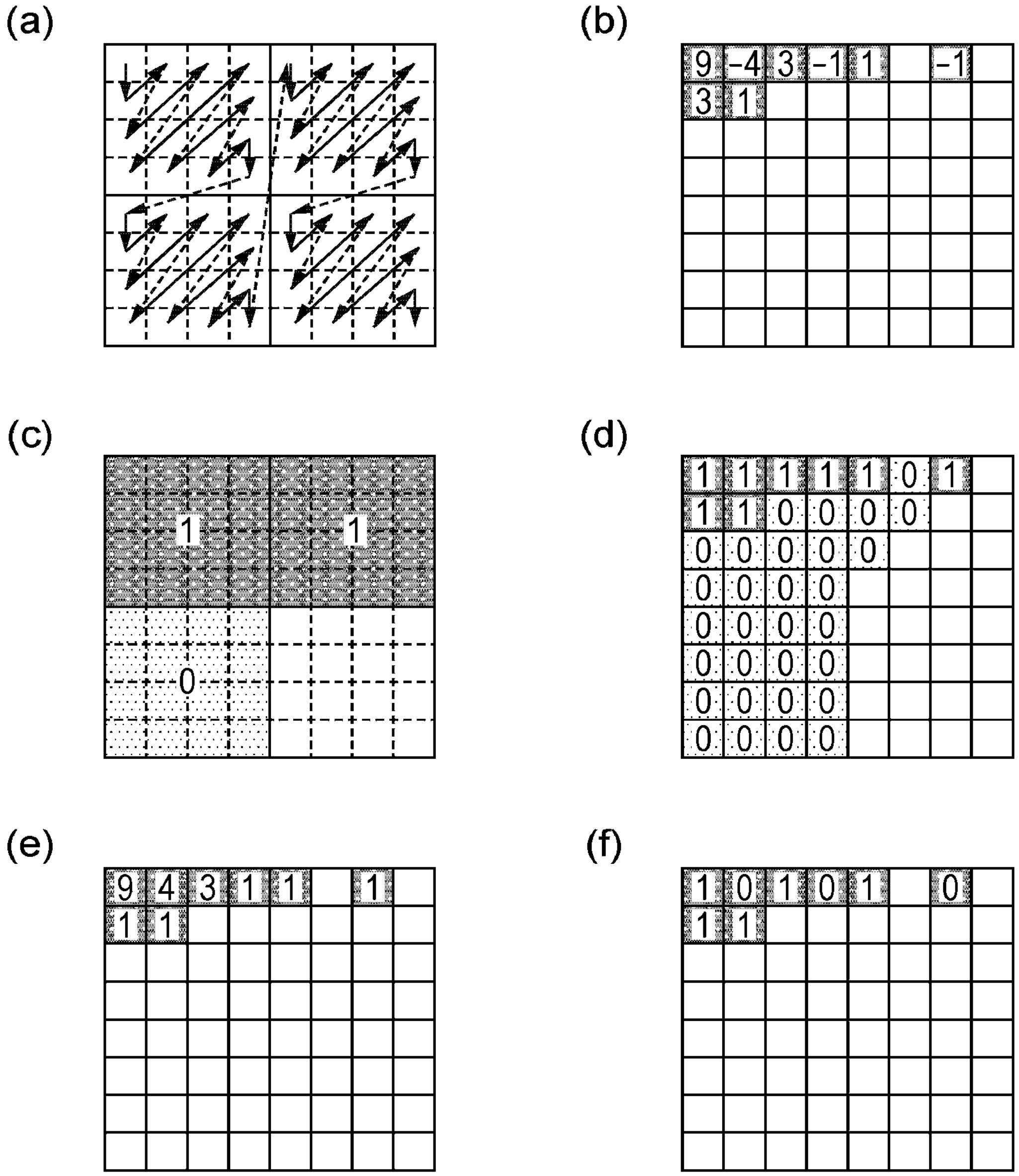

FIG. 6 illustrates a decoding process of a non-zero transform coefficient in the embodiment in which (a) in FIG. 6 illustrates a scan order in a case where a block having a TU size of 8×8 is split into sub-blocks each having a size of 4×4, and respective frequency components are scanned in a forward scan; (b) in FIG. 6 exemplifies transform coefficients (non-zero transform coefficients) which are not 0 in a frequency domain a frequency component having a TU size of 8×8; (c) in FIG. 6 illustrates each value of a sub-block coefficient presence/absence flag significant_coeff_group_flag which is decoded for each sub-block in a case where decoding target transform coefficients are ones illustrated in (b) in FIG. 6; (d) in FIG. 6 illustrates each value of syntax significant_coeff_flag indicating the presence or absence of a non-zero transform coefficient in a case where decoding target transform coefficients are ones illustrated in (b) in FIG. 6; (e) in FIG. 6 illustrates an absolute value of each transform coefficient obtained by decoding syntaxes coeff_abs_level_greater1_flag, coeff_abs_level_greater2_flag, and coeff_abs_level_remaining in a case where decoding target transform coefficients are ones illustrated in (b) in FIG. 6; and (f) in FIG. 6 illustrates syntax coeff_sign_flag in a case where decoding target transform coefficients are ones illustrated in (b) in FIG. 6.

Figure 7:
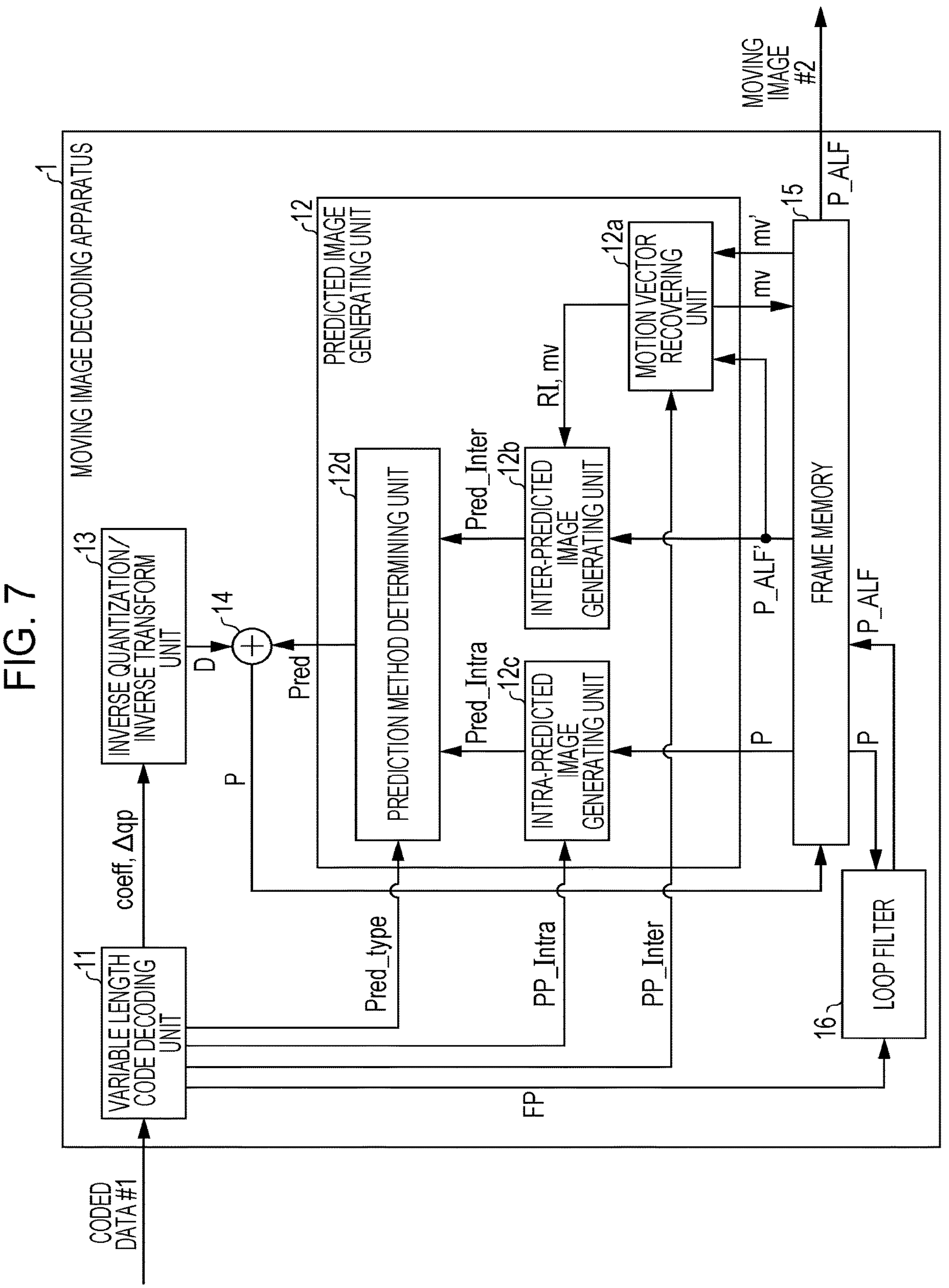

FIG. 7 is a block diagram illustrating a configuration of a moving image decoding apparatus according to the embodiment.

Figure 8:
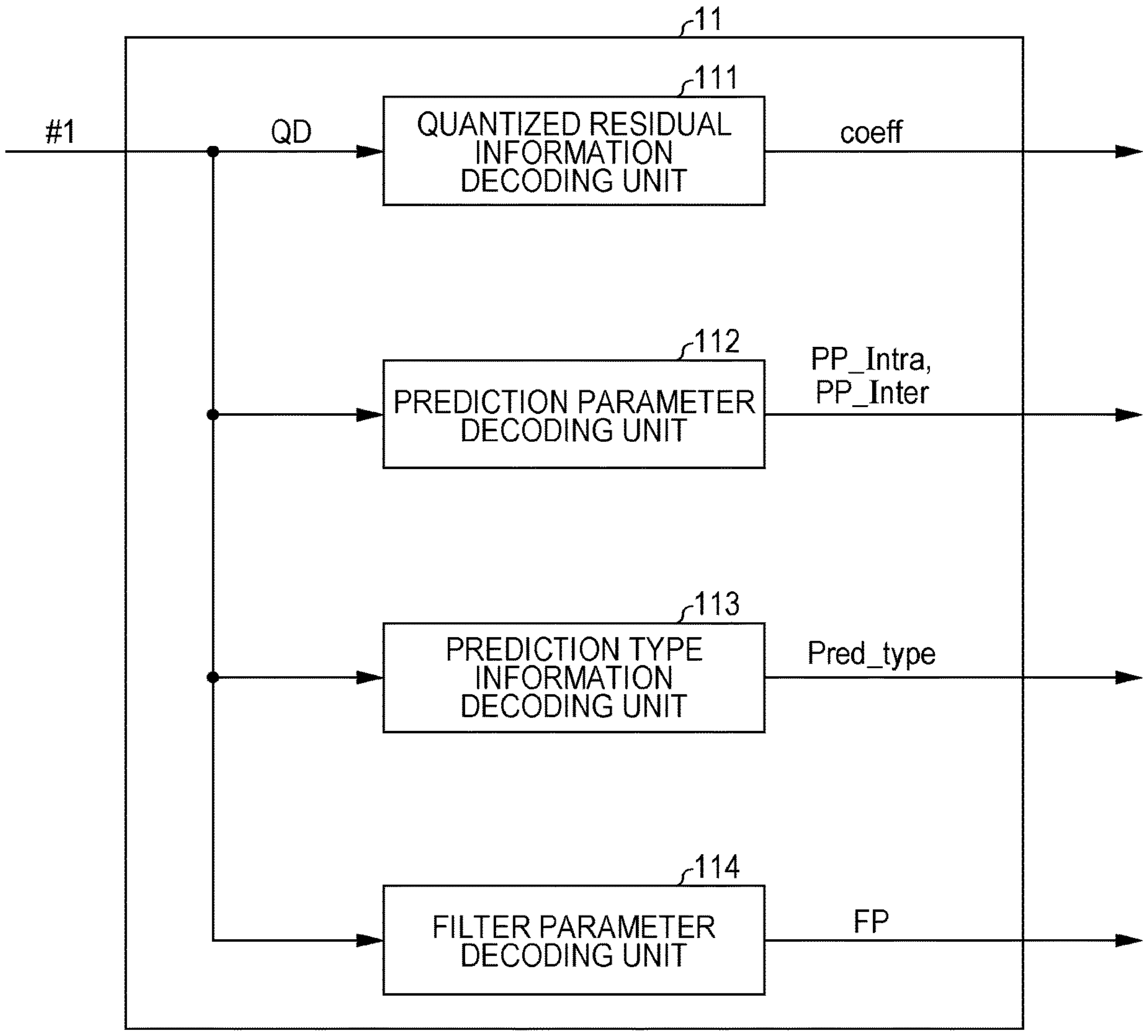

FIG. 8 is a block diagram illustrating a configuration of a variable length code decoding unit included in the moving image decoding apparatus according to the embodiment.

Figures 9, 10:
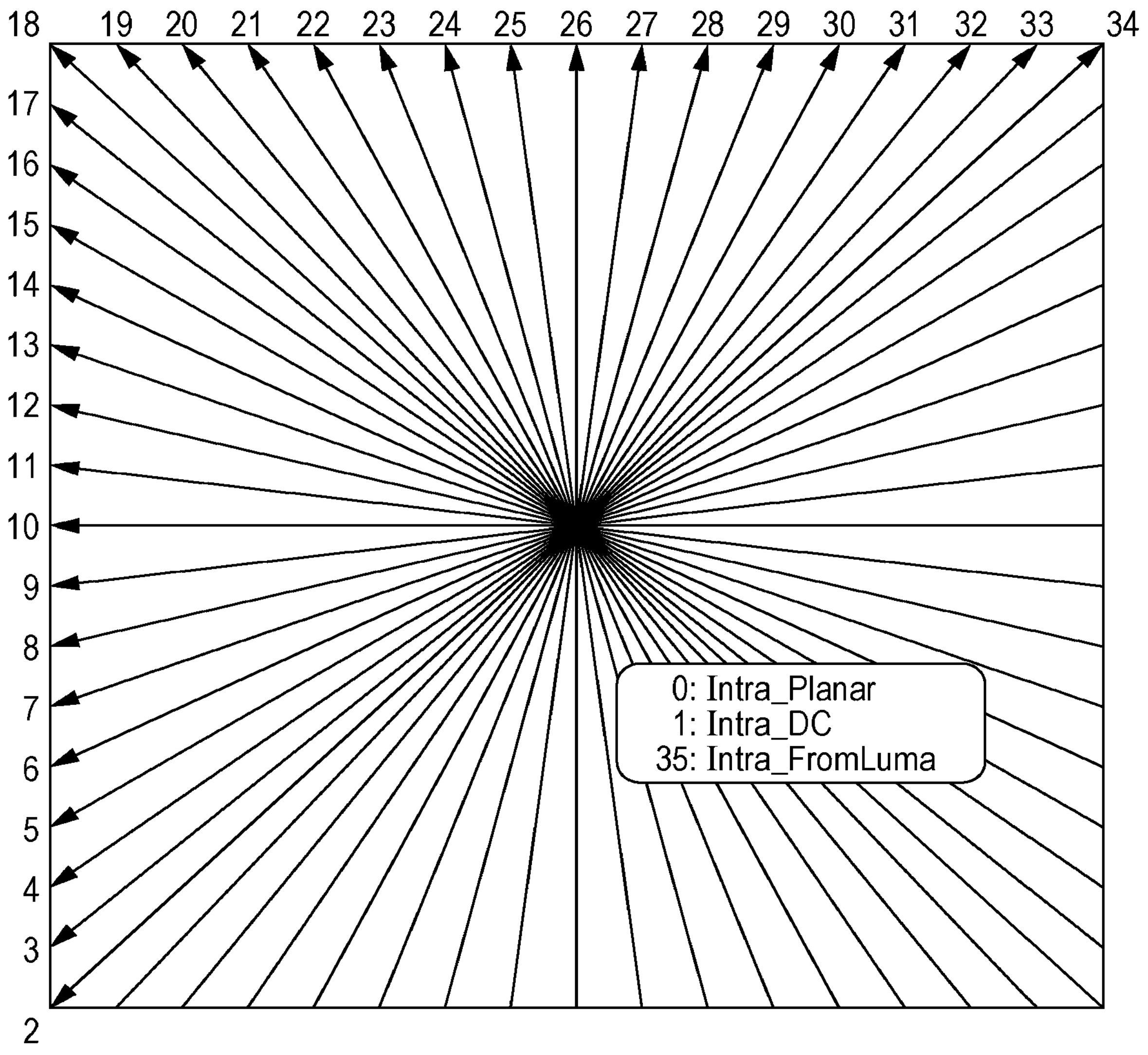

FIG. 9 is a diagram illustrating directions of intra-prediction which can be used in the moving image decoding apparatus according to the embodiment.

FIG. 10 is a diagram illustrating intra-prediction modes and the name correlated with corresponding intra-prediction modes.

Figure 11:
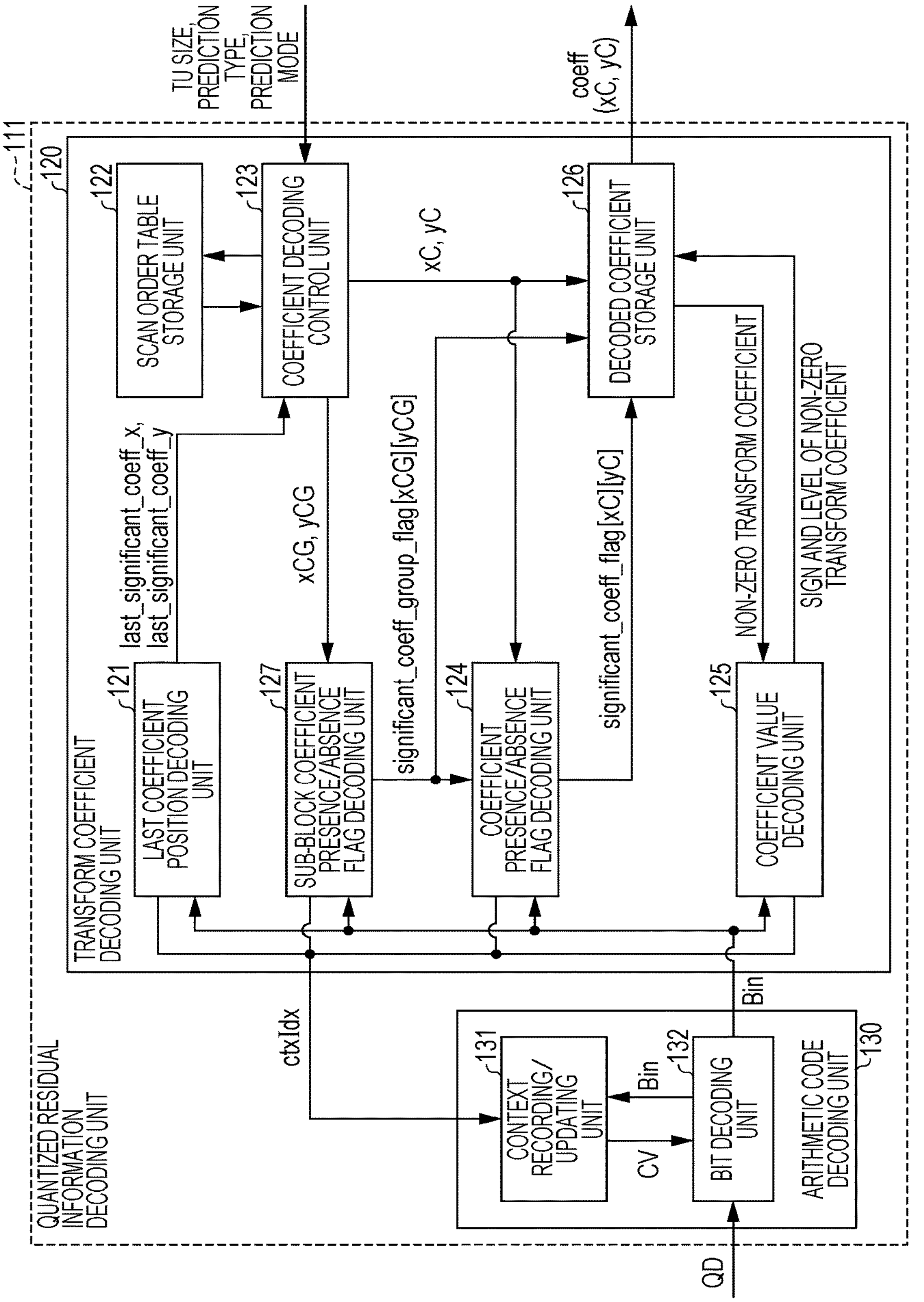

FIG. 11 is a block diagram illustrating a configuration of a quantization residual information decoding unit included in the moving image decoding apparatus according to the embodiment of the present invention.

Figures 12, 13:
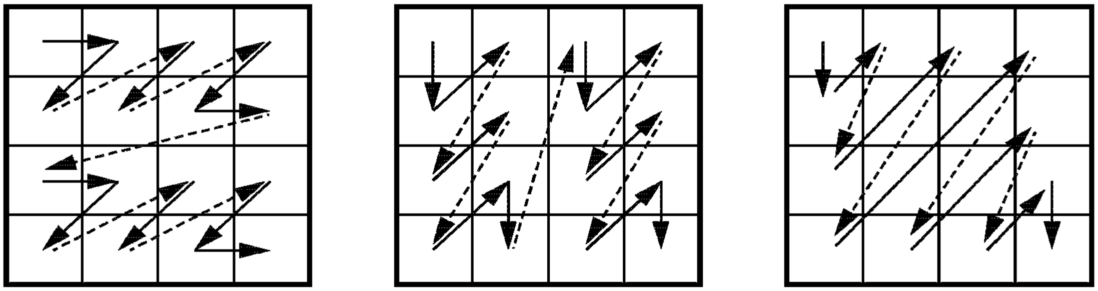

FIG. 12 is a table illustrating an example of a scan index scanIdx designated by an intra-prediction mode index IntraPredMode and each value of log 2TrafoSize-2.

FIG. 13 illustrates a scan index, in which FIG. 13(*a*) illustrates a scan type ScanType designated by each value of the scan index ScanIdx; FIG. 13(*b*) illustrates an example of a scan order in horizontal fast scan when a TU size is 4×4; FIG. 13(*c*) illustrates an example of an scan order in vertical fast scan when a TU size is 4×4; and FIG. 13 (*d*) illustrates an example of an scan order in up-right diagonal scan when a TU size is 4×4. In addition, the horizontal fast scan illustrated in FIG. 13(*b*) is characterized in that coefficients are scanned diagonally in the horizontal direction for each line in the units of small sub-blocks in which the sub-block is split into upper and lower halves, and the vertical fast scan illustrated in FIG. 13 (*c*) is characterized in that coefficients are scanned diagonally in the vertical direction for each line in the units of small sub-blocks in which the sub-block is split into left and right halves.

Figure 14:
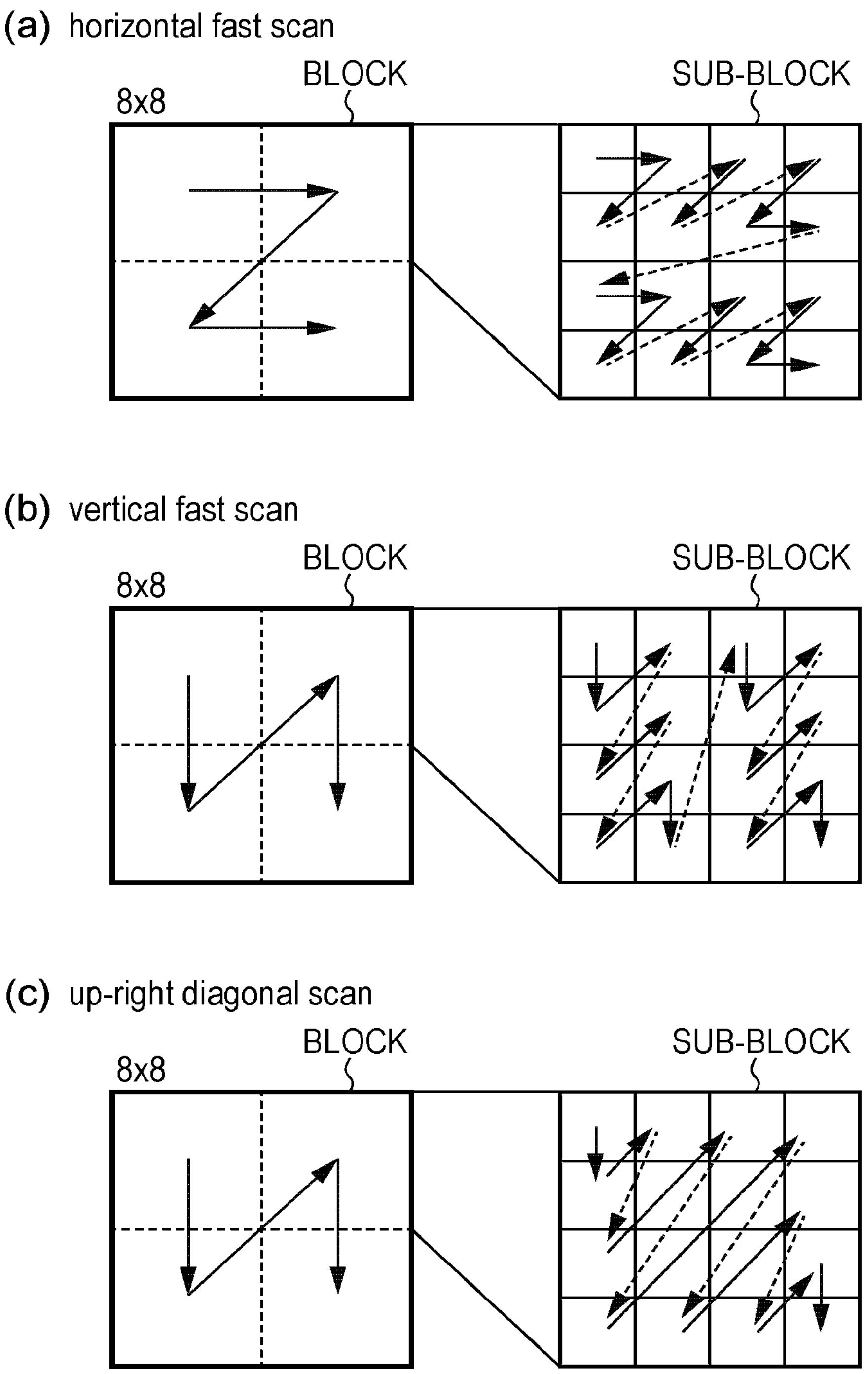

FIG. 14 illustrates a scan order of a block and a sub-block, in which FIGS. 14(*a*) to 14(*c*) illustrate an example of a scan order in each scan type designated by the scan index scanIdx in a case where a TU size is 8×8 and a sub-block size is 4×4. In addition, an arrow in the example illustrated in each of FIGS. 14(*a*) to 14(*c*) indicates forward scan direction. Further, the horizontal fast scan illustrated in FIG. 14(*a*) is characterized in that coefficients are scanned diagonally in the horizontal direction for each line in the units of small sub-blocks in which the sub-block is split into upper and lower halves, and the vertical fast scan illustrated in FIG. 14(*b*) is characterized in that coefficients are scanned diagonally in the vertical direction for each line in the units of small sub-blocks in which the sub-block is split into left and right halves.

Figure 15:
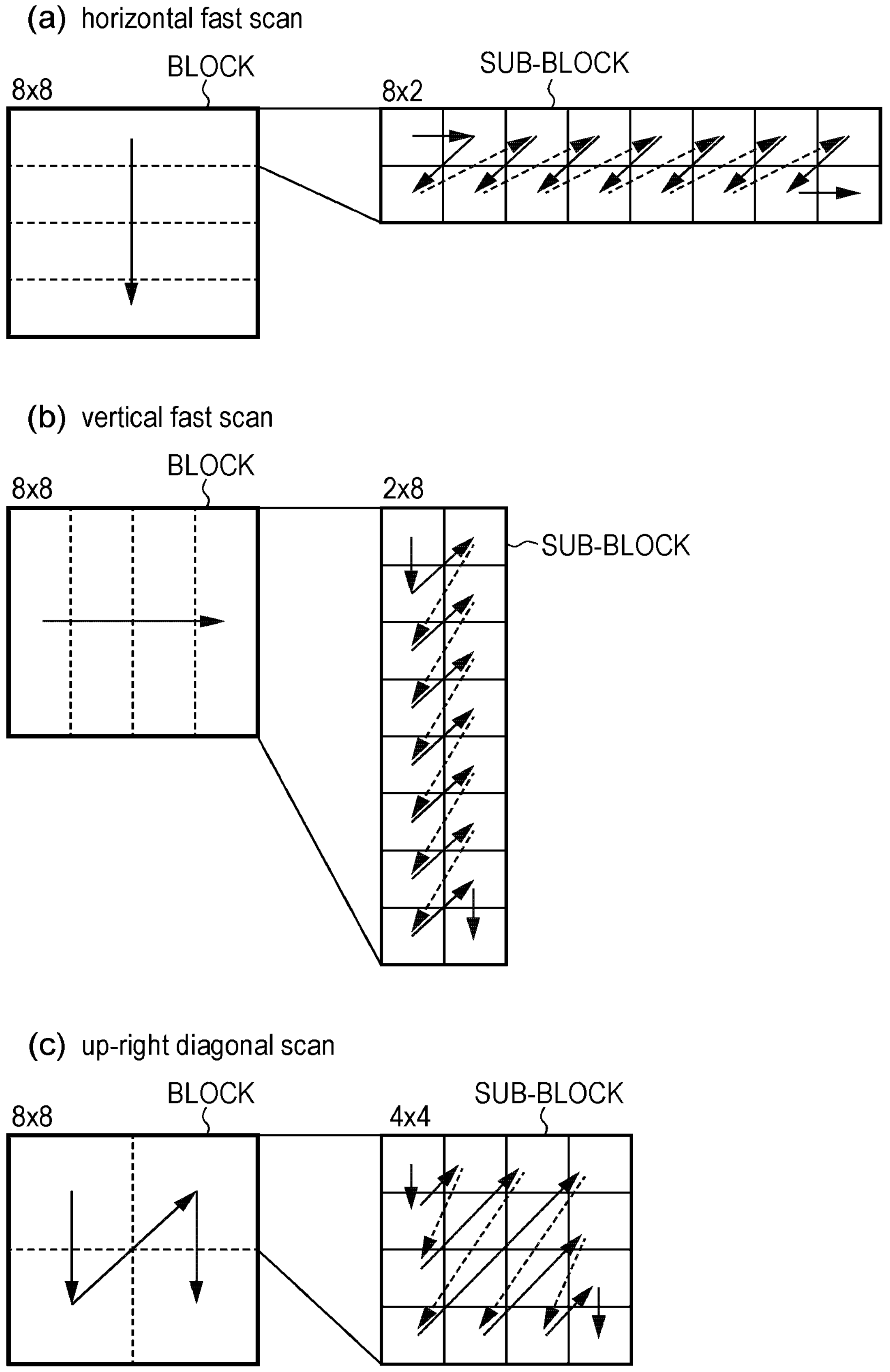

FIG. 15 illustrates a scan order of a block and a sub-block, in which FIGS. 15(*a*) to 15(*c*) illustrate examples of scan orders in the scan types designated by the scan index scanIdx in a case where a TU size is 8×8 and sub-block sizes are different from each other. In addition, an arrow in the example illustrated in each of FIGS. 15(*a*) to 15(*c*) indicates forward scan direction. Further, the horizontal fast scan illustrated in FIG. 15(*a*) is characterized in that coefficients are scanned diagonally in the horizontal direction for each line in the units of sub-blocks which are transversely long, and the vertical fast scan illustrated in FIG. 15(*b*) is characterized in that coefficients are scanned diagonally in the vertical direction for each line in the units of sub-blocks which are longitudinally long.

Figure 16:
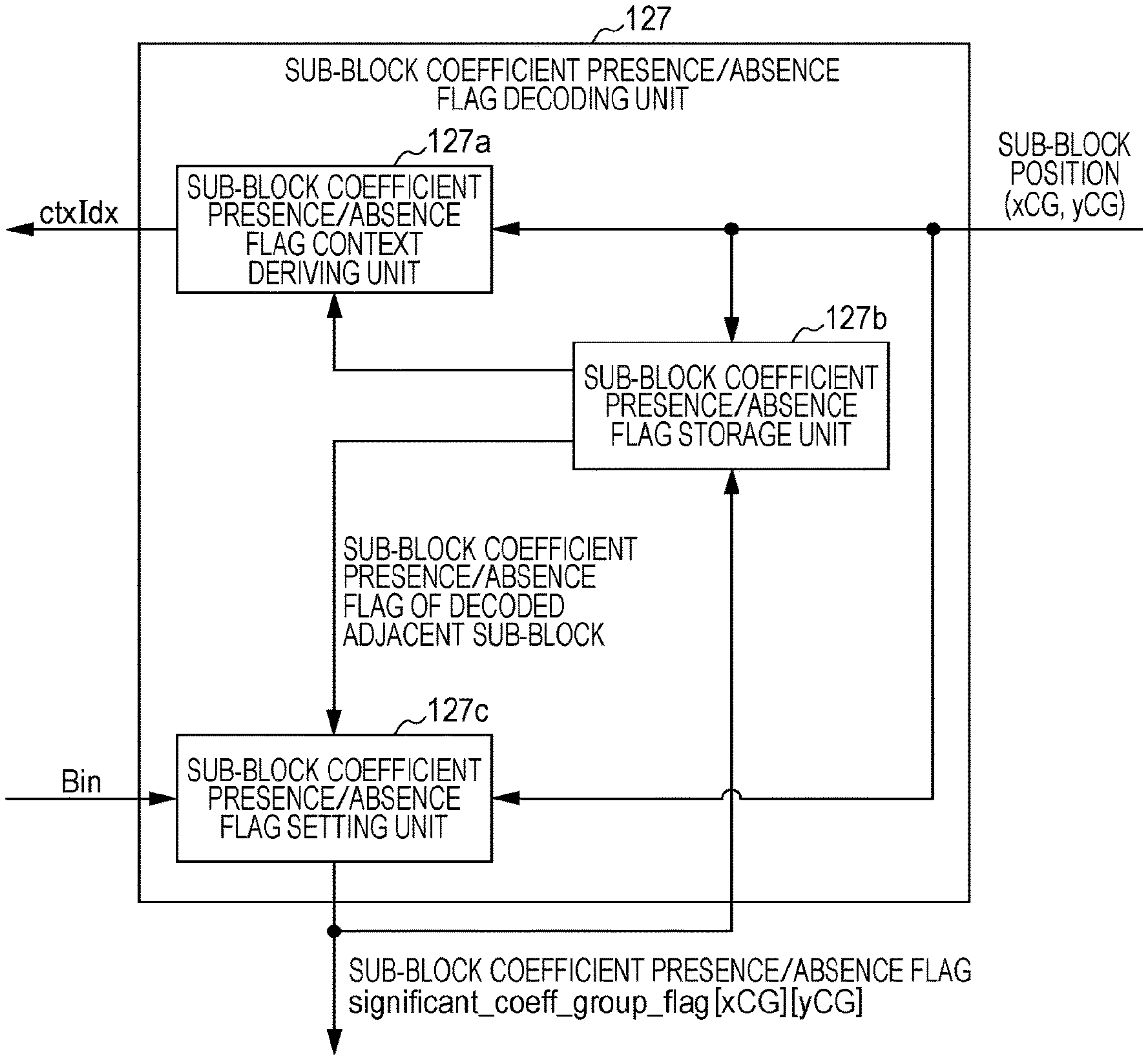

FIG. 16 is a block diagram illustrating a configuration of a sub-block coefficient presence/absence flag decoding unit according to the embodiment.

Figure 17:
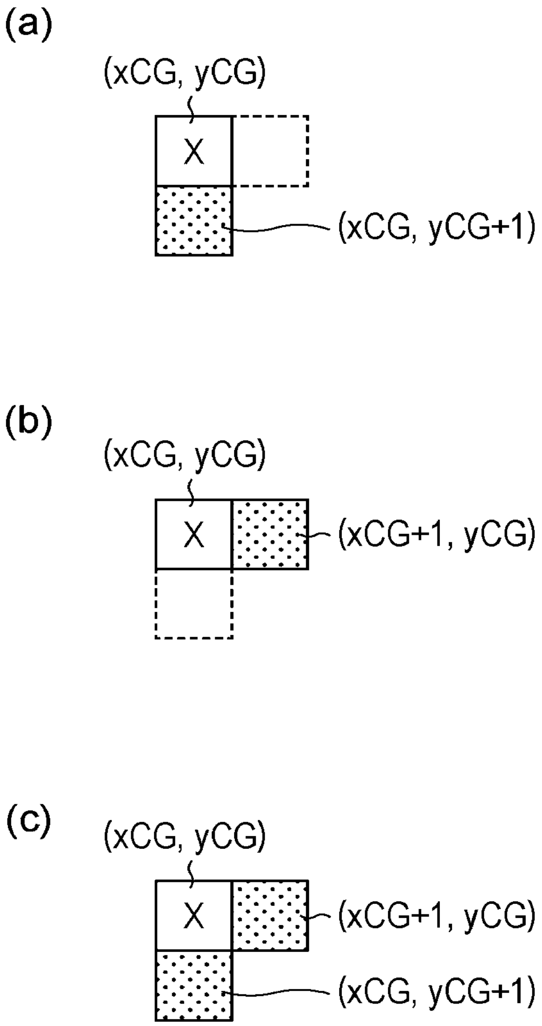

FIG. 17 illustrates a decoding process performed by the sub-block coefficient presence/absence flag decoding unit according to the embodiment, in which FIG. 17(*a*) illustrates a target sub-block (xCG,yCG) and an adjacent sub-block (xCG,yCG+1) which is adjacent to the lower side of the target sub-block; FIG. 17(*b*) illustrates the target sub-block (xCG,yCG) and an adjacent sub-block (xCG+1,yCG) which is adjacent to the right side of the target sub-block; and FIG. 17(*c*) illustrates the target sub-block (xCG,yCG), the adjacent sub-block (xCG,yCG+1) which is adjacent to the lower side of the target sub-block, and the adjacent sub-block (xCG+1,yCG) which is adjacent to the right side of the target sub-block.

Figure 18:
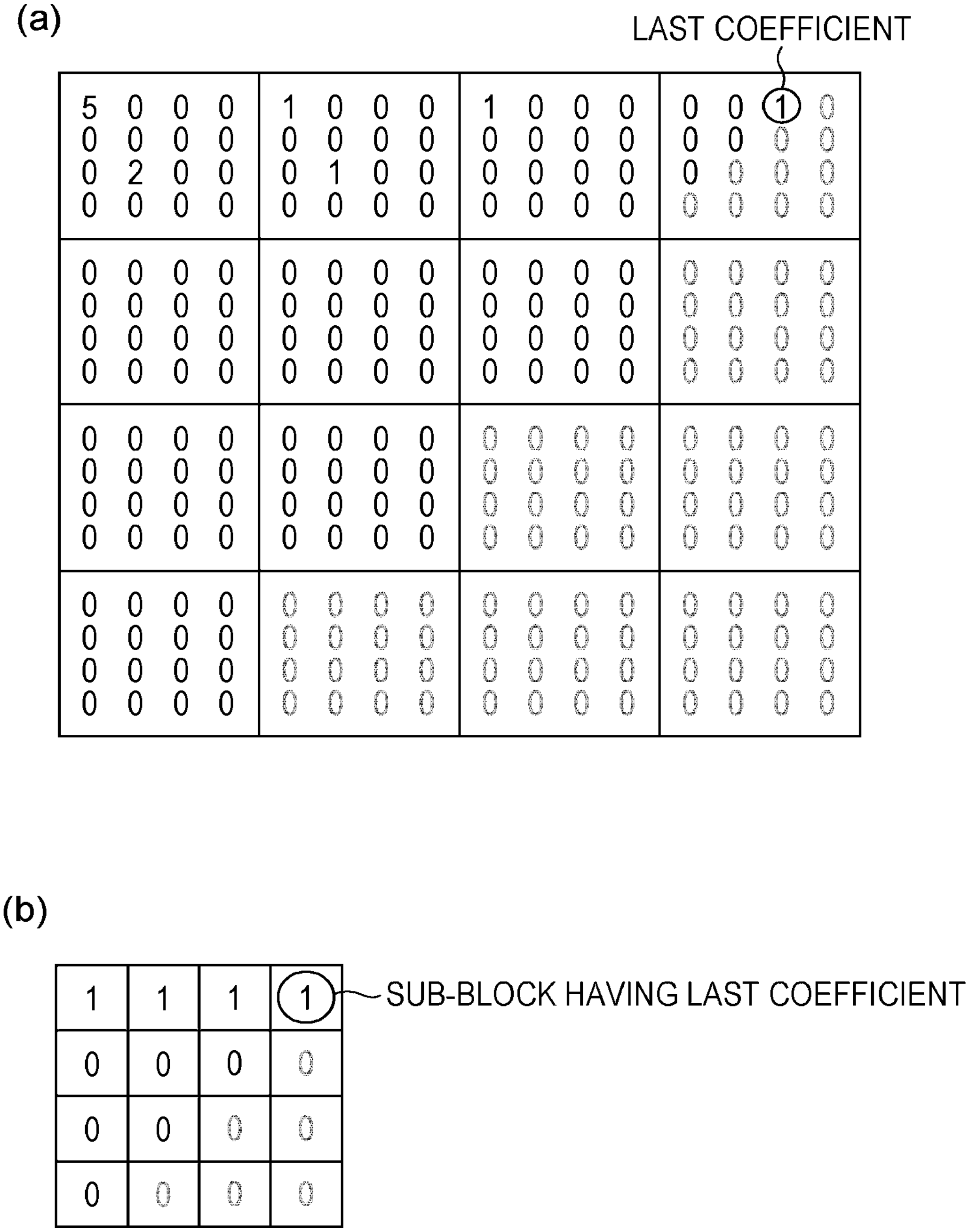

FIG. 18 illustrates coding and decoding processes of a sub-block coefficient presence/absence flag according to the embodiment, in which FIG. 18(*a*) illustrates transform coefficients which are present in a frequency domain of a 16×16 TU, and FIG. 18(*b*) illustrates a sub-block coefficient presence/absence flag assigned to each sub-block.

FIG. 19 is a diagram illustrating an example of a pseudo-code for deriving a context index from coordinates of a target frequency component in a sub-block according to a pattern index idxCG.

FIG. 20 illustrates arrangements of values of the context indexes in the context index derivation method using the pseudo-code illustrated in FIG. 19.

Figure 21:
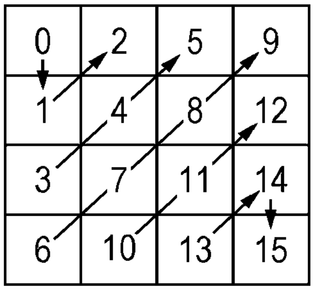

FIG. 21 is a diagram illustrating a scan order in a sub-block.

Figure 22:
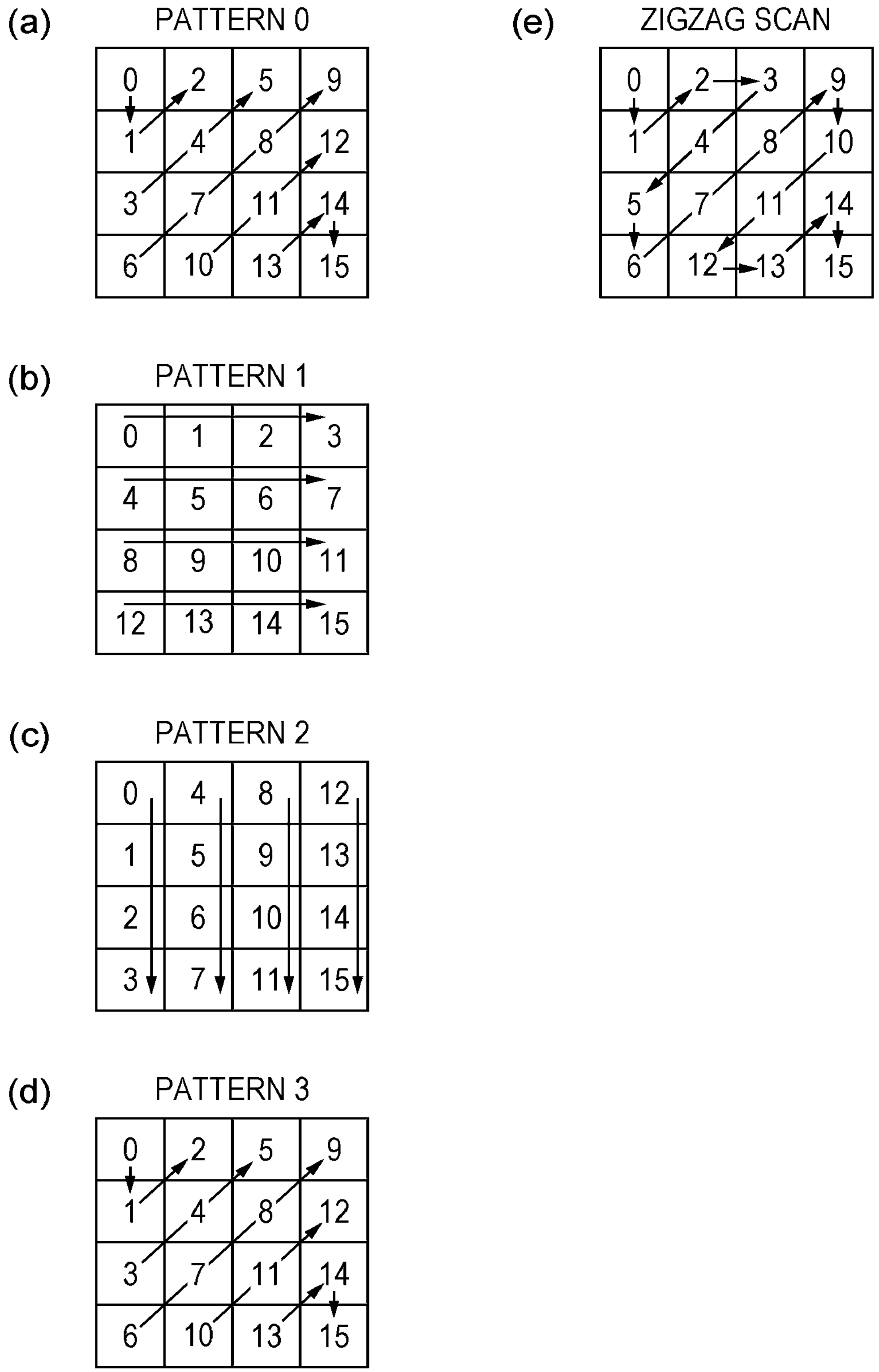

FIG. 22 illustrates modification examples in which a scan order in a target sub-block is changed according to whether or not a non-zero transform coefficient is present in an adjacent sub-block.

FIG. 23 is a diagram illustrating another example of a pseudo-code for deriving a context index from coordinates of a process target frequency component in a sub-block according to a pattern index idxCG.

FIG. 24 illustrates arrangements of values of the context indexes in the context index derivation method using the pseudo-code illustrated in FIG. 23.

FIG. 25 is a diagram illustrating still another example of a pseudo-code for deriving a context index from coordinates of a process target frequency component in a sub-block according to a pattern index idxCG.

FIG. 26 illustrates arrangements of values of the context indexes in the context index derivation method using the pseudo-code illustrated in FIG. 25.

FIG. 27 illustrates a scan order in four 2×2 partial domains of a sub-block.

FIG. 28 is a diagram illustrating still another example of a pseudo-code for deriving a context index from coordinates of a process target frequency component in a sub-block according to a pattern index idxCG.

Figure 29:
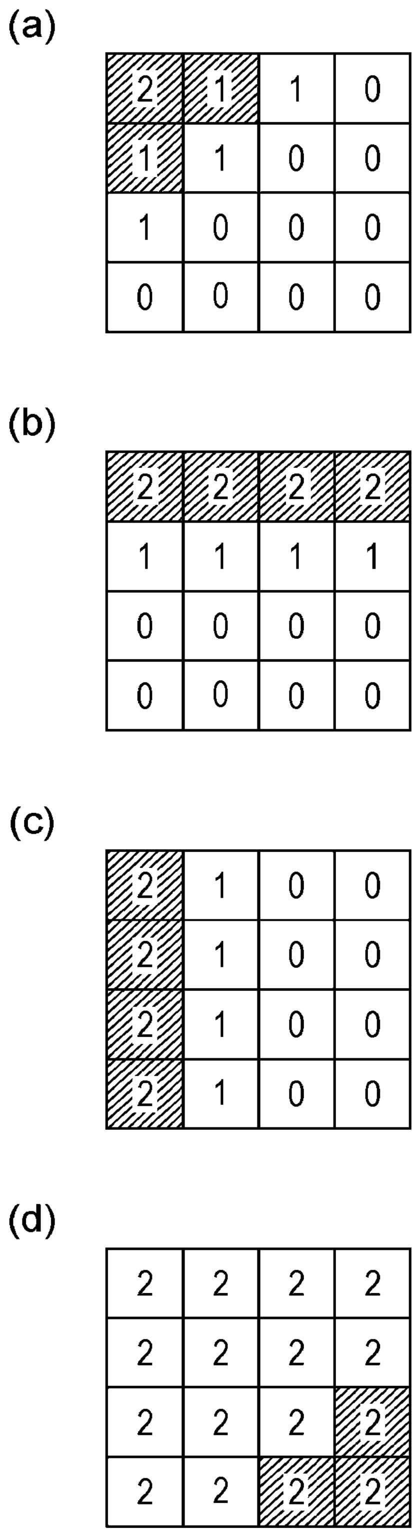

FIG. 29 illustrates arrangements of values of the context indexes in the context index derivation method using the pseudo-code illustrated in FIG. 28.

FIG. 30 is a diagram illustrating a general configuration of a pseudo-code for performing a context index derivation method related to Modification Example 5.

Figure 31:
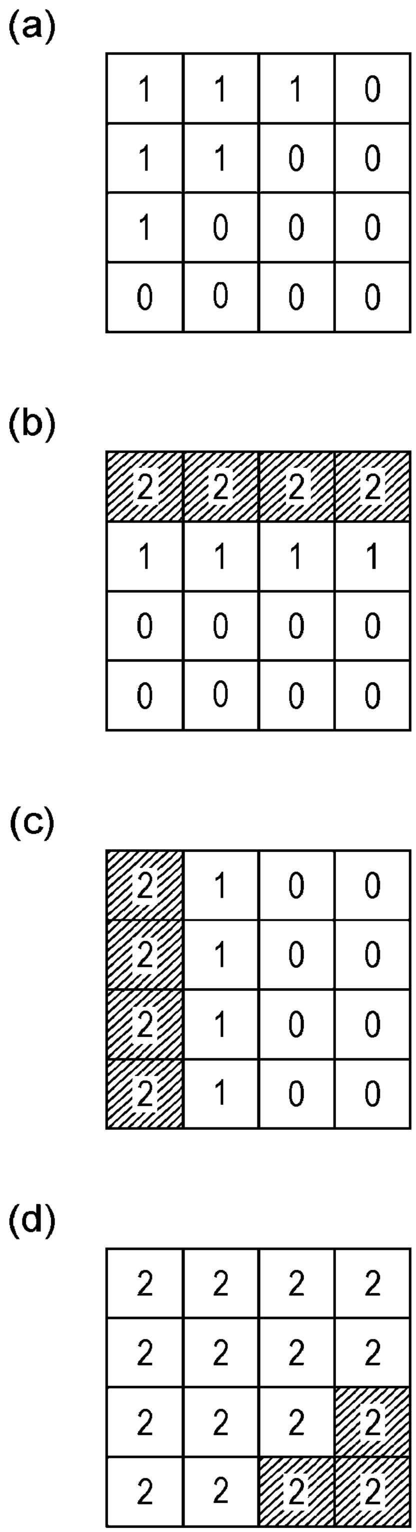

FIG. 31 illustrates arrangements of values of the context indexes in the context index derivation method when a specific threshold value is set in the pseudo-code illustrated in FIG. 30.

FIG. 32 illustrates arrangements of values of the context indexes in the context index derivation method when another threshold value is set in the pseudo-code illustrated in FIG. 30.

Figure 33:
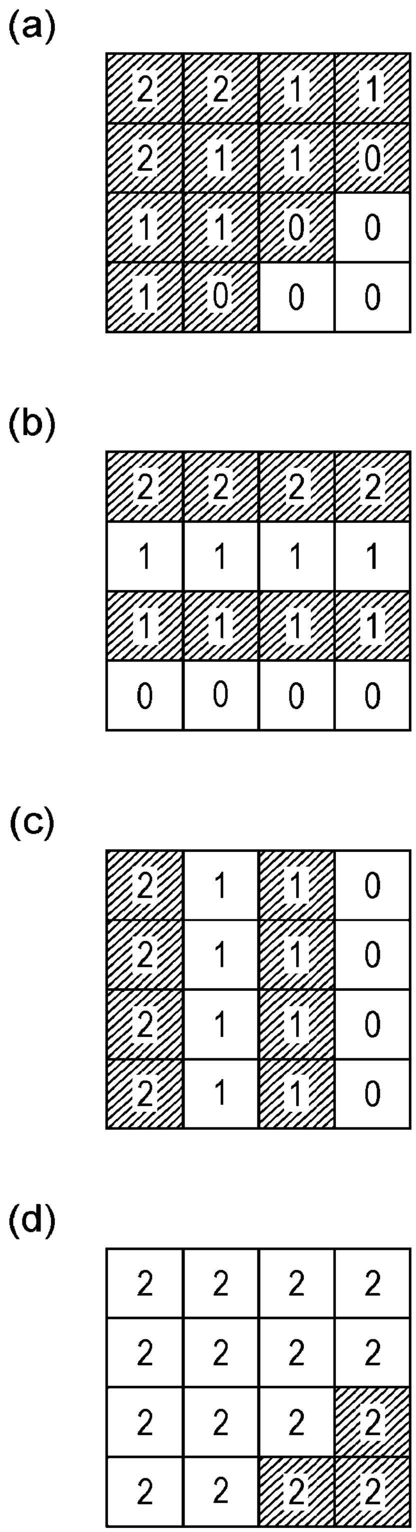

FIG. 33 illustrates arrangements of values of the context indexes in the context index derivation method when still another threshold value is set in the pseudo-code illustrated in FIG. 30.

FIG. 34 is a diagram illustrating still another example of a pseudo-code for deriving a context index from coordinates of a process target frequency component in a sub-block according to a pattern index idxCG.

FIG. 35 illustrates arrangements of values of the context indexes in the context index derivation method using the pseudo-code illustrated in FIG. 33.

Figures 36, 37:
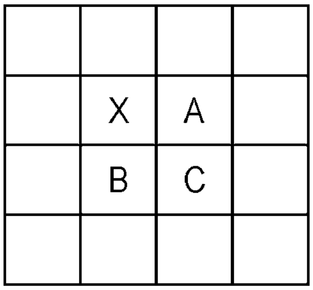

FIG. 36 is a diagram illustrating positions of a right adjacent sub-block A, a lower adjacent sub-block B, and a lower-right adjacent sub-block C with respect to a process target sub-block X.

FIG. 37 is a diagram illustrating still another example of a pseudo-code for deriving a context index from coordinates of a process target frequency component in a sub-block according to a pattern index idxCG.

FIG. 38 illustrates arrangements of values of the context indexes in the context index derivation method using the pseudo-code illustrated in FIG. 37.

Figure 39:
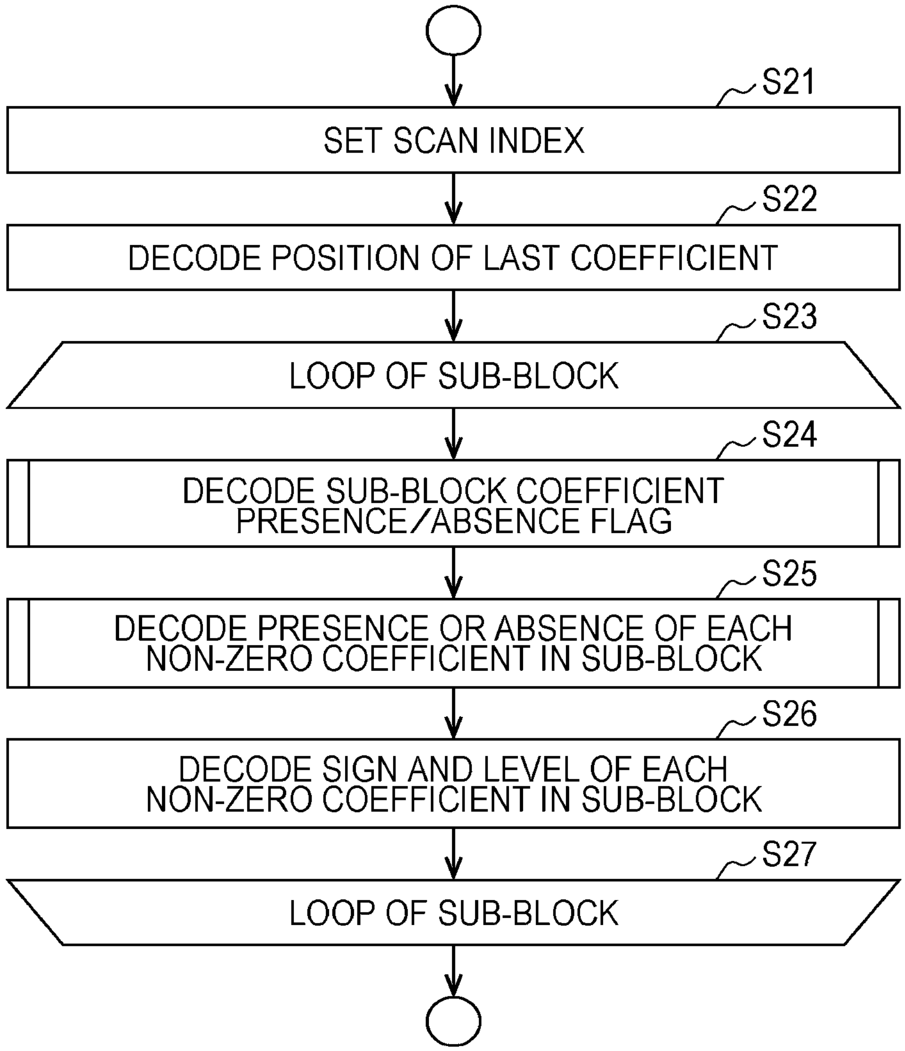

FIG. 39 is a flowchart illustrating a flow of a transform coefficient decoding process performed by a transform coefficient decoding unit included in the moving image decoding apparatus.

Figure 40:
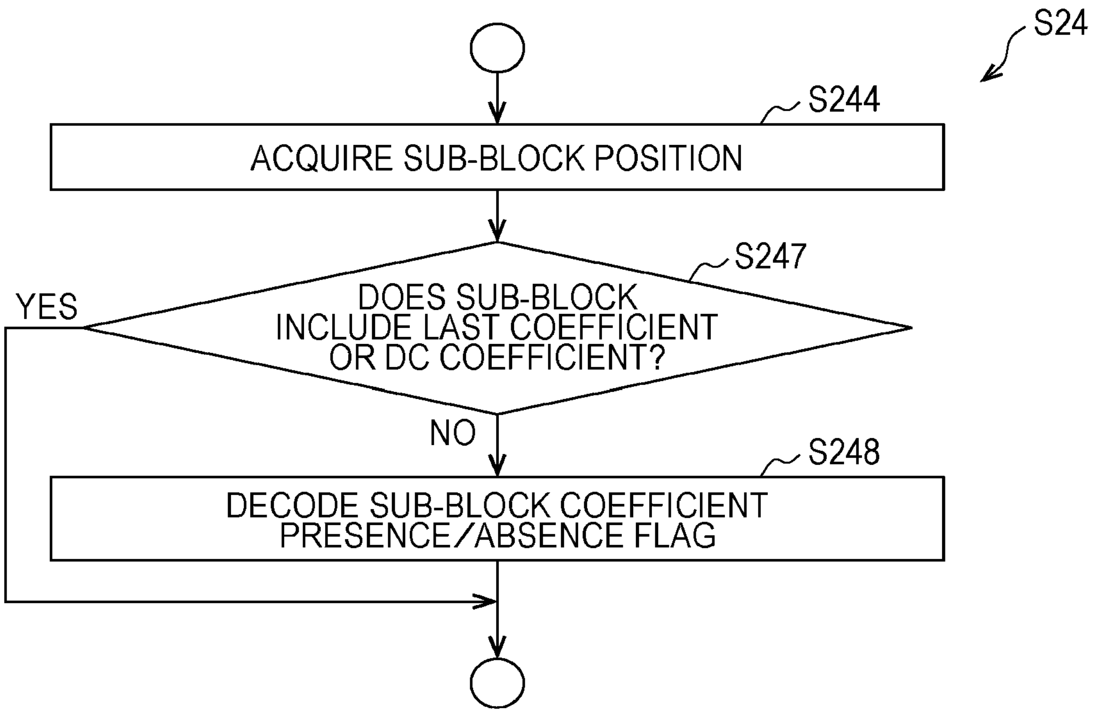

FIG. 40 is a flowchart illustrating details of a process of decoding a sub-block coefficient presence/absence flag.

Figure 41:
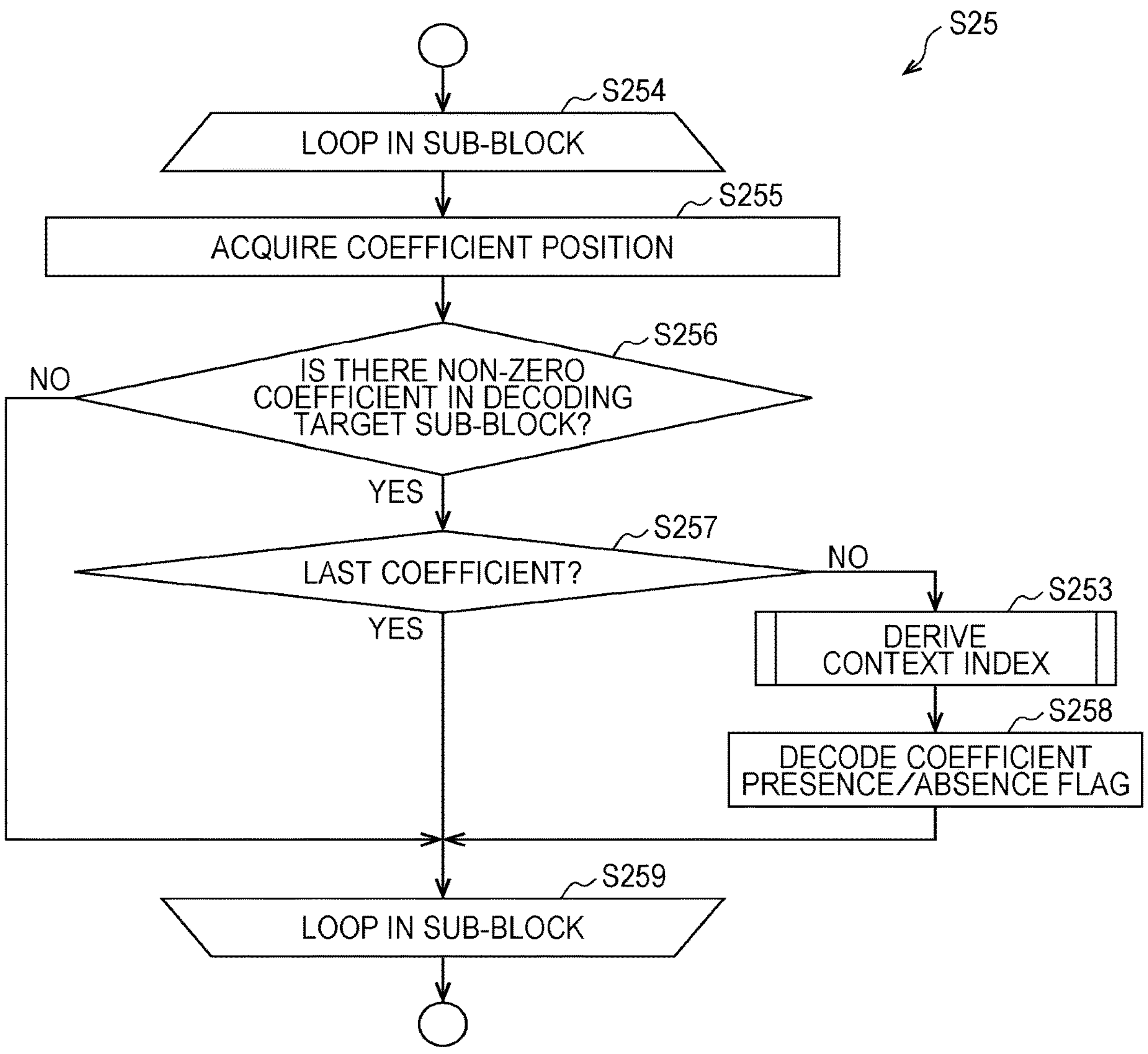

FIG. 41 is a flowchart illustrating details of a process of decoding each non-zero transform coefficient present flag significant_coeff_flag in a sub-block.

Figure 42:
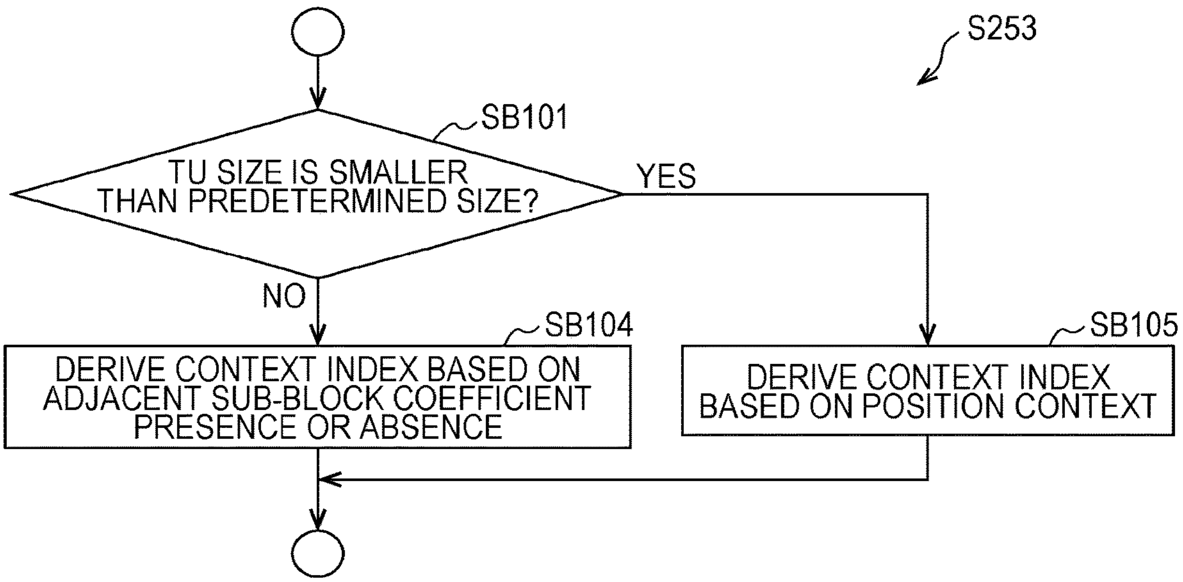

FIG. 42 is a flowchart illustrating an example of a flow of a context index derivation process in a coefficient presence/absence flag coding unit.

Figure 43:
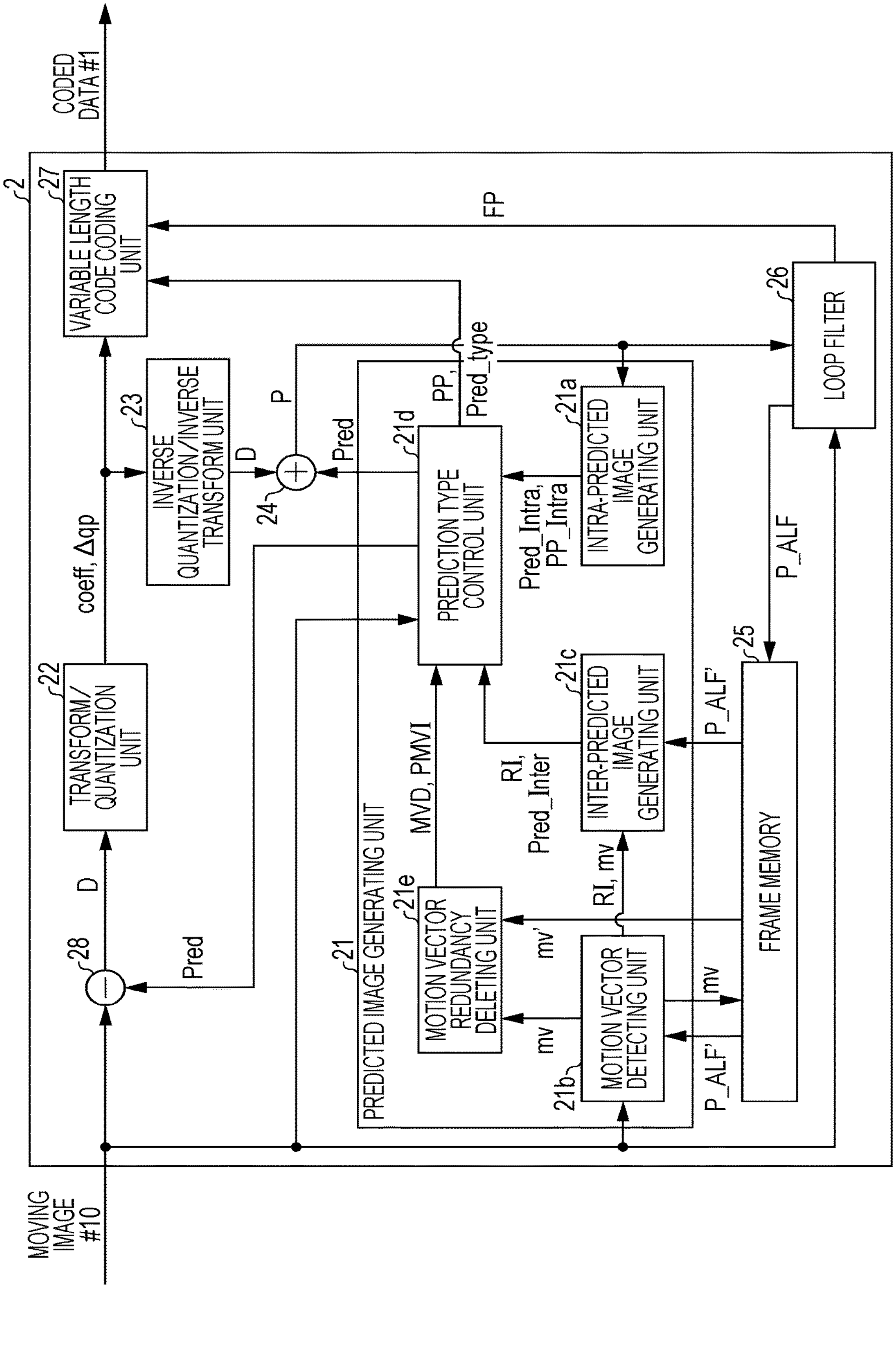

FIG. 43 is a block diagram illustrating a configuration of a moving image coding apparatus according to an embodiment.

Figure 44:
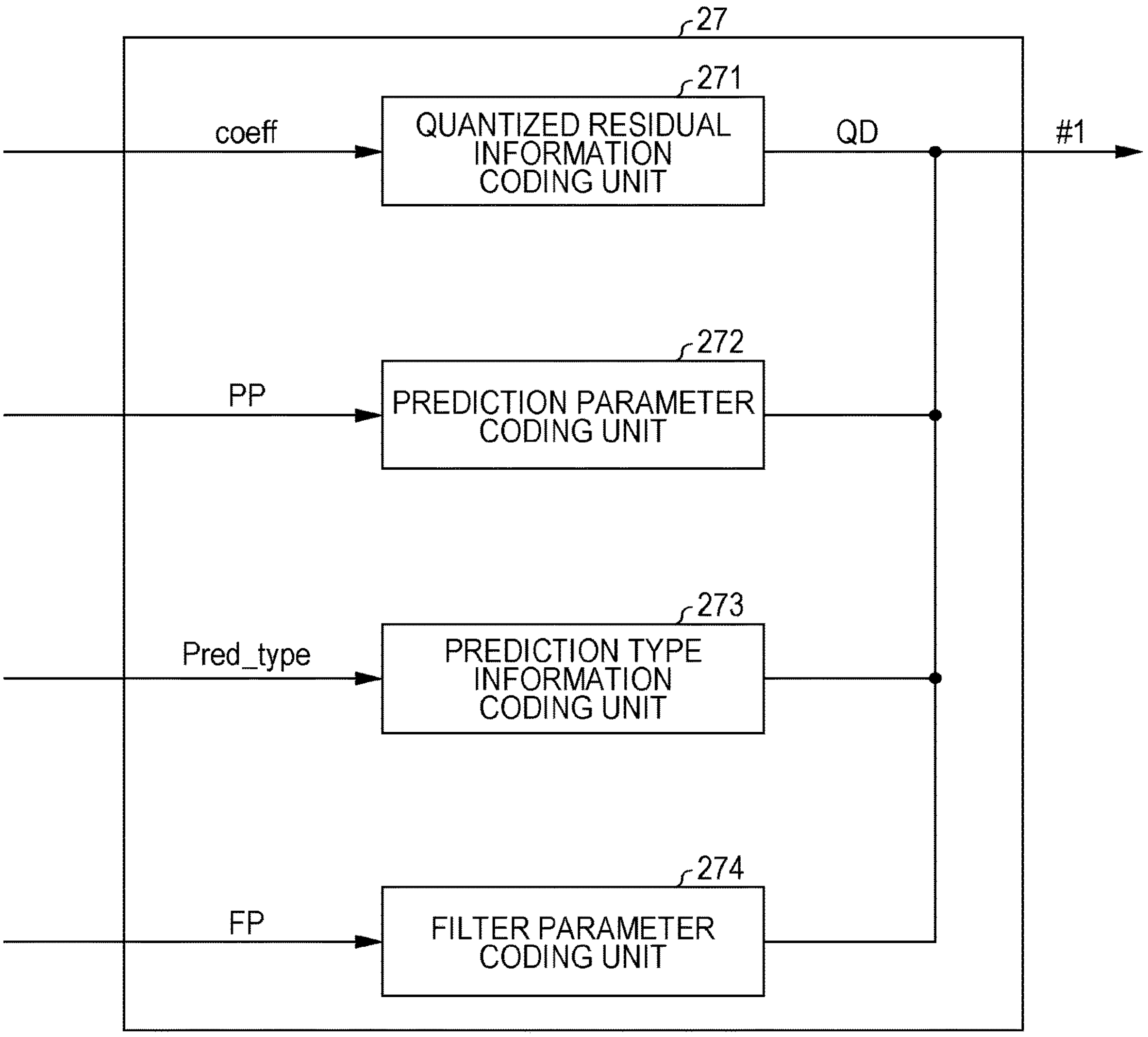

FIG. 44 is a block diagram illustrating a configuration of a variable length code coding unit included in the moving image coding apparatus according to the embodiment.

Figure 45:
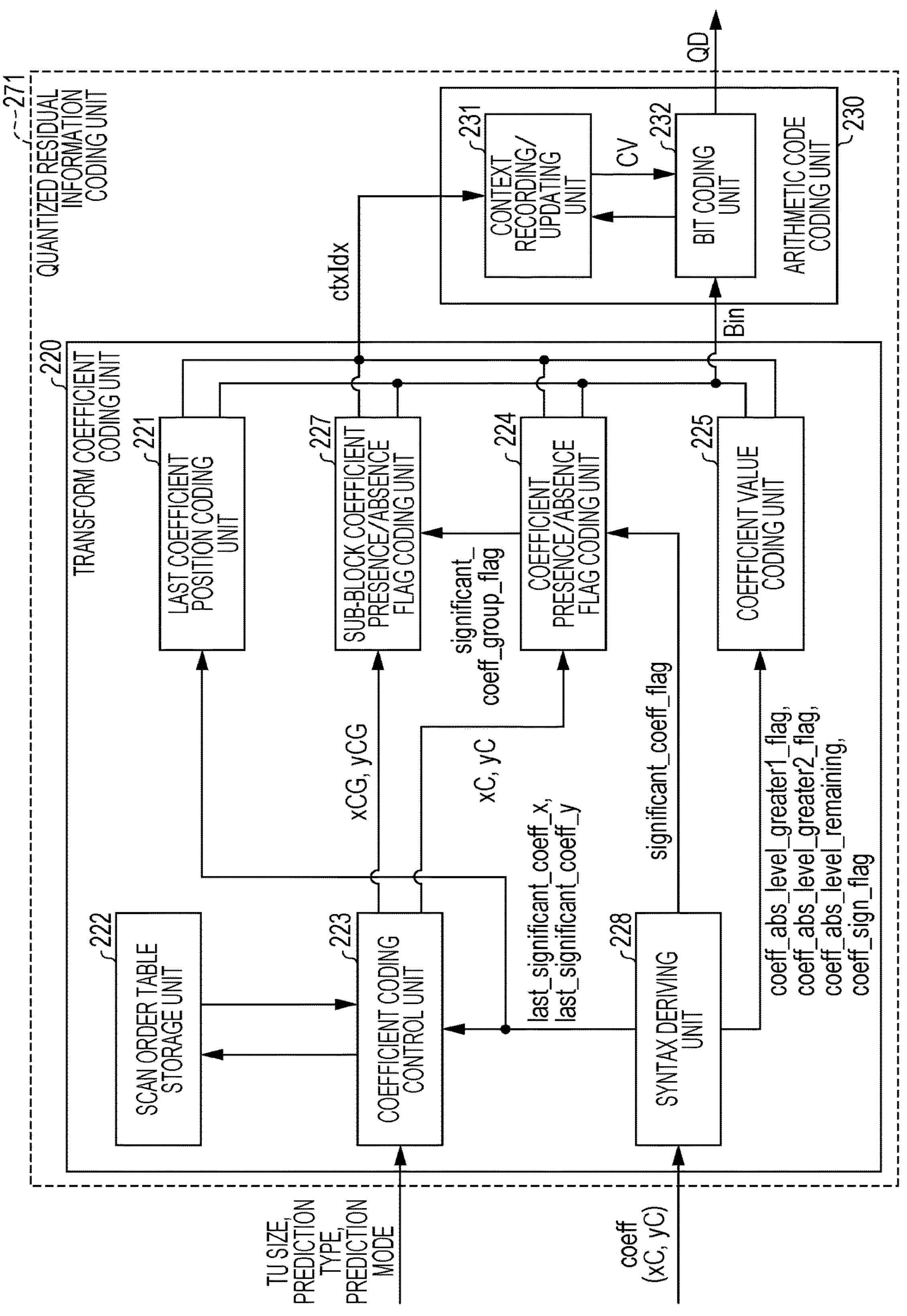

FIG. 45 is a block diagram illustrating a configuration of a quantization residual information coding unit included in the moving image coding apparatus according to the embodiment of the present invention.

Figure 46:
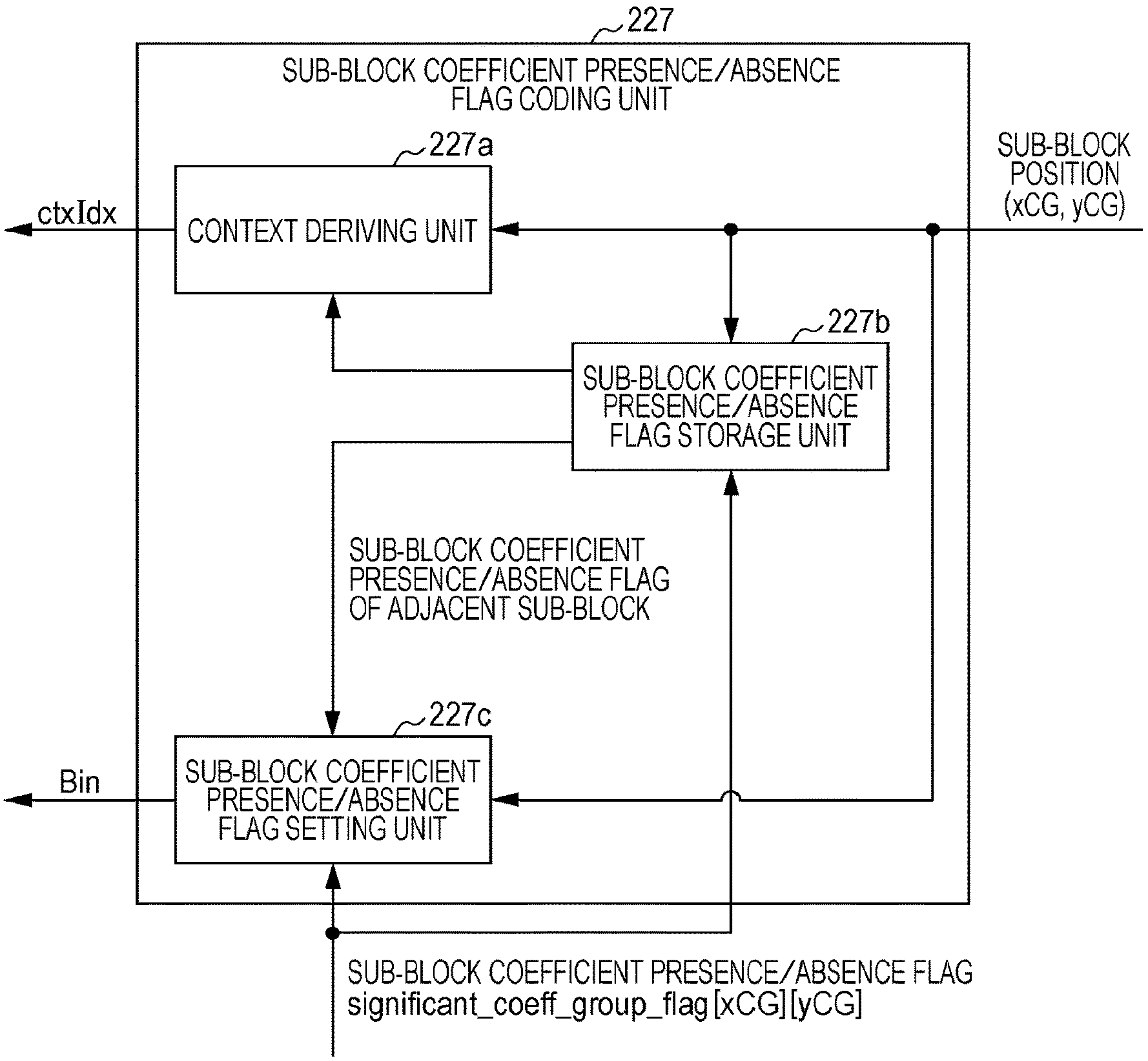

FIG. 46 is a block diagram illustrating a configuration of a sub-block coefficient presence/absence flag coding unit according to the embodiment.

Figure 47:
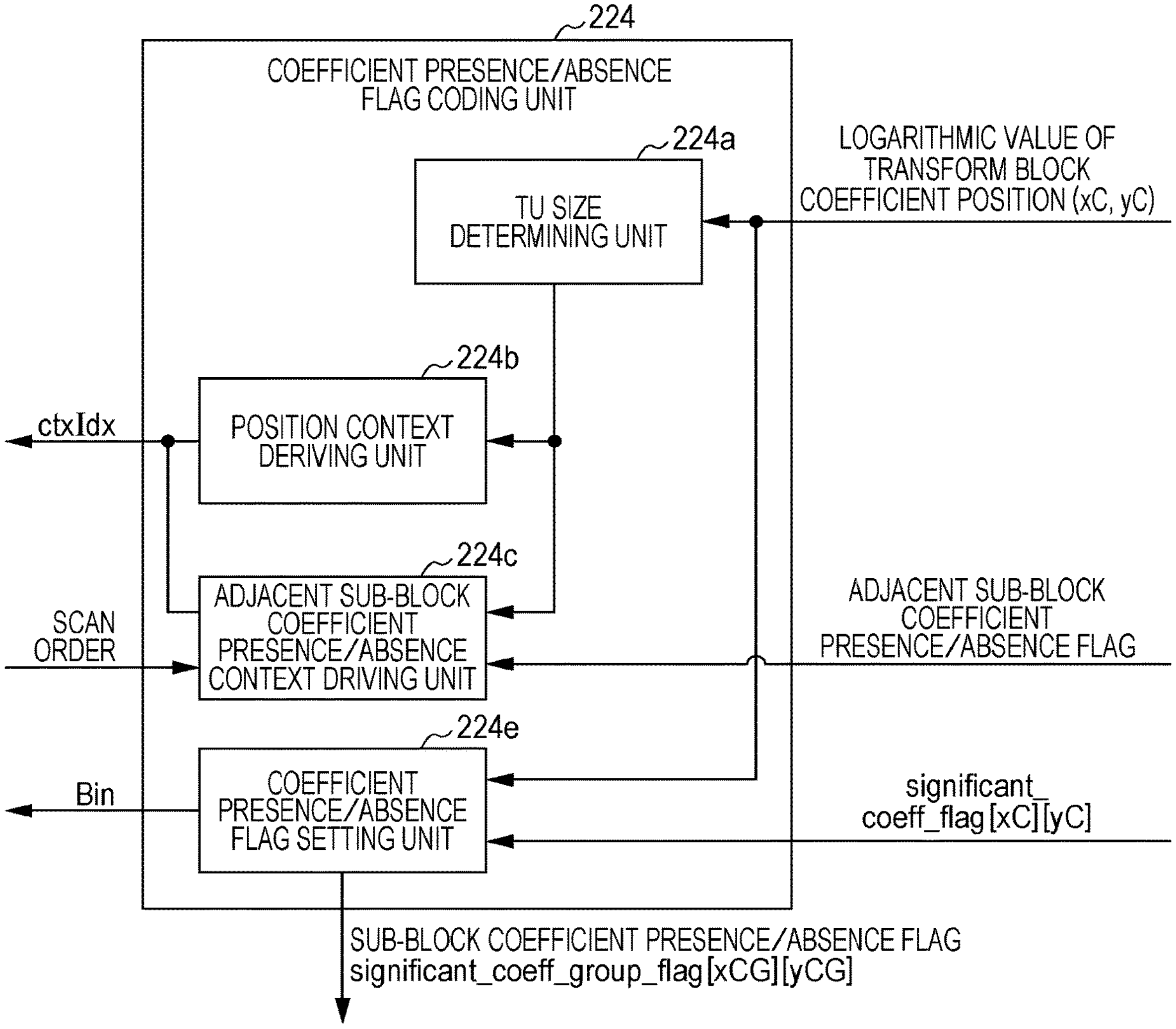

FIG. 47 is a block diagram illustrating a second configuration example of the coefficient presence/absence flag coding unit according to the embodiment.

FIG. 48 illustrates configurations of transmission equipment equipped with the moving image coding apparatus and reception equipment equipped with the moving image decoding apparatus, in which FIG. 48(*a*) illustrates the transmission equipment equipped with the moving image coding apparatus, and FIG. 48(*b*) illustrates the reception equipment the equipped with the moving image decoding apparatus.

Figure 49:
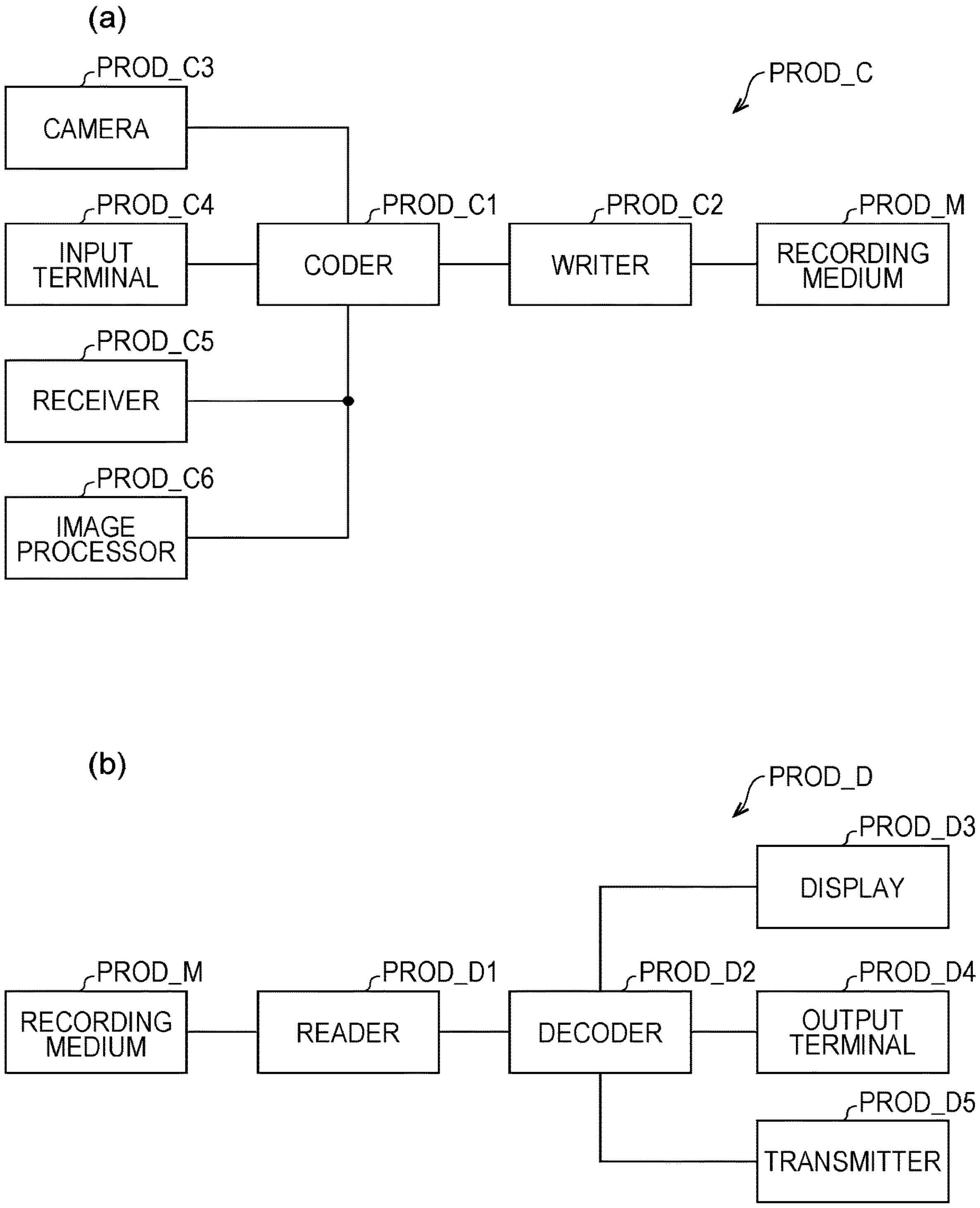

FIG. 49 illustrates configurations of recording equipment equipped with the moving image coding apparatus and reproducing equipment equipped with the moving image decoding apparatus, in which FIG. 49(*a*) illustrates the recording equipment equipped with the moving image coding apparatus, and FIG. 49(*b*) illustrates the reproducing equipment the equipped with the moving image decoding apparatus.

Figures 50, 51:
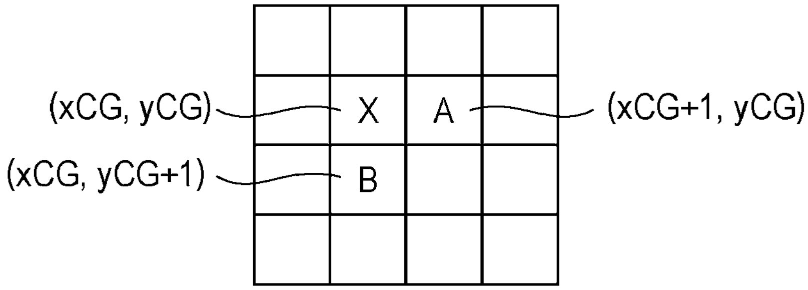

FIG. 50 is a diagram illustrating positions of a right adjacent sub-block A and a lower adjacent sub-block B with respect to a process target sub-block X.

FIG. 51 is a diagram illustrating an example of a pseudo-code of the related art for deriving a context index from coordinates of a process target frequency component in a sub-block according to a pattern index idxCG.

FIG. 52 illustrates arrangements of values of the context indexes in the context index derivation method using the pseudo-code illustrated in FIG. 51.

FIG. 53 illustrates arrangements of values of the context indexes in the context index derivation method when another threshold value is set in the pseudo-code illustrated in FIG. 30.

FIG. 54 is a diagram illustrating still another example of a pseudo-code for deriving a context index from coordinates of a process target frequency component in a sub-block according to a pattern index idxCG.

FIG. 55 illustrates arrangements of values of the context indexes in the context index derivation method using the pseudo-code illustrated in FIG. 54.

FIG. 56 illustrates an example of another pseudo-code for realizing arrangements of the values of the context indexes illustrated in FIG. 29.

FIG. 57 illustrates an example of another pseudo-code for realizing arrangements of the values of the context indexes illustrated in FIG. 31.

FIG. 58 illustrates an example of another pseudo-code for realizing arrangements of the values of the context indexes illustrated in FIG. 32.

FIG. 59 illustrates an example of another pseudo-code for realizing arrangements of the values of the context indexes illustrated in FIG. 33.

FIG. 60 illustrates an example of another pseudo-code for realizing arrangements of the values of the context indexes illustrated in FIG. 53.

FIG. 61 illustrates arrangements of values of the context indexes in the context index derivation method when still another threshold value is set in the pseudo-code illustrated in FIG. 30 (Modification Example 5-6).

FIG. 62 is a diagram illustrating still another example of a pseudo-code for deriving a context index from coordinates of a process target frequency component in a sub-block according to a pattern index idxCG related to Modification Example 5-6.

FIG. 63 illustrates arrangements of values of the context indexes in the context index derivation method when still another threshold value is set in the pseudo-code illustrated in FIG. 30 (Modification Example 5-7).

FIG. 64 is a diagram illustrating still another example of a pseudo-code for deriving a context index from coordinates of a process target frequency component in a sub-block according to a pattern index idxCG related to Modification Example 5-7.

Figure 65:
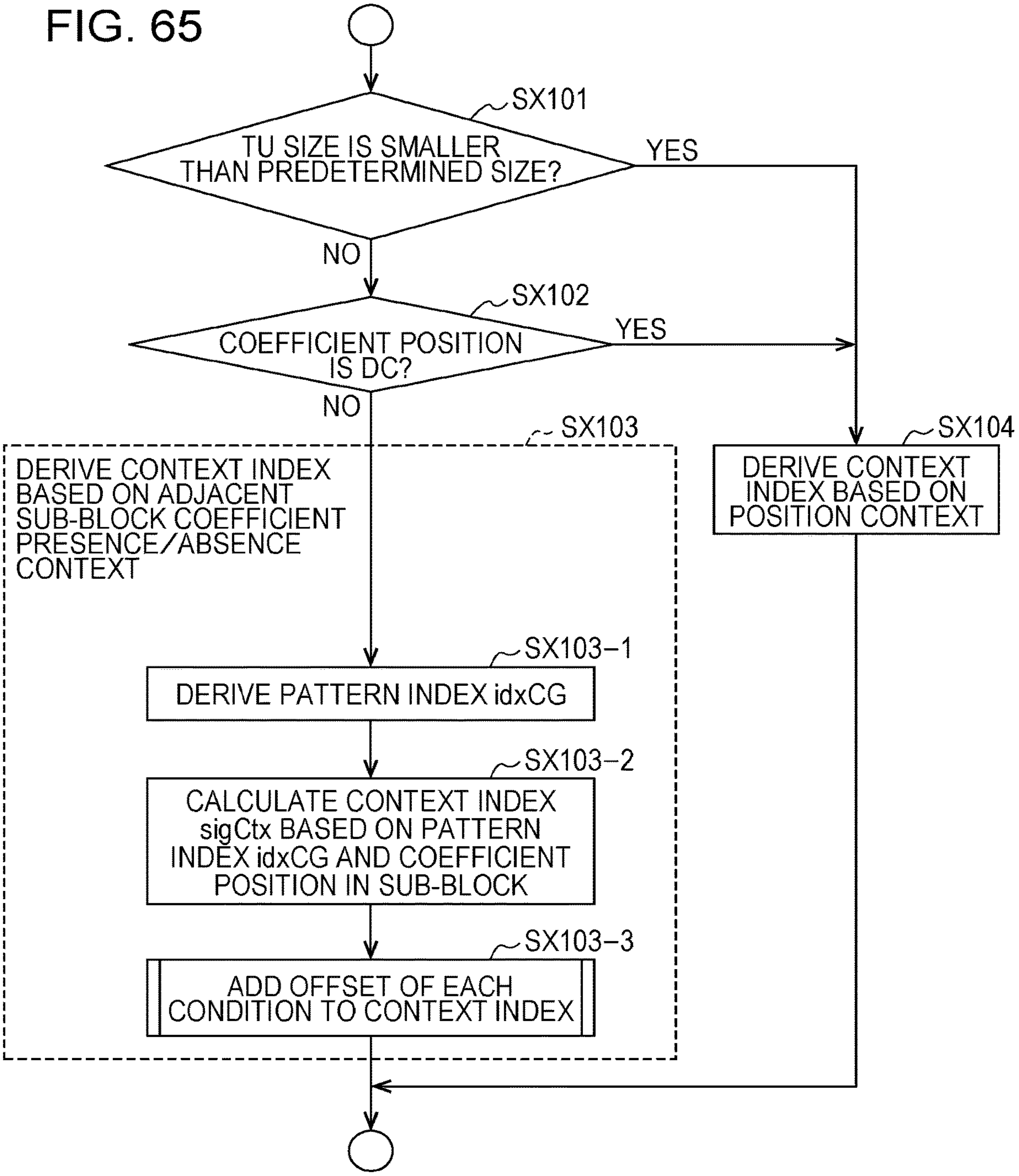

FIG. 65 is a flowchart illustrating an operation of deriving a context index regarding a transform coefficient presence/absence flag in the coefficient presence/absence flag decoding unit 124 related to Modification Example 8.

Figure 66:
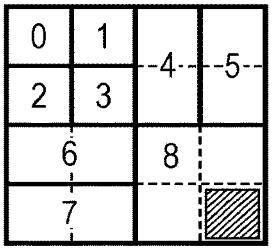

FIG. 66 illustrates an example of a context index assigned to each coefficient position of a 4×4 TU in a position context deriving unit 124*b*.

Figures 67, 68:
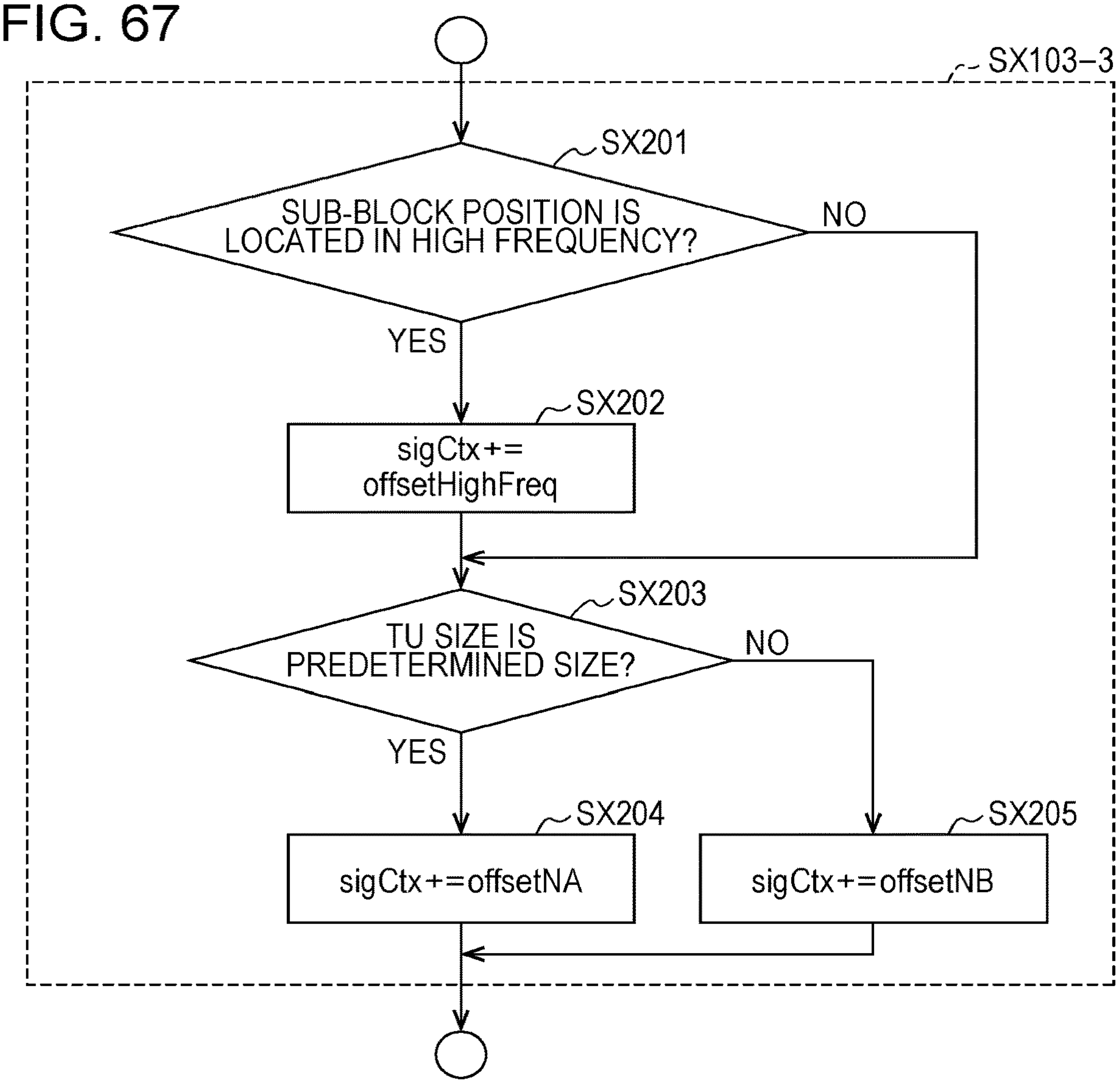

FIG. 67 is a flowchart illustrating a more detailed operation of step SX103-3 of FIG. 65.

FIG. 68 is a table illustrating assignment of context indexes regarding a transform coefficient presence/absence flag related to Modification Example 8.

FIG. 69 is a table illustrating assignment of context indexes regarding a transform coefficient presence/absence flag in a comparative technique (NPL 3).

FIG. 70 is a diagram illustrating a pseudo-code for deriving a context index from coordinates of a process target frequency component in a sub-block according to a pattern index idxCG and a scan direction (scan index scanIdx) related to Modification Example 8-2.

FIG. 71 illustrates arrangements of values of the context indexes in the context index derivation method using the pseudo-code illustrated in FIG. 70.

Figure 72:
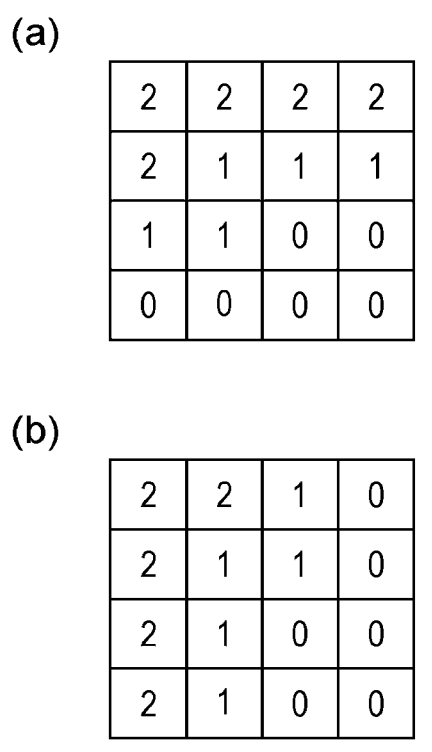

FIG. 72 illustrates arrangements of values of the context indexes when each of weight coefficients and threshold values of horizontal fast scan and vertical fast scan of a pattern 0 is set to another value in the pseudo-code illustrated in FIG. 70.

FIG. 73 is a diagram illustrating another example of a pseudo-code for deriving a context index from coordinates of a process target frequency component in a sub-block component according to a pattern index idxCG and a scan direction (scan index scanIdx) related to Modification Example 8-2.

Figure 74:
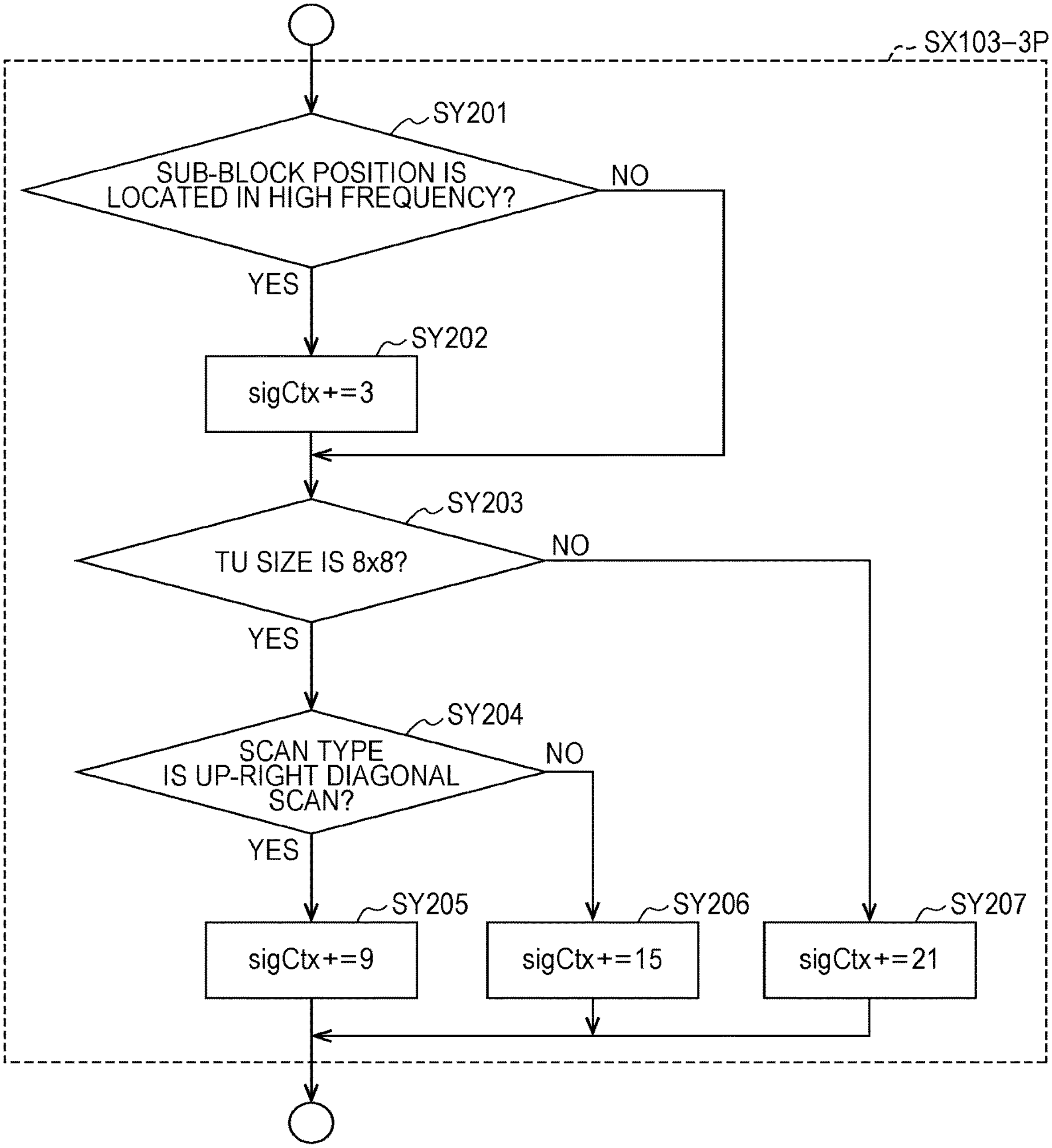

FIG. 74 is a flowchart illustrating details of an operation of a context index offset adding process in the comparative technique (NPL 3), and is a flowchart illustrating details of an operation corresponding to step SX103 of FIG. 65.

DESCRIPTION OF EMBODIMENTS

A coding apparatus and a decoding apparatus according to an embodiment of the present invention will be described. In addition, the decoding apparatus according to the embodiment decodes a moving image from coded data. Therefore, hereinafter, this is referred to as a "moving image decoding apparatus". Further, the coding apparatus according to the present embodiment generates coded data by coding a moving image. Therefore, hereinafter, this is referred to as a "moving image coding apparatus".

However, the scope to which the present invention is applicable is not limited thereto. In other words, as is clear from the following description, features of the present invention are established even if a plurality of frames are not premised. That is, the present invention is generally applicable to a decoding apparatus and a coding apparatus regardless of whether or not a target is a moving image or a still image.

[Configuration of Coded Data #1]

Figure 2:
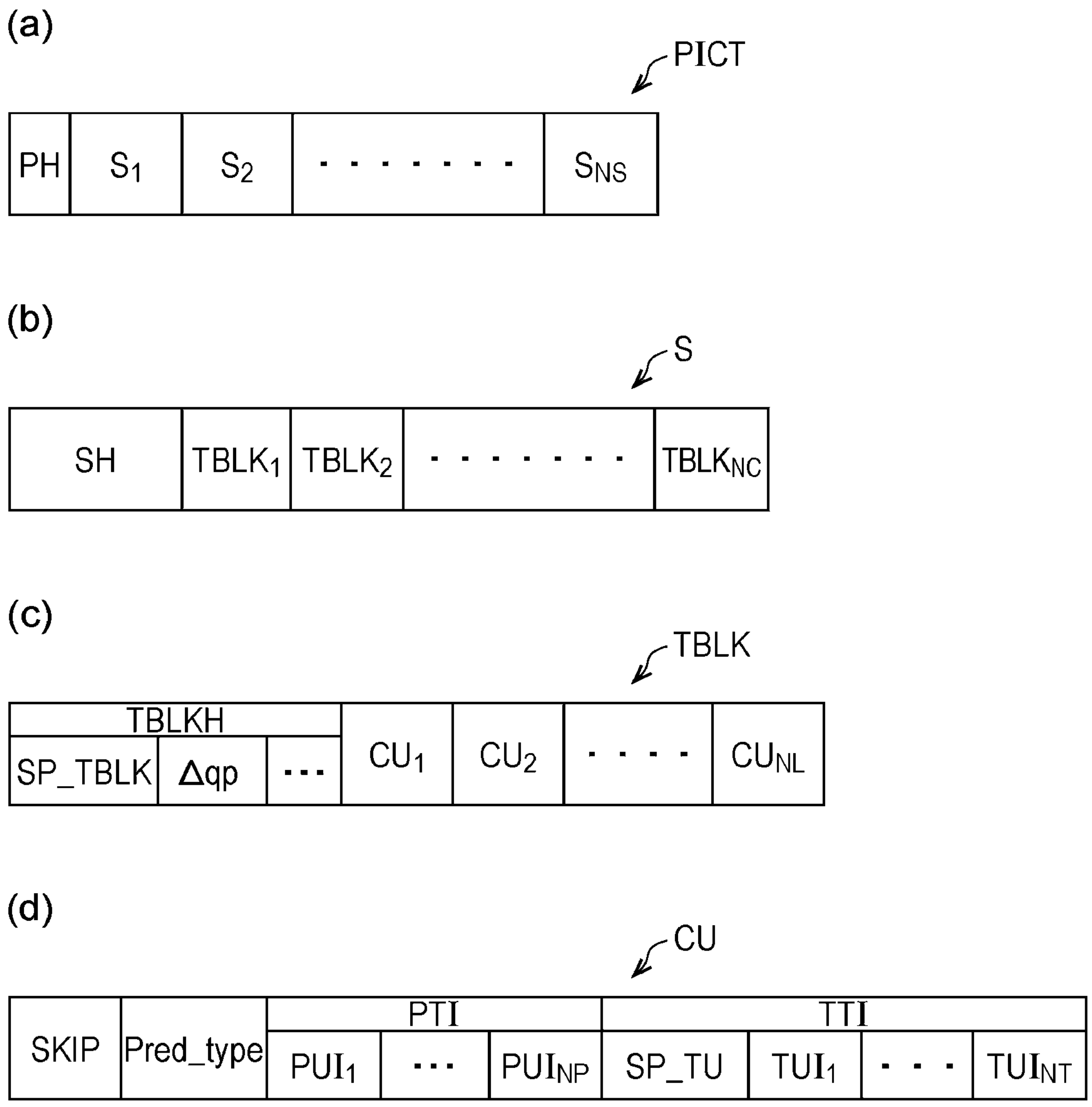
FIG. 2 illustrates data configuration of coded data which is generated by a moving image coding apparatus according to the embodiment of the present invention and is decoded by the moving image decoding apparatus, in which (a) to (d) FIG. 2 are diagrams respectively illustrating a picture layer, a slice layer, a tree block layer, and a CU layer.

With reference to FIG. 2, a configuration example of coded data #1 which is generated by a moving image coding apparatus 2 and is decoded by a moving image decoding apparatus 1 will be described. The coded data #1 exemplarily includes a sequence and a plurality of pictures forming the sequence.

In a sequence layer, sets of data which are referred to by the moving image decoding apparatus 1 in order to decode a process target sequence are prescribed. The sequence layer includes a sequence parameter set SPS, a picture parameter set PPS, and a picture PICT.

FIG. 2 illustrates structures of hierarchies which are equal to or lower than a picture layer in the coded data #1. FIGS. 2(*a*) to 2(*d*) are diagrams respectively illustrating a picture layer which prescribed the picture PICT, a slice layer which prescribed a slice S, a tree block layer which prescribed a tree block TBLK, and a CU layer which prescribed a coding unit (CU) included in the tree block TBLK.

(Picture Layer)

In the picture layer, sets of data which are referred to by the moving image decoding apparatus 1 in order to decode a process target picture PICT (hereinafter, also referred to as a target picture) are prescribed. The picture PICT includes a picture header PH and slices $S_1$ to $S_{NS}$ (where NS indicates a total number of slices included in the picture PICT) as illustrated in FIG. 2(*a*).

In addition, in the following, in a case where the respective slices $S_1$ to $S_{NS}$ are not required to be differentiated from each other, the subscripts may be omitted. Further, this is also the same for other data which is included in the coded data #1 described below and is given a subscript.

The picture header PH includes a coding parameter group which is referred to by the moving image decoding apparatus 1 in order to determine a decoding method of a target picture.

(Slice Layer)

In the slice layer, sets of data which are referred to by the moving image decoding apparatus 1 in order to decode a process target slice S (hereinafter, also referred to as a target slice) are prescribed. The slice S includes a slice header SH and tree blocks $TBLK_1$ to $TBLK_{NC}$ (where NC indicates a total number of tree blocks included in the slice S) as illustrated in FIG. 2(*b*).

The slice header SH includes a coding parameter group which is referred to by the moving image decoding apparatus 1 in order to determine a decoding method of a target slice. Slice type designation information (slice_type) for designating a slice type is an example of a coding parameter included in the slice header SH.

Slice types which can be designated by the slice type designation information may include (1) an I slice which uses only intra-prediction during coding, (2) a P slice which uses a uni-prediction or intra-prediction during coding, (3) a B slice which uses uni-prediction, bi-prediction, or intra-prediction, and the like.

In addition, the slice header SH includes a filter parameter FP which is referred to be a loop filter which is included in the moving image decoding apparatus 1. The filter parameter FP includes a filter coefficient group. The filter coefficient group includes (1) tap number designation information for designating the number of taps of filters, (2) filter coefficients $a_0$ to $a_{NT-1}$ (where NT indicates a total number of filter coefficients included in the filter coefficient group), and (3) an offset.

(Tree Block Layer)

In the tree block layer, sets of data which are referred to by the moving image decoding apparatus 1 in order to decode a process target tree block TBLK (hereinafter, also referred to as a target tree block) are prescribed.

The tree block TBLK includes a tree block header TBLK and coding unit information $CU_1$ to $CU_{NL}$ (where NL indicates a total number of items of coding unit information included in the tree block TBLK). Here, first, a description will be made of a relationship between the tree block TBLK and the coding unit information CU.

The tree block TBLK is split into units for specifying a block size used for each process of intra-prediction or inter-prediction and transform.

The units of the tree block TBLK are obtained through recursive quadtree subdivision. A tree structure obtained through the recursive quadtree subdivision is hereinafter referred to as a coding tree.

Hereinafter, a unit corresponding to a leaf which is a terminal node of the coding tree is referred to as a coding node. In addition, the coding node is a basic unit in a coding process, and thus the coding node is hereinafter referred to as a coding unit (CU).

In other words, the coding unit information $CU_1$ to $CU_{NL}$ is information corresponding to each coding node (coding unit) which is obtained by performing recursive quadtree subdivision on the tree block TBLK.

In addition, a root of the coding tree is correlated with the tree block TBLK. In other words, the tree block TBLK is correlated with the highest node of a tree structure obtained through quadtree subdivision, recursively including a plurality of coding nodes.

In addition, a size of each coding node is a half of a size of a coding node (that is, a unit of a one hierarchy higher node of the corresponding coding node) vertically and horizontally.

Further, a size taken by each coding node depends on size designation information and a maximum hierarchical depth of a coding node, included in the sequence parameter set SPS of the coded data #1. For example, in a case where a size of the tree block TBLK is 64×64 pixels, and the maximum hierarchical depth is 3, a coding node in a hierarchy which is equal to or lower than the tree block TBLK can take any one of four types of sizes, that is, 64×64 pixels, 32×32 pixels, 16×16 pixels, and 8×8 pixels.

(Tree Block Header)

Tree block header TBLKH includes coding parameters which are referred to by the moving image decoding apparatus 1 in order to determine a decoding method of a target tree block. Specifically, as illustrated in FIG. 2(*c*), tree block split information SP_TBLK for designating a split pattern of a target tree block into respective CUs, and a quantization parameter difference Δqp (qp_delta) for designating a size of a quantization step, are included.

The tree block split information SP_TBLK is information indicating a coding tree for splitting a tree block, and, specifically, information for designating a shape, size, and a position in a target tree block, of each CU included in the target tree block.

In addition, the tree block split information SP_TBLK may not explicitly include a shape or a size of a CU. For example, the tree block split information SP_TBLK may be a set of flags (split_coding_unit_flag) indicating the entire target tree block or a partial domain of a tree block is split into four parts. In this case, a shape or a size of each CU can be specified by using a shape or a size of a tree block together.

In addition, the quantization parameter difference Δqp is a difference qp−qp' between a quantization parameter qp in a target tree block and a quantization parameter qp' in a tree block which is coded right before the corresponding target tree block.

(CU Layer)

In the CU layer, sets of data which are referred to by the moving image decoding apparatus 1 in order to decode a process target CU (hereinafter, also referred to as a target CU) are prescribed.

Here, prior to detailed description of content of data included in the coding unit information CU, a tree structure of data included in the CU will be described. A coding node is a node of roots of a prediction tree (PT) and a transform tree (TT). The prediction tree and the transform tree will be described.

In the prediction tree, a coding node is split into one or a plurality of prediction blocks, and a position and a size of each prediction block are prescribed. In other words, the prediction block is one domain or a plurality of domains which do not overlap each other, forming the coding node. In addition, the prediction tree includes one or a plurality of prediction blocks obtained through the above-described split.

A prediction process is performed for each prediction block. Hereinafter, the prediction block which is the unit of prediction is also referred to as a prediction unit (PU).

Types of splits in the prediction tree roughly include two types of intra-prediction and inter-prediction.

In a case of intra-prediction, as a split method, there are 2N×2N (which is the same size as that of a coding node) and N×N.

In addition, in a case of inter-prediction, as a split method, there are 2N×2N (which is the same size as that of a coding node), 2N×N, N×2N, N×N, and the like.

Further, in the transform tree, a coding node is split into one or a plurality of transform blocks, and a position and a size of each transform block are prescribed. In other words, the transform block is one domain or a plurality of domains which do not overlap each other, forming the coding node. In addition, the transform tree includes one or a plurality of transform blocks obtained through the above-described splitting.

A transform process is performed for each prediction block. Hereinafter, the transform block which is the unit of transform is also referred to as a transform unit (TU). A size of the TU is represented by a logarithmic value log 2TrafoWidth of a width and a logarithmic value log 2TrafoHeight of a height of a transform block. A size of the TU is also represented by a value log 2TrafoSize obtained from the following Equation.

$$\text{log 2TrafoSize}=(\text{log 2TrafoWidth}+\text{log 2TrafoHeight})>>1$$

Hereinafter, a TU having a width W×height H is referred to as W×H TU (for example, 4×4 TU).

(Data Structure of Coding Unit Information)

Next, with reference to FIG. 2(*d*), detailed description will be made of content of data included in the coding unit information CU. As illustrated in FIG. 2(*d*), the coding unit information CU includes, specifically, a skip mode flag SKIP, CU prediction type information Pred_type, PT information PTI, and TT information TTI.

[Skip Flag]

The skip flag SKIP is a flag indicating whether or not a skip mode is applied to a target CU, and in a case where a value of the skip flag SKIP is 1, that is, the skip mode is applied to a target CU, the PT information PTI in the coding unit information CU is omitted. In addition, the skip flag SKIP is omitted in an I slice.

[CU Prediction Type Information]

The CU prediction type information Pred_type includes CU prediction method information PredMode and PU split type information PartMode. The CU prediction type information is simply referred to as prediction type information in some cases.

The CU prediction method information PredMode is to designate one of intra-prediction (intra-CU) and inter-prediction (inter-CU) as a predicted image generation method for each PU included in a target CU. In addition, hereinafter, the types of skip, intra-prediction, and inter-prediction are referred to as CU prediction modes in a target CU.

The PU split type information PartMode is to designate a PU split type which is a pattern of split of a target coding unit (CU) into PUs. Hereinafter, as mentioned above, dividing target coding unit (CU) into PUs is referred to as PU split according to a PU split type.

For example, the PU split type information PartMode may be an index indicating the type of PU split pattern, and may designate a shape, a size, and a position in a target prediction tree, of each PU included in the target prediction tree.

In addition, a selectable PU split type is different depending on a CU prediction method and a CU size. Further, a selectable PU split type is different in each case of inter-prediction and intra-prediction. Furthermore, details of the PU division type will be described later.

[Pt Information]

The PT information PTI is information regarding a PT included in a target CU. In other words, the PT information PTI is a set of information regarding each of one or a plurality of PUs included in a PT. As described above, generation of a predicted image is performed in the units of PUs, and thus the PT information PTI is referred to when the predicted image is generated by the moving image decoding apparatus 1. The PT information PTI includes PU information $PUI_1$ to $PUI_{NP}$ (where NP indicates a total number of PUs included in a target PT) including prediction information in each PU as illustrated in FIG. 2(*d*).

The prediction information PUI includes an image processing apparatus parameter PP_Intra or an inter-prediction parameter PP_Inter according to a prediction method designated by the prediction type information Pred_mode. Hereinafter, a PU to which intra-prediction is applied is referred to as an intra-PU, and a PU to which inter-prediction is applied is referred to as an inter-PU.

The inter-prediction parameter PP_Inter includes coding parameters which are referred to when the moving image decoding apparatus 1 generates an inter-predicted image through inter-prediction.

The inter-prediction parameter PP_Inter may be, for example, a merge flag (merge_flag), a merge index (merge_idx), an estimated motion vector index (mvp_idx), a reference image index (ref_idx), an inter-prediction flag (inter_pred_flag), and a motion vector difference (mvd).

The intra-prediction parameter PP_Inter includes coding parameters which are referred to when the moving image decoding apparatus 1 generates a predicted image through inter-prediction.

The inter-prediction parameter PP_Inter may be, for example, an estimated prediction mode flag, an estimated prediction mode index, and a remaining prediction mode index.

In addition, the intra-prediction parameter may include a PCM mode flag indicating whether or not a PCM mode is used. In a case where the PCM mode flag is coded, and indicates that a PCM mode is used, each of a prediction process (intra), a transform process, and an entropy coding process is omitted.

[TT Information]

The TT information TTI is information regarding a TT included in a CU. In other words, the TT information TTI is a set of information regarding each of one or a plurality of TUs included in a TT, and is referred to when the moving image decoding apparatus 1 decodes residual data. In addition, hereinafter, a TU is referred to as a block in some cases.

As illustrated in FIG. 2(*d*), the TT information TTI includes TT split information SP_TU, and TU information $TUI_1$ to $TUI_{NT}$ (where NT indicates a total number of blocks included in a target CU).

The TT split information SP_TU is, specifically, information for determining a shape, a size, and a on in a target CU, of each TU included in the target CU. For example, the TT split information SP_TU may be realized by information (split_transform_flag) indicating whether or not a target node will be split, and information (trafoDepth) indicating a depth of the split.

In addition, for example, in a case where a size of a CU is 64×64, each TU which is obtained through splitting can take sizes of 32×32 pixels to 4×4 pixels.

The TU information $TUI_1$ to $TUI_{NT}$ is information regarding each of one or a plurality of TUs included in a TT. For example, the TU information TUI includes a quantized prediction residual (also referred to as a quantized residual).

Each quantized prediction residual is coded data which is generated by the moving image coding apparatus 2 performing the following processes 1 to 3 on a process target block.

Process 1: Frequency transform (for example, discrete cosine transform (DCT)) is performed on a prediction residual obtained by subtracting a predicted image from a coding target image.

Process 2: A transform coefficient obtained in the process 1 is quantized.

Process 3: Variable length coding is performed on the transform coefficient quantized in the process 2.

In addition, the quantization parameter qp indicates a size of a quantization step QP which is used for the moving image coding apparatus 2 to quantize the transform coefficient ($QP=2^{qp/6}$).

(PU Split Type)

The PU split type includes a total of the following eight types of patterns assuming that a size of a target CU is 2N×2N. In other words, there are four symmetric splitting including 2N×2N pixels, 2N×N pixels, N×2N pixels, and N×N pixels, and four asymmetric splitting including 2N×nU pixels, 2N×nD pixels, nL×2N pixels, and nR×2N pixels. In addition, N indicates $2^m$ (where m is an integer of 1 or more). Hereinafter, a domain which is obtained by splitting a symmetric CU is also referred to as a partition.

FIGS. 3(*a*) to 3(*h*) specifically illustrate positions of boundaries of PU slit in a CU, for respective slit types.

FIG. 3(*a*) illustrates a PU split type of 2N×2N in which a CU is not split. In addition, FIGS. 3(*b*), 3(*c*) and 3(*d*) respectively illustrate shapes of partitions in cases where PU split types are 2N×N, 2N×nU, and 2N×nD. Further, FIGS. 3(*e*), 3(*f*) and 3(*g*) respectively illustrate shapes of partitions in cases where PU split types are N×2N, nL×2N, and nR×2N. Furthermore, FIG. 3(*h*) illustrates a shape of a partition in a case where a PU split type is N×N.

The PU split types of FIGS. 3(*a*) and 3(*h*) are also referred to as square split on the basis of the shape of the partition. In addition, the PU split types of FIGS. 3(*b*) to 3(*g*) are also referred to as non-square split.

Further, in FIGS. 3(*a*) to 3(*h*), a number given to each domain indicates an identification number of the domain, and a process is performed on the domains in an order of the identification numbers. In other words, the identification number indicates a scan order of the domain.

[Split Type in Case of Inter-Prediction]

In an inter-PU, seven types are defined except for N×N (FIG. 3(*h*)) among the eight split types. In addition, the six asymmetric splittings are referred to as asymmetric motion partition (AMP).

Further, a specific value of N is prescribed by a size of a CU to which a corresponding PU belongs, and specific values of nU, nD, nL, and nR are determined according to a value of N. For example, an inter-CU of 128×128 pixels can be split into inter-PUs of 128×128 pixels, 128×64 pixels, 64×128 pixels, 64×64 pixels, 128×32 pixels, 128×96 pixels, 32×128 pixels, and, and 96×128 pixels.

[Split Type in Case of Intra-Prediction]

The following two split patterns are defined in an intra-PU. The patterns are a split pattern 2N×2N in which a target CU is not split, that is, the target CU is treated as a single PU, and a pattern N×N in which the target CU is symmetrically split into four PUs.

Therefore, the intra-PU can take the split patterns of FIGS. 3(*a*) and 3(*h*) in the examples illustrated in FIG. 3.

For example, an intra-CPU of 128×128 pixels can be split into 128×128 pixels and 64×64 pixels.

(TU Split Type)

Next, a TU split type will be described with reference to FIGS. 3(*i*) to 3(*o*). Patterns of TU split is determined by a size of a CU, depth (trafoDepth) of split, and a PU split type of a target PU.

In addition, patterns of TU split include square quadtree subdivision and non-square quadtree subdivision.

FIGS. 3(*i*) to (*k*) illustrate split types in which a square node is subdivided into square or non-square quadtrees. More specifically, FIG. 3(*i*) illustrates a split type in which a square node is subdivided into square quadtrees. In addition, FIG. 3(*j*) illustrates a split type in which a square node is subdivided into rectangular quadtrees each of which is transversely long. Further, FIG. 3(*k*) illustrates a split type in which a square node is subdivided into rectangular quadtrees each of which is longitudinally long.

In addition, FIGS. 3(*l*) to 3(*o*) illustrate split types in which a non-square node is subdivided into square or non-square quadtrees. More specifically, FIG. 3(*l*) illustrates a split type in which a rectangular node which is transversely long is subdivided into rectangular quadtrees each of which is transversely long. In addition, FIG. 3(*m*) illustrates a split type in which a rectangular node which is transversely long is subdivided into square quadtrees. Further, FIG. 3(*n*) illustrates a split type in which a rectangular node which is longitudinally long is subdivided into rectangular quadtrees each of which is longitudinally long. Furthermore, FIG. 3(*o*) illustrates a split type in which a rectangular node which is longitudinally long is subdivided into square quadtrees.

(Configuration of Quantized Residual Information QD)

The quantized residual information QD may include information such as a position of the last non-zero transform coefficient, the presence or absence of a non-zero transform coefficient in a sub-block, the presence or absence of a non-zero transform coefficient at each position, and a level and a sign of a transform coefficient.

For example, the quantized residual information QD may include syntaxes last_significant_coeff_x, last_significant_coeff_y, significant_coeff_group_flag, significant_coeff_flag, coeff_abs_level_greater1_flag, coeff_abs_level_greater2_flag, coeff_sign_flag, and coeff_abs_level_remaining.

Transform coefficients are sequentially scanned from a low frequency side toward a high frequency side. This scan order may be referred to as a forward scan. On the other hand, reversely to the forward scan, a scan from a high frequency side to a low frequency side is also used. This scan order may be referred to as a backward scan.

The syntaxes last_significant_coeff_x and last_significant_coeff_y are syntaxes indicating a position of the last non-zero transform coefficient in the forward scan direction. In addition, each syntax may be subdivided into prefix and suffix and be coded. A last coefficient position may be derived by using last coefficient process prefixes last_significant_coeff_x_prefix and last_significant_coeff_y_prefix and last coefficient position suffixes last_significant_coeff_x_suffix, and last_significant_coeff_y_suffix.

The syntax significant_coeff_flag is a syntax indicating the presence or absence of a non-zero transform coefficient in each frequency component in the backward scan direction with a non-zero transform coefficient as a starting point. The syntax significant_coeff_flag is a flag which takes 0 if a transform coefficient is 0 and takes 1 if a transform coefficient is not 0, with respect to each of xC and yC. In addition, the syntax significant_coeff_flag is also referred to as a transform coefficient presence/absence flag or simply referred to as coefficient presence/absence flag. Further, significant_coeff_flag may not be treated as a separate syntax but may be included in the syntax (for example, coeff_abs_level) indicating an absolute value of a transform coefficient. In this case, a first bit of the syntax coeff_abs_level corresponds to significant_coeff_flag, and the following process of deriving a context index of significant_coeff_flag corresponds to a process of deriving a context index of the first bit of the syntax coeff_abs_level.

A variable length code decoding unit 11 included in the moving image decoding apparatus 1 splits a tree block into a plurality of sub-blocks, and decodes significant_coeff_group_flag in the process units of sub-blocks. The quantized residual information QD includes a flag (sub-block coefficient presence/absence flag significant_coeff_group_ flag) indicating that at least one non-zero transform coefficient in the sub-block in the sub-block units.

Hereinafter, with reference to FIGS. 4 to 6, a summary of a decoding process will be described.

First, with reference to FIG. 4, an example of sub-block splitting will be described. FIG. 4 illustrates a relationship between a block and a sub-block. FIG. 4(*a*) illustrates an example in which a 4×4 TU is formed by a single sub-block including 4×4 components. FIG. 4(*b*) illustrates an example in which an 8×8 TU is formed by four sub-blocks each including 4×4 components. FIG. 4(*c*) illustrates an example in which a 16×16 TU is formed by sixteen sub-blocks each including 4×4 components. In addition, a relationship between a TU size and a sub-block size and a splitting method are not limited to these examples.

FIG. 5(*a*) is a diagram illustrating a scan order for a plurality of (in FIG. 5(*a*), 4×4=16) sub-blocks obtained by splitting a block. Hereinafter, a scan in the units of sub-blocks is also referred to as a sub-block scan. In a case where the sub-blocks are scanned as in FIG. 5(*a*), respective frequency domains in the sub-blocks are scanned in a scan order illustrated in FIG. 5(*b*). The scan order illustrated in FIGS. 5(*a*) and 5(*b*) is referred to as a "forward scan".

FIG. 5(*c*) is a diagram illustrating a scan order for a plurality of (in FIG. 5(*b*), 4×4=16) sub-blocks obtained by splitting a block. In a case where the sub-blocks are scanned as in FIG. 5(*c*), respective frequency domains in the sub-blocks are scanned in a scan order illustrated in FIG. 5(*d*). The scan order illustrated in FIGS. 5(*c*) and 5(*d*) is referred to as a "backward scan".

A transverse axis of each of FIGS. 6(*a*) to 6(*f*) expresses a horizontal frequency xC (where $0 \leq xC \leq 7$), and a longitudinal axis thereof expresses a vertical frequency yC (where $0 \leq yC \leq 7$). In the following description, among partial domains included in a frequency domain, a partial domain designated by the horizontal frequency xC and the vertical frequency yC is also referred to as a frequency component (xC,yC). In addition, a transform coefficient for the frequency component (xC,yC) is also denoted by Coeff (xC, yC). A transform coefficient Coeff (0,0) indicates a DC component, and other transform coefficients indicate components other than the DC component. In the present specification, (xC,yC) may be denoted as (u,v).

FIG. 6(*a*) is a diagram illustrating a scan order in a case where a block having a TU size of 8×8 is split into sub-blocks each having a size of 4×4, and respective frequency components are scanned in the forward scan.

FIG. 6(*b*) is a diagram exemplifying non-zero transform coefficients in a frequency domain including 8×8 frequency components. In a case of the example illustrated in FIG. 6(*b*), last_significant_coeff_x is 6, and last_significant_coeff_y is 0.

FIG. 6(*c*) is a diagram illustrating each value of the sub-block coefficient presence/absence flag significant_coeff_group_flag which is decoded for each sub-block in a case where decoding target transform coefficients are ones illustrated in FIG. 6(*b*). A value of significant_coeff_group_flag regarding a sub-block including at least one non-zero transform coefficient is set to 1, and a value of significant_coeff_group_flag regarding a sub-block including no non-zero transform coefficient is set to 0.

FIG. 6(*d*) is a diagram illustrating each value of the syntax significant_coeff_flag indicating the presence or absence of a non-zero transform coefficient in a case where decoding target transform coefficients are ones illustrated in FIG. 6(*b*). For a sub-block in which significant_coeff_group_flag is 1, significant_coeff_flag is decoded in the backward scan order, and for a sub-block in which significant_coeff_group_flag is 0, significant_coeff_flag for all the frequency components included in the sub-block is set to 0 without decoding significant_coeff_flag (a lower left sub-block of FIG. 6(*d*)).

FIG. 6(*e*) is a diagram illustrating each value obtained by decoding the syntaxes coeff_abs_level_greater1_flag, coeff_abs_level_greater2_flag, and coeff_abs_level_remaining in a case where decoding target transform coefficients are ones illustrated in FIG. 6(*b*).

FIG. 6(*f*) is a diagram illustrating the syntax coeff_sign_flag in a case where decoding target transform coefficients are ones illustrated in FIG. 6(*b*).

Decoding of the syntaxes coeff_abs_level_greater1_flag, coeff_abs_level_greater2_flag, and coeff_abs_level_remaining indicating a value of each transform coefficient changes in accordance with a mode (high throughput mode). The high throughput mode is turned off at the time of start of a sub-block, and the high throughput mode is turned on at the time when the number of non-zero transform coefficients in a sub-block is equal to or larger than a predetermined constant. In the high throughput mode, decoding of some syntaxes is skipped.

The syntax coeff_abs_level_greater1_flag is a flag indicating whether or not an absolute value of a transform coefficient exceeds 1, and is coded for a frequency component in which a value of the syntax significant_coeff_flag is 1. When a value of a transform coefficient exceeds 1, a value of coeff_abs_level_greater1_flag is 1, and, otherwise, a value of coeff_abs_level_greater1_flag is 0. In addition, decoding of coeff_abs_level_greater1_flag is skipped in the high throughput mode.

The syntax coeff_abs_level_greater2_flag is a flag indicating whether or not an absolute value of a transform coefficient exceeds 2, and is coded when a value of coeff_abs_level_greater1_flag is 1. When an absolute value of a transform coefficient exceeds 2, a value of coeff_abs_level_greater2_flag is 1, and, otherwise, a value of coeff_abs_level_greater2_flag is 0. In addition, decoding of coeff_abs_level_greater2_flag is skipped after the first time in each sub-block, and in a case of the high throughput mode.

In a case where an absolute value of a transform coefficient is a predetermined base level baseLevel, the syntax coeff_abs_level_remaining is syntax for designating an absolute value of the transform coefficient. In a case where decoding of coeff_abs_level_greater1_flag is skipped, coeff_abs_level_greater2_flag is skipped, and in a case where coeff_abs_level_greater1_flag is 1, coeff_abs_level_greater2_flag is coded when a value thereof is 1. A value of the syntax coeff_abs_level_remaining is obtained by subtracting baseLevel from an absolute value of a transform coefficient. For example, coeff_abs_level_remaining=1 indicates that an absolute value of a transform coefficient is baseLevel+1. In addition, baseLevel is determined as follows.

baseLevel=1 (in a case where decoding of coeff_abs_level_greater1_flag is skipped)

baseLevel=2 (in a case where decoding of coeff_abs_level_greater2_flag is skipped in cases other than the above-described case)

baseLevel=3 (in a case where decoding of coeff_abs_level_greater2_flag is 1 in cases other than the above-described cases)

The syntax coeff_sign_flag is a flag indicating a sign (positive or negative) of a transform coefficient, and is coded for a frequency component in which a value of the syntax coeff_sign_flag is 1 except for a case of performing sign hiding. The syntax coeff_sign_flag takes 1 if a transform coefficient is positive, and takes 0 if a transform coefficient is negative.

In addition, the sign hiding refers to a method in which a sign of a transform coefficient is not explicitly coded but is calculated through computation.

The variable length code decoding unit 11 included in the moving image decoding apparatus 1 can generate a transform coefficient Coeff (xC,yC) for each frequency component by decoding the syntaxes last_significant_coeff_x, last_significant_coeff_y, significant_coeff_flag, coeff_abs_level_greater1_flag, coeff_abs_level_greater2_flag, and coeff_sign_flag, coeff_abs_level_remaining.

In addition, a set of non-zero transform coefficients in a specific domain (for example, a TU) is also referred to significancemap in some cases.

Details of decoding processes of various syntaxes will be described later, and a configuration of the moving image decoding apparatus 1 will now be described.

(Moving Image Decoding Apparatus 1)

Hereinafter, a description will be made of the moving image decoding apparatus 1 according to the present embodiment with reference to FIG. 1 and FIGS. 7 to 26. The moving image decoding apparatus 1 is a decoding apparatus which employs the technique proposed in High-Efficiency Video Coding (HEVC) which is a succeeding codec of the H. 264/MPEG-4. AVC standard.

FIG. 7 is a block diagram illustrating a configuration of the moving image decoding apparatus 1. As illustrated in FIG. 7, the moving image decoding apparatus 1 includes the variable length code decoding unit 11, a predicted image generating unit 12, an inverse quantization/inverse transform unit 13, an adder 14, a frame memory 15, and a loop filter 16. In addition, as illustrated in FIG. 7, the predicted image generating unit 12 includes a motion vector recovering unit 12*a*, an inter-predicted image generating unit 12*b*, an intra-predicted image generating unit 12*c*, and a prediction type determining unit 12*d*. The moving image decoding apparatus 1 is an apparatus which generates a moving image #2 by decoding the coded data #1.

(Variable Length Code Decoding Unit 11)

FIG. 8 is a block diagram illustrating a main part configuration of the variable length code decoding unit 11. As illustrated in FIG. 8, the variable length code decoding unit 11 includes a quantized residual information decoding unit 111, a prediction parameter decoding unit 112, a prediction type information decoding unit 113, and a filter parameter decoding unit 114.

The variable length code decoding unit 11 decodes a prediction parameter PP regarding each partition from the coded data #1 in the prediction parameter decoding unit 112 and supplies the prediction parameter PP to the predicted image generating unit 12. Specifically, the prediction parameter decoding unit 112 decodes inter-prediction parameters PP_Inter including a reference image index, an estimation motion vector index, and a motion vector residual from the coded data #1 in relation to an inter-prediction partition, and supplies the inter-prediction parameters PP_Inter to the motion vector recovering unit 12*a*. On the other hand, in relation to an intra-prediction partition, intra-prediction parameters PP_Intra including an estimated prediction mode flag, an estimated prediction mode index, and a remaining prediction mode index are decoded from the coded data #1, and are supplied to the intra-predicted image generating unit 12*c*.

In addition, the variable length code decoding unit 11 decodes the prediction type information Pred_type for each partition from the coded data #1 in the prediction type information decoding unit 113, and supplies the prediction type information to the prediction type determining unit 12*d*. Further, the variable length code decoding unit 11 decodes the quantized residual information QD regarding a block, and the quantization parameter difference Δpq from the coded data #1 in the quantized residual information decoding unit 111, and supplies the decoded information to the inverse quantization/inverse transform unit 13. Furthermore, the variable length code decoding unit 11 decodes the filter parameter PP from the coded data #1 in the filter parameter decoding unit 114 and supplies the filter parameter to the loop filter 16. Moreover, a specific configuration of the quantized residual information decoding unit 111 will be described later, and thus description thereof is omitted here.

(Predicted Image Generating Unit 12)

The predicted image generating unit 12 identifies whether each partition is an inter-prediction partition on which inter-prediction is to be performed or an intra-prediction partition on which intra-prediction is to be performed on the basis of the prediction type information Pred_type for each partition. In addition, in the former case, an inter-predicted image Pred_Inter is generated, and the generated inter-predicted image Pred_Inter is supplied to the adder 14 as a predicted image Pred, and, in the latter case, an intra-predicted image Pred_Intra is generated, and the generated intra-predicted image Pred_Intra is supplied to the adder 14. Further, in a case where a skip mode is applied to a process target TU, the predicted image generating unit 12 omits decoding of other parameters which belongs to the PU.

(Motion Vector Recovering Unit 12*a*)

The motion vector recovering unit 12*a* recovers a motion vector mv regarding each inter-prediction partition from a motion vector residual regarding the partition and a recovered motion vector mv' regarding another partition. Specifically, (1) an estimation motion vector is derived from the recovered motion vector mv' an estimation method designated by the estimation motion vector index, and (2) the motion vector mv is obtained by adding the derived estimation motion vector to the motion vector residual. In addition, the recovered motion vector mv' regarding another partition may be read from the frame memory 15. The motion vector recovering unit 12*a* supplies the recovered motion vector mv to the inter-predicted image generating unit 12*b* along with a corresponding reference image index RI.

(Inter-Predicted Image Generating Unit 12*b*)

The inter-predicted image generating unit 12*b* generates a motion compensation image mc regarding each inter-prediction partition through inter-frame prediction. Specifically, the motion compensation image mc is generated from an adaptive filtered decoded image P_ALF' designated by the reference image index RI which is supplied from the motion vector recovering unit 12*a*, by using the motion vector mv supplied from the motion vector recovering unit 12*a*. Here, the adaptive filtered decoded image P_ALF' is an image obtained by the loop filter 16 performing a filter process on a decoded image in which decoding of all frames have already been completed, and the inter-predicted image generating unit 12*b* may read a pixel value of each pixel forming the adaptive filtered decoded image P_ALF' from the frame memory 15. The motion compensation image mc generated by the inter-predicted image generating unit 12*b* is supplied to the prediction type determining unit 12*d* as the inter-predicted image Pred_Inter.

(Intra-Predicted Image Generating Unit 12*c*)

The intra-predicted image generating unit 12*c* generates a predicted image Pred_Intra regarding each intra-prediction partition. Specifically, first, a prediction mode is specified on the basis of the intra-prediction parameters PP_Intra supplied from the variable length code decoding unit 11, and assigns the specified prediction mode to a target partition, for example, in a raster scan order.

Here, specification of a prediction mode based on the intra-prediction parameters PP_Intra may be performed as follows. (1) The estimated prediction mode flag is decoded, and, in a case where the estimated prediction mode flag indicates that a prediction mode for a process target partition is the same as prediction modes assigned to peripheral partitions of the target partition, the prediction mode which is assigned to the peripheral partitions of the target partition is assigned to the target partition. (2) On the other hand, in a case where the estimated prediction mode flag indicates that a prediction mode for a process target partition is not the same as prediction modes assigned to peripheral partitions of the target partition, the remaining prediction mode index is decoded, and a prediction mode indicated by the remaining prediction mode index is assigned to the target partition.

The intra-predicted image generating unit 12*c* generates the predicted image Pred_Intra from a (locally) decoded image P through inter-frame prediction according to a prediction method indicated by the prediction mode assigned to the target partition. The intra-predicted image Pred_Intra generated by the intra-predicted image generating unit 12*c* is supplied to the prediction type determining unit 12*d*. In addition, the intra-predicted image generating unit 12*c* may generate the predicted image Pred_Intra from the adaptive filtered decoded image P_ALF through inter-frame prediction.

With reference to FIG. 9, definition of the prediction mode will be described. FIG. 9 illustrates a definition of the prediction mode. As illustrated in FIG. 9, thirty-six types of prediction modes are defined, and the prediction modes are specified by numbers of "0" to "35" (intra-prediction mode indexes). In addition, as illustrated in FIG. 10, the following name is assigned to each prediction mode. In other words, “0” is “Intra_Planar (planar prediction mode)”, “1” is “Intra DC (intra-DC prediction mode)”, “2” to “34” are “Intra Angular (direction prediction)”, and “35” is “Intra From Luma”. “35” is specific to a chroma prediction mode, and is a mode for performing chroma prediction on the basis of prediction of luminance. In other words, the chroma prediction mode “35” is a prediction mode using a luminance pixel value and a chroma pixel value. The chroma prediction mode “35” is also referred to as an LM mode. The number of prediction modes (intraPredModeNum) is “35” regardless of a size of a target block.

(Prediction Type Determining Unit 12*d*)

The prediction type determining unit 12*d* determines whether each partition is an inter-prediction partition on which inter-prediction is to be performed or an intra-prediction partition on which intra-prediction is to be performed on the basis of the prediction type information Pred_type for a PU to which each partition belongs. In addition, in the former case, the inter-predicted image Pred_Inter generated in the inter-predicted image generating unit 12*b* is supplied to the adder 14 as a predicted image Pred, and, in the latter case, the intra-predicted image Pred_Intra is generated in the intra-predicted image generating unit 12*c* is supplied to the adder 14 as a predicted image Pred.

(Inverse Quantization/Inverse Transform Unit 13)

The inverse quantization/inverse transform unit 13 (1) inversely quantizes the transform coefficient Coeff which has been decoded from the quantized residual information QD of the coded data #1, (2) performs inverse frequency transform such as inverse discrete cosine transform (DCT) on a transform coefficient Coeff_IQ obtained through the inverse quantization, and (3) supplies a prediction residual D obtained through the inverse frequency transform to the adder 14. In addition, in a case where the transform coefficient Coeff decoded from the quantized residual information QD is inversely quantized, the inverse quantization/inverse transform unit 13 derives a quantization step QP from the quantization parameter difference Δqp supplied from the variable length code decoding unit 11. The quantization parameter qp may be derived by adding the quantization parameter difference Δpq to a quantization parameter qp' regarding a TU which is previously subject to inverse quantization and inverse frequency transform, and the quantization step QP may be derived from the quantization parameter qp by, for example, $QP=2^{pq/6}$. In addition, the generation of the prediction residual D by the inverse quantization/inverse transform unit 13 is performed in the unit of TU or in the units of blocks into which the TU is split.

In addition, for example, if a size of a target block is 8×8, a position of a pixel in the target block is set to (i,j) (where 0≤i≤7 and 0≤i≤7), a value of the prediction residual D at the position (i,j) is indicated by D(i,j), and a transform coefficient which is inversely quantized in a frequency component (u,v) (where 0≤u≤7 and 0≤v≤7) is indicated by Coeff_IQ (u,v), the inverse DCT performed by the inverse quantization/inverse transform unit 13 is given by, for example, the following Equation (1).

[Equation 1]

$$D(i,j)=\frac{1}{4}\sum_{u=0}^{7}\sum_{v=0}^{7}C(u)C(v)\mathrm{Coeff\_IQ}(u,v)\cos\left\{\frac{(2i+1)u\pi}{16}\right\}\cos\left\{\frac{(2j+1)v\pi}{16}\right\} \tag{1}$$

Here, (u,v) are variables corresponding to the above-described (xC,yC). C(u) and C(v) are given as follows.

$C(u)=1/\sqrt{2}(u=0)$ $C(u)=1(u\neq 0)$ $C(v)=1/\sqrt{2}(v=0)$ $C(v)=1(v\neq 0)$ (Adder 14)

The adder 14 generates a decoded image P by adding the predicted image Pred supplied from the predicted image generating unit 12 to the prediction residual D supplied from the inverse quantization/inverse transform unit 13. The generated decoded image P is stored in the frame memory 15.

(Loop Filter 16)

The loop filter 16 functions (1) as a deblocking filter (DF) which performs smoothing (deblock process) on a peripheral image on a block boundary or a partition boundary in the decoded image P, and (2) as an adaptive filter (ALF) of performing an adaptive filter process on the image to which the deblocking filter has been applied, by using the filter parameter FP.

(Details of Quantized Residual Information Decoding Unit 111)

The quantized residual information decoding unit 111 has a configuration for decoding the quantized transform coefficient Coeff (xC,yC) for each frequency component (xC, yC) from the quantized residual information QD included in the coded data #1. Here, xC and yC are indexes indicating a position of each frequency component in a frequency domain, and are indexes which respectively correspond to the horizontal frequency u and the vertical frequency v described above. Hereinafter, the quantized transform coefficient Coeff may be also simply referred to as a transform coefficient Coeff.

FIG. 11 is a block diagram illustrating a configuration of the quantized residual information decoding unit 111. As illustrated in FIG. 11, the quantized residual information decoding unit 111 includes a transform coefficient decoding unit 120 and an arithmetic code decoding unit 130.

(Arithmetic Code Decoding Unit 130)

The arithmetic code decoding unit 130 has a configuration for decoding each bit included in the quantized residual information QD by referring to context, and includes a context recording/updating unit 131 and a bit decoding unit 132 as illustrated in FIG. 11.

[Context Recording/Updating Unit 131]

The context recording/updating unit 131 has a configuration for recording and updating a context variable CV which is managed by each context index ctxIdx. Here, the context variable CV includes (1) a superior symbol MPS (most probable symbol) of which an occurrence probability is high, and (2) a probability state index pStateIdx for designating an occurrence probability of the superior symbol MPS.

The context recording/updating unit 131 updates the context variable CV by referring to the context index ctxIdx supplied from each constituent element included in the transform coefficient decoding unit 120 and a value of a Bin decoded by the bit decoding unit 132, and records the updated context variable CV until the next update. In addition, the superior symbol MPS is 0 or 1. Further, the superior symbol MPS and the probability state index pStateIdx are updated whenever the bit decoding unit 132 decodes a single Bin.

In addition, the context index ctxIdx may directly designate context for each frequency component, and may be an increment value from an offset of a context index which is set for each TU which is a process target (this is also the same for the following).

[Bit Decoding Unit 132]

The bit decoding unit 132 decodes each bit (also referred to as a Bin) included in the quantized residual information QD by referring to the context variable CV which is recorded in the context recording/updating unit 131. In addition, a value of the Bin obtained through the decoding is supplied to each constituent element included in the transform coefficient decoding unit 120. Further, a value of the Bin obtained through the decoding is also supplied to the context recording/updating unit 131 so as to be referred to for updating the context variable CV.

(Transform Coefficient Decoding Unit 120)

As illustrated in FIG. 11, the transform coefficient decoding unit 120 includes a last coefficient position decoding unit 121, a scan order table storage unit 122, a coefficient decoding control unit 123, a coefficient presence/absence flag decoding unit, a coefficient value decoding unit 125, a decoded coefficient storage unit 126, and a sub-block coefficient presence/absence flag decoding unit 127.

[Last Coefficient Position Decoding Unit 121]

The last coefficient position decoding unit 121 analyzes the decoded bit (Bin) supplied from the bit decoding unit 132 so as to decode last_significant_coeff_x and last_significant_coeff_y. The decoded syntaxes last_significant_coeff_x and last_significant_coeff_y are supplied to the coefficient decoding control unit 123. In addition, the last coefficient position decoding unit 121 calculates the context index ctxIdx for determining context used to decode Bin of the syntaxes last_significant_coeff_x and last_significant_coeff_y in the arithmetic code decoding unit 130. The calculated context index ctxIdx is supplied to the context recording/updating unit 131.

[Scan Order Table Storage Unit 122]

The scan order table storage unit 122 stores a table which provides a position of a process target frequency component in a frequency domain by using a size of a process target TU (block), a scan index indicating the type of scan direction, and a frequency component identification index which is given according to a scan order, as arguments.

An example of such a scan order table may include ScanOrder. ScanOrder is a table for obtaining a position (xC,yC) in a frequency domain of a process target frequency component on the basis of a width size log 2TrafoWidth of a process target TU, a height size log 2TrafoHeight of the process target TU, a scan index scanIdx, and a frequency component identification index n which is given according to a scan order. In addition, hereinafter, a position (xC,yC) in a frequency domain of a process target frequency component may be simply referred to as a coefficient position (xC, yC).

Further, the table stored in the scan order table storage unit 122 is designated by a size of a process target TU (block) and the scan index scanIdx associated with a prediction mode index of an intra-prediction mode. In a case where a prediction mode method used for a process target TU is intra-prediction, the coefficient decoding control unit 123 refers to a table which is designated by a size of the TU and the scan index scanIdx associated with a prediction mode of the TU, so as to determine a scan order of frequency components.

FIG. 12 illustrates an example of the scan index scanIdx which is designated by an intra-prediction mode index IntraPredMode and a value log 2TrafoSize for designating a TU size. In FIG. 12, log 2TrafoSize-2=0 indicates that a TU size is 4×4 (corresponding to 4×4 pixels), and log 2TrafoSize-2=1 indicates that a TU size is 8×8 (corresponding to 8×8 pixels). In addition, log 2TrafoSize-2=2 and log 2TrafoSize-2=3 respectively indicate TU sizes of 16×16 and 32×32.

As illustrated in FIG. 12, for example, in a case where the TU size is 4×4, and the intra-prediction mode index is 1, the scan index of 0 is used, and, in a case where the TU size is 4×4, and the intra-prediction mode index is 6, the scan index of 2 is used.

FIG. 13(*a*) illustrates a scan type ScanType designated by each value of the scan index scanIdx. As illustrated in FIG. 13(*a*), in a case where the scan index is 0, an up-right diagonal scan is designated; in a case where the scan index is 1, a horizontal fast scan is designated; and in a case where the scan index is 2, a vertical fast scan is designated.

In addition, in a case where the CU prediction method information PredMode is inter-prediction, a scan index may be derived by using a TU size. In a case where, in a TU size, a width and a height of the TU size are the same as each other, a scan order (scan index=0) other than the horizontal fast scan and vertical fast scan is used. In a case where a width and a height of the TU size are not the same as each other, and a width of the TU size is larger than the height thereof, the horizontal fast scan order (scan index=1) is used. On the other hand, in a case where a height of a TU size is larger than a width thereof, the vertical fast scan order (scan index=2) is used.

In addition, FIGS. 13(*b*) to 13(*d*) illustrate examples of scan orders of the respective scan types (the horizontal fast scan, the vertical fast scan, and the up-right diagonal scan) designated by the scan index scanIdx in a case where a TU size is 4×4. Further, the respective examples illustrated in FIGS. 13(*b*) to 13(*d*) illustrate a forward scan direction. The horizontal fast scan illustrated in FIG. 13(*b*) is characterized in that coefficients are scanned diagonally in the horizontal direction for each line in the units of small sub-blocks in which the sub-block is split into upper and lower halves, and is suitable for a case where coefficients concentrate on horizontal frequency components. In addition, the vertical fast scan illustrated in FIG. 13(*c*) is characterized in that coefficients are scanned diagonally in the vertical direction for each line in the units of small sub-blocks in which the sub-block is split into left and right halves, and is suitable for a case where coefficients concentrate on vertical frequency components.

FIGS. 14(*a*) to 14(*c*) illustrate an example of a scan order in each scan type designated by the scan index scanIdx in a case where a TU size is 8×8 and a sub-block size is 4×4. In addition, each example illustrated in FIGS. 14(*a*) to 14(*c*) illustrates a forward scan direction. The horizontal fast scan illustrated in FIG. 14(*a*) is characterized in that coefficients are scanned diagonally in the horizontal direction for each line in the units of small sub-blocks in which the sub-block is split into upper and lower halves, and is suitable for a case where coefficients concentrate on horizontal frequency components. In addition, the vertical fast scan illustrated in FIG. 14(*b*) is characterized in that coefficients are scanned diagonally in the vertical direction for each line in the units of small sub-blocks in which the sub-block is split into left and right halves, and is suitable for a case where coefficients concentrate on vertical frequency components. Further, the up-right diagonal scan illustrated in FIG. 14(*c*) is characterized in that coefficients are scanned in an upper right diagonal direction, and is suitable for a case where there is no particular directivity in a distribution of coefficients.

FIG. 15 illustrates examples of scan orders in the scan types designated by the scan index scanIdx in a case where a TU size is 8×8 and sub-block sizes are different from each other.

FIG. 15(*a*) illustrates an example of the horizontal fast scan in a case where a TU size is 8×8, and a sub-block size is 8×2. The method in which coefficients are scanned diagonally in the horizontal direction for each line in the units of 8×2 sub-blocks (transversely long sub-blocks) illustrated in FIG. 15(*a*) is suitable for a case where coefficients concentrate on horizontal frequency components.

FIG. 15(*b*) illustrates an example of the vertical fast scan in a case where a TU size is 8×8, and a sub-block size is 2×8. The method in which coefficients are scanned diagonally in the vertical direction for each line in the units of 2×8 sub-blocks (longitudinally long sub-blocks) illustrated in FIG. 15(*b*) is suitable for a case where coefficients concentrate on vertical frequency components.

FIG. 15(*c*) illustrates an example of the up-right diagonal scan in a case where a TU size is 8×8, and a sub-block size is 4×4.

[Sub-Block Scan Order Table]

In addition, the scan order table storage unit 122 stores a sub-block scan order for designating a scan order of sub-blocks. The sub-block scan order is designated by a size of a process target TU (block) and a scan index scanIdx associated with a prediction mode index (prediction direction) of an intra-prediction mode. In a case where a prediction mode method used for a process target TU is intra-prediction, the coefficient decoding control unit 123 refers to a table which is designated by a size of the TU and the scan index scanIdx associated with a prediction mode of the TU, so as to determine a scan order of sub-blocks.

[Coefficient Decoding Control Unit 123]

The coefficient decoding control unit 123 has a configuration for controlling an order of a decoding process in each constituent element included in the quantized residual information decoding unit 111.

Specifically, the coefficient decoding control unit 123 performs sub-block splitting, the supply of each sub-block position according to a sub-block scan order, and the supply of a position of each frequency component in a sub-block according to a scan order.

The coefficient decoding control unit 123 derives a sub-block size in accordance with a scan order and/or a TU size, and splits the TU in the derived sub-block size so as to split the TU into sub-blocks. A splitting method is as described in FIGS. 14 and 15, and thus description thereof will be omitted here.

The coefficient decoding control unit 123 specifies a position of the last non-zero transform coefficient according to the forward scan by referring to the syntaxes last_significant_coeff_x and last_significant_coeff_y supplied from the last coefficient position decoding unit 121, and supplies a position (xCG,yCG) of each sub-block to the sub-block coefficient presence/absence flag decoding unit 127 in a backward scan order of a scan order which uses a position of a sub-block including the specified position of the last non-zero transform coefficient as a starting point and is given by the sub-block scan order table stored in the scan order table storage unit 122. In addition, the coefficient decoding control unit 123 supplies a size of a corresponding TU and a scan index scanIdx associated with a prediction mode of the TU, to the coefficient presence/absence flag decoding unit 124.

Further, in relation to a process target sub-block, the coefficient decoding control unit 123 supplies a position (xC,yC) of each frequency component included in the process target sub-block to the coefficient presence/absence flag decoding unit 124 and the decoded coefficient storage unit 126 in a backward scan order given by the scan order table stored in the scan order table storage unit 122. Here, as a scan order of each frequency component included in the process target sub-block, in a case of intra-prediction, a scan order (any one of the horizontal fast scan, the vertical fast scan, and the up-right diagonal scan) indicated by a scan index scanIdx which is designated by the intra-prediction mode index IntraPredMode and a value log 2TrafoSize for designating a TU size may be used, and, in a case of inter-prediction, the up-right diagonal scan may be used.

As mentioned above, the coefficient decoding control unit 123 has a configuration of setting a sub-block scan order and a scan order in a sub-block according to a prediction direction of intra-prediction in a case where a prediction method which is applied to a process target unit domain (a block or a TU) is the intra-prediction.

Generally, since an intra-prediction mode and a bias of a transform coefficient are correlated with each other, a scan order is changed according to the intra-prediction mode, and a scan suitable for biases of the sub-block coefficient presence/absence flag and the coefficient presence/absence flag can be performed. Consequently, it is possible to reduce a code amount of the sub-block coefficient presence/absence flag and the coefficient presence/absence flag which are coding and decoding targets, and thus to reduce a processing amount and to improve coding efficiency.

[Sub-Block Coefficient Presence/Absence Flag Decoding Unit 127]

The sub-block coefficient presence/absence flag decoding unit 127 analyzes each Bin supplied from the bit decoding unit 132, so as to decode syntax significant_coeff_group_flag[xCG][yCG] designated by each sub-block position (xCG,yCG). In addition, the sub-block coefficient presence/absence flag decoding unit 127 calculates a context index ctxIdx for determining context which is used for the c130 to decode a Bin of the syntax significant_coeff_group_flag [xCG][yCG]. The calculated context index ctxIdx is supplied to the context recording/updating unit 131. Here, the syntax significant_coeff_group_flag[xCG][yCG] takes 1 in a case where at least one non-zero transform coefficient is included in a sub-block designated by the sub-block position (xCG,yCG), and takes 0 in a case where no non-zero transform coefficient is included therein. A value of the decoded syntax significant_coeff_group_flag[xCG][yCG] is stored in the decoded coefficient storage unit 126.

In addition, a more specific configuration of the sub-block coefficient presence/absence flag decoding unit 127 will be described later.

[Coefficient Presence/Absence Flag Decoding Unit 124]

The coefficient presence/absence flag decoding unit 124 according to the present embodiment decodes syntax significant_coeff_flag[xC][yC] designated by each coefficient position (xC,yC). A value of the decoded syntax significant_coeff_flag[xC][yC] is stored in the decoded coefficient storage unit 126. In addition, the coefficient presence/absence flag decoding unit 124 calculates a context index ctxIdx for determining context which is for the arithmetic code decoding unit 130 to decode a Bin of the syntax significant_coeff_flag[xC][yC]. The calculated context index ctxIdx is supplied to the context recording/updating unit 131. A specific configuration of the coefficient presence/absence flag decoding unit 124 will be described later.

[Coefficient Value Decoding Unit 125]

The coefficient value decoding unit 125 analyzes each Bin supplied from the bit decoding unit 132 so as to decode the syntaxes coeff_abs_level_greater1_flag, coeff_abs_level_greater2_flag, coeff_sign_flag, and coeff_abs_level_remaining, and derives a value of a transform coefficient (more specifically, a non-zero transform coefficient) in a process target frequency component, on the basis of results of decoding the syntaxes. In addition, the context index ctxIdx used to decode the various syntaxes is supplied to the context recording/updating unit 131. The derived value of a transform coefficient is stored in the decoded coefficient storage unit 126.

[Decoded Coefficient Storage Unit 126]

The decoded coefficient storage unit 126 has a configuration for storing each value of a transform coefficient decoded by the coefficient value decoding unit 125. In addition, the decoded coefficient storage unit 126 stores each value of the syntax significant_coeff_flag decoded by the coefficient presence/absence flag decoding unit 124. Each value of the transform coefficient stored in the decoded coefficient storage unit 126 is supplied to the inverse quantization/inverse transform unit 13.

(Configuration Example of Sub-Block Coefficient Presence/Absence Flag Decoding Unit 127)

Hereinafter, with reference to FIG. 16, a specific configuration example of the sub-block coefficient presence/absence flag decoding unit 127 will be described.

FIG. 16 is a block diagram illustrating a configuration example of the sub-block coefficient presence/absence flag decoding unit 127. As illustrated in FIG. 16, the sub-block coefficient presence/absence flag decoding unit 127 includes a sub-block coefficient presence/absence flag context deriving unit 127*a*, a sub-block coefficient presence/absence flag storage unit 127*b*, and a sub-block coefficient presence/absence flag setting unit 127*c*.

Hereinafter, the sub-block coefficient presence/absence flag decoding unit 127 will be described by exemplifying a case where a sub-block position (xCG,yCG) is supplied from the coefficient decoding control unit 123 in a backward scan order. In addition, in this case, the sub-block position (xCG,yCG) is supplied in a forward scan order in a configuration of a coding apparatus side corresponding to the sub-block coefficient presence/absence flag decoding unit 127.

(Sub-Block Coefficient Presence/Absence Flag Context Deriving Unit 127*a*)

The sub-block coefficient presence/absence flag context deriving unit 127*a* included in the sub-block coefficient presence/absence flag decoding unit 127 derives a context index assigned to a sub-block which is designated by each sub-block position (xCG,yCG). The context index assigned to the sub-block is used to decode a Bin indicating the syntax significant_coeff_group_flag for the sub-block. In addition, in a case where the context index is derived, a value of the decoded sub-block coefficient presence/absence flag stored in the sub-block coefficient presence/absence flag storage unit 127*b* is referred to. The sub-block coefficient presence/absence flag context deriving unit 127*a* supplies the derived context index to the context recording/updating unit 131.

In the derivation of the context index assigned to a sub-block, a sub-block coefficient presence/absence flag of a sub-block (xCG+1,yCG) (refer to FIG. 17(*b*)) located to be adjacent to the right side of the sub-block position (xCG, yCG) and a sub-block coefficient presence/absence flag of a sub-block (xCG,yCG+1) (refer to FIG. 17(*a*)) located on the lower side of the sub-block position (xCG,yCG) are referred to.

In other words, the context index assigned to the sub-block is derived, specifically, by using the sub-block position (xCG,yCG), and values of the decoded sub-block coefficient presence/absence flags stored in the sub-block coefficient presence/absence flag storage unit 127*b*.

More specifically, the context index is set as follows by referring to a value of the decoded sub-block coefficient presence/absence flag significant_coeff_group_flag[xCG+1][yCG] which is decoded for the sub-block (xCG+1,yCG) located to be adjacent to the right side of the sub-block position (xCG,yCG) and a value of the decoded sub-block coefficient presence/absence flag siginificant_coeff_group_flag[xCG][yCG+1] which is decoded for the sub-block (xCG,yCG+1) located on the lower side of the sub-block position (xCG,yCG).

ctxIdx=ctxIdxOffset+Min((significant_coeff_group_flag[*xCG*+1][*yCG*]+significant_coeff_group_flag[*xCG*][*yCG*+1]),1)

In addition, the initial value ctxIdxOffset is determined by cIdx indicating a color space. Further, in a case where a decoded sub-block located at (xCG+1,yCG) or (xCG,yCG+1) is not present, a value of a sub-block coefficient presence/absence flag located at (xCG+1,yCG) or (xCG,yCG+1) is treated as zero.

(Sub-Block Coefficient Presence/Absence Flag Storage Unit 127*b*)

The sub-block coefficient presence/absence flag storage unit 127*b* stores each value of the syntax significant_coeff_group_flag which is decoded or is set by the sub-block coefficient presence/absence flag setting unit 127*c*. The sub-block coefficient presence/absence flag setting unit 127*c* may read the syntax significant_coeff_group_flag assigned to an adjacent sub-block from the sub-block coefficient presence/absence flag storage unit 127*b*.

(Sub-Block Coefficient Presence/Absence Flag Setting Unit 127*c*)

The sub-block coefficient presence/absence flag setting unit 127*c* decodes or sets the syntax significant_coeff_group_flag[xCG][yCG] by analyzing each Bin supplied from the bit decoding unit 132. More specifically, the sub-block coefficient presence/absence flag setting unit 127*c* decodes or sets the syntax significant_coeff_group_flag[xCG][yCG] by referring to the sub-block position (xCG, yCG) and the syntax significant_coeff_group_flag assigned to a sub-block (also referred to as an adjacent sub-block) adjacent to a sub-block designated by the sub-block position (xCG,yCG). In addition, a value of the decoded or set syntax significant_coeff_group_flag[xCG][yCG] is supplied to the coefficient presence/absence flag decoding unit 124.

As illustrated in FIG. 17(*c*), the sub-block coefficient presence/absence flag setting unit 127*c* refers to a value of the sub-block coefficient presence/absence flag significant_coeff_group_flag[xCG+1][yCG] assigned to the sub-block (xCG+1,yCG) adjacent to the sub-block position (xCG, yCG) and a value of the sub-block coefficient presence/absence flag significant_coeff_group_flag[xCG][yCG+1] assigned to the sub-block (xCG,yCG+1), so as to derive a context index used to decode the sub-block coefficient presence/absence flag significant_coeff_group_flag[xCG][yCG+1].

In addition, in a block in which the sub-block coefficient presence/absence flag is set to 0, the coefficient presence/absence flag coding unit 124 can skip decoding of the coefficient presence/absence flag significant_coeff_flag, and thus a decoding process is simplified.

With reference to FIG. 18, a specific example thereof will be described. In a case where transform coefficients are distributed as illustrated in FIG. 18(*a*), a sub-block coefficient presence/absence flag assigned to each sub-block is as illustrated in FIG. 18(*b*). In other words, among 4×4 sub-blocks, a non-zero transform coefficient is present in the sub-blocks of the first row, but a non-zero transform coefficient is not present in the sub-blocks of the second row and thereafter.

Therefore, in the example illustrated in FIG. 18(*b*), the coefficient presence/absence flag decoding unit 124 can skip decoding of the coefficient presence/absence flag significant_coeff_flag in decoding of the sub-blocks of the second row and thereafter.

<<Configuration Example of Coefficient Presence/Absence Flag Decoding Unit 124>>

Figure 1:
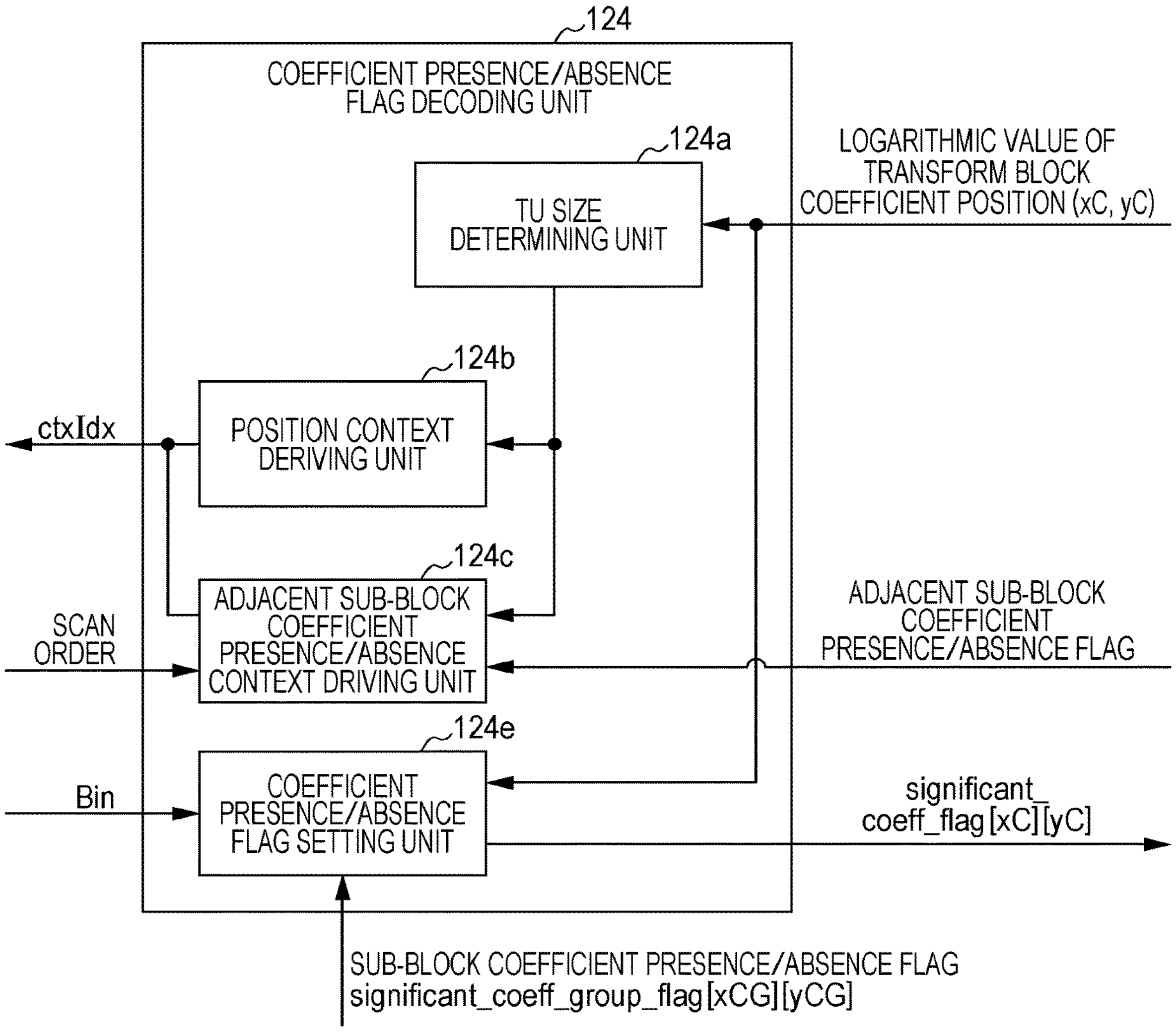
FIG. 1 is a block diagram illustrating a configuration of a coefficient presence/absence flag coding unit included in a moving image decoding apparatus according to an embodiment of the present invention.

Hereinafter, a specific configuration of the coefficient presence/absence flag decoding unit 124 will be described with reference to FIG. 1. FIG. 1 is a block diagram illustrating a configuration example of the coefficient presence/absence flag decoding unit 124. The coefficient presence/absence flag decoding unit 124 includes a TU size determining unit 124*a*, a position context deriving unit 124*b*, an adjacent sub-block coefficient presence/absence context deriving unit 124*c*, and a coefficient presence/absence flag setting unit 124*e*.

(TU Size Determining Unit 124*a*)

A position (xC,yC) of a transform coefficient which is a process target and logarithmic values (log 2TrafoWidth and log 2TrafoHeight) of a transform block are input to the TU size determining unit 124*a*. A TU size is obtained by calculating a width and a height of a frequency domain from the logarithmic value sizes by respectively using (1<<log 2TrafoWidth) and (1<<log 2TrafoHeight). In addition, the logarithmic value sizes may not be used, but a width of a height of a frequency domain may be directly input.

The TU size determining unit 124*a* selects the position context deriving unit 124*b* or the adjacent sub-block coefficient presence/absence context deriving unit 124*c* according to a target TU size. The selected context deriving unit derives a context index ctxIdx.

For example, in a case where a TU size is equal to or smaller than a predetermined size (for example, in a case of a 4×4 TU), the TU size determining unit 124*a* selects the position context deriving unit 124*b*.

Therefore, the position context deriving unit 124*b* derives a context index ctxIdx and assigns the derived context index to a decoding target frequency component.

On the other hand, in a case where a target TU size is larger than the predetermined size (for example, in a case of an 8×8 TU, a 16×16 TU, or a 32×32 TU), the TU size determining unit 124*a* selects the adjacent sub-block coefficient presence/absence context deriving unit 124*c*.

Therefore, the adjacent sub-block coefficient presence/absence context deriving unit 124*c* derives a context index ctxIdx and assigns the derived context index to a decoding target frequency component.

In addition, the TU size determining unit 124*a* is not limited to the above-described configuration, and may have a configuration of deriving a context index ctxIdx which is common to TU sizes of a 4×4 TU to a 32×32 TU. In other words, the TU size determining unit 124*a* may have a configuration of fixedly selecting either one of the position context deriving unit 124*b* and the adjacent sub-block coefficient presence/absence context deriving unit 124*c* regardless of a TU size.

(Position Context Deriving Unit 124*b*)

The position context deriving unit 124*b* derives a context index ctxIdx for a target frequency component on the basis of a position (xC,yC) of the target frequency component in a frequency domain. In addition, in a case where a context index ctxIdx which is a fixed value is derived regardless of a position of a frequency component, the position context deriving unit 124*b* may perform the derivation process.

(Adjacent Sub-Block Coefficient Presence/Absence Context Deriving Unit 124*c*)

The adjacent sub-block coefficient presence/absence context deriving unit 124*c* selects a context derivation pattern according to whether or not a non-zero transform coefficient is present in an adjacent sub-block, and derives a context index for a decoding target frequency component from coordinates of the decoding target frequency component in a sub-block according to the selected derivation pattern. Details of Examples thereof will be described later.

(Coefficient Presence/Absence Flag Setting Unit 124*e*)

The coefficient presence/absence flag setting unit 124*e* analyzes each Bin supplied from the bit decoding unit 132 so as to set the syntax significant_coeff_flag[xC][yC]. The set syntaxsignificant_coeff_flag[xC][yC] is supplied to the decoded coefficient storage unit 126.

In a case where a target frequency domain is split into sub-blocks, the coefficient presence/absence flag setting unit 124*e* refers to the syntax significant_coeff_group_flag[xCG][yCG] assigned to a target sub-block, and sets significant_coeff_flag[xC][yC] for all frequency components included in the target sub-block to 0 in a case where a value of significant_coeff_group_flag[xCG][yCG] is 0.

<<Examples: Minimization of Change in Context Index>>

Hereinafter, specific Examples of the adjacent sub-block coefficient presence/absence context deriving unit 124*c* will be described.

Specifically, the adjacent sub-block coefficient presence/absence context deriving unit 124*c* derives context index sigCtx as follows.

First, the adjacent sub-block coefficient presence/absence context deriving unit 124*c* refers to the right adjacent sub-block illustrated in FIG. 17(*b*) and the lower adjacent sub-block illustrated in FIG. 17(*a*), and obtains a pattern index idxCG which is an index for specifying a context derivation pattern, from the sub-block coefficient presence/absence flag in each of the adjacent sub-blocks, by using the following Equation (A).

$$\text{idxCG}=\text{significant\_coeff\_group\_flag}[xCG+1][yCG]+(\text{significance\_coeff\_group\_flag}[xCG][yCG+1]<<1) \quad \text{(A)}$$

in the above Equation (A), significant_coeff_group_flag is a flag indicating that at least one non-zero transform coefficient is present in a sub-block as described above. In a case where at least one non-zero transform coefficient is present in a sub-block, a value of at least one non-zero transform coefficient is present in a sub-block is "1", and in a case where no non-zero transform coefficient is present in a sub-block, a value of at least one non-zero transform coefficient is present in a sub-block is "0".

significant_coeff_group_flag[xCG+1][yCG] indicates a value of a decoded sub-block coefficient presence/absence flag which is decoded for the sub-block (xCG+1,yCG)

located to be adjacent to the right side of the sub-block position (xCG,yCG), and siginificant_coeff_group_flag[xCG][yCG+1]

indicates a value of a decoded sub-block coefficient presence/absence flag which is decoded for the sub-block (xCG,yCG+1) located on the lower side of the sub-block position (xCG,yCG).

On the basis of the above Equation (A), the pattern index idxCG takes values of 0 to 3 in the following patterns 0 to 3, respectively.

(Pattern 0)

In a case where a value of the sub-block coefficient presence/absence flag is 0 in both of the right adjacent sub-block (xCG+1,yCG) and the lower adjacent sub-block (xCG,yCG+1)

(Pattern 1)

In a case where a value of the sub-block coefficient presence/absence flag is 1 in the right adjacent sub-block (xCG+1,yCG), and a value of the sub-block coefficient presence/absence flag is 0 in the lower adjacent sub-block (xCG,yCG+1)

(Pattern 2)

In a case where a value of the sub-block coefficient presence/absence flag is 0 in the right adjacent sub-block (xCG,yCG+1), and a value of the sub-block coefficient presence/absence flag is 1 in the lower adjacent sub-block (xCG,yCG+1)

(Pattern 3)

In a case where a value of the sub-block coefficient presence/absence flag is 1 in both of the right adjacent sub-block (xCG+1,yCG) and the lower adjacent sub-block (xCG,yCG+1)

Next, the adjacent sub-block coefficient presence/absence context deriving unit 124*c* derives a context index for a decoding target frequency component from coordinates (xB, yB) of the decoding target frequency component in a sub-block according to the pattern index idxCG obtained by using the above Equation (A).

In addition, the coordinates (xB,yB) in the sub-block may be derived by using a coefficient position (xC,yC) and a sub-block position (xCG,yCG) in a TU. In other words, the coordinates (xB,yB) in the sub-block may be derived by using xB=xC−(xCG<<2) and yB=yC−(yCG<<2). Further, the coordinates (xB,yB) in the sub-block may also be derived by a logical sum of a bit unit using an operator of the coefficient position (xC,yC) in a TU and “3”. That is, the coordinates (xB,yB) may be obtained by computing xB=xC&3 and yB=yC&3.

With reference to FIGS. 19 and 20, a description will be made of a method in which the adjacent sub-block coefficient presence/absence context deriving unit 124*c* derives a context index.

FIG. 19 is a diagram illustrating an example of a pseudocode for deriving a context index from coordinates of a process target frequency component in a sub-block according to a pattern index idxCG. With reference to FIG. 19, a description will be made of a value of a context index which is derived in each case of patterns 0 to 3. In addition, the notation of a form of x?y:z indicates the following logical operation. In other words, “if x is “true” or is “not 0””, a value of y is evaluated, and otherwise, a value of z is evaluated. This is also the same for the following.

(Case of Pattern 0)

In a case of the pattern 0, the adjacent sub-block coefficient presence/absence context deriving unit 124*c* derives a context index by using sigCtx=(xB+yB<=2)?1:0.

Therefore, in a case of the pattern 0, if a sum of the coordinate xB in the horizontal direction of the coordinates (xB,yB) in the sub-block and the coordinate yB in the vertical direction is equal to or smaller than 2, a value of a context index is “1”, and, otherwise, a value of a context index is “0”.

Consequently, values of the context indexes are arranged as illustrated in FIG. 20(*a*).

In addition, in the pattern 0, a context index may be derived by using sigCtx=(xB+yB<3)?1:0.

Further, in the context index, sigCtx=0 corresponds to a case where an occurrence probability of a non-zero transform coefficient is low, and sigCtx=2 corresponds to a case where an occurrence probability of a non-zero transform coefficient is high. Furthermore, sigCtx=1 corresponds to a case where an occurrence probability of a non-zero transform coefficient is intermediate between a high case and a low case. Moreover, in the above example, description has been made that sigCtx=0 corresponds to a case where an occurrence probability of a non-zero transform coefficient is low, and sigCtx=2 corresponds to a case where an occurrence probability of a non-zero transform coefficient is high, but the present invention is not limited thereto. Alternatively, values of context indexes may be set so that sigCtx=2 corresponds to a case where an occurrence probability of a non-zero transform coefficient is low, and sigCtx=0 corresponds to a case where an occurrence probability of a non-zero transform coefficient is high, and the same applies to the following Examples. In other words, in the following Examples, for analysis, a value of “2” of a context index corresponding to each of coordinates in a sub-block in each index pattern idxCG may be replaced with “0”, and a value of “0” of a context index corresponding to each of coordinates in a sub-block in each index pattern idxCG may be replaced with “2”.

(Case of Pattern 1)

In a case of the pattern 1, the adjacent sub-block coefficient presence/absence context deriving unit 124*c* derives a context index on the basis of a table tb11 in which coordinates (xB,yB) in a sub-block is correlated with a context index.

As exemplified in FIG. 19, the table tb11 is an arrangement including sixteen elements such as {1, 1, 1, 1, 1, 1, 0, 1, 0, 0, 0, 0, 0, 0, 0, 0}.

The adjacent sub-block coefficient presence/absence context deriving unit 124*c* derives a context index by using sigCtx=tb11[xB+(yB<<2)] on the basis of the table tb11.

Therefore, values of the context indexes are arranged as illustrated in FIG. 20(*b*). In other words, the first to fourth elements of the arrangement respectively correspond to (0,0) to (3,0) of the first row in the sub-block illustrated in FIG. 20(*b*). In the following, similarly, the fifth to eighth elements, the ninth to twelfth elements, and the thirteenth to sixteenth elements of the arrangement respectively correspond to the second row, the third row, and the fourth row.

(Case of Pattern 2)

In a case of the pattern 2, the adjacent sub-block coefficient presence/absence context deriving unit 124*c* derives a context index on the basis of a table tb12 in which coordinates (xB,yB) in a sub-block is correlated with a context index.

As exemplified in FIG. 19, the table tb12 is an arrangement including sixteen elements such as {1, 1, 1, 0, 1, 1, 0, 0, 1, 1, 0, 0, 1, 0, 0, 0}.

The adjacent sub-block coefficient presence/absence context deriving unit 124*c* derives a context index by using sigCtx=tb12[xB+(yB<<2)] on the basis of the table tb12.

Therefore, values of the context indexes are arranged as illustrated in FIG. 20(*c*). In other words, a correspondence between the elements of the arrangement and the coordinates in the sub-block illustrated in FIG. 20(*c*) is the same as in a case of the pattern 1. For example, the first to fourth elements of the arrangement respectively correspond to (0,0) to (3,0) of the first row in the sub-block illustrated in FIG. 20(*b*).

(Case of Pattern 3)

In a case of the pattern 3, the adjacent sub-block coefficient presence/absence context deriving unit 124*c* derives a context index by using sigCtx=(xB+yB<=4)?2:1.

Therefore, in a case of the pattern 3, if a sum of the coordinate xB in the horizontal direction of the coordinates (xB,yB) in the sub-block and the coordinate yB in the vertical direction is 4 or less, a value of a context index is "2", and, otherwise, a value of a context index is "1".

Consequently, values of the context indexes are arranged as illustrated in FIG. 20(*d*).

In addition, in the pattern 3, a context index may be derived by using sigCtx=(xB+yB<5)?2:1. Hereinafter, whether the determination is performed in "x or less" or "x+1 below" may be changed as appropriate.

Here, advantages of the configuration will be described through comparison with a comparative example according to the related art.

First, a scan order in a sub-block is assumed to be the up-right diagonal scan as illustrated in FIG. 21. In addition, the scan order illustrated in FIG. 21 is a forward direction.

Decoding of transform coefficients is performed in a backward scan order from "15" to "0" illustrated in FIG. 21.

(Configuration Related to Comparative Example)

Hereinafter, a configuration illustrated in FIGS. 51 and 52 is used as a comparative example. In the configuration related to the comparative example, if context indexes are arranged in a backward scan order in each of the patterns 0 to 3, this leads to the following sequences.

Pattern 0: 0000000000111111
Pattern 1: 0001001100110111
Pattern 2: 0000010011011111
Pattern 3: 1112222222222222

Here, the pattern 1 and the pattern 2 have a large number of changes from "0" to "1" or from "1" to "0".

Specifically, in the pattern 1, the number of changes from "0" to "1" is four, the number of changes from "1" to "0" is three, and thus a total of seven changes occur.

In addition, in the pattern 2, the number of changes from "0" to "1" is three, the number of changes from "1" to "0" is two, and thus a total of five changes occur.

Among items of hardware, there is hardware which defines the number of repeated 0s and the number of repeated 1s, and derives a context index corresponding to a position in a sub-block according to the definition. In such hardware, if the number of changes in 0s and 1s increases, complexity of a configuration required to realize the hardware also increases.

(Configuration Related to Example)

As mentioned above, the moving image decoding apparatus 1 related to the present example includes an arithmetic decoding device which decodes coded data which is obtained by arithmetically coding various syntaxes indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a 4×4 size according to a predetermined definition; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; directivity determining means for determining a directivity of a distribution of transform coefficients on the basis of a sub-block coefficient presence/absence flag in a sub-block adjacent to a process target sub-block; and context index deriving means for deriving a context index assigned to a transform coefficient presence/absence flag which is syntax indicating whether or not the process target transform coefficient is 0, in which, in a case where a scan order applied to the sub-block is the up-right diagonal scan, a determined directivity is a vertical direction, and coordinates of the sub-block having the 4×4 size are set to (xB,yB) (where xB is a coordinate in a horizontal direction, yB is a coordinate in a vertical direction, and the upper left side of the sub-block is set to an origin (0,0)), the context index deriving means derives the context index corresponding to a case where an occurrence probability of a transform coefficient is higher than in domains other than a domain formed by (0,0) to (0,3), (1,0) to (1,2), and (2,0).

In addition, as mentioned above, the moving image decoding apparatus 1 related to the present example includes an arithmetic decoding device which decodes coded data which is obtained by arithmetically coding various syntaxes indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a 4×4 size according to a predetermined definition; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; directivity determining means for determining a directivity of a distribution of transform coefficients on the basis of a sub-block coefficient presence/absence flag in a sub-block adjacent to a process target sub-block; and context index deriving means for deriving a context index assigned to a transform coefficient presence/absence flag which is syntax indicating whether or not the process target transform coefficient is 0, in which, in a case where a scan order applied to the sub-block is the up-right diagonal scan, a determined directivity is a horizontal direction, and coordinates of the sub-block having the 4×4 size are set to (xB,yB) (where xB is a coordinate in a horizontal direction, yB is a coordinate in a vertical direction, and the upper left side of the sub-block is set to an origin (0,0)), the context index deriving means derives the context index corresponding to a case where an occurrence probability of a transform coefficient is higher than in domains other than a domain formed by (0,0) to (3,0), (0,1) to (2,1), and (0,2).

According to the adjacent sub-block coefficient presence/absence context deriving unit 124*c* related to the present example, sequences of context indexes in a backward scan order in patterns 1 and 2 is as follows.

Pattern 1: 0000001100111111
Pattern 2: 0000000011111111

In the pattern 1, the number of changes from "0" to "1" is two, the number of changes from "1" to "0" is one, and thus the number of changes is a total of three.

In the pattern 2, the number of changes is only one from "0" to "1".

According to the configuration, it is possible to considerably reduce the number of changes when compared with the configuration related to the comparative example. The number of changes is at most three in the pattern 1, and is one corresponding to the minimum value in the pattern 2.

As mentioned above, according to the configuration, it is possible to minimize variations (changes) in context indexes in a sub-block. Accordingly, as described above, in hardware which defines the number of repeated 0s and 1s, mounting of the hardware is simplified.

In addition, in a case where a process is performed in a forward scan direction, sequences which are opposite to the sequences of the pattern 1 and the pattern 2 are obtained. Therefore, also in a case where a process is performed in the forward scan direction, the same effect can be achieved.

MODIFICATION EXAMPLES

Modification examples of the present invention will be described below.

Modification Example 1: Minimization of Changes in Context Indexes 2

Hereinafter, a description will be made of a modification example of changing a scan order in a target sub-block in accordance with whether or not a non-zero transform coefficient is present in an adjacent sub-block with reference to FIG. 22.

In the present modification example, the coefficient decoding control unit 123 performs the supply of a position of each frequency component according to a scan order in a sub-block on the basis of scan orders as illustrated in FIGS. 22(*a*) to 22(*d*).

In addition, in FIGS. 22(*a*) to 22(*e*), all arrows indicating the scan orders are illustrated in a forward direction, but a decoding process of transform coefficients is performed in a backward scan direction which is opposite to the directions of the arrows.

In addition, in the following, as an example, the arrangement of the context indexes illustrated in FIGS. 51 and 52 is used.

Hereinafter, patterns 0 to 3 will be sequentially described.

In a case of the pattern 0, as illustrated in FIG. 22 (*a*), the coefficient decoding control unit 123 applies the up-right diagonal scan thereto.

In a case of the pattern 1, as illustrated in FIG. 22(*b*), the coefficient decoding control unit 123 applies the horizontal fast scan thereto. That is, in a case of (significant_coeff_group_flag[xCG+1][yCG], significant_coeff_group_flag[xCG][yCG+1])=(1,0), the coefficient decoding control unit 123 applies the horizontal fast scan thereto.

In a case of the pattern 2, as illustrated in FIG. 22 (*c*), the coefficient decoding control unit 123 applies the vertical fast scan thereto. That is, in a case of (significant_coeff_group_flag[xCG+1][yCG], significant_coeff_group_flag[xCG][yCG+1])=(0,1), the coefficient decoding control unit 123 applies the vertical fast scan thereto.

In a case of the pattern 3, as illustrated in FIG. 22 (*d*), the coefficient decoding control unit 123 applies the up-right diagonal scan thereto.

[Operations and Effects]

As described above, the moving image decoding apparatus 1 related to Modification Example 1 includes an arithmetic decoding device which decodes coded data which is obtained by arithmetically coding various syntaxes indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; directivity determining means for determining a directivity of a distribution of transform coefficients on the basis of a sub-block coefficient presence/absence flag in a sub-block adjacent to a process target sub-block; and transform coefficient decoding means for decoding the transform coefficients by using a scan order according to a directivity determined by the directivity determining means.

According to the configuration, in a case (FIG. 22(*b*)) where there is a high probability that non-zero transform coefficients concentrates in the horizontal direction, the horizontal fast scan is applied thereto, and, in a case (FIG. 22(*c*)) where there is a high probability that non-zero transform coefficients concentrates in the vertical direction, the vertical fast scan is applied thereto.

Accordingly, a scan can be performed in an order of a higher appearing probability of non-zero transform coefficients, and thus it is possible to improve coding efficiency.

In addition, sequences of context indexes in a backward scan order are as follows.

Pattern 0:0000000000111111

Pattern 1:0000000011111111

Pattern 2:0000000011111111

Pattern 3:1112222222222222

Accordingly, the number of changes in 0s and 1s of the context indexes is at most one in the backward scan order in a sub-block.

In addition, in the above description, the up-right diagonal scan is used in the patterns 0 and 3, but, alternatively, a zigzag scan as illustrated in FIG. 22(*e*) may be used. Further, the above-described scan order may be stored in the scan order table storage unit 122.

Modification Example 2: Reduction in Derivation Pattern

Hereinafter, with reference to FIGS. 23 and 24, a description will be made of a modification example in which context derivation patterns are changed in accordance with the number of non-zero transform coefficients which are present in an adjacent sub-block.

In the present modification example, the adjacent sub-block coefficient presence/absence context deriving unit 124*c* obtains a pattern index idxCG which is an index for specifying a context derivation pattern from sub-block coefficient presence/absence flags in adjacent sub-blocks (right adjacent and lower adjacent sub-blocks), by using the following Equation (B).

$$idxCG=\text{significant\_coeff\_group\_flag}[xCG+1][yCG]+\text{significant\_coeff\_group\_flag}[xCG][yCG+1] \quad (B)$$

On the basis of the above Equation (B), the pattern index idxCG takes values of 0 to 2 in the following patterns 0 to 2, respectively.

(Pattern 0) In a case where a value of the sub-block coefficient presence/absence flag is 0 in both of the right adjacent sub-block (xCG+1,yCG) and the lower adjacent sub-block (xCG,yCG+1)

(Pattern 1) In a case where a value of the sub-block coefficient presence/absence flag is 1 in one of the right adjacent sub-block (xCG+1,yCG) and the lower adjacent sub-block (xCG,yCG+1), and a value of the sub-block coefficient presence/absence flag is 0 in the other thereof (Pattern 2) In a case where a value of the sub-block coefficient presence/absence flag is 1 in both of the right adjacent sub-block (xCG+1,yCG) and the lower adjacent sub-block (xCG,yCG+1)

In addition, in the present modification example, the adjacent sub-block coefficient presence/absence context deriving unit 124*c* derives a context index in a method illustrated in FIG. 23.

FIG. 23 is a diagram illustrating another example of a pseudo-code for deriving a context index from coordinates of a process target frequency component in a sub-block according to a pattern index idxCG obtained from Equation (B).

With reference to FIG. 23, a description will be made of a value of a context index which is derived in each case of a patterns 0 to 3.

(Case of Pattern 0)

In a case of the pattern 0, the adjacent sub-block coefficient presence/absence context deriving unit 124*c* derives a context index by using sigCtx=(xB+yB<=2)?1:0.

In other words, a case of the pattern 0 is the same as a case of the pattern 0 of the above-described example. Therefore, values of the context indexes are arranged as illustrated in FIG. 24(*a*).

(Case of Pattern 1)

In a case of the pattern 1, the adjacent sub-block coefficient presence/absence context deriving unit 124*c* derives a context index by using sigCtx=(xB+yB<3)?1:0.

Therefore, in a case of the pattern 1, if a sum of the coordinate xB in the horizontal direction of the coordinates (xB,yB) in the sub-block and the coordinate yB in the vertical direction is 3 or less, a value of a context index is “1”, and, otherwise, a value of a context index is “0”.

Consequently, values of the context indexes are arranged as illustrated in FIG. 24(*b*).

(Case of Pattern 2)

In a case of the pattern 2, the adjacent sub-block coefficient presence/absence context deriving unit 124*c* derives a context index by using sigCtx=(xB+yB<4)?2:1.

In other words, a case of the pattern 2 is the same as a case of the pattern 3 of the above-described example. Therefore, values of the context indexes are arranged as illustrated in FIG. 24(*c*).

Modification Example 2-1

Hereinafter, with reference to FIGS. 54 and 55, a description will be made of a modification example of using a context index derivation method having three stages in relation to the pattern 0 and the pattern 1 of Modification Example 2. In the arrangement of values of the context indexes related to Modification Example 2, values of two stages are taken in each pattern so that sigCtx=0 or 1 in the patterns 0 and 1 (FIGS. 24(*a*) and 24(*b*)), and sigCtx=1 or 2 in the pattern 2 (FIG. 24(*c*)). By increasing these stages, it is possible to realize an arrangement of values of context indexes which are more suitable for actual occurrence circumstances of a transform coefficient. FIG. 54 illustrates a pseudo-code for deriving a context index from coordinates of a process target frequency component in a sub-block according to a pattern index idxCG obtained from the above Equation (B), related to Modification Example 2-1. FIG. 55 illustrates arrangements of values of the context indexes in the context index derivation method using the pseudo-code illustrated in FIG. 54.

In addition, Modification Example 2-1 may be said to be a combination of Modification Example 2 related to reduction in a derivation pattern with Modification Example 5 described later.

(Case of Pattern 0)

In a case of the pattern 0, the adjacent sub-block coefficient presence/absence context deriving unit 124*c* derives a context index as follows according to a value of xB+yB.

In a case where xB+yB is equal to or smaller than TH1, the adjacent sub-block coefficient presence/absence context deriving unit 124*c* derives sigCtx=2. In addition, in a case where xB+yB is greater than TH1 and is equal to or smaller than TH2, the adjacent sub-block coefficient presence/absence context deriving unit 124*c* derives sigCtx=1. In other cases, the adjacent sub-block coefficient presence/absence context deriving unit 124*c* derives sigCtx=0. Here, if the threshold value TH1=0, and the threshold value TH2=2, values of context indexes are arranged as illustrated in FIG. 55(*a*).

(Case of Pattern 1)

In a case of the pattern 1, the adjacent sub-block coefficient presence/absence context deriving unit 124*c* derives a context index as follows according to a value of xB+yB.

In a case where xB+yB is equal to or smaller than TH3, the adjacent sub-block coefficient presence/absence context deriving unit 124*c* derives sigCtx=2. In addition, in a case where xB+yB is greater than TH3 and is equal to or smaller than TH4, the adjacent sub-block coefficient presence/absence context deriving unit 124*c* derives sigCtx=1. In other cases, the adjacent sub-block coefficient presence/absence context deriving unit 124*c* derives sigCtx=0. Here, if the threshold value TH3=1 and the threshold value TH4=3, values of context indexes are arranged as illustrated in FIG. 55(*b*).

(Case of Pattern 2)

As an example, a threshold value TH5 is set to 4. If the threshold value TH5=4, this leads to the same result as in the pattern 2 (FIG. 24(*c*)) of Modification Example 2, and thus description thereof will be omitted.

In addition, the threshold values TH1, TH2, TH3, and TH4 are preferably set to satisfy TH1<TH3, and TH2<TH4, in consideration of biases of occurrence probabilities of a non-zero transform coefficient in the respective patterns.

From the test performed by the present inventor, it has been confirmed that Modification Example 2-1 can further improve coding efficiency than Modification Example 2, especially, in an intra-prediction block. In relation to the elements of Modification Example 2-1, in the pattern 0 and the pattern 1, a value of a context index located at a first distance (the pattern 0: xB+yB<=TH1, and the pattern 1: xB+yB<=TH3) from the upper rightmost part is set to 2 which indicates an occurrence probability is high, a value of a context index located at a second distance (the pattern 0: TH1<xB+yB<=TH2, and the pattern 1: TH3<xB+yB<=TH4) from the first distance is set to 1 which indicates an occurrence probability is intermediate, and a value of a context index located at other positions is set to 0 which indicates an occurrence probability is low.

In addition, in relation of the threshold value TH5, the threshold value TH5 may be set to satisfy TH4<TH5 as described above.

[Operations and Effects]

As described above, the moving image decoding apparatus 1 related to Modification Example 2 includes an arithmetic decoding device which decodes coded data which is obtained by arithmetically coding various syntaxes indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; coefficient-present-sub-block number counting means for counting the number of sub-blocks including at least one non-zero transform coefficient for each sub-block adjacent to a process target sub-block on the basis of the sub-block coefficient presence/absence flag; and context index deriving means for deriving a context index assigned to a transform coefficient presence/absence flag which is syntax indicating whether or not the transform coefficient is 0, in which the context index deriving means derives the context index by using a sum of a coordinate in a horizontal direction and a coordinate in a vertical direction of a process target transform coefficient in the process target sub-block according to the number counted by the coefficient-present-sub-block number counting means.

In the configuration, the sub-block coefficient presence/absence flag is not differentiated between a right adjacent sub-block and a lower adjacent sub-block.

Accordingly, when compared with the above-described Example, it is possible to reduce the number of context derivation patterns. In addition, the comparisons in the respective patterns are all performed through a comparison between "xB+yB" and a predetermined threshold value. Further, the arrangements illustrated in FIGS. 24(*a*) to 24(*c*) are related to the up-right diagonal scan, the number of changes in context indexes in a scan order in a sub-block is only one, and thus mounting thereof in hardware is simplified.

The moving image decoding apparatus related to Modification Example 2-1 described above includes an arithmetic decoding device which decodes coded data which is obtained by arithmetically coding various syntaxes indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; coefficient-present-sub-block number counting means for counting the number of sub-blocks including at least one non-zero transform coefficient for each sub-block adjacent to a process target sub-block on the basis of the sub-block coefficient presence/absence flag; and context index deriving means for deriving a context index assigned to a transform coefficient presence/absence flag which is syntax indicating whether or not the transform coefficient is 0, in which the context index deriving means derives the context indexes respectively corresponding to a case where an occurrence probability of a non-zero transform coefficient is low, a case where an occurrence probability of a non-zero transform coefficient is high, and a case where an occurrence probability of a non-zero transform coefficient is intermediate between the high case and the low case, on the basis of a position of a process target transform coefficient in the process target sub-block, by using a sum of a coordinate in a horizontal direction and a coordinate in a vertical direction of a process target transform coefficient in the process target sub-block according to the number counted by the coefficient-present-sub-block number counting means.

In the configuration, the sub-block coefficient presence/absence flag is not differentiated between a right adjacent sub-block and a lower adjacent sub-block.

Accordingly, when compared with the above-described Example, it is possible to reduce the number of context derivation patterns. In addition, the comparisons in the respective patterns are all performed through a comparison between "xB+yB" and a predetermined threshold value. Further, the arrangements illustrated in FIGS. 55(*a*) and 55(*b*) are related to the up-right diagonal scan, the number of changes in context indexes in a scan order in a sub-block is only two, and thus mounting thereof in hardware is simplified.

In addition, in a case where it is determined that no non-zero transform coefficient is present in two or more sub-blocks adjacent to the process target sub-block, the context index deriving means derives the context indexes respectively corresponding to a case where an occurrence probability of a non-zero transform coefficient is low, a case where an occurrence probability of a non-zero transform coefficient is high, and a case where an occurrence probability of a non-zero transform coefficient is intermediate between the high case and the low case, on the basis of a position of a process target transform coefficient in the process target sub-block, according to the determination result, and can improve coding efficiency. Particularly, a case where an occurrence probability of a non-zero transform coefficient is high is preferably assigned to an upper left position in the process target sub-block.

Further, in a case where it is determined that one or more non-zero transform coefficients are present in one or more sub-blocks adjacent to the process target sub-block, and no non-zero transform coefficient is present in one or more sub-blocks, the context index deriving means derives the context indexes respectively corresponding to a case where an occurrence probability of a non-zero transform coefficient is low, a case where an occurrence probability of a non-zero transform coefficient is high, and a case where an occurrence probability of a non-zero transform coefficient is intermediate between the high case and the low case, on the basis of a position of a process target transform coefficient in the process target sub-block, according to the determination result, and can improve coding efficiency. Particularly, it is determined that a non-zero transform coefficient is present in a right or low adjacent sub-block, and a case where an occurrence probability of a non-zero transform coefficient is high is preferably assigned to the first column and the second column in a diagonal direction from the upper left part in the process target sub-block. In addition, a case where an occurrence probability of a non-zero transform coefficient is intermediate is preferably assigned to the third column and the fourth column in a diagonal direction from the upper left part in the process target sub-block.

As mentioned above, according to Modification Example 2-1, it is possible to realize a context derivation pattern which is more suitable for an actual occurrence probability of a transform coefficient than in Modification Example 2, and thus it is possible to improve coding efficiency.

Modification Example 3: 2×2 Pattern

Coordinates of a sub-block having a 4×4 size takes value of 0 to 3 (2 bits) in each of an X coordinate and a Y coordinate. Hereinafter, with reference to FIGS. 25 and 26, a description will be made of a modification example in which a context index is derived without using lower bits of sub-block coordinates. In other words, in the following modification example, a context index is derived in the unit of a 2×2 size.

In the present modification example, the adjacent sub-block coefficient presence/absence context deriving unit 124*c* obtains a pattern index idxCG by using the above Equation (A), and also derives a context index in a method illustrated in FIG. 25 according to patterns 0 to 3 obtained therefrom.

FIG. 25 is a diagram illustrating still another example of a pseudo-code for deriving a context index from coordinates of a process target frequency component in a sub-block according to a pattern index idxCG obtained from Equation (A). FIG. 26 illustrates arrangements of values of context indexes in the context index derivation method using the pseudo-code illustrated in FIG. 25.

With reference to FIGS. 25 and 26, a description will be made of a value of a context index which is derived in each case of patterns 0 to 3.

(Case of Pattern 0)

In a case of the pattern 0, the adjacent sub-block coefficient presence/absence context deriving unit 124*c* derives a context index by using sigCtx=((xB>>1)+(yB>>1)<=0)?1:0.

Consequently, values of the context indexes are arranged as illustrated in FIG. 26(*a*). In other words, as illustrated in FIG. 26(*a*), in a case where the sub-block is split into four partial domains including an upper left domain, an upper right domain, a lower left domain, and a lower right domain, each having a 2×2 size, values of the context indexes are 1 in the upper left partial domain, and values of the context indexes are 0 in the other partial domains.

(Case of Pattern 1)

In a case of the pattern 1, the adjacent sub-block coefficient presence/absence context deriving unit 124*c* derives a context index by using sigCtx=((yB>>1)<=0)?1:0.

Consequently, values of the context indexes are arranged as illustrated in FIG. 26(*a*). In other words, as illustrated in FIG. 26(*b*), values of the context indexes are 1 in upper left and upper right partial domains in the sub-block, and values of the context indexes are 0 in lower left and lower right partial domains.

(Case of Pattern 2)

In a case of the pattern 2, the adjacent sub-block coefficient presence/absence context deriving unit 124*c* derives a context index by using sigCtx=((xB>>1)<=0)?1:0.

Consequently, values of the context indexes are arranged as illustrated in FIG. 26(*c*). In other words, as illustrated in FIG. 26(*c*), values of the context indexes are 1 in upper left and lower left partial domains in the sub-block, and values of the context indexes are 0 in upper right and lower right partial domains.

(Case of Pattern 3)

In a case of the pattern 3, the adjacent sub-block coefficient presence/absence context deriving unit 124*c* derives a context index by using sigCtx=((xB>>1)+(yB>>1)<=1)?2:1.

Consequently, values of the context indexes are arranged as illustrated in FIG. 26(*d*). In other words, as illustrated in FIG. 26(*d*), values of the context indexes are 2 in upper left, upper right and lower left partial domains in the sub-block, and values of the context indexes are 0 in a lower right partial domain.

The context index derivation method for the moving image decoding apparatus 1 related to Modification Example 3 is a method in which a lower 1 bit of coordinates (xB,yB) in a sub-block is not referred to as illustrated in FIG. 25. In addition, in an arrangement of values of the context indexes related to Modification Example 3, values of the context indexes in a smaller block (here, a 2×2 block) forming a sub-block are equally obtained as illustrated in FIG. 26.

[Operations and Effects]

As mentioned above, the moving image decoding apparatus 1 related to the Modification Example 3 includes an arithmetic decoding device which decodes coded data which is obtained by arithmetically coding various syntaxes indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target into sub-blocks each having a 4×4 size according to a predetermined definition; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; pattern determining means for determining a pattern of a value of a sub-block coefficient presence/absence flag which is decoded for each sub-block adjacent to a process target sub-block; and context index deriving means for deriving a context index assigned to a transform coefficient presence/absence flag which is syntax indicating whether or not the process target transform coefficient is 0, in which the context index deriving means derives the context index by using higher-order bits (in 2-bit expression) of each of coordinates in a horizontal direction and a vertical direction of a process target transform coefficient in the process target sub-block according to a determination result from the pattern determining means.

According to the configuration, it is possible to perform a context index deriving process from input information of higher bits (4 bits). Specifically, the 4 bits are a total of 4 bits including a higher bit (1 bit) of a X coordinate in a sub-block, a higher bit (1 bit) of a Y coordinate in the sub-block, a sub-block coefficient presence/absence flag (1 bit) in an adjacent sub-block in the X direction, and a sub-block coefficient presence/absence flag (1 bit) in an adjacent sub-block in the Y direction.

In addition, since derivation of output of 0 to 2 (2 bits) from input of 4 bits is preferable, a context index deriving process can be performed through a simple bit calculation. Detailed description thereof will be made as follows.

First, x1, y1, x2, and y2 (each of which is 1 bit) are defined as follows.

$$x1=xB=(xC-(xCG<<2))>>1$$

$$y1=yB=(yC-(yCG<<2))>>1$$

$$x2=\text{significant\_coeff\_group\_flag}[xCG+1][yCG]$$

$$y2=\text{significant\_coeff\_group\_flag}[xCG][yCG+1]$$

In this case, a context index deriving process can be performed through the following logical calculation.

$$\text{sigCtx}=((x2\&y2)\&((y2\&!y1)|(x2\&!x1))<<1)|((x2\&y2)\&(x1\&y1))|(!x2\&!y2)\&(!x1\&!y1)|(!x2\&y2\&!x1)|(y2\&!x2\&!y1)$$

Consequently, it is possible to exclude conditional branch from the context index deriving process.

Modification Example 4: 2×2 Pattern 2

Hereinafter, with reference to FIG. 27, a description will be made of a modification example of using a scan order in the 2×2 unit as a scan order in a target sub-block.

In the present modification example, the coefficient decoding control unit 123 performs the supply of a position of each frequency component according to a scan order in a sub-block on the basis of scan orders as illustrated in FIGS. 27(*a*) and 27(*b*).

In addition, in FIGS. 22(*a*) to 22(*e*), all arrows indicating the scan orders are illustrated in a forward direction, but a decoding process of transform coefficients is performed in a backward scan direction which is opposite to the directions of the arrows. Further, an arrangement of context indexes is not limited to ones illustrated in FIGS. 51 and 52, and may be arbitrarily set.

As illustrated in FIG. 27(*a*), the coefficient decoding control unit 123 may set a scan order in the partial domain units in a sub-block to a scan order of upper left, lower left, upper right and lower right partial domains. In addition, the coefficient decoding control unit 123 may set a scan order of frequency components in the partial domain having a 2×2 size to a scan order of upper left, lower left, upper right and lower right frequency components.

In addition, the coefficient decoding control unit 123 may employ the scan order illustrated in FIG. 27 (*a*) in a case where a probability that non-zero transform coefficients concentrate in the vertical direction is high.

In addition, as illustrated in FIG. 27(*b*), the coefficient decoding control unit 123 may set a scan order in the partial domain units in a sub-block to a scan order of upper left, upper right, lower left and lower right partial domains. Further, the coefficient decoding control unit 123 may set a scan order of frequency components in the partial domain having a 2×2 size to a scan order of upper left, upper right, lower left and lower right frequency components.

Furthermore, the coefficient decoding control unit 123 may employ the scan order illustrated in FIG. 27(*b*) in a case where a probability that non-zero transform coefficients concentrate in the horizontal direction is high.

In addition, the above-described scan orders may be stored in the scan order table storage unit 122.

[Operations and Effects]

As mentioned above, the moving image decoding apparatus 1 related to the Modification Example 4 includes an arithmetic decoding device which decodes coded data which is obtained by arithmetically coding various syntaxes indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a 4×4 size according to a predetermined definition; and transform coefficient decoding means for decoding a transform coefficient by using a scan order in a partial domain with respect to respective partial domains each having a 2×2 size, obtained by splitting the sub-block having the 4×4 size into four domains.

According to the configuration, since coordinates in a scan order (for example, coordinates of frequency components adjacent to each other in the scan order) can be prevented from being considerably changed, transform coefficients which have spatially the same kinds of characteristics as each other can be sequentially decoded. As a result, coding efficiency is improved.

In addition, a change of the context indexes in a scan order in a sub-block is minimized.

For example, in a case where the arrangements of values of the context indexes illustrated in FIGS. 26(*a*) to 26(*d*), the number of changes in 0s and 1s of the context indexes in a backward scan order is at most one.

In addition, the present invention is not limited thereto, and is applicable to arrangements other than the arrangements of values of the context indexes illustrated in FIGS. 26(*a*) to 26(*d*). For example, in a case where the scan order illustrated in FIG. 27(*a*) is employed in the arrangement of values of the context indexes of FIG. 52(*c*), and the scan order illustrated in FIG. 27(*b*) is employed in the arrangement of values of the context indexes of FIG. 52(*b*), the number of changes can be restricted to one.

Modification Example 5: Other Patterns

Hereinafter, with reference to FIGS. 28 to 32, a description will be made of using a context index derivation method having three stages in a predetermined context derivation pattern.

The arrangement of values of context indexes described hitherto is an arrangement using values of two stages. For example, in the arrangement of values of context indexes according to the related art, described with reference to FIGS. 51 and 52, values of two stages are taken in each pattern so that sigCtx=0 or 1 in the patterns 0 to 2, and sigCtx=1 or 2 in the pattern 3. By increasing these stages, it is possible to realize an arrangement of values of context indexes which are more suitable for actual occurrence circumstances of a transform coefficient.

In the present modification example, the adjacent sub-block coefficient presence/absence context deriving unit 124*c* obtains a pattern index idxCG (patterns 0 to 3) by using the above Equation (A). In addition, the adjacent sub-block coefficient presence/absence context deriving unit 124*c* uses a context index derivation method having three stages in the patterns 0 to 2. Further, context indicating that coding efficiency is highest at positions of a Y coordinate yB=0 of a sub-block and an X coordinate xB=0 of the sub-block is used in the patterns 1 and 2. Hereinafter, specific modification examples will be described.

Modification Example 5-1

With reference to FIGS. 28 and 29, Modification Example 5-1 will be described. FIG. 28 is a diagram illustrating still another example of a pseudo-code for deriving a context index from coordinates of a process target frequency component in a sub-block according to a pattern index idxCG obtained from Equation (A). FIG. 29 illustrates arrangements of values of context indexes in the context index derivation method using the pseudo-code illustrated in FIG. 28.

With reference to FIGS. 28 and 29, a description will be made of a value of a context index which is derived in each case of patterns 0 to 3. In addition, hatched parts illustrated in FIG. 29 are parts which are changed from the arrangements of values of context indexes illustrated in FIG. 52.

(Case of Pattern 0)

In a case of the pattern 0, the adjacent sub-block coefficient presence/absence context deriving unit 124*c* derives a context index as follows according to a value of xB+yB.

In a case where xB+yB is equal to or smaller than 0, the adjacent sub-block coefficient presence/absence context deriving unit 124*c* derives sigCtx=2. In addition, in a case where xB+yB is greater than 0 and is equal to or smaller than 2, the adjacent sub-block coefficient presence/absence context deriving unit 124*c* derives sigCtx=1. In other cases, the adjacent sub-block coefficient presence/absence context deriving unit 124*c* derives sigCtx=0. Consequently, values of context indexes are arranged as illustrated in FIG. 29 (*a*).

(Case of Pattern 1)

In a case of the pattern 1, the adjacent sub-block coefficient presence/absence context deriving unit 124*c* derives a context index as follows according to a value of yB.

In a case where yB is equal to or smaller than 0, the adjacent sub-block coefficient presence/absence context deriving unit 124*c* derives sigCtx=2. In addition, in a case where yB is greater than 0 and is equal to or smaller than 1, the adjacent sub-block coefficient presence/absence context deriving unit 124*c* derives sigCtx=1. In other cases, the adjacent sub-block coefficient presence/absence context deriving unit 124*c* derives sigCtx=0. Consequently, values of context indexes are arranged as illustrated in FIG. 29 (*b*).

In other words, as illustrated in FIG. 29(*b*), values of the context indexes are 2 in the first row of the sub-block, and values of the context indexes are 1 in the second row of the sub-block. In addition, values of the context indexes are 0 in the third row and the fourth row of the sub-block.

(Case of Pattern 2)

In a case of the pattern 2, the adjacent sub-block coefficient presence/absence context deriving unit 124*c* derives a context index as follows according to a value of xB.

In a case where xB is equal to or smaller than 0, the adjacent sub-block coefficient presence/absence context deriving unit 124*c* derives sigCtx=2. In addition, in a case where xB is greater than 0 and is equal to or smaller than 1, the adjacent sub-block coefficient presence/absence context deriving unit 124*c* derives sigCtx=1. In other cases, the adjacent sub-block coefficient presence/absence context deriving unit 124*c* derives sigCtx=0. Consequently, values of context indexes are arranged as illustrated in FIG. 29 (*c*).

In other words, as illustrated in FIG. 29(*c*), values of the context indexes are 2 in the first column of the sub-block, and values of the context indexes are 1 in the second column of the sub-block. In addition, values of the context indexes are 0 in the third column and the fourth column of the sub-block.

(Case of Pattern 3)

In a case of the pattern 3, as illustrated in FIG. 29(*d*), the adjacent sub-block coefficient presence/absence context deriving unit 124*c* equally derives sigCtx=2 in the sub-block regardless of values of xB and yB.

In addition, the arrangements of context indexes related to a case of Modification Example 5-1 may be realized by using a pseudo-code illustrated in FIG. 56. FIG. 56 is an example of another pseudo-code for realizing the arrangements of the values of the context indexes illustrated in FIG. 29. More specifically, the pseudo-code illustrated in FIG. 56 is one in which a boundary value for magnitude relation determination is changed, or the magnitude relation determination is changed to equal value determination, in the pseudo-code illustrated in FIG. 29. According to the pseudo-code illustrated in FIG. 56, it is possible to realize the arrangements of values of the context indexes illustrated in FIG. 29 in the same manner as the pseudo-code illustrated in FIG. 29.

General Configuration of Modification Example 5

With reference to FIG. 30, a description will be made of a general configuration of a pseudo-code for deriving a context index of Modification Example 5. In the general configuration, a context index is derived by using predetermined threshold values TH1, TH2, TH3, TH4, and TH5.

(Case of Pattern 0)

In a case of the pattern 0, the adjacent sub-block coefficient presence/absence context deriving unit 124*c* derives a context index as follows according to a value of xB+yB.

In a case where xB+yB is equal to or smaller than TH1, the adjacent sub-block coefficient presence/absence context deriving unit 124*c* derives sigCtx=2. In addition, in a case where xB+yB is greater than TH1 and is equal to or smaller than TH2, the adjacent sub-block coefficient presence/absence context deriving unit 124*c* derives sigCtx=1. In other cases, the adjacent sub-block coefficient presence/absence context deriving unit 124*c* derives sigCtx=0.

(Case of Pattern 1)

In a case of the pattern 1, the adjacent sub-block coefficient presence/absence context deriving unit 124*c* derives a context index as follows according to a value of yB.

In a case where yB is equal to or smaller than TH3, the adjacent sub-block coefficient presence/absence context deriving unit 124*c* derives sigCtx=2. In addition, in a case where yB is greater than TH3 and is equal to or smaller than TH4, the adjacent sub-block coefficient presence/absence context deriving unit 124*c* derives sigCtx=1. In other cases, the adjacent sub-block coefficient presence/absence context deriving unit 124*c* derives sigCtx=0. Consequently, values of context indexes are arranged as illustrated in FIG. 31(*b*).

In other words, values of the context indexes are 2 in the (TH3-1)-th and subsequent rows of the sub-block, and values of the context indexes are 1 from the TH3-th row to the (TH4-1)-th row. In addition, values of the context indexes are 0 in the TH4-th row of the sub-block.

(Case of Pattern 2)

In a case of the pattern 2, the adjacent sub-block coefficient presence/absence context deriving unit 124*c* derives a context index as follows according to a value of xB.

In a case where xB is equal to or smaller than TH3, the adjacent sub-block coefficient presence/absence context deriving unit 124*c* derives sigCtx=2. In addition, in a case where xB is greater than TH3 and is equal to or smaller than TH4, the adjacent sub-block coefficient presence/absence context deriving unit 124*c* derives sigCtx=1. In other cases, the adjacent sub-block coefficient presence/absence context deriving unit 124*c* derives sigCtx=0.

In other words, values of the context indexes are 2 in the (TH3-1)-th and subsequent columns of the sub-block, and values of the context indexes are 1 from the TH3-th column to the (TH4-1)-th column. In addition, values of the context indexes are 0 in the TH4-th column of the sub-block.

(Case of Pattern 3)

In a case of the pattern 3, the adjacent sub-block coefficient presence/absence context deriving unit 124*c* derives a context index by using sigCtx=(xB+yB<=TH5)?2:1.

Therefore, in a case of the pattern 3, if a sum of the coordinate xB in the horizontal direction of the coordinates (xB,yB) in the sub-block and the coordinate yB in the vertical direction is equal to or smaller than TH5, a value of a context index is "2", and, otherwise, a value of a context index is "1".

Modification Example 5-1 described above is an example of TH1=0, TH2=2, TH3=0, TH4=1, and TH5=6. From the test performed by the present inventor, it has been confirmed that Modification Example 5-1 can further improve coding efficiency than the comparative example of FIGS. 51 and 52, especially, in an intra-prediction block. In relation to the elements of Modification Example 5-1, in the pattern 0, a value of a context index at the upper left position is set to 2 which indicates an occurrence probability is high; in the pattern 1 and the pattern 2, values of context indexes at the first row and the first column are set to 2 which indicates an occurrence probability is high; and, in the pattern 3, a value of a context index is set to a fixed value (here, 2 which indicates an occurrence probability is high). It has been confirmed from the test performed by the present inventor that coding efficiency is considerably improved by changing the patterns 1 and 2, coding efficiency is improved in an intermediate extent by changing the pattern 0, and coding efficiency is not reduced in the simplification such as changing of the pattern 3.

In addition, in the pattern 0, it is appropriate that TH1 is equal to or greater than 0, and TH2 is smaller than 6 in terms of coding efficiency. In the patterns 1 and 2, it is appropriate that TH3 is equal to or greater than 0, and TH4 is smaller than 6 in terms of coding efficiency. In the pattern 3, it is appropriate that TH5 is equal to or greater than 6.

Hereinafter, with reference to FIGS. 31 to 33, and FIG. 53, a description will be further made of Modification Example 5-2, Modification Example 5-3, Modification Example 5-4, and Modification Example 5-5.

Modification Example 5-2

With reference to FIG. 31, Modification Example 5-2 will be described. Modification Example 5-2 is an example of TH1=−1, TH2=2, TH3=0, TH4=1, and TH5=6. In relation of elements of Modification Example 5-2, in patterns 1 and 2, values of context indexes of the first row and the first column are set to 2, and, in a pattern 3, a value of a context index is set to a fixed value (here, 2).

FIG. 31 illustrates arrangements of values of context indexes in a context index derivation method of Modification Example 5-2. With reference to FIG. 31, a description will be made of a value of a context index which is derived in each case of the patterns 0 to 3. In addition, hatched parts illustrated in FIG. 31 are parts which are changed from the arrangements of values of context indexes illustrated in FIG. 52.

(Case of Pattern 0)

As illustrated in FIG. 31(*a*), there are the same derivation method and an arrangement of the same values as in the comparative example of FIGS. 51 and 52.

(Case of Patterns 1 to 3)

As illustrated in FIGS. 31(*b*) to 31(*c*), there are the same derivation method and an arrangement of the same values as in Modification Example 5-1 of FIGS. 28 and 29.

In addition, the arrangements of context indexes related to a case of Modification Example 5-2 may be realized by using a pseudo-code illustrated in FIG. 57. FIG. 57 is an example of another pseudo-code for realizing the arrangements of the values of the context indexes illustrated in FIG. 31.

More specifically, the pseudo-code illustrated in FIG. 57 is one in which a boundary value for magnitude relation determination is changed, or the magnitude relation determination is changed to equal value determination, as appropriate, in the pseudo-code of FIG. 30 including TH1=−1, TH2=2, TH3=0, TH4=1, and TH5=6, in order to realize the arrangements of the values of the context indexes illustrated in FIG. 31.

According to the pseudo-code illustrated in FIG. 57, it is possible to realize the arrangements of values of the context indexes illustrated in FIG. 31 in the same manner as in a case where threshold values are set to TH1=−1, TH2=2, TH3=0, TH4=1, and TH5=6 in the pseudo-code illustrated in FIG. 30.

As described above, the context index derivation method of Modification Example 5-2 can achieve effects of improvement of coding efficiency by setting values of the context indexes of the first row and the first column to 2 in the patterns 1 and 2, and simplification by setting a value of the context index to a fixed value in the pattern 3, in the same manner as Modification Example 5-1. In addition, unlike Modification Example 5-1, values of context indexes of the pattern 0 are only 0 and 1 of two stages, and thus complexity of Modification Example 5-2 is lower than that of Modification Example 5-1. From the test performed by the present inventor, it has been confirmed that, in the same manner as Modification Example 5-1, Modification Example 5-2 can also improve coding efficiency than the comparative example of FIGS. 51 and 52, especially, in an intra-prediction block.

Modification Example 5-3

With reference to FIG. 32, Modification Example 5-3 will be described. Modification Example 5-3 is an example of TH1=−1, TH2=2, TH3=0, TH4=2, and TH5=4. In relation of elements of Modification Example 5-2, in patterns 1 and 2, values of context indexes of the first row and the first column are set to 2, and, in patterns 1 and 2, values of context indexes of the third row and the third column are set to 1.

FIG. 32 illustrates arrangements of values of context indexes in a context index derivation method of Modification Example 5-3. With reference to FIG. 32, a description will be made of a value of a context index which is derived in each case of the patterns 0 to 3. In addition, hatched parts illustrated in FIG. 32 are parts which are changed from the arrangements of values of context indexes illustrated in FIG. 52.

(Case of Pattern 0)

As illustrated in FIG. 32(*a*), there are the same derivation method and an arrangement of the same values as in the comparative example of FIGS. 51 and 52.

(Case of Pattern 1)

In a case of the pattern 1, the adjacent sub-block coefficient presence/absence context deriving unit 124*c* derives a context index as follows according to a value of yB.

In a case where yB is equal to or smaller than 0, the adjacent sub-block coefficient presence/absence context deriving unit 124*c* derives sigCtx=2. In addition, in a case where yB is greater than 0 and is equal to or smaller than 2, the adjacent sub-block coefficient presence/absence context deriving unit 124*c* derives sigCtx=1. In other cases, the adjacent sub-block coefficient presence/absence context deriving unit 124*c* derives sigCtx=0. Consequently, values of context indexes are arranged as illustrated in FIG. 32(*b*).

In other words, as illustrated in FIG. 32(*b*), values of the context indexes are 2 in the first row of the sub-block, and values of the context indexes are 1 in the second and third rows of the sub-block. In addition, values of the context indexes are 0 in the fourth row of the sub-block.

(Case of Pattern 2)

In a case of the pattern 3, the adjacent sub-block coefficient presence/absence context deriving unit 124*c* derives a context index as follows according to a value of xB.

In a case where xB is equal to or smaller than 0, the adjacent sub-block coefficient presence/absence context deriving unit 124*c* derives sigCtx=2. In addition, in a case where xB is greater than 0 and is equal to or smaller than 2, the adjacent sub-block coefficient presence/absence context deriving unit 124*c* derives sigCtx=1. In other cases, the adjacent sub-block coefficient presence/absence context deriving unit 124*c* derives sigCtx=0. Consequently, values of context indexes are arranged as illustrated in FIG. 32(*c*).

In other words, as illustrated in FIG. 32(*c*), values of the context indexes are 2 in the first column of the sub-block, and values of the context indexes are 1 in the second and third columns of the sub-block. In addition, values of the context indexes are 0 in the fourth column of the sub-block.

(Case of Pattern 3)

As illustrated in FIG. 32(*d*), there are the same derivation method and an arrangement of the same values as in the comparative example of FIGS. 51 and 52.

In addition, the arrangements of context indexes related to a case of Modification Example 5-3 may be realized by using a pseudo-code illustrated in FIG. 58. FIG. 58 is an example of another pseudo-code for realizing the arrangements of the values of the context indexes illustrated in FIG. 32.

More specifically, the pseudo-code illustrated in FIG. 58 is one in which a boundary value for magnitude relation determination is changed, or the magnitude relation determination is changed to equal value determination, as appropriate, in the pseudo-code of FIG. 32 including TH1=−1, TH2=2, TH3=0, TH4=1, and TH5=4, in order to realize the arrangements of the values of the context indexes illustrated in FIG. 32.

According to the pseudo-code illustrated in FIG. 58, it is possible to realize the arrangements of values of the context indexes illustrated in FIG. 32 in the same manner as in a case where threshold values are set to TH1=−1, TH2=2, TH3=0, TH4=1, and TH5=4 in the pseudo-code illustrated in FIG. 30.

As described above, the context index derivation method of Modification Example 5-3 can improve coding efficiency by setting values of the context indexes of the first row and the first column to 2 in the patterns 1 and 2 in the same manner as in Modification Example 5-1.

Modification Example 5-4

With reference to FIG. 33, Modification Example 5-4 will be described. Modification Example 5-4 is an example of TH1=1, TH2=3, TH3=0, TH4=2, and TH5=6. In relation of elements of Modification Example 5-4, in patterns 1 and 2, values of context indexes of the first row and the first column are set to 2, and, in patterns 1 and 2, values of context indexes of the third row and the third column are set to 1.

FIG. 33 illustrates arrangements of values of context indexes in a context index derivation method of Modification Example 5-4. With reference to FIG. 33, a description will be made of a value of a context index which is derived in each case of the patterns 0 to 3. In addition, hatched parts illustrated in FIG. 33 are parts which are changed from the arrangements of values of context indexes illustrated in FIG. 52.

(Case of Pattern 0)

In a case of the pattern 0, the adjacent sub-block coefficient presence/absence context deriving unit 124*c* derives a context index as follows according to a value of xB+yB.

In a case where xB+yB is equal to or smaller than 1, the adjacent sub-block coefficient presence/absence context deriving unit 124*c* derives sigCtx=2. In addition, in a case where xB+yB is greater than 1 and is equal to or smaller than 3, the adjacent sub-block coefficient presence/absence context deriving unit 124*c* derives sigCtx=1. In other cases, the adjacent sub-block coefficient presence/absence context deriving unit 124*c* derives sigCtx=0. Consequently, values of context indexes are arranged as illustrated in FIG. 33(*a*).

(Case of Patterns 1 and 2)

As illustrated in FIGS. 33(*b*) and 33(*c*), there are the same derivation method and an arrangement of the same values as in Modification Example 5-3 of FIG. 32.

(Case of Pattern 3)

As illustrated in FIG. 33(*d*), there are the same derivation method and an arrangement of the same values as in the Modification Example 5-1 of FIGS. 28 and 29.

In addition, the arrangements of context indexes related to a case of Modification Example 5-4 may be realized by using a pseudo-code illustrated in FIG. 59. FIG. 59 is an example of another pseudo-code for realizing the arrangements of the values of the context indexes illustrated in FIG. 33.

More specifically, the pseudo-code illustrated in FIG. 59 is one in which a boundary value for magnitude relation determination is changed, or the magnitude relation determination is changed to equal value determination, as appropriate, in the pseudo-code of FIG. 30 including TH1=1, TH2=3, TH3=0, TH4=2, and TH5=6, in order to realize the arrangements of the values of the context indexes illustrated in FIG. 33.

According to the pseudo-code illustrated in FIG. 57, it is possible to realize the arrangements of values of the context indexes illustrated in FIG. 33 in the same manner as in a case where threshold values are set to TH1=−1, TH2=2, TH3=0, TH4=1, and TH5=6 in the pseudo-code illustrated in FIG. 30.

As described above, the context index derivation method of Modification Example 5-4 can improve coding efficiency by setting values of the context indexes of the first row and the first column to 2 in the patterns 1 and 2 in the same manner as in Modification Example 5-3. In addition, in the same manner as in Modification Example 5-1, it is possible to improve coding efficiency by using 0, 1, 2, and 3 of three stages as values of context indexes in the pattern 0. Further, in the same manner as in Modification Example 5-1, it is possible to achieve an effect of simplification by setting a value of a context index to a fixed value in the pattern 3.

Modification Example 5-5

With reference to FIG. 53, Modification Example 5-5 will be described. Modification Example 5-5 is an example of TH1=−1, TH2=2, TH3=−1, TH4=1, and TH5=6. In relation of elements of Modification Example 5-5, in a pattern 3, a value of a context index is set to a fixed value (here, 2). FIG. 53 illustrates arrangements of values of context indexes in a context index derivation method of Modification Example 5-5. With reference to FIG. 53, a description will be made of a value of a context index which is derived in each case of the patterns 0 to 3. In addition, hatched parts illustrated in FIG. 53 are parts which are changed from the arrangements of values of context indexes illustrated in FIG. 52.

(Case of Patterns 0 to 2)

As illustrated in FIGS. 53(*a*) to 53(*c*), there are the same derivation method and an arrangement of the same values as in the comparative example of FIGS. 51 and 52.

(Case of Pattern 3)

As illustrated in FIG. 53(*d*), there are the same derivation method and an arrangement of the same values as in Modification Example 5-1 of FIGS. 28 and 29.

In addition, the arrangements of context indexes related to a case of Modification Example 5-5 may be realized by using a pseudo-code illustrated in FIG. 60. FIG. 60 is an example of another pseudo-code for realizing the arrangements of the values of the context indexes illustrated in FIG. 53.

More specifically, the pseudo-code illustrated in FIG. 60 is one in which a boundary value for magnitude relation determination is changed, or the magnitude relation determination is changed to equal value determination, as appropriate, in the pseudo-code of FIG. 30 including TH1=−1, TH2=2, TH3=−1, TH4=1, and TH5=6, in order to realize the arrangements of the values of the context indexes illustrated in FIG. 53.

According to the pseudo-code illustrated in FIG. 60, it is possible to realize the arrangements of values of the context indexes illustrated in FIG. 53 in the same manner as in a case where threshold values are set to TH1=−1, TH2=2, TH3=−1, TH4=1, and TH5=6, in the pseudo-code illustrated in FIG. 30.

Modification Example 5-6

With reference to FIG. 61, Modification Example 5-6 will be described. Modification Example 5-6 is an example of TH1=1, TH2=2, TH3=0, TH4=1, and TH5=6. In relation of elements of Modification Example 5-6, in a pattern 0, a value of a context index indicating that an occurrence probability of a non-zero transform coefficient is high is set to a part satisfying xB+yB<2.

FIG. 61 illustrates arrangements of values of context indexes in a context index derivation method of Modification Example 5-6. With reference to FIG. 61, a description will be made of a value of a context index which is derived in each case of the patterns 0 to 3.

(Case of Pattern 0)

In a case of the pattern 0, the adjacent sub-block coefficient presence/absence context deriving unit 124*c* derives a context index as follows according to a value of xB+yB.

In a case where xB+yB is equal to or smaller than 1, the adjacent sub-block coefficient presence/absence context deriving unit 124*c* derives sigCtx=2. In addition, in a case where xB+yB is greater than 1 and is equal to or smaller than 2, the adjacent sub-block coefficient presence/absence context deriving unit 124*c* derives sigCtx=1. In other cases, the adjacent sub-block coefficient presence/absence context deriving unit 124*c* derives sigCtx=0. Consequently, values of context indexes are arranged as illustrated in FIG. 61(*a*).

(Case of Patterns 1 to 3)

FIGS. 61(*b*) to 61(*d*) illustrate the same derivation method and arrangements of the same values as in the Modification Example 5-1 of FIGS. 29(*b*), 29(*c*) and 29(*d*).

In addition, the arrangements of context indexes related to a case of Modification Example 5-6 may be realized by using a pseudo-code illustrated in FIG. 62. The pseudo-code illustrated in FIG. 62 may be obtained by changing a boundary value for magnitude relation determination, or by changing the magnitude relation determination to equal value determination, in the pseudo-code illustrated in FIG. 30, as described in the above-described modification example.

As described above, the context index derivation method of Modification Example 5-6 can achieve effects of improvement of coding efficiency by setting values of the context indexes of the first row and the first column to 2 in the patterns 1 and 2, and simplification by setting a value of the context index to a fixed value in the pattern 3, in the same manner as Modification Example 5-1. Particularly, in a case where context indexes are derived from an 8×8 TU to a 32×32 TU by the adjacent sub-block coefficient presence/absence context deriving unit 124*c*, it is possible to achieve an effect of improvement of coding efficiency by setting a value of a context index indicating that an occurrence probability of a non-zero transform coefficient is high to a part satisfying xB+yB<2 in the pattern 0.

Modification Example 5-7

With reference to FIG. 63, Modification Example 5-7 will be described. Modification Example 5-7 is an example of TH1=1, TH2=3, TH3=0, TH4=1, and TH5=6. In relation of elements of Modification Example 5-7, in a pattern 0, a value of a context index indicating that an occurrence probability of a non-zero transform coefficient is high is set to a part satisfying xB+yB<2, and a value of a context index indicating that an occurrence probability of a non-zero transform coefficient is intermediate is set to a part satisfying 1<xB+yB<4.

FIG. 63 illustrates arrangements of values of context indexes in a context index derivation method of Modification Example 5-7. With reference to FIG. 63, a description will be made of a value of a context index which is derived in each case of the patterns 0 to 3.

(Case of Pattern 0)

FIG. 63(*a*) illustrates the same derivation method and arrangements of the same values as in the Modification Example 5-4 of FIG. 33(*a*).

(Case of Patterns 1 to 3)

FIGS. 63(*b*) to 63(*d*) illustrate the same derivation method and arrangements of the same values as in the Modification Example 5-1 of FIGS. 29(*b*), 29(*c*) and 29(*d*).

In addition, the arrangements of context indexes related to a case of Modification Example 5-7 may be realized by using a pseudo-code illustrated in FIG. 64. The pseudo-code illustrated in FIG. 64 may be obtained by changing a boundary value for magnitude relation determination, or by changing the magnitude relation determination to equal value determination, in the pseudo-code illustrated in FIG. 30, as described in the above-described modification example.

As described above, the context index derivation method of Modification Example 5-7 can achieve effects of improvement of coding efficiency by setting values of the context indexes of the first row and the first column to a value of a context index indicating that an occurrence probability of a non-zero transform coefficient is high in the patterns 1 and 2, and simplification by setting a value of the context index to a fixed value in the pattern 3, in the same manner as Modification Example 5-1. Particularly, in a case where context indexes are derived from an 8×8 TU to a 32×32 TU by the adjacent sub-block coefficient presence/absence context deriving unit 124*c*, it is possible to achieve an effect of improvement of coding efficiency by setting a value of a context index indicating that an occurrence probability of a non-zero transform coefficient is high to a part satisfying xB+yB<2, and by setting a value of a context index indicating that an occurrence probability of a non-zero transform coefficient is intermediate to a part satisfying 1<xB+yB<4 in the pattern 0.

Supplements Related to Modification Example 5

In addition, in the moving image decoding apparatus 1 related to Modification Examples 5-1, 5-4, 5-6 and 5-7 described above, the context index deriving means determines a sub-block coefficient presence/absence flag for a right adjacent sub-block which is a sub-block adjacent to the right side of a process target sub-block and a lower adjacent sub-block which is adjacent to the lower side thereof. When it is determined that a non-zero transform coefficient is not present in either the right adjacent sub-block or the lower adjacent sub-block, on the basis of the determination result, the context index deriving means derives the context index corresponding to a case where an occurrence probability of a non-zero transform coefficient is high in a case where a sum of xB and yB indicating a coefficient position in a sub-block is equal to or smaller than a first threshold value; derives the context index corresponding to a case where an occurrence probability of a non-zero transform coefficient is intermediate in a case where the sum of xB and yB is greater than the first threshold value and is equal to or smaller than a second threshold value; and derives the context index corresponding to a case where an occurrence probability of a non-zero transform coefficient is low in a case where the sum of xB and yB is greater than the second threshold value.

According to the configuration, it is possible to realize a context derivation pattern which is more suitable for an actual occurrence probability of a transform coefficient, and thus it is possible to improve coding efficiency.

Particularly, by setting the first threshold value to 0 and the second threshold value to 2, it is possible to realize a preferable context derivation pattern which is more suitable for an actual occurrence probability of a non-zero transform coefficient. In addition, preferably, the first threshold value may be set to 1, and the second threshold value may be set to 2. Further, preferably, the first threshold value may be set to 1, and the second threshold value may be set to 3.

In addition, in the moving image decoding apparatus 1 related to Modification Examples 5-1 to 5-4, 5-6 and 5-7 described above, the context index deriving means determines a sub-block coefficient presence/absence flag for a right adjacent sub-block which is a sub-block adjacent to the right side of a process target sub-block and a lower adjacent sub-block which is adjacent to the lower side thereof. When it is determined that a non-zero transform coefficient is not present in one of the right adjacent sub-block and the lower adjacent sub-block, the context index deriving means selects a coefficient position of one of xB and yB indicating a coefficient position in a sub-block in an adjacent direction of a sub-block in which it is determined that a non-zero transform coefficient is not present; derives the context index corresponding to a case where an occurrence probability of a non-zero transform coefficient is high in a case where the coefficient position is equal to or smaller than a first threshold value; derives the context index corresponding to a case where an occurrence probability of a non-zero transform coefficient is intermediate in a case where the coefficient position is greater than the first threshold value and is equal to or smaller than a second threshold value; and derives the context index corresponding to a case where an occurrence probability of a non-zero transform coefficient is low in a case where the coefficient position is greater than the second threshold value.

According to the configuration, it is possible to set a preferable threshold value to an actual occurrence probability of a transform coefficient and thus to realize a more suitable context derivation pattern. Therefore, it is possible to improve coding efficiency.

In addition, in the moving image decoding apparatus 1 related to Modification Examples 5-1, 5-3, 5-4 and 5-5 described above, the context index deriving means determines a sub-block coefficient presence/absence flag for a right adjacent sub-block which is a sub-block adjacent to the right side of a process target sub-block and a lower adjacent sub-block which is adjacent to the lower side thereof. When it is determined that a non-zero transform coefficient is present in both the right adjacent sub-block and the lower adjacent sub-block with respect to a process target sub-block, the context index deriving means derives a fixed context index with respect to a non-zero transform coefficient in the process target sub-block.

According to the configuration, it is possible to minimize a reduction in coding efficiency and also to simplify derivation of a context index.

In addition, in the configuration, the fixed context index is preferably a context index corresponding to a case where an occurrence frequency of a non-zero transform coefficient is high.

According to the configuration, it is possible to fixedly derive a context index which is more suitable for an actual occurrence probability of a transform coefficient and corresponds to a case where an occurrence probability of a non-zero transform coefficient is high. Therefore, since a fixed context index which is more suitable for an actual occurrence probability of a transform coefficient can be derived, it is possible to further minimize a reduction in coding efficiency and also to simplify derivation of a context index.

[Operations and Effects]

As described above, the moving image decoding apparatus 1 related to Modification Examples 5-1 to 5-4, 5-6 and 5-7 includes an arithmetic decoding device which decodes coded data which is obtained by arithmetically coding various syntaxes indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; non-zero transform coefficient determining means for determining whether or not at least one non-zero transform coefficient is included in a sub-block adjacent to a process target sub-block on the basis of the decoded sub-block coefficient presence/absence flag; and context index deriving means for deriving a context index assigned to a transform coefficient presence/absence flag which is syntax indicating whether or not the transform coefficient is 0, in which, when a non-zero transform coefficient is not present in any of sub-blocks adjacent to the process target sub-block, on the basis of the determination result, the context index deriving means derives the context indexes which respectively correspond to a case where an occurrence probability of a non-zero transform coefficient is low, a case where an occurrence probability of a non-zero transform coefficient is high, and a case where an occurrence probability of a non-zero transform coefficient is intermediate between the high case and the low case, according to a position of a process target transform coefficient in the process target sub-block.

In the moving image decoding apparatus 1 related to Modification Examples 5-1, 5-4, 5-6 and 5-7 described above, when it is determined that a non-zero transform coefficient is not present in any of two or more sub-blocks adjacent to the process target sub-block, on the basis of the determination result, the context index deriving means derives the context indexes which respectively correspond to a case where an occurrence probability of a non-zero transform coefficient is low, a case where an occurrence probability of a non-zero transform coefficient is high, and a case where an occurrence probability of a non-zero transform coefficient is intermediate between the high case and the low case, according to a position of a process target transform coefficient in the process target sub-block. Therefore, it is possible to improve coding efficiency. Particularly, a case where an occurrence probability of a non-zero transform coefficient is high is preferably assigned to an upper left position in the process target sub-block.

In the moving image decoding apparatus 1 related to Modification Examples 5-1 to 5-4, 5-6 and 5-7 described above, when it is determined that a non-zero transform coefficient is present in one or more sub-blocks adjacent to the process target sub-block and is not present in one or more sub-blocks, on the basis of the determination result, the context index deriving means derives the context indexes which respectively correspond to a case where an occurrence probability of a non-zero transform coefficient is low, a case where an occurrence probability of a non-zero transform coefficient is high, and a case where an occurrence probability of a non-zero transform coefficient is intermediate between the high case and the low case, according to a position of a process target non-zero transform coefficient in the process target sub-block. Therefore, it is possible to improve coding efficiency. Particularly, in a sub-block of which a non-zero transform coefficient is determined as being present in a sub-block adjacent to the right side and a non-zero transform coefficient is determined as being present in a sub-block adjacent to the lower side, a case where an occurrence probability of a non-zero transform coefficient is high is preferably assigned to a first row in the process target sub-block. Symmetrically thereto, particularly, in a sub-block of which a non-zero transform coefficient is determined as being present in a sub-block adjacent to the lower side and a non-zero transform coefficient is determined as being present in a sub-block adjacent to the right side, a case where an occurrence probability of a non-zero transform coefficient is high is preferably assigned to a first column in the process target sub-block.

In the moving image decoding apparatus 1 related to Modification Examples 5-1, 5-3, 5-4, 5-5, 5-6 and 5-7 described above, when it is determined that a non-zero transform coefficient is present in two or more sub-blocks adjacent to the process target sub-block, on the basis of the determination result, the context index deriving means fixedly derives the context index corresponding to a case where an occurrence probability of a non-zero transform coefficient is high, and can simplify derivation of the context index.

According to the configuration related to Modification Examples 5-1 to 5-4, 5-6 and 5-7 described above, it is possible to realize a context derivation pattern which is more suitable for an actual occurrence probability of a transform coefficient, and thus it is possible to improve coding efficiency.

Combination Between Modification Example 5 and Modification Example 1

In addition, Modification Example 5 may be combined with Modification Example 1. Modification Example 5 is a configuration in which a separation of a stage for a value of a context index is set in the following condition as described above. In other words, in the pattern 0, a separation of a stage for a value of a context index is set according to xB+yB. In the pattern 1, a separation of a stage for a value of a context index is set according to yB. In the pattern 2, a separation of a stage for a value of a context index is set according to xB. Further, in the pattern 3, a separation of a stage for a value of a context index is set according to xB+yB, or a value of a context index corresponding to a case where an occurrence probability of a non-zero transform coefficient is high is equally set.

In a decoding process of a transform coefficient using the scan order of Modification Example 1, a context index is derived according to the condition related to Modification Example 5, and thus the number of changes in 0s and 1s of context indexes in a backward scan order in a sub-block can be minimized.

More specifically, the following scan order may be used in the patterns 0 to 3 of Modification Examples 5-1 to 5-5.

In a case of the pattern 0, as illustrated in FIG. 22 (*a*), the coefficient decoding control unit 123 may apply the up-right diagonal scan thereto.

In a case of the pattern 1, as illustrated in FIG. 22(*b*), the coefficient decoding control unit 123 applies the horizontal fast scan thereto. In other words, in a case of (significant_coeff_group_flag[xCG+1][yCG],significant_coeff_group_flag[xCG][yCG+1])=(1,0), the coefficient decoding control unit 123 may apply the horizontal fast scan thereto.

In a case of the pattern 2, as illustrated in FIG. 22 (*c*), the coefficient decoding control unit 123 applies the vertical fast scan. In other words, in a case of (significant_coeff_group_flag[xCG+1][yCG],significant_coeff_group_flag[xCG][yCG+1])=(0,1), the coefficient decoding control unit 123 may apply the vertical fast scan thereto.

In a case of the pattern 3, as illustrated in FIG. 22 (*d*), the coefficient decoding control unit 123 may apply the up-right diagonal scan.

Modification Example 6: Reference to Absolute Coordinate

Hereinafter, with reference to FIGS. 34 and 35, a description will be made of a modification example of deriving a context index by using not only coordinates (xB,yB) in a sub-block but also a coefficient position (xC,yC) in a TU.

In the present modification example, the adjacent sub-block coefficient presence/absence context deriving unit 124*c* obtains a pattern index idxCG by using the above Equation (A), and also derives a context index in a method illustrated in FIG. 34 according to patterns 0 to 3 obtained therefrom.

FIG. 34 is a diagram illustrating still another example of a pseudo-code for deriving a context index from coordinates of a process target frequency component in a sub-block according to a pattern index idxCG obtained from Equation (A). FIG. 35 illustrates arrangements of values of context indexes in the context index derivation method using the pseudo-code illustrated in FIG. 34.

With reference to FIGS. 34 and 35, a description will be made of a value of a context index which is derived in each case of patterns 0 to 3.

(Case of Pattern 0)

In a case of the pattern 0, the adjacent sub-block coefficient presence/absence context deriving unit 124*c* derives a context index by using sigCtx=(xB+yB<=2)<=0)?1:0.

In other words, a case of the pattern 0 is the same as a case of the pattern 0 of the above Example. Therefore, values of the context indexes are arranged as illustrated in FIG. 35(*a*).

(Case of Pattern 1)

In a case of the pattern 1, the adjacent sub-block coefficient presence/absence context deriving unit 124*c* derives a context index according to the Y coordinate yC of the coefficient position (xC,yC).

In a case where yC is 0, the adjacent sub-block coefficient presence/absence context deriving unit 124*c* derives sigCx=2. Therefore, values the context indexes are arranged as illustrated in FIG. 35(*e*). In other words, in a case where yC is 0, as illustrated in FIG. 35(*e*), values of the context indexes are 2 in the first row (upper end) of the sub-block.

In contrast, in a case where yC is not 0, the adjacent sub-block coefficient presence/absence context deriving unit 124*c* derives a context index by using sigCtx=(yB<=1)?1:0.

Consequently, as illustrated in FIG. 35(*b*), values of the context indexes are 1 in the first and second rows of the sub-block, and values of the context indexes are 0 in the third and fourth rows of the sub-block.

(Case of Pattern 2)

In a case of the pattern 2, the adjacent sub-block coefficient presence/absence context deriving unit 124*c* derives a context index according to the Y coordinate xC of the coefficient position (xC,yC).

In a case where xC is 0, the adjacent sub-block coefficient presence/absence context deriving unit 124*c* derives sigCx=2. Therefore, values the context indexes are arranged as illustrated in FIG. 35(*f*). In other words, in a case where yC is 0, as illustrated in FIG. 35(*f*), values of the context indexes are 2 in the first column (left end) of the sub-block.

In contrast, in a case where xC is not 0, the adjacent sub-block coefficient presence/absence context deriving unit 124*c* derives a context index by using sigCtx=(xB<=1)?1:0.

Consequently, as illustrated in FIG. 35(*c*), values of the context indexes are 1 in the first and second columns of the sub-block, and values of the context indexes are 0 in the third and fourth columns of the sub-block.

(Case of Pattern 3)

In a case of the pattern 3, the adjacent sub-block coefficient presence/absence context deriving unit 124*c* derives a context index by using sigCtx=(xB+yB<=4)<=0)?1:0.

Therefore, in a case of the pattern 3, if a sum of the coordinate xB in the horizontal direction of the coordinates (xB,yB) in the sub-block and the coordinate yB in the vertical direction is equal to or smaller than 4, a value of a context index is "1", and, otherwise, a value of a context index is "0".

Consequently, values of the context indexes are arranged as illustrated in FIG. 35(*d*).

[Operations and Effects]

As mentioned above, the moving image decoding apparatus 1 related to Modification Example 6 includes an arithmetic decoding device which decodes coded data which is obtained by arithmetically coding various syntaxes indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; directivity determining means for determining a directivity of a distribution of transform coefficients on the basis of a sub-block coefficient presence/absence flag in a sub-block adjacent to a process target sub-block; and context index deriving means for deriving a context index assigned to a transform coefficient presence/absence flag which is syntax indicating whether or not the transform coefficient is 0, in which the context index deriving means derives the context index by using coordinates in the process target unit domain in the process target sub-block according to a directivity determined by the directivity determining means.

According to the configuration, in a case of xC=0 or yC=0, a context index corresponding to a case where an occurrence probability of a non-zero transform coefficient is high is used in the patterns 1 and 2.

In a case where a horizontal edge or a vertical edge is present, non-zero transform coefficients tend to concentrate and appear in a domain of xC=0 or yC=0.

According to the configuration, since a context index corresponding to a case where an occurrence probability of a non-zero transform coefficient is high is used in a case where a probability of the presence of the horizontal edge or the vertical edge is high, it is possible to improve coding efficiency.

Further, in the pattern 1 (pattern 2), in addition to the determination of yC=0 (xC=0), or instead of the determination, it may be determined whether or not xC is 0 and yC is 0, and a context index may be derived according to a determination result.

Modification Example 7: Equally High Probability Pattern

Hereinafter, with reference to FIGS. 36 to 38, a description will be made of a modification example of equally using a context index in a process target sub-block in a case where a probability that there are a large number of non-zero transform coefficients in an adjacent sub-block is high.

In a case where a probability that there are a large number of non-zero transform coefficients in an adjacent sub-block is high, there may be an occurrence of circumstances in which a large number of non-zero transform coefficients are equally present in a process target sub-block.

With reference to FIG. 36, a description will be made of a case of circumstances in which a large number of non-zero transform coefficients are equally present in a process target sub-block regardless of coordinates in the sub-block.

In a case where non-zero transform coefficients are present in all of a right adjacent sub-block A, a lower adjacent sub-block B, and a lower right adjacent sub-block C with respect to a process target sub-block X illustrated in FIG. 36, there is a tendency for an occurrence probability of a non-zero transform coefficient in the sub-block X to be equally high regardless of coordinates in the sub-block X.

In such a case, it is preferable that the context index 1 indicating an occurrence probability with an intermediate level be not used but the context index 2 indicating an occurrence probability with a high level be used.

In the present modification example, the adjacent sub-block coefficient presence/absence context deriving unit 124*c* obtains a pattern index idxCG which is an index for specifying a context derivation pattern from sub-block coefficient presence/absence flags in adjacent sub-blocks (right adjacent and lower adjacent sub-blocks), by using the following Equation (C).

idx*CG*=significant_coeff_group_flag[*xCG*+1][*yCG*]+(significant_coeff_group_flag[*xCG*][*yCG*+1]<<1)+(significant_coeff_group_flag[*xCG*+1][*yCG*+1]<<2) (C)

The pattern index idxCG takes values of 0 to 7 from the above Equation (C). The adjacent sub-block coefficient presence/absence context deriving unit 124*c* derives the following five patterns according to the values of the pattern index idxCG.

(Pattern 0) In a case where a value of the sub-block coefficient presence/absence flag is 0 in all of the right adjacent sub-block (xCG+1,yCG), the lower adjacent sub-block (xCG,yCG+1), and the lower right adjacent sub-block (xCG+1,yCG+1)

(Pattern 1) In a case where a value of the sub-block coefficient presence/absence flag is 0 in both of the right adjacent sub-block (xCG+1,yCG) and the lower adjacent sub-block (xCG,yCG+1)

(Pattern 2) In a case where a value of the sub-block coefficient presence/absence flag is 1 in one of the right adjacent sub-block (xCG+1,yCG) and the lower adjacent sub-block (xCG,yCG+1), and a value of the sub-block coefficient presence/absence flag is 0 in the other thereof (Pattern 3) In a case where a value of the sub-block coefficient presence/absence flag is 1 in both of the right adjacent sub-block (xCG+1,yCG) and the lower adjacent sub-block (xCG,yCG+1)

(Pattern 4) In a case where a value of the sub-block coefficient presence/absence flag is 1 in all of the right adjacent sub-block (xCG+1,yCG) the lower adjacent sub-block (xCG,yCG+1), and the lower right adjacent sub-block (xCG+1,yCG+1)

In the present modification example, the adjacent sub-block coefficient presence/absence context deriving unit 124*c* obtains a pattern index idxCG by using the above Equation (C), and also derives a context index in a method illustrated in FIG. 37 according to patterns 0 to 4 obtained therefrom.

With reference to FIGS. 37 and 38, a description will be made of a specific context index derivation method.

FIG. 37 is a diagram illustrating still another example of a pseudo-code for deriving a context index from coordinates of a process target frequency component in a sub-block according to a pattern index idxCG obtained from Equation (C). FIG. 38 illustrates arrangements of values of context indexes in the context index derivation method using the pseudo-code illustrated in FIG. 37. In addition, hatched parts illustrated in FIG. 38 are parts which are changed from the arrangements of values of context indexes illustrated in FIG. 52.

With reference to FIG. 37, a description will be made of a value of a context index which is derived in each case of patterns 0 to 4.

(Case of Pattern 4)

First, in a case of the pattern 4, the adjacent sub-block coefficient presence/absence context deriving unit 124*c* determines whether or not a pattern is the pattern 4. In a case where the pattern is the pattern 4, as illustrated in FIG. 38(*e*), the adjacent sub-block coefficient presence/absence context deriving unit 124*c* equally derives sigCtx=2 in the sub-block regardless of values of xB and yB.

In a case where the pattern is not the pattern 4, the adjacent sub-block coefficient presence/absence context deriving unit 124*c* determines whether or not the pattern is one of the patterns 0 to 3 in the following. In addition, in FIG. 37, "idxCG&3" is used to calculate lower 2 bits of idxCG, and thus values of sub-block coefficient presence/absence flags of the right adjacent sub-block (xCG+1,yCG) and the lower adjacent sub-block (xCG,yCG+1) are extracted.

(Case of Pattern 0)

In a case of the pattern 0, the adjacent sub-block coefficient presence/absence context deriving unit 124*c* derives a context index by using sigCtx=(xB+yB<=2)<=0)?1:0.

In other words, a case of the pattern 0 is the same as a case of the pattern 0 of the above Example. Therefore, values of the context indexes are arranged as illustrated in FIG. 38(*a*).

(Case of Pattern 1)

In a case of the pattern 1, the adjacent sub-block coefficient presence/absence context deriving unit 124*c* derives a context index by using sigCtx=(yB<=1)<=0)?1:0.

Consequently, as illustrated in FIG. 38(*b*), values of the context indexes are 1 in the first and second rows of the sub-block, and values of the context indexes are 0 in the third and fourth rows of the sub-block.

(Case of Pattern 2)

In a case of the pattern 2, the adjacent sub-block coefficient presence/absence context deriving unit 124*c* derives a context index by using sigCtx=(xB<=1)<=0)?1:0.

Consequently, as illustrated in FIG. 38(*c*), values of the context indexes are 1 in the first and second columns of the sub-block, and values of the context indexes are 0 in the third and fourth columns of the sub-block.

(Case of Pattern 3)

In a case of the pattern 3, the adjacent sub-block coefficient presence/absence context deriving unit 124*c* derives a context index by using sigCtx=(xB+yB<=4)<=0)?2:1.

Therefore, in a case of the pattern 3, if a sum of the coordinate xB in the horizontal direction of the coordinates (xB,yB) in the sub-block and the coordinate yB in the vertical direction is equal to or smaller than 4, a value of a context index is "1", and, otherwise, a value of a context index is "0".

Consequently, values of the context indexes are arranged as illustrated in FIG. 38(*d*).

As mentioned above, in a cases of the patterns 0 to 3, the context indexes are respectively arranged as in the examples of the arrangements illustrated in FIGS. 52(*a*) to 52(*d*).

[Operations and Effects]

As mentioned above, the moving image decoding apparatus related to Modification Example 7 includes an arithmetic decoding device which decodes coded data which is obtained by arithmetically coding various syntaxes indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; adjacent sub-block coefficient presence determining means for determining whether or not at least one non-zero transform coefficient is included in each of sub-blocks adjacent to a process target sub-block on the basis of the sub-block coefficient presence/absence flag; and context index deriving means for deriving a context index assigned to a transform coefficient presence/absence flag which is syntax indicating whether or not the transform coefficient is 0, in which, in a case where at least one non-zero transform coefficient is included in sub-blocks of a predetermined number or more as a result of the determination, the context index deriving means derives the context index corresponding to a case where an occurrence probability of a non-zero transform coefficient is high, equally in the process target sub-block.

According to the configuration, as adjacent sub-blocks which are targets for determining a sub-block coefficient presence/absence flag, the lower right adjacent sub-block C is further used in addition to the right adjacent sub-block A and the lower adjacent sub-block B.

It is determined whether or not a state occurs in which an occurrence probability of a non-zero transform coefficient is equally high in the process target sub-block X on the basis of states of the sub-block coefficient presence/absence flags of the target adjacent sub-blocks.

In addition, in a case where the state occurs in which an occurrence probability of a non-zero transform coefficient is equally high in the process target sub-block X, a context index corresponding to a case where an occurrence probability of a non-zero transform coefficient is high is equally used in the process target sub-block X. Therefore, it is possible to improve coding efficiency.

In the above description, in a case where values of the sub-block coefficient presence/absence flags are 1 in all the adjacent sub-blocks, a context index corresponding to a case where an occurrence probability of a non-zero transform coefficient is high is equally used, but the present invention is not limited thereto.

In a case where values of sub-block coefficient presence/absence flags are 1 in adjacent sub-blocks of a predetermined number or more, a context index corresponding to a case where an occurrence probability of a non-zero transform coefficient is high may be equally used. In a case where values of sub-block coefficient presence/absence flags are 1 in adjacent sub-blocks of a predetermined number or more, it can be said that an occurrence probability of a non-zero transform coefficient is equally in a high state in the process target sub-block X. Therefore, the corresponding configuration can achieve the same effect as the configuration of Modification Example 5 described above.

Modification Example 8

NPL 3 has proposed a method in which, in an 8×8 TU, shapes of sub-blocks which are different from each other in a scan direction are unified into a 4×4 sub-block; also in an 8×8 TU to 32×32 TU, a derivation pattern is selected according to whether or not a non-zero transform coefficient is present in an adjacent sub-block; and a context index regarding transform coefficient presence/absence flag is derived from a position in a sub-block according to the selected derivation pattern. In addition, NPL 3 has proposed a method in which, in relation to an 8×8 TU for luminance, context regarding a transform coefficient presence/absence flag is differentiated in cases where a scan direction is an up-right diagonal scan and a horizontal scan or a vertical scan.

However, in a case of luminance of an 8×8 TU, the horizontal fast scan and vertical fast scan appear only in intra-prediction, and a use frequency thereof is lower than the up-right diagonal scan. In addition, a tendency (an average of occurrence frequencies of non-zero transform coefficients during the horizontal fast scan and the vertical fast scan) of an occurrence frequency of a non-zero transform coefficient at a coefficient position in a sub-block corresponding to each index pattern idxCG of the horizontal fast scan and the vertical fast scan is highly similar to a tendency of an occurrence frequency of a non-zero transform coefficient during the up-right diagonal scan. Accordingly, contexts regarding transform coefficient presence/absence flags during the up-right diagonal scan, the horizontal fast scan, and the vertical fast scan in luminance of an 8×8 TU can be shared thereamong.

Hereinafter, with reference to FIGS. 65, 66, 67 and 68, a description will be made of Modification Example 8 in which derivation of a context index regarding a transform coefficient presence/absence flag in an 8×8 TU is simplified, and thus the number of contexts regarding the transform coefficient presence/absence flags is reduced.

FIG. 65 is a flowchart illustrating an operation of deriving a context index regarding a transform coefficient presence/absence flag in the coefficient presence/absence flag coding unit 124 related to Modification Example 8.

(Step SX101)

The TU size determining unit 124*a* determines whether or not a process target TU size is smaller than a predetermined size (for example, an 8×8 TU). In a case where the process target TU size is smaller than the predetermined size (YES in step SX101), the TU size determining unit 124*a* selects the position context deriving unit 124*b* as context deriving means, and the flow proceeds to step SX104. In other cases, the flow proceeds to step SX102 (No in step SX101).

For example, the following Expression is used for determination. log 2TrafoSize<THSize is used, and, for example, 3 is used as THSize. In a case where 3 is used as the threshold value THsize, it is determined that a 4×4 TU is smaller than the predetermined size. It is determined that 8×8 TU, 16×4 TU, 4×16 TU, 16×16 TU, 32×4 TU, 4×32 TU, and 32×32 TU are equal to or larger than the predetermined size.

(Step SX102)

In a case where the process target TU size is equal to or larger than the predetermined size (for example, an 8×8 size) (No in step SX101), the TU size determining unit 124*a* determines whether or not a position of a process target transform coefficient is DC. In a case where the position of a process target transform coefficient is DC (Yes in step SX102), the TU size determining unit 124*a* selects the position context deriving unit 124*b* as context deriving means, and the flow proceeds to step SX104. In other cases, the TU size determining unit 124*a* selects the adjacent sub-block coefficient presence/absence context deriving unit 124*c* as context deriving means, and the flow proceeds to step SX103 (No in step SX102). In addition, whether or not the position of a process target transform coefficient is DC may be determined on the basis of whether or not a sum of xC and yC is the same as 0 by using a position (xC,yC) of a transform coefficient. In other words, the determination may be performed on the basis of determination of whether "xC+yC==0" is true or false.

(Step SX104)

In a case where the process target TU size is smaller the predetermined size (for example, an 8×8 TU) (Yes in step SX101), or the position of the process target transform coefficient is DC (Yes in step SX102), the position context deriving unit 124*b* selected as context deriving means derives a context index ctxIdx of a transform coefficient presence/absence flag corresponding to a position (xC,yC) of the transform coefficient illustrated in FIG. 66. FIG. 66 is a diagram illustrating a context index assigned to each coefficient position in luminance or chroma in a 4×4 TU. As illustrated in FIG. 66, the 4×4 TU is split into nine domains including "0" to "8", and a context index is assigned to each of the nine domains. Therefore, the number of contexts of the 4×4 TU is "9". Further, in a case where the position of the process target transform coefficient is DC, a value assigned to a DC component of the 4×4 TU in FIG. 66 is assigned as a context index which is common to TUs including the 4×4 TU to a 32×32 TU.

(Step SX103)

In a case where the process target TU size is smaller the predetermined size (for example, an 8×8 TU) (No in step SX101), or the position of the process target transform coefficient is DC (Yes in step SX102), the adjacent sub-block coefficient presence/absence context deriving unit 124*c* selected as context deriving means selects a derivation pattern according to whether or not a non-zero transform coefficient is present in an adjacent sub-block, and derives a context index sigCtx (ctxIdx) regarding a transform coefficient presence/absence flag from a position in the sub-block according to the selected derivation pattern.

A more specific process in which the adjacent sub-block coefficient presence/absence context deriving unit 124*c* derives a context index ctxIdx regarding a transform coefficient presence/absence flag in step SX103 is as follows.

(Step SX103-1)

The adjacent sub-block coefficient presence/absence context deriving unit 124*c* obtains a pattern index idxCG corresponding to the derivation pattern according to whether or not a non-zero transform coefficient is present in the adjacent sub-block. The pattern index idxCG may be obtained from the above Equation (A).

(Step SX103-2)

A context index sigCtx (ctxIdx) regarding a transform coefficient presence/absence flag is derived from the derivation pattern corresponding to the obtained pattern index idxCG and the position in the sub-block. The derivation pattern corresponding to the pattern index idxCG may use, for example, that of Modification Example 5-1 described above, and thus detailed description thereof will be omitted. In other words, in a case where the pattern index idxCG is the pattern 0, values of context indexes have the arrangement as illustrated in FIG. 29(*a*). In a case where the pattern index idxCG is the pattern 1, values of context indexes have the arrangement as illustrated in FIG. 29(*b*). In a case where the pattern index idxCG is the pattern 2, values of context indexes have the arrangement as illustrated in FIG. 29(*c*). In a case where the pattern index idxCG is the pattern 3, values of context indexes have the arrangement as illustrated in FIG. 29(*d*).

(Step SX103-3)

The adjacent sub-block coefficient presence/absence context deriving unit 124*c* adds a predetermined offset value to the context index sigCtx (ctxIdx) obtained in step SX103-2, so as to derive the context index sigCtx (ctxIdx) regarding a process target transform coefficient.

Hereinafter, derivation of the predetermined offset value in step SX103-3 will be described by exemplifying luminance. FIG. 67 is a flowchart illustrating a more detailed operation of step SX103-3.

(Step SX201)

It is determined whether or not a process target sub-block position (xCG,yCG) is located in a high frequency. For example, the determination may be performed on the basis of xCG+yCG>TH1. In a case where a sum of xCG and yCG is larger than a predetermined threshold value TH1, it is determined that the position is located in a high frequency, and, otherwise, it is determined that the position is located in a low frequency. The threshold value TH1 may be 0, for example. In this case, a sub-block including a DC component is treated as a low frequency.

(Step SX202)

In a case where the process target sub-block position (xCG,yCG) is located in a high frequency (Yes in step SX201), a predetermined offset value offsetHighFreq for identifying contexts for a low frequency and a high frequency is added to the context index sigCtx (ctxIdx). In other words, sigCtx (ctxIdx) is obtained by sigCtx=sigCtx+offsetHighFreq. In addition, as a meaning of the operator "+=" shown in step SX202 of FIG. 67, in a case where A and B are used such as "A+=B", this indicates "A=A+B". The same applies hereinafter.

In addition, in the present example, an occurrence frequency of a non-zero transform coefficient is indicated in three levels including "high", "intermediate", and "low", and thus "3" is used as the predetermined offset value offsetHighFreq.

(Step SX203)

It is determined whether or not a process target TU size is a predetermined size (for example, an 8×8 TU). In other words, it is determined whether or not a process target TU size is a predetermined size by determining whether log 2TrafoSize==THSize is true or false.

In addition, for example, "3" indicating a size of an 8×8 TU is used as the threshold value THSize.

(Step SX204)

In a case where the process target TU size is the predetermined size (for example, an 8×8 TU) (Yes in step SX203), a predetermined offset value offsetNA for identifying contexts for a TU satisfying the threshold value THSize and other TUs is added to the context index ctxIdx. In other words, sigCtx=sigCtx+offsetNA is computed.

Here, in order to identify contexts for a 4×4 TU and an 8×8 TU, the offset value offsetNA is set to, for example, "9" which is the number of contexts of the 4×4 TU illustrated in FIG. 66.

(Step Sx205)

In a case where the process target TU size is not the predetermined size (for example, an 8×8 TU) (No in step SX203), a predetermined offset value offsetNB for identifying contexts for a TU (8×8 TU) satisfying the threshold value THSize and other TUs (a 16×16 TU to a 32×32 TU) is added thereto. In other words, sigCtx=sigCtx+offsetNB is computed. Here, in order to identify contexts for an 8×8 TU and a 16×16 TU to a 32×32 TU, the offset value offsetNB is set to, for example, "15" which is a sum of "9" as the number of contexts of the 4×4 TU illustrated in FIG. 66 and "6" as the number of contexts of the 8×8 TU. The reason why the number of contexts of the 8×8 TU is "6" is that, in the present example, an occurrence frequency of a non-zero transform coefficient is indicated in three levels including "high", "intermediate", and "low", and each of a low frequency and a high frequency has "three" as the number of contexts.

As mentioned above, in Modification Example 8, if the offset values offsetHighFreq, offsetNA, and offsetNB for identifying context indexes are set to offsetHighFreq=3, offsetNA=9, and offsetNB=15, the context indexes regarding transform coefficient presence/absence flags for luminance are assigned with values of 0 to 20 as illustrated in FIG. 68.

ctxIdx=0 is a context index for DC ctxIdx=1 to 8 is context indexes for a 4×4 TU ctxIdx=9 to 11 is context indexes for an 8×8 TU (low frequency)

ctxIdx=12 to 14 is context indexes for an 8×8 TU (high frequency)

ctxIdx=15 to 17 is context indexes for a 16×16 TU to a 32×32 TU (low frequency)

ctxIdx=18 to 20 is context indexes for a 16×16 TU to a 32×32 TU (high frequency)

Therefore, a total number of contexts is 21.

Here, advantages of the configuration will be described through comparison with a comparative example (NPL 3) of the related art.

<Description of Comparative Technique>

Hereinafter, a description will be made of derivation of a context index regarding a transform coefficient presence/absence flag in a coefficient presence/absence flag coding unit related to the comparative technique (NPL 3).

In Modification Example 8 and NPL 3, a flow of a method of selecting context deriving means, illustrated in FIG. 65, is common thereto, and thus description thereof will be omitted. In addition, in step SX103 of FIG. 65, the processes in steps SX103-1 and SX103-2 are common to the Modification Example 8 and the comparative technique, and thus detailed description thereof will be omitted. In other words, also in the comparative technique, a pattern index idxCG corresponding to a derivation pattern is derived on the basis of the above Equation (X) according to determines whether or not a non-zero transform coefficient is present in an adjacent sub-block. Then, a context index regarding a transform coefficient presence/absence flag is derived from the derivation pattern corresponding to the derived pattern index idxCG and a position in a sub-block. The derivation pattern corresponding to the pattern index idxCG is the same as in Modification Example 5-1 described above, and thus detailed description thereof will be omitted.

In a case where the pattern index idxCG is the pattern 0, values of context indexes have the arrangement as illustrated in FIG. 29(*a*). In a case where the pattern index idxCG is the pattern 1, values of context indexes have the arrangement as illustrated in FIG. 29(*b*). In a case where the pattern index idxCG is the pattern 2, values of context indexes have the arrangement as illustrated in FIG. 29(*c*). In a case where the pattern index idxCG is the pattern 3, values of context indexes have the arrangement as illustrated in FIG. 29(*d*).

Hereinafter, with reference to FIG. 74, a detailed description will be made of an operation of adding an offset of each condition to a context index which is obtained from a derivation pattern corresponding to a pattern index idxCG and a position in a sub-block in step SX103-3 of FIG. 65 in the comparative technique.

A description will be made how the derivation of a predetermined offset value corresponding to step SX103-3 of FIG. 65 is performed in the comparative example, by exemplifying a case of luminance. As illustrated in FIG. 74, in the comparative technique, a process SX103-3P corresponding to step SX103-3 of FIG. 65 is performed as follows.

(Step SY201)

It is determined whether or not a process target sub-block position (xCG,yCG) is located in a high frequency.

(Step SY202)

In a case where the process target sub-block position (xCG,yCG) is located in a high frequency (Yes in step SY201), a predetermined offset value for identifying contexts for a low frequency and a high frequency is added to the context index sigCtx. In NPL 3, sigCtx is calculated by sigCtx=sigCtx+3.

(Step SY203)

It is determined whether or not a process target TU size is an 8×8 TU.

(Step SY204)

In a case where the process target TU size is the 8×8 TU (Yes in step SY203), it is determined that a scan direction is the up-right diagonal scan.

(Step SY205)

In a case where a scan direction is the up-right diagonal scan in the process target TU (Yes in step SY204), a predetermined offset value for identifying contexts for the up-right diagonal scan and the horizontal fast scan or the vertical fast scan is added to the context index ctxIdx. In the comparative technique, sigCtx is calculated by sigCtx=sigCtx+9.

(Step SY206)

In a case where a scan direction is not the up-right diagonal scan in the process target TU, that is, a scan direction is the horizontal fast scan or the vertical fast scan (No in step SY204), a predetermined offset value for identifying contexts for the up-right diagonal scan and the horizontal fast scan or the vertical fast scan is added to the context index ctxIdx. In the comparative technique, sigCtx is calculated by sigCtx=sigCtx+15.

(Step SY207)

In a case where the process target TU size is not an 8×8 TU, that is, the size is 16×16, 32×32, 4×16, 16×4, 8×32, or 32×8 (No in step SY203), a predetermined offset value for identifying contexts for the 8×8 TU and another TU is added thereto. In the comparative technique, sigCtx is calculated by sigCtx=sigCtx+21.

As mentioned above, in the comparative technique, the context indexes regarding transform coefficient presence/absence flags for luminance are assigned with values of 0 to 26 as illustrated in FIG. 69.

ctxIdx=0 is a context index for DC ctxIdx=1 to 8 is context indexes for a 4×4 TU ctxIdx=9 to 11 is context indexes for up-right diagonal scan of an 8×8 TU (low frequency)

ctxIdx=12 to 14 is context indexes for up-right diagonal scan of an 8×8 TU (high frequency)

ctxIdx=15 to 17 is context indexes for horizontal fast scan or vertical fast scan of an 8×8 TU (low frequency)

ctxIdx=18 to 20 is context indexes for horizontal fast scan or vertical fast scan of an 8×8 TU (high frequency)

ctxIdx=21 to 23 is context indexes for a 16×16 TU to a 32×32 TU (low frequency)

ctxIdx=24 to 26 is context indexes for a 16×16 TU to a 32×32 TU (high frequency)

Therefore, a total number of contexts is 27.

In the comparative technique, in relation to the 8×8 TU for luminance, contexts regarding transform coefficient presence/absence flags are differentiated from each other in cases where a scan direction is the up-right diagonal scan and the horizontal fast scan or the vertical fast scan. On the other hand, in Modification Example 8, by the use of characteristics in which a tendency (an average of occurrence frequencies of non-zero transform coefficients during the horizontal fast scan and the vertical fast scan) of an occurrence frequency of a non-zero transform coefficient at a coefficient position in a sub-block corresponding to each index pattern idxCG of the horizontal fast scan and the vertical fast scan is highly similar to a tendency of an occurrence frequency of a non-zero transform coefficient during the up-right diagonal scan, contexts regarding transform coefficient presence/absence flags during the up-right diagonal scan, the vertical fast scan, and the horizontal fast scan in the luminance of the 8×8 TU are shared thereamong. Therefore, branch regarding changes in context according to a scan direction can be reduced, and a total number of context indexes regarding transform coefficient presence/absence flags for the luminance can be reduced from 27 to 21, that is, by a total number of six, when compared with the comparative technique. Thus, it is possible to reduce a memory size required to maintain a state of context. In addition, it has been confirmed from the test by the present inventor that, in a case where the patterns illustrated in FIGS. 29(*a*) to 29(*d*) are used as derivation patterns corresponding to the pattern index idxCG, there is no reduction in coding efficiency due to the sharing of contexts regarding transform coefficient presence/absence flags during the up-right diagonal scan, the horizontal fast scan, and the vertical fast scan in luminance of the 8×8 TU including respective context indexes.

[Operations and Effects]

As mentioned above, according to Modification Example 8, it is possible to achieve effects of minimizing a reduction in coding efficiency, simplifying a process of deriving a context index regarding a transform coefficient presence/absence flag, and reducing a memory size through a reduction in the number of contexts.

Modification Example 8-1

In Modification Example 8, as arrangements of context indexes in a sub-block, corresponding to a pattern index idxCG from an 8×8 TU to a 32×32 TU, the patterns illustrated in FIGS. 29(*a*) to 29(*d*) are used in the same manner as in Modification Example 5-1, but the present invention is not limited thereto.

According to the test by the present inventor, the following fact has been confirmed as a tendency of an average occurrence frequency of a non-zero transform coefficient during the up-right diagonal scan, the horizontal fast scan, and the vertical fast scan, in the luminance of an 8×8 TU to a 32×32 TU.

In other words, in a case where the pattern index idxCG is a pattern 0, that is, a value of the sub-block coefficient presence/absence flag is 0 in both of the right adjacent sub-block (xCG+1,yCG) and the lower adjacent sub-block (xCG,yCG+1), there are the following tendencies P0-1 to P0-3.

P0-1: An occurrence frequency of a non-zero transform coefficient is high on average at a position where a coefficient position (xB,yB) in a sub-block satisfies xB+yB<2.

P0-2: An occurrence frequency of a non-zero transform coefficient is approximately intermediate at a position where a coefficient position (xB,yB) in a sub-block satisfies 2≤xB+yB<3 or 2≤xB+yB<4.

P0-3: An occurrence frequency of a non-zero transform coefficient is low at a position where a coefficient position (xB,yB) in a sub-block satisfies xB+yB>3 or xB+yB>4.

Therefore, in consideration of the tendencies, in an 8×8 TU to a 32×32 TU, context indexes in the pattern 0 may be arranged as illustrated in FIG. 61(*a*) of Modification Example 5-6 or as illustrated in FIG. 63(*a*) of Modification Example 5-7.

In a case of FIG. 61(*a*), a context index can be derived from the following Equation.

$$sigCtx=(xB+yB<2)?2:(xB+yB<3)?1:0$$

In a case of FIG. 63(*a*), a context index can be derived from the following Equation.

$$sigCtx=(xB+yB<2)?2:(xB+yB<4)?1:0$$

Hereinafter, whether the determination is performed in "x or less" or "x+1 below" may be changed as appropriate.

In a case where the pattern index idxCG is a pattern 1, that is, a value of the sub-block coefficient presence/absence flag is 0 in the right adjacent sub-block (xCG+1,yCG) and a value of the sub-block coefficient presence/absence flag is 1 in the lower adjacent sub-block (xCG,yCG+1), there are the following tendencies P1-1 to P1-3.

P1-1: An occurrence frequency of a non-zero transform coefficient is high on average at a position where a coefficient position (xB,yB) in a sub-block satisfies yB<1.

P1-2: An occurrence frequency of a non-zero transform coefficient is approximately intermediate at a position where a coefficient position (xB,yB) in a sub-block satisfies 1≤yB<2 or 1≤yB<3.

P1-3: An occurrence frequency of a non-zero transform coefficient is low at a position where a coefficient position (xB,yB) in a sub-block satisfies yB≥2 or yB≥3.

Therefore, in consideration of the tendencies, in an 8×8 TU to a 32×32 TU, context indexes in the pattern 1 may be arranged as illustrated in FIG. 33(*b*) instead of FIG. 29(*b*).

In a case of FIG. 33(*b*), a context index can be derived from the following Equation.

$$sigCtx=(yB<1)?2:(yB<3)?1:0$$

If the configuration is applied to the pattern 1, in the same manner as in Modification Example 8, it is possible to minimize a reduction in coding efficiency and to simplify derivation of a context index regarding a transform coefficient presence/absence flag.

In a case where the pattern index idxCG is a pattern 2, that is, a value of the sub-block coefficient presence/absence flag is 0 in the right adjacent sub-block (xCG+1,yCG) and a value of the sub-block coefficient presence/absence flag is 1 in the lower adjacent sub-block (xCG,yCG+1), there are the following tendencies P2-1 to P2-3.

P2-1: An occurrence frequency of a non-zero transform coefficient is high on average at a position where a coefficient position (xB,yB) in a sub-block satisfies xB<1.

P2-2: An occurrence frequency of a non-zero transform coefficient is approximately intermediate at a position where a coefficient position (xB,yB) in a sub-block satisfies 1≤XB<2 or 1≤XB<3.

P2-3: An occurrence frequency of a non-zero transform coefficient is low at a position where a coefficient position (xB,yB) in a sub-block satisfies xB≥2 or xB≥3.

Therefore, in consideration of the tendencies, in an 8×8 TU to a 32×32 TU, context indexes in the pattern 2 may be arranged as illustrated in FIG. 33(*c*) instead of FIG. 29 (*c*).

In a case of FIG. 33(*c*), a context index can be derived from the following Equation.

$$\text{sigCtx}=(xB<1)?2:(xB<3)?1:0$$

If the configuration is applied to the pattern 2, in the same manner as in Modification Example 8, it is possible to minimize a reduction in coding efficiency and to simplify derivation of a context index regarding a transform coefficient presence/absence flag.

In a case where the pattern index idxCG is a pattern 3, that is, a value of the sub-block coefficient presence/absence flag is 1 in the right adjacent sub-block (xCG+1,yCG) and a value of the sub-block coefficient presence/absence flag is 1 in the lower adjacent sub-block (xCG,yCG+1), there are the following tendency P3-1.

P3-1: An occurrence frequency of a non-zero transform coefficient is high on average or approximately intermediate regardless of a position where a coefficient position (xB,yB) in a sub-block.

Therefore, in consideration of the tendency, in an 8×8 TU to a 32×32 TU, "1" indicating that an occurrence frequency of a non-zero transform coefficient is approximately intermediate may be used instead of "2" indicating that an occurrence frequency of a non-zero transform coefficient is high, in FIG. 29(*d*) illustrating the arrangement of context indexes in the pattern 3.

In this case, a context index may be derived from the following Equation. sigCtx=1

[Operations and Effects]

[[As to Pattern 0]]

As mentioned above, according to the configuration of Modification Example 8-1, in the moving image decoding apparatus 1, the context index deriving means determines a sub-block coefficient presence/absence flag for a right adjacent sub-block which is a sub-block adjacent to the right side and a lower adjacent sub-block which is adjacent to the lower side. When it is determined that a non-zero transform coefficient is not present in either the right adjacent sub-block or the lower adjacent sub-block, on the basis of the determination result, the context index deriving means derives the context index corresponding to a case where an occurrence probability of a non-zero transform coefficient is high in a case where a sum of xB and yB indicating a coefficient position in a sub-block is equal to or smaller than a first threshold value; derives the context index corresponding to a case where an occurrence probability of a non-zero transform coefficient is intermediate in a case where the sum of xB and yB is greater than the first threshold value and is equal to or smaller than a second threshold value; and derives the context index corresponding to a case where an occurrence probability of a non-zero transform coefficient is low in a case where the sum of xB and yB is greater than the second threshold value. Since a context derivation pattern which is more suitable for an actual occurrence probability of a transform coefficient can be realized, it is possible to further minimize a reduction in coding efficiency and to simplify derivation of a context index. Particularly, by setting the first threshold value to 2 and the second threshold value to 3, it is possible to derive a preferable context index which is more suitable for an actual occurrence probability of a non-zero transform coefficient. Particularly, in a case where derivation of a context index is made in common to TUs including an 8×8 TU to a 32×32 TU, it is possible to derive a preferable context index which is more suitable for an actual occurrence probability of a non-zero transform coefficient by setting the first threshold value to 1 and the second threshold value to 2. In addition, the first threshold value may be set to 2, and the second threshold value may be set to 3.

[[As to Patterns 1 and 2]]

As mentioned above, according to the configuration of Modification Example 8-1, in the moving image decoding apparatus 1, the context index deriving means determines a sub-block coefficient presence/absence flag for a right adjacent sub-block which is a sub-block adjacent to the right side and a lower adjacent sub-block which is adjacent to the lower side. When it is determined that a non-zero transform coefficient is not present in one of the right adjacent sub-block and the lower adjacent sub-block, the context index deriving means selects a coefficient position of one of xB and yB indicating a coefficient position in a sub-block in an adjacent direction of a sub-block in which it is determined that a non-zero transform coefficient is not present; derives the context index corresponding to a case where an occurrence probability of a non-zero transform coefficient is high in a case where the coefficient position is equal to or smaller than a first threshold value; derives the context index corresponding to a case where an occurrence probability of a non-zero transform coefficient is intermediate in a case where the coefficient position is greater than the first threshold value and is equal to or smaller than a second threshold value; and derives the context index corresponding to a case where an occurrence probability of a non-zero transform coefficient is low in a case where the coefficient position is greater than the second threshold value. Since a context derivation pattern which is more suitable for an actual occurrence probability of a transform coefficient can be realized, it is possible to minimize a reduction in coding efficiency and to simplify derivation of a context index. Particularly, in a case where derivation of a context index is made in common to TUs including an 8×8 TU to a 32×32 TU, it is possible to derive a preferable context index which is more suitable for an actual occurrence probability of a non-zero transform coefficient by setting the first threshold value to 0 and the second threshold value to 1. In addition, the first threshold value may be set to 0, and the second threshold value may be set to 2.

[[As to Pattern 3] ]

As mentioned above, according to the configuration of Modification Example 8-1, in the moving image decoding apparatus 1, the context index deriving means determines a sub-block coefficient presence/absence flag for a right adjacent sub-block which is a sub-block adjacent to the right side of a process target sub-block and a lower adjacent sub-block which is adjacent to the lower side thereof. When it is determined that a non-zero transform coefficient is present in both the right adjacent sub-block and the lower adjacent sub-block with respect to a process target sub-block, the context index deriving means derives a fixed context index with respect to a non-zero transform coefficient in the process target sub-block on the basis of the determination result. Particularly, a context index of a non-zero transform coefficient which is fixedly derived is preferably set to a context index indicating that an occurrence probability of a non-zero transform coefficient is high. In addition, a context index of a non-zero transform coefficient which is fixedly derived is also preferably set to a context index indicating that an occurrence probability of a non-zero transform coefficient is approximately intermediate. Consequently, since a fixed context index which is more suitable for an actual occurrence probability of a transform coefficient can be derived, it is possible to minimize a reduction in coding efficiency and to simplify derivation of a context index.

Modification Example 8-2

In Modification Examples 8 and 8-1, arrangements of context indexes in a sub-block corresponding to a pattern index idxCG are made in common to an 8×8 TU to a 32×32 TU, but the present invention is not limited thereto. Arrangements of context indexes of patterns 0 to 2 may be adaptively changed in accordance with a scan direction (scan index scanIdx). Therefore, an arrangement of context indexes is changed in consideration of a bias of an occurrence frequency of a non-zero transform coefficient for each scan direction, and thus it is possible to improve coding efficiency when compared with Modification Examples 8 and 8-1. In addition, in a case of Modification Example 8-2, it is assumed that a scan direction (scan index scanIdx) is input to the adjacent sub-block coefficient presence/absence context deriving unit 124*c* from an external device.

FIG. 70 illustrates an example of a pseudo-code for deriving a context index corresponding to each pattern index idxCG in a case where an arrangement of context indexes in a sub-block is changed in accordance with a scan direction (scan index scanIdx).

According to the test by the present inventor, the following fact has been confirmed as each tendency of an occurrence frequency of a non-zero transform coefficient in a pattern 0 during the up-right diagonal scan, the horizontal fast scan, and the vertical fast scan, in an 8×8 TU.

<Case of Up-Right Diagonal Scan (scanIdx==0)>

- An occurrence frequency of a non-zero transform coefficient is high on average at a position where a coefficient position (xB,yB) in a sub-block satisfies xB+yB<2.
- An occurrence frequency of a non-zero transform coefficient is approximately intermediate at a position where a coefficient position (xB,yB) in a sub-block satisfies 2<xB+yB<3.
- An occurrence frequency of a non-zero transform coefficient is low at a position where a coefficient position (xB,yB) in a sub-block satisfies xB+yB>3.

Therefore, in consideration of the tendencies, context indexes in the pattern 0 during the up-right diagonal scan are preferably arranged as illustrated in FIG. 71(*a*).

In a case of FIG. 71(*a*), a context index can be derived from the following Equation.

$$sigCtx=(xB+yB<2)?2:(xB+yB<3)?1:0$$

In addition, the above Equation may be expanded to be represented as the following Equation.

$$sigCtx=(xB+yB<TH1)?2:(xB+yB<TH2)?1:0$$

In other words, in a case where xB+yB is smaller than the threshold value TH1, a context index indicating that an occurrence frequency of a non-zero transform coefficient is high is derived; in a case where xB+yB is equal to or greater than the threshold value TH1 and is smaller than the threshold value TH2, a context index indicating that an occurrence frequency of a non-zero transform coefficient is approximately intermediate is derived; and in other cases (in a case where xB+yB is greater than the threshold value TH2), a context index indicating that an occurrence frequency of a non-zero transform coefficient is low is derived.

A case of FIG. 71(*a*) is a case of the threshold value TH1=2 and TH2=3.

<Case of Horizontal Fast Scan (scanIdx==1)>

In a case of the horizontal fast scan, there is a tendency for non-zero transform coefficients to concentrate on frequency components in the horizontal direction. Particularly, in a case of the pattern 0, there are the following tendencies.

- An occurrence frequency of a non-zero transform coefficient is high on average at a position where a coefficient position (xB,yB) in a sub-block satisfies xB+2×yB<3.
- An occurrence frequency of a non-zero transform coefficient is approximately intermediate at a position where a coefficient position (xB,yB) in a sub-block satisfies 3<xB+2×yB<5.
- An occurrence frequency of a non-zero transform coefficient is low at a position where a coefficient position (xB, yB) in a sub-block satisfies xB+2×yB>5.

Therefore, in consideration of the tendencies, context indexes in the pattern 0 during the vertical fast scan are preferably arranged as illustrated in FIG. 71(*b*).

In a case of FIG. 71(*b*), a context index can be derived from the following Equation.

$$sigCtx=(xB+2*yB<3)?2:(xB+2*yB<5)?1:0$$

In addition, the above Equation may be expanded to be represented as the following Equation.

$$sigCtx=(W1*xB+W2*yB<TH3)?2:(W1*xB+W2*yB<TH4)?1:0$$

In other words, in a case where the weighted sum "W1×xB+W2×yB" is smaller than the threshold value TH3, a context index indicating that an occurrence frequency of a non-zero transform coefficient is high is derived; in a case where the weighted sum "W1×xB+W2×yB" is equal to or greater than the threshold value TH3 and is smaller than the threshold value TH4, a context index indicating that an occurrence frequency of a non-zero transform coefficient is approximately intermediate is derived; and in other cases (in a case where the weighted sum "W1×xB+W2×yB" is greater than the threshold value TH4), a context index indicating that an occurrence frequency of a non-zero transform coefficient is low is derived.

A case of FIG. 71(*b*) is a case of the weighting factor W1=1, the weighting factor W2=2, the threshold value TH3=3, and the threshold value TH4=5. In addition, in a case of the horizontal fast scan, since non-zero transform coefficients concentrate in the horizontal direction, the weighting factor is set to W1=1, the weighting factor is set to W2=1, the threshold value is set to TH3=1, and the threshold value is set to TH4=2, so that a weighted sum is simplified, and thus the context indexes illustrated in FIG. 29(*b*) may be derived. In addition, by setting the weighting factor to W1=1, the weighting factor to W2=3, the threshold value to TH3=4, and the threshold value to TH4=8, an arrangement of context indexes illustrated in FIG. 72(*a*) may be obtained.

<Case of Vertical Fast Scan (scanIdx==2)>

In a case of the vertical fast scan, there is a tendency for non-zero transform coefficients to concentrate on frequency components in the vertical direction. Particularly, in a case of the pattern 0, there are the following tendencies.

- An occurrence frequency of a non-zero transform coefficient is high on average at a position where a coefficient position (xB,yB) in a sub-block satisfies 2×xB+yB<3.

An occurrence frequency of a non-zero transform coefficient is approximately intermediate at a position where a coefficient position (xB,yB) in a sub-block satisfies 3<2×xB+yB<5.

An occurrence frequency of a non-zero transform coefficient is low at a position where a coefficient position (xB,yB) in a sub-block satisfies 2×xB+yB>5.

Therefore, in consideration of the tendencies, context indexes in the pattern 0 during the vertical fast scan are preferably arranged as illustrated in FIG. 71(*c*).

In a case of FIG. 71(*c*), a context index can be derived from the following Equation.

$$sigCtx=(2*xB+yB<3)?2:(2*xB+yB<5)?1:0$$

In addition, the above Equation may be expanded to be represented as the following Equation.

$$sigCtx=(W3*xB+W4*yB<TH5)?2:(W3*xB+W4*yB<TH6)?1:0$$

In other words, in a case where the weighted sum "W3×xB+W4×yB" is smaller than the threshold value TH5, a context index indicating that an occurrence frequency of a non-zero transform coefficient is high is derived; in a case where the weighted sum "W3×xB+W4×yB" is equal to or greater than the threshold value TH5 and is smaller than the threshold value TH6, a context index indicating that an occurrence frequency of a non-zero transform coefficient is approximately intermediate is derived; and in other cases (in a case where the weighted sum "W3×xB+W4×yB" is greater than the threshold value TH6), a context index indicating that an occurrence frequency of a non-zero transform coefficient is low is derived.

A case of FIG. 71(*c*) is a case of the weighting factor W3=2, the weighting factor W4=1, the threshold value TH5=3, and the threshold value TH6=5. In addition, in a case of the horizontal fast scan, since non-zero transform coefficients concentrate in the vertical direction, the weighting factor is set to W1=1, the weighting factor is set to W2=1, the threshold value is set to TH5=1, and the threshold value is set to TH6=2, so that a weighted sum is simplified, and thus the context indexes illustrated in FIG. 29(*c*) may be derived. In addition, by setting the weighting factor to W1=3, the weighting factor to W2=1, the threshold value to TH5=4, and the threshold value to TH6=8, an arrangement of context indexes illustrated in FIG. 72(*b*) may be obtained.

(In Cases of Patterns 1 to 3)

As illustrated in FIGS. 71(*d*) to 71(*f*), there are the same derivation method and arrangements of the same values as in the Modification Example 5-1 of FIGS. 29(*b*), 29(*c*) and 29(*d*).

In addition, the patterns 1 to 3 may have the same derivation method and arrangements of the same values as the patterns 1 to 3 in any one of Modification Examples 5-1 to 5-7.

Further, also in the patterns 1 and 2, in consideration a bias of a non-zero transform coefficient due to a directivity for each scan direction, an arrangement of context indexes may be adaptively changed for each scan direction in the same manner as in the pattern 0. For example, context indexes are derived by using a pseudo-code illustrated in FIG. 73. Furthermore, the patterns 0 and 3 are the same as the patterns 0 and 3 of the pseudo-code illustrated in FIG. 70, and thus description thereof will be omitted.

(Case of Pattern 1)

In a case of the up-right diagonal scan, the context indexes illustrated in FIG. 29(*b*) are derived from the following Equation.

$$sigCtx=(yB==0)?2:(yB==1)?1:0$$

In a case of the horizontal fast scan, the context indexes illustrated in FIG. 72(*a*) are derived from the following Equation.

$$sigCtx=(xB+3*yB<4)?2:(xB+3*yB<8)?1:0$$

In a case of the horizontal fast scan, the context indexes illustrated in FIG. 72(*b*) are derived from the following Equation.

$$sigCtx=(3*xB+yB<4)?2:(3*xB+yB<8)?1:0$$

(Case of Pattern 2)

In a case of the up-right diagonal scan, the context indexes illustrated in FIG. 29(*c*) are derived from the following Equation.

$$sigCtx=(xB==0)?2:(xB==1)?1:0$$

In a case of the horizontal fast scan, the context indexes illustrated in FIG. 72(*a*) are derived from the following Equation.

$$sigCtx=(xB+3*yB<4)?2:(xB+3*yB<8)?1:0$$

In a case of the horizontal fast scan, the context indexes illustrated in FIG. 72(*b*) are derived from the following Equation.

$$sigCtx=(3*xB+yB<4)?2:(3*xB+yB<8)?1:0$$

As mentioned above, according to the configuration of Modification Example 8-2, in the moving image decoding apparatus 1, the context index deriving means determines a sub-block coefficient presence/absence flag for a right adjacent sub-block which is a sub-block adjacent to the right side of a process target sub-block and a lower adjacent sub-block which is adjacent to the lower side thereof, and derives a context index on the basis of the determination result.

When a scan index indicates up-right diagonal scan, the context index deriving means derives the context index corresponding to a case where an occurrence probability of a non-zero transform coefficient is high in a case where a sum of xB and yB indicating a coefficient position in a sub-block is smaller than a first threshold value; derives the context index corresponding to a case where an occurrence probability of a non-zero transform coefficient is intermediate in a case where the sum of xB and yB is equal to or greater than the first threshold value and is smaller than a second threshold value; and derives the context index corresponding to a case where an occurrence probability of a non-zero transform coefficient is low in a case where the sum of xB and yB is equal to or greater than the second threshold value.

In addition, when a scan index indicates horizontal fast scan, the context index deriving means derives the context index corresponding to a case where an occurrence probability of a non-zero transform coefficient is high in a case where a value of a weight sum of W1×xB+W2×yB defined from xB and yB indicating a coefficient position in a sub-block is smaller than a third threshold value; derives the context index corresponding to a case where an occurrence probability of a non-zero transform coefficient is intermediate in a case where a value of the weight sum of W1×xB+W2×yB is equal to or greater than the third threshold value and is smaller than a fourth threshold value; and derives the context index corresponding to a case where an occurrence probability of a non-zero transform coefficient is low in a case where a value of the weight sum of W1×xB+W2×yB is equal to or greater than the fourth threshold value.

Further, when a scan index indicates the vertical fast scan, the context index deriving means derives the context index corresponding to a case where an occurrence probability of a non-zero transform coefficient is high in a case where a value of a weight sum of W3×xB+W4×yB defined from xB and yB indicating a coefficient position in a sub-block is smaller than a third threshold value; derives the context index corresponding to a case where an occurrence probability of a non-zero transform coefficient is intermediate in a case where a value of the weight sum of W3×xB+W4×yB is equal to or greater than the third threshold value and is smaller than a fourth threshold value; and derives the context index corresponding to a case where an occurrence probability of a non-zero transform coefficient is low in a case where a value of the weight sum of W3×xB+W4×yB is equal to or greater than the fourth threshold value.

Therefore, since a context derivation pattern is changed in accordance with a scan index, it is possible to realize a context derivation pattern which is more suitable for an actual occurrence probability of transform coefficient for each scan direction indicated by the scan index, and thus to improve coding efficiency. Particularly, in a case where derivation of a context index is made in common to TUs including an 8×8 TU to a 32×32 TU, it is possible to derive a preferable context index which is more suitable for an actual occurrence probability of a non-zero transform coefficient by setting the first threshold value to 2 and the second threshold value to 3 in relation to the up-right diagonal scan when the corresponding determination result indicates that a non-zero transform coefficient is not present in either the right adjacent sub-block or the lower adjacent sub-block. In addition, the first threshold value may be set to 1, and the second threshold value may be set to 2. Further, in a case of the horizontal fast scan, by setting the weighting factor W1 to 1, the weighting factor W2 to 2, the third threshold value TH3 to 3, and the fourth threshold value TH4 to 5, it is possible to derive a preferable context index which is more suitable for an actual occurrence probability of a non-zero transform coefficient. Furthermore, in a case of the vertical fast scan, by setting the weighting factor W2 to 2, the weighting factor W2 to 1, the third threshold value TH3 to 3, and the fourth threshold value TH4 to 5, it is possible to derive a preferable context index which is more suitable for an actual occurrence probability of a non-zero transform coefficient.

In addition, it is possible to derive a preferable context index which is more suitable for an actual occurrence probability of a non-zero transform coefficient by setting the first threshold value to 1 and the second threshold value to 2 in relation to the up-right diagonal scan when the corresponding determination result indicates that a non-zero transform coefficient is not present in one of the right adjacent sub-block and the lower adjacent sub-block. Further, in a case of the horizontal fast scan, by setting the weighting factor W1 to 1, the weighting factor W2 to 3, the third threshold value TH3 to 4, and the fourth threshold value TH4 to 8, it is possible to derive a preferable context index which is more suitable for an actual occurrence probability of a non-zero transform coefficient. Furthermore, in a case of the vertical fast scan, by setting the weighting factor W2 to 3, the weighting factor W2 to 1, the third threshold value TH3 to 4, and the fourth threshold value TH4 to 8, it is possible to derive a preferable context index which is more suitable for an actual occurrence probability of a non-zero transform coefficient.

In addition, in a case where the corresponding determination result indicates that a non-zero transform coefficient is present in both of the right adjacent sub-block and the lower adjacent sub-block, a fixed context index is derived, and thus it is possible to simplify derivation of a context index.

Here, the weighting factors W1 to W4 used in W1×xB+W2×yB and W3×xB+W4×yB which are weighted sums of xB and yB are not limited the above-described ones, and may be arbitrarily set according to a directivity of a scan type. In addition, the threshold values TH1 to TH6 are not limited to the above-described ones, and may be set according to an occurrence frequency of a non-zero transform coefficient as appropriate.

In addition, in Modification Examples 8 to 8-2, an example in which the adjacent sub-block coefficient presence/absence context deriving unit 124*c* derives a context index of a non-zero transform coefficient for a 8×8 TU to a 32×32 TU has been described, but may be applied to a 4×4 TU. In a case of the 4×4 TU, there is no adjacent sub-block having a sub-block coefficient presence/absence flag which can be referred to, and thus a pattern index idxCG is only 0. In this case, since context index derivation of a non-zero transform coefficient for a 4×4 TU to a 32×32 TU can be unified by the adjacent sub-block coefficient presence/absence context deriving unit 124*c* except for DC, it is possible to achieve effects of reducing a circuit scale, simplifying a context index deriving process, and reducing the number of contexts. In addition, also in relation to a DC component from a 4×4 TU to a 32×32 TU, a context index may be derived by the adjacent sub-block coefficient presence/absence context deriving unit 124*c*. Consequently, it is possible to achieve greater effects of reducing a circuit scale, simplifying a context index deriving process, and reducing the number of contexts.

(Flow of Process by Transform Coefficient Decoding Unit 120)

Hereinafter, with reference to FIGS. 39 to 42, a description will be made of a flow of a process performed by the transform coefficient decoding unit 120.

FIG. 39 is a flowchart illustrating a flow of a transform coefficient decoding process performed by the transform coefficient decoding unit 120.

(Step S21)

First, the coefficient decoding control unit 123 included in the transform coefficient decoding unit 120 sets a scan index scanIdx.

(Step S22)

Next, the last coefficient position decoding unit 121 included in the transform coefficient decoding unit 120 decodes the syntaxes last_significant_coeff_x and last_significant_coeff_y indicating a position of the last transform coefficient according to a scan order.

(Step S23)

Next, the coefficient decoding control unit 123 starts a loop in the units of sub-blocks. In addition, with a sub-block having the last coefficient as a starting position of the loop, a decoding process is performed in the sub-block units in a backward scan order of the sub-block scan.

(Step S24)

Next, the sub-block coefficient presence/absence flag decoding unit 127 included in the transform coefficient decoding unit 120 decodes the sub-block coefficient presence/absence flag significant_coeff_group_flag.

(Step S25)

Next, the coefficient presence/absence flag coding unit 124 included in the transform coefficient decoding unit 120 decodes each non-zero transform coefficient presence/absence flag significant_coeff_flag in a target sub-block.

(Step S26)

Next, the coefficient value decoding unit 125 included in the transform coefficient decoding unit 120 decodes a sign and a size of a non-zero transform coefficient in a target small group. This is performed by the respective syntaxes coeff_abs_level_greater1_flag, coeff_abs_level_greater2_flag, coeff_sign_flag, and coeff_abs_level_remaining.

(Step S27)

This step is a terminal end of the loop having the sub-block as the unit (a terminal end of the loop having the sub-block of step S23 as the unit).

[Decoding Process of Sub-Block Coefficient Presence/Absence Flag]

FIG. 40 is a flowchart more specifically illustrating the process (step S24 of FIG. 39) of decoding the sub-block coefficient presence/absence flag.

The sub-block coefficient presence/absence flag decoding unit 127 initializes a value of the sub-block coefficient presence/absence flag significant_coeff_group_flag included in a target frequency domain before starting a loop of the sub-block. This initialization process is performed by setting a sub-block coefficient presence/absence flag of a sub-block including a DC coefficient and a sub-block coefficient presence/absence flag of a sub-block including the last coefficient to 1, and by setting other sub-block coefficient presence/absence flags to 0.

(Step S244)

The sub-block coefficient presence/absence flag coding unit 124 acquires a position of the sub-block.

(Step S247)

The coefficient presence/absence flag coding unit 124 determines whether or not the target sub-block is a sub-block including the last coefficient or a DC coefficient.

(Step S248)

In a case where the target sub-block is not a sub-block including the last coefficient or the DC coefficient (No in step S247), the coefficient presence/absence flag coding unit 124 decodes the sub-block coefficient presence/absence flag significant_coeff_group_flag.

[Decoding Process on Coefficient Presence/Absence Flag]

FIG. 41 is a flowchart more specifically illustrating the process (step S25 of FIG. 39) of decoding each non-zero transform coefficient presence/absence flag significant_coeff_flag in the sub-block.

(Step S254)

Next, the coefficient presence/absence flag coding unit 124 starts a loop in the target sub-block. The loop is a loop having a frequency component as the unit.

(Step S255)

Next, the coefficient presence/absence flag coding unit 124 acquires a position of a transform coefficient.

(Step S256)

Next, the coefficient presence/absence flag coding unit 124 determines whether or not a non-zero transform coefficient is present in the target sub-block.

(Step S257)

In a case where a non-zero transform coefficient is present in the target sub-block (Yes in step S256), the coefficient presence/absence flag coding unit 124 determines whether or not the position of the transform coefficient is the last position.

(Step S253)

In a case where the position of the transform coefficient is not the last position (No in step S257), the coefficient presence/absence flag coding unit 124 derives a context index with respect to the process target transform coefficient in a predetermined method. Details of the operation will be described later.

(Step S258)

After step S253, the coefficient presence/absence flag coding unit 124 decodes the transform coefficient presence/absence flag significant_coeff_flag.

(Step S259)

This step is a terminal end of the loop having the frequency component in the target sub-block as the unit (a terminal end of the loop in the sub-block of step S259).

<<Context Index Deriving Process>>

FIG. 42 is a flowchart illustrating an example of a flow of the context index deriving process in the coefficient presence/absence flag coding unit 124. In other words, FIG. 42 is a flowchart illustrating operations (details of the operation of step S253 of FIG. 41) of the TU size determining unit 124*a*, the position context deriving unit 124*b*, and the adjacent sub-block coefficient presence/absence context deriving unit 124*c* included in the coefficient presence/absence flag coding unit 124.

(Step SB101)

The TU size determining unit 124*a* determines whether or not a TU size is smaller than a predetermined size. For example, the following Expression is used for the determination.

$$\log 2\text{TrafoWidth}+\log 2\text{TrafoHeight}<TH\text{Size}$$

In addition, for example, 6 is used as the threshold value THSize. In a case where 6 is used as the threshold value THsize, it is determined that a 4×4 TU is smaller than the predetermined size. It is determined that an 8×8 TU, a 16×4 TU, a 4×16 TU, a 16×16 TU, a 32×4 TU, a 4×32 TU, and a 32×32 TU are equal to or larger than the predetermined size. Further, the threshold value THSize may be 0. In this case, it is determined that the 4×4 TU to the 32×32 TU are equal to or larger than the predetermined size.

(Step SB104)

In a case where the process target TU size is equal to or larger than the predetermined size (No in step SB101), the TU size determining unit 124*a* selects the adjacent sub-block coefficient presence/absence context deriving unit 124*c* as context deriving means, and a context index of the target transform coefficient is derived by the selected adjacent sub-block coefficient presence/absence context deriving unit 124*c*.

(Step SB105)

In a case where the process target TU size is smaller than the predetermined size (Yes in step SB101), the TU size determining unit 124*a* selects the position context deriving unit 124*b* as context deriving means, and a context index of the target transform coefficient is derived by the selected position context deriving unit 124*b*.

In addition, the TU size determining unit 124*a* is not limited thereto, and may perform a process of deriving a context index ctxIdx which is common to TU sizes from the 4×4 TU to the 32×32 TU. In other words, the TU size determining unit 124*a* may fixedly select either the position context deriving unit 124*b* or the adjacent sub-block coefficient presence/absence context deriving unit 124*c* regardless of a TU size.

[Moving Image Coding Apparatus 2]

With reference to FIGS. 43 to 47, a description will be made of a configuration of the moving image coding apparatus 2 according to the present embodiment. The moving image coding apparatus 2 is a coding apparatus which employs the technique used in the H. 264/MPEG-4. AVC standard, and the technique proposed in High-Efficiency Video Coding (HEVC) which is a succeeding codec thereof. In the following, the same parts as described above are given the same reference numerals, and description thereof will be omitted.

FIG. 43 is a block diagram illustrating a configuration of the moving image coding apparatus 2. As illustrated in FIG. 43, the moving image coding apparatus 2 includes a predicted image generating unit 21, a transform/quantization unit 22, an inverse quantization/inverse transform unit 23, an adder 24, a frame memory 25, a loop filter 26, a variable length code coding unit 27, and a subtractor 28. In addition, as illustrated in FIG. 43, the predicted image generating unit 21 includes an intra-predicted image generating unit 21*a*, a motion vector detecting unit 21*b*, an inter-predicted image generating unit 21*c*, a prediction type control unit 21*d*, and a motion vector redundancy deleting unit 21*e*. The moving image coding apparatus 2 is an apparatus which codes a moving image #10 (coding target image) so as to generate the coded data #1.

(Predicted Image Generating Unit 21)

The predicted image generating unit 21 recursively splits a process target LCU into one or a plurality of lower CUs, and further splits each leaf CU into one or a plurality of partitions, so as to generate an inter-predicted image Pred_Inter using inter-frame prediction or an intra-predicted image Pred_Inra using intra-frame prediction. The generated inter-predicted image Pred_Intra and intra-predicted image Pred_Intra are supplied to the adder 24 and the subtractor 28 as predicted images Pred.

In addition, the predicted image generating unit 21 omits decoding of other parameters belonging to a PU in relation to a PU to which a skip mode is applied. Further, (1) an aspect of split into lower CUs and partitions in a target LCU, (2) whether or not a skip mode is applied, and (3) whether an inter-predicted image Pred_Intra or an intra-predicted image Pred_Intra is generated for each partition, are determined so as to optimize coding efficiency.

(Intra-Predicted Image Generating Unit 21*a*)

The intra-predicted image generating unit 21*a* generates a predicted image Pred_Intra regarding each partition by using inter-frame prediction. Specifically, (1) a prediction mode used for intra-prediction in each partition is selected, and (2) a predicted image Pred_Intra is generated from a decoded image P by using the selected prediction mode. The intra-predicted image generating unit 21*a* supplies the generated intra-predicted image Pred_Intra to the prediction type control unit 21*d*.

In addition, the intra-predicted image generating unit 21*a* determines an estimated prediction mode for a target partition from a prediction mode which is assigned to a peripheral partition of the target partition, and supplies an estimated prediction mode flag indicating whether or not the estimated prediction mode is the same as a prediction mode which is actually selected for the target partition, to the variable length code coding unit 27 via the prediction type control unit 21*d* as part of an intra-prediction parameter PP_Intra. The variable length code coding unit 27 includes the flag in the coded data #1.

Further, in a case where the estimated prediction mode for the target partition is different from the prediction mode which is actually selected for the target partition, the intra-predicted image generating unit 21*a* supplies a remaining prediction mode index indicating a prediction mode for the target partition, to the variable length code coding unit 27 via the prediction type control unit 21*d* as part of the intra-prediction parameter PP_Intra. The variable length code coding unit 27 includes the remaining prediction mode index in the coded data #1.

In addition, in a case where the predicted image Pred_Intra is generated, the intra-predicted image generating unit 21*a* selects a prediction mode which causes coding efficiency to be further improved, from among the prediction modes illustrated in FIG. 11, and applies the selected prediction mode.

(Motion Vector Detecting Unit 21*b*)

The motion vector detecting unit 21*b* detects a motion vector mv regarding each partition. Specifically, (1) an adaptive filtered decoded image P_ALF' used as a reference image is selected, and (2) a region which is most approximate to the target partition in the selected adaptive filtered decoded image P_ALF' is searched, so that the motion vector mv regarding the target partition is detected. Here, the adaptive filtered decoded image P_ALF' is an image obtained by the loop filter 26 performing a filter process on a decoded image in which decoding of all frames have already been completed, and the motion vector detecting unit 21*b* may read a pixel value of each pixel forming the adaptive filtered decoded image P_ALF' from the frame memory 25. The motion vector detecting unit 21*b* supplies the detected motion vector mv to the inter-predicted image generating unit 21*c* and the motion vector redundancy deleting unit 21*e* along with a reference image index RI for designating the adaptive filtered decoded image P_ALF' used as a reference image.

(Inter-Predicted Image Generating Unit 21*c*)

The inter-predicted image generating unit 21*c* generates a motion compensation image me regarding each inter-prediction partition through inter-frame prediction. Specifically, the motion compensation image me is generated from the adaptive filtered decoded image P_ALF' designated by the reference image index RI which is supplied from the motion vector detecting unit 21*b*, by using the motion vector mv supplied from the motion vector detecting unit 21*b*. In the same manner as the motion vector detecting unit 21*b*, the inter-predicted image generating unit 21*c* may read a pixel value of each pixel forming the adaptive filtered decoded image P_ALF' from the frame memory 25. The inter-predicted image generating unit 21*c* supplies the generated motion compensation image me (inter-predicted image Pred_Inter) to the prediction type control unit 21*d* along with the reference image index RI supplied from the motion vector detecting unit 21*b*.

(Prediction Type Control Unit 21*d*)

The prediction type control unit 21*d* compares the intra-predicted image Pred_Intra and the inter-predicted image Pred_Inter with a coding target image, and selects whether intra-prediction or inter-prediction is performed. In a case where the intra-prediction is selected, the prediction type control unit 21*d* supplies the intra-predicted image Pred_Intra to the adder 24 and the subtractor 28 as a predicted image Pred, and also supplies the intra-prediction parameter PP_Intra which is supplied from the intra-predicted image generating unit 21*a*, to the variable length code coding unit 27. On the other hand, in a case where the inter-prediction is selected, the prediction type control unit 21*d* supplies the inter-predicted image Pred_Inter to the adder 24 and the subtractor 28 as a predicted image Pred, and also supplies, to the variable length code coding unit 27, the reference image index RI, and an estimated motion vector index PMVI and a motion vector residual MVD which are supplied from the motion vector redundancy deleting unit 21*e* described later, as inter-prediction parameters PP_Inter. In addition, the prediction type control unit 21*d* supplies prediction type information Pred_type indicating which one of the intra-predicted image Pred_Intra and the inter-predicted image Pred_Inter has been selected, to the variable length code coding unit 27.

(Motion Vector Redundancy Deleting Unit 21*e*)

The motion vector redundancy deleting unit 21*e* deletes redundancy from the motion vector mv which has been detected by the motion vector detecting unit 21*b*. Specifically, (1) an estimation method used to estimate the motion vector mv is selected, (2) an estimated motion vector pmv is derived according to the selected estimation method, and (3) the motion vector residual MVD is generated by subtracting the estimated motion vector pmv from the motion vector mv. The motion vector redundancy deleting unit 21*e* supplies the generated motion vector residual MVD to the prediction type control unit 21*d* along with the estimated motion vector index PMVI indicating the selected estimation method.

(Transform/Quantization Unit 22)

The transform/quantization unit 22 (1) performs frequency transform such as discrete cosine transform (DCT) on a prediction residual D obtained by subtracting the predicted image Pred from the coding target image, for each block (transform unit), (2) quantizes a transform coefficient Coeff_IQ which is obtained through the frequency transform, and (3) supplies the transform coefficient Coeff obtained through the quantization to the variable length code coding unit 27 and the inverse quantization/inverse transform unit 23. In addition, the transform/quantization unit 22 (1) selects a quantization step QP used for the quantization for each TU, (2) supplies a quantization parameter difference Δpq indicating a size of the selected quantization step QP to the variable length code coding unit 27, and (3) supplies the selected quantization step QP to the inverse quantization/inverse transform unit 23. Here, the quantization parameter difference Δpq indicates a difference value obtained by subtracting a value of a quantization parameter qp' regarding a TU which has previously undergone frequency transform and quantization from a quantization parameter qp (for example, $QP=2^{pq/6}$) regarding a TU which undergoes frequency transform and quantization.

In addition, the DCT performed by the transform/quantization unit 22 is given by, for example, the following Equation (2) in a case where a size of a target block is 8×8 pixels, and an unquantized transform coefficient for a horizontal frequency u and a vertical frequency v is denoted by Coeff_IQ(u,v) (where 0≤u≤7 and 0≤v≤7).

[Equation 2]

$$\text{Coeff\_IQ}(u, v) = \frac{1}{4}C(u)C(v)\sum_{i=0}^{7}\sum_{j=0}^{7}D(i, j)\cos\left\{\frac{(2i+1)u\pi}{16}\right\}\cos\left\{\frac{(2j+1)v\pi}{16}\right\} \quad (2)$$

Here, D(i,j) (where 0≤u≤7 and 0≤v≤7) indicates a prediction residual D at a position (i,j) in a target block. In addition, C(u) and C(v) are given as follows.

$$C(u)=1/\sqrt{2}\,(u=0)$$

$$C(u)=1\,(u\neq 0)$$

$$C(v)=1/\sqrt{2}\,(v=0)$$

$$C(v)=1\,(v\neq 0)$$

(Inverse Quantization/Inverse Transform Unit 23)

The inverse quantization/inverse transform unit 23 (1) inversely quantizes the quantized transform coefficient Coeff, (2) performs inverse frequency transform such as inverse discrete cosine transform (DCT) on the transform coefficient Coeff_IQ obtained through the inverse quantization, and (3) supplies the prediction residual D to the adder 24. The quantization step QP which is supplied from the transform/quantization unit 22 is used to inversely quantize the quantized transform coefficient Coeff. In addition, the prediction residual D which is output from the inverse quantization/inverse transform unit 23 is obtained by adding an quantization error to the prediction residual D which is input to the transform/quantization unit 22, but, here, for simplification, the common name is used. More specific operations of the inverse quantization/inverse transform unit 23 is substantially the same as the inverse quantization/inverse transform unit 13 included in the moving image decoding apparatus 1.

(Adder 24)

The adder 24 adds the predicted image Pred selected in the prediction type control unit 21*d* to the prediction residual D generated in the inverse quantization/inverse transform unit 23, so as to generate a (local) decoded image P. The generated (local) decoded image P generated in the adder 24 is supplied to the loop filter 26 and is also stored in the frame memory 25 so as to be used as a reference image in intra-prediction.

(Variable Length Code Coding Unit 27)

The variable length code coding unit 27 performs variable length coding on (1) the quantized transform coefficient Coeff and Δqp which are supplied from the transform/quantization unit 22, (2) the quantization parameters (the inter-predicted image Pred_Inter and the intra-predicted image Pred_Intra) supplied from the prediction type control unit 21*d*, (3) the prediction type information Pred_type, and (4) a filter parameter FP supplied from the loop filter 26, so as to generate the coded data #1.

FIG. 44 is a block diagram illustrating a configuration of the variable length code coding unit 27. As illustrated in FIG. 44, the variable length code coding unit 27 includes a quantized residual information coding unit 271 which codes the quantized transform coefficient Coeff, a prediction parameter coding unit 272 which codes the prediction parameter PP, a prediction type information coding unit 273 which codes the prediction type information Pred_type, and a filter parameter coding unit 274 which codes the filter parameter PP. A specific configuration of the quantized residual information coding unit 271 will be described later, and thus description thereof will be omitted here.

(Subtractor 28)

The subtractor 28 subtracts the predicted image Pred selected in the prediction type control unit 21*d* from the coding target image so as to generate the prediction residual D. The prediction residual D generated in the subtractor 28 undergoes frequency transform and quantization in the transform/quantization unit 22.

(Loop Filter 26)

The loop filter 26 functions (1) as a deblocking filter (DF) which performs smoothing (deblock process) on a peripheral image on a block boundary or a partition boundary in the decoded image P, and (2) as an adaptive filter (ALF) of performing an adaptive filter process on the image to which the deblocking filter has been applied, by using the filter parameter FP.

(Details of Quantized Residual Information Coding Unit 271)

The quantized residual information coding unit 271 performs context-based adaptive binary arithmetic coding on the quantized transform coefficient Coeff (xC,yC) so as to generate quantized residual information QD. Syntax included in the quantized residual information QD which is generated is as described above.

In addition, xC and yC are indexes indicating a position of each frequency component in a frequency domain, and are indexes corresponding to the above-described horizontal frequency u and vertical frequency v. Further, hereinafter, the quantized transform coefficient Coeff is simply referred to as a transform coefficient Coeff in some cases.

FIG. 45 is a block diagram illustrating a configuration of the quantized residual information coding unit 271. As illustrated in FIG. 45, the quantized residual information coding unit 271 includes a transform coefficient coding unit 220 and an arithmetic code coding unit 230.

(Arithmetic Code Coding Unit 230)

The arithmetic code coding unit 230 codes each Bin supplied from the transform coefficient coding unit 220 by referring to context, so as to generate the quantized residual information QD, and includes a context recording/updating unit 231 and a bit coding unit 232 as illustrated in FIG. 45.

(Context Recording/Updating Unit 231)

The context recording/updating unit 231 has a configuration for recording and updating a context variable CV which is managed by each context index ctxIdx. Here, the context variable CV includes (1) a superior symbol MPS (most probable symbol) of which an occurrence probability is high, and (2) a probability state index pStateIdx for designating an occurrence probability of the superior symbol MPS.

The context recording/updating unit 231 updates the context variable CV by referring to the context index ctxIdx supplied from each constituent element included in the transform coefficient coding unit 220 and a value of a Bin coded by the bit coding unit 232, and records the updated context variable CV until the next update. In addition, the superior symbol MPS is 0 or 1. Further, the superior symbol MPS and the probability state index pStateIdx are updated whenever the bit coding unit 232 decodes a single Bin.

In addition, the context index ctxIdx may directly designate context for each frequency component, and may be an increment value from an offset of a context index which is set for each process target TU (this is also the same for the following).

[Bit Coding Unit 232]

The bit coding unit 232 codes each Bin supplied from each constituent element included in the transform coefficient coding unit 220 by referring to the context variable CV which is recorded in the context recording/updating unit 231, so as to generate the quantized residual information QD. In addition, a value of the coded Bin is also supplied to the context recording/updating unit 231 so as to be referred to for updating the context variable CV.

(Transform Coefficient Coding Unit 220)

As illustrated in FIG. 45, the transform coefficient coding unit 220 includes a last coefficient position coding unit 221, a scan order table storage unit 222, a coefficient coding control unit 223, a coefficient presence/absence flag coding unit 224, a coefficient value coding unit 225, a coded coefficient storage unit 226, a sub-block coefficient presence/absence flag coding unit 227, and syntax deriving unit 228.

[Syntax Deriving Unit 228]

The syntax deriving unit 228 refers to each value of the transform coefficient Coeff (xC,yC), and derives each value of syntaxes last_significant_coeff_x, last_significant_coeff_y, significant_coeff_flag, coeff_abs_level_greater1_flag, coeff_abs_level_greater2_flag, coeff_sign_flag, and coeff_abs_level_remaining, for specifying the transform coefficient in a target frequency domain. The derived each syntax is supplied to the coded coefficient storage unit 226. In addition, among the derived syntaxes, last_significant_coeff_x and last_significant_coeff_y are also supplied to the coefficient coding control unit 223 and the last coefficient position coding unit 221. Further, among the derived syntaxes, significant_coeff_flag is also supplied to the coefficient presence/absence flag coding unit 224. Furthermore, the content indicated by each syntax has been described above, and thus description thereof will be omitted here.

[Last Coefficient Position Coding Unit 221]

The last coefficient position coding unit 221 generates Bins indicating the syntaxes last_significant_coeff_x and last_significant_coeff_y supplied from the syntax deriving unit 228. In addition, the generated each Bin is supplied to the bit coding unit 232. Further, the context index ctxIdx for designating context which is referred to for coding the Bin of the syntaxes last_significant_coeff_x and last_significant_ coeff_y is supplied to the context recording/updating unit 231.

[Scan Order Table Storage Unit 222]

The scan order table storage unit 222 stores a table which provides a position of a process target frequency component in a frequency domain by using a size of a process target TU (block), a scan index indicating the type of scan direction, and a frequency component identification index which is given according to a scan order, as arguments. An example of such a scan order table may include ScanOrder illustrated in FIGS. 4 and 5.

In addition, the scan order table storage unit 222 stores a sub-block scan order table for designating a scan order of sub-blocks. Here, the sub-block scan order table is designated by a size of a process target TU (block) and the scan index scanIdx associated with a prediction mode index of an intra-prediction mode.

The scan order table and sub-block scan order table stored in the scan order table storage unit 222 are the same as those stored in the scan order table storage unit 122 of the moving image decoding apparatus 1, and thus description thereof will be omitted here.

[Coefficient Coding Control Unit 223]

The coefficient coding control unit 223 has a configuration for controlling an order of a coding process in each constituent element included in the quantized residual information coding unit 271.

Specifically, the coefficient coding control unit 223 performs sub-block splitting, the supply of each sub-block position according to a sub-block scan order, and the supply of a position of each frequency component in a sub-block according to a scan order.

The coefficient coding control unit 223 derives a sub-block size in accordance with a scan order and/or a TU size, and splits the TU in the derived sub-block size so as to split the TU into sub-blocks. A splitting method is as described in FIGS. 14 and 15, and thus description thereof will be omitted here.

(In Case where TU Size is Equal to or Smaller than Predetermined Size)

In a case where a TU size is equal to or smaller than a predetermined size (for example, a 4×4 TU or the like), the coefficient coding control unit 223 specifies a position of the last non-zero transform coefficient according to a forward scan by referring to the syntaxes last_significant_coeff_x and last_significant_coeff_y supplied from the syntax deriving unit 228, and supplies a position (xC,yC) of each frequency component to the sub-block coefficient presence/absence flag coding unit in a backward scan order of a scan order which uses the specified position of the last non-zero transform coefficient as a starting point and is given by the sub-block scan order table stored in the scan order table storage unit 222.

In addition, the coefficient coding control unit 223 supplies a size of a process target TU to each constituent element (not illustrated) included in the transform coefficient coding unit 220.

Further, the coefficient coding control unit 223 may supply the position (xC,yC) of each frequency component to the coefficient presence/absence flag coding unit 224 in a forward scan order of a scan order which is given by the scan order table stored in the scan order table storage unit 222.

(Case of TU Size is Larger than Predetermined Size)

In a case where a TU size is larger than a predetermined size, the coefficient coding control unit 223 specifies a position of the last non-zero transform coefficient according to a forward scan by referring to the syntaxes last_significant_coeff_x and last_significant_coeff_y supplied from the syntax deriving unit 228, and supplies a position (xCG,yCG) of each sub-block to the sub-block coefficient presence/absence flag coding unit 227 in a backward scan order of a scan order which uses a position of a sub-block including the specified position of the last non-zero transform coefficient as a starting point and is given by the sub-block scan order table stored in the scan order table storage unit 222.

Further, in relation to a process target sub-block, the coefficient coding control unit 223 supplies a position (xC, yC) of each frequency component included in the process target sub-block to the coefficient presence/absence flag coding unit 224 in a backward scan order given by the scan order table stored in the scan order table storage unit 222. Here, as a scan order of each frequency component included in the process target sub-block, in a case of intra-prediction, a scan order (any one of the horizontal fast scan, the vertical fast scan, and the up-right diagonal scan) indicated by a scan index scanIdx which is designated by the intra-prediction mode index IntraPredMode and a value log 2TrafoSize for designating a TU size may be used, and, in a case of inter-prediction, the up-right diagonal scan may be used. Furthermore, the coefficient coding control unit 223 supplies a size of a corresponding TU and a scan index scanIdx associated with a prediction mode of the TU, to the coefficient presence/absence flag coding unit 224.

As mentioned above, the coefficient coding control unit 223 changes a scan order for each intra-prediction mode. Generally, Generally, since an intra-prediction mode and a bias of a transform coefficient are correlated with each other, a scan order is changed according to the intra-prediction mode, and a scan suitable for biases of the sub-block coefficient presence/absence flag and the coefficient presence/absence flag can be performed. Consequently, it is possible to reduce a code amount of the sub-block coefficient presence/absence flag and the coefficient presence/absence flag which are coding and decoding targets, and thus to reduce a processing amount and to improve coding efficiency.

[Coefficient Value Coding Unit 225]

The coefficient value coding unit 225 generates Bins indicating the syntaxes coeff_abs_level_greater1_flag, coeff_abs_level_greater2_flag, coeff_sign_flag, and coeff_abs_level_remaining, supplied from the syntax deriving unit 228. In addition, each generated Bin is supplied to the bit coding unit 232. Further, the context index ctxIdx for designating context which is referred to for coding the Bins of the syntaxes is supplied to the context recording/updating unit 231.

[Coefficient Presence/Absence Flag Coding Unit 224]

The coefficient presence/absence flag coding unit 224 according to the present embodiment codes syntax significant_coeff_flag[xC][yC] designated by each position (xC, yC). More specifically, a Bin indicating the syntax significant_coeff_flag[xC][yC] designated by each position (xC, yC) is generated. Each generated bit is supplied to the bit coding unit 232. In addition, the coefficient presence/absence flag coding unit 224 calculates the context index ctxIdx for determining context which is used for the arithmetic code coding unit 230 to code the Bin of the syntax significant_coeff_flag[xC][yC]. The calculated context index ctxIdx is supplied to the context recording/updating unit 231. A specific configuration example of the coefficient presence/absence flag coding unit will be described later.

[Sub-Block Coefficient Presence/Absence Flag Coding Unit 227]

The sub-block coefficient presence/absence flag coding unit 227 codes syntax significant_coeff_group_flag[xCG][yCG] designated by each sub-block position (xCG,yCG). More specifically, a Bin indicating syntax significant_coeff_group_flag[xCG][yCG] designated by each sub-block position (xCG,yCG) is generated. Each generated Bin is supplied to the bit coding unit 232. In addition, the sub-block coefficient presence/absence flag coding unit 227 calculates the context index ctxIdx for determining context which is used for the arithmetic code coding unit 230 to code the Bin of the syntax significant_coeff_flag[xC][yC]. The calculated context index ctxIdx is supplied to the context recording/updating unit 231.

FIG. 46 is a block diagram illustrating a configuration of the sub-block coefficient presence/absence flag coding unit 227. As illustrated in FIG. 46, the sub-block coefficient presence/absence flag coding unit 227 includes a context deriving unit 227*a*, a sub-block coefficient presence/absence flag storage unit 227*b*, and a sub-block coefficient presence/absence flag setting unit 227*c*.

Hereinafter, a description will be described by exemplifying a case where the sub-block position (xCG,yCG) is supplied from the coefficient coding control unit 223 to the sub-block coefficient presence/absence flag coding unit 227 in a forward scan order. In addition, in this case, the sub-block position (xCG, yCG) is preferably supplied to the sub-block coefficient presence/absence flag decoding unit 127 included in the moving image decoding apparatus 1 in a backward scan order.

(Context Deriving Unit 227*a*)

The context deriving unit 227*a* included in the sub-block coefficient presence/absence flag coding unit 227 derives a context index assigned to a sub-block which is designated by each sub-block position (xCG,yCG). The context index assigned to a sub-block is used to decode a Bin indicating syntax significant_coeff_group_flag for the sub-block. In addition, in a case where the context index is derived, a value of the sub-block coefficient presence/absence flag stored in the sub-block coefficient presence/absence flag coding unit 227 is referred to. The context deriving unit 227*a* supplies the derived context index to the context recording/updating unit 231.

(Sub-Block Coefficient Presence/Absence Flag Storage Unit 227*b*)

The sub-block coefficient presence/absence flag storage unit 227*b* stores each value of the syntax significant_coeffgroup_flag supplied from the coefficient presence/absence flag coding unit 224. The sub-block coefficient presence/absence flag setting unit 227*c* may read the syntax significant_coeff_group_flag assigned to an adjacent sub-block from the sub-block coefficient presence/absence flag storage unit 227*b*.

(Sub-Block Coefficient Presence/Absence Flag Setting Unit 227*c*)

The sub-block coefficient presence/absence flag setting unit 227*c* generates a Bin indicating the syntax significant_coeff_group_flag[xCG][yCG] supplied from the coefficient presence/absence flag coding unit 224. The generated Bin is supplied to the bit coding unit 232.

<<Configuration Example of Coefficient Presence/Absence Flag Coding Unit 224>>

FIG. 47 is a block diagram illustrating a configuration example of the coefficient presence/absence flag coding unit 224 according to the present embodiment. The coefficient presence/absence flag coding unit 224, as illustrated in FIG. 47, includes a TU size determining unit 224*a*, a position context deriving unit 224*b*, an adjacent sub-block coefficient presence/absence context deriving unit 224*c*, and a coefficient presence/absence flag setting unit 224*e*.

(TU Size Determining Unit 224*a*)

The TU size determining unit 224*a* selects the position context deriving unit 224*b* or the adjacent sub-block coefficient presence/absence context deriving unit 224*c* according to a target TU size. Each selected context deriving unit derives a context index ctxIdx.

For example, in a case where a TU size is equal to or smaller than a predetermined size (for example, in a case of a 4×4 TU), the TU size determining unit 224*a* selects the position context deriving unit 224*b*.

Thus, the position context deriving unit 224*b* derives a context index ctxIdx, and assigns the derived context index to a coding target frequency component.

On the other hand, in a case where the target TU size is larger than the predetermined size (for example, in a case of an 8×8 TU, a 16×16 TU, a 32×32 TU, or the like), the TU size determining unit 224*a* selects the adjacent sub-block coefficient presence/absence context deriving unit 224*c*.

Thus, the adjacent sub-block coefficient presence/absence context deriving unit 224*c* derives a context index ctxIdx, and assigns the derived context index to a coding target frequency component.

In addition, the TU size determining unit 224*a* is not limited to the above-described configuration, and may have a configuration of deriving a context index ctxIdx which is common to TU sizes of a 4×4 TU to a 32×32 TU. In other words, the TU size determining unit 224*a* may have a configuration of fixedly selecting either one of the position context deriving unit 224*b* and the adjacent sub-block coefficient presence/absence context deriving unit 224*c* regardless of a TU size.

(Position Context Deriving Unit 224*b*)

The position context deriving unit 224*b* derives a context index ctxIdx for a target frequency component on the basis of a position of the target frequency component in a frequency domain.

(Adjacent Sub-Block Coefficient Presence/Absence Context Deriving Unit 224*c*)

The adjacent sub-block coefficient presence/absence context deriving unit 224*c* selects a context derivation pattern according to whether or not a non-zero transform coefficient is present in an adjacent sub-block, and derives a context index for a coding target frequency component from coordinates of the coding target frequency component in a sub-block according to the selected derivation pattern.

(Coefficient Presence/Absence Flag Setting Unit 224*e*)

The coefficient presence/absence flag setting unit 224*e* generates a Bin indicating the syntax significant_coeff_flag [xC][yC] supplied from the syntax deriving unit 228. The generated is supplied to the bit coding unit 232. In addition, the coefficient presence/absence flag setting unit 224*e* refers to a value of significant_coeff_flag[xC][yC] included in a target sub-block, sets a value of significant_coeff_group_flag[xCG][yCG] regarding the sub-block to 0 in a case where all values of significant_coeff_flag[xCG][yCG] are 0, that is, a non-zero transform coefficient is not included in the target sub-block, and, otherwise, sets a value of significant_coeff_group_flag[xCG][yCG] regarding the target sub-block to 1. significant_coeff_group_flag[xCG][yCG] given the values as mentioned above is supplied to the sub-block coefficient presence/absence flag coding unit 227.

The above-described 224 has a configuration corresponding to that of the coefficient presence/absence flag coding unit 124.

In other words, the TU size determining unit 224*a*, the position context deriving unit 224*b*, the adjacent sub-block coefficient presence/absence context deriving unit 224*c*, and the coefficient presence/absence flag setting unit 224*e* of the coefficient presence/absence flag coding unit 224 respectively correspond to the TU size determining unit 124*a*, the position context deriving unit 124*b*, the adjacent sub-block coefficient presence/absence context deriving unit 124*c*, and the coefficient presence/absence flag setting unit 124*e* of the coefficient presence/absence flag coding unit 124.

For example, a specific process performed by the adjacent sub-block coefficient presence/absence context deriving unit 224*c* is the same as the process performed by the adjacent sub-block coefficient presence/absence context deriving unit 124*c* included in the moving image decoding apparatus 1.

Therefore, details of each configuration of the coefficient presence/absence flag coding unit 224 are the same as those described in each configuration of the coefficient presence/absence flag coding unit 124 described above. In other words, Examples and Modification Examples 1 to 7 related to the moving image decoding apparatus 1, each configuration of the moving image decoding apparatus 1 is replaced with a corresponding configuration of the coefficient presence/absence flag coding unit 224, and thus the configuration of the coefficient presence/absence flag coding unit 224 will be understood. Therefore, detailed description thereof will be omitted here.

As described above, the moving image coding apparatus 2 according to the present embodiment includes an arithmetic coding device which arithmetically codes various elements of syntax indicating a transform coefficient with respect to each transform coefficient which is obtained for each frequency component by performing frequency transform on a target image for each unit domain. The arithmetic coding device includes sub-block splitting means for splitting a target frequency domain corresponding to a process target unit domain into sub-blocks each having a predetermined size; sub-block coefficient presence/absence flag coding means for coding a sub-block coefficient presence/absence flag indicating whether or not at least one non-zero transform coefficient is included in the sub-block with respect to the respective sub-blocks into which the frequency domain is split by the sub-block splitting means;

non-zero transform coefficient determining means for determining whether or not at least one non-zero transform coefficient is included in a sub-block adjacent to a process target sub-block on the basis of the coded sub-block coefficient presence/absence flag; and context index deriving means for deriving a context index assigned to a transform coefficient presence/absence flag which is syntax indicating whether or not the transform coefficient is 0, in which, when a non-zero transform coefficient is not present in any of sub-blocks adjacent to the process target sub-block, on the basis of the determination result, the context index deriving means derives the context indexes which respectively correspond to a case where an occurrence probability of a non-zero transform coefficient is low, a case where an occurrence probability of a non-zero transform coefficient is high, and a case where an occurrence probability of a non-zero transform coefficient is intermediate between the high case and the low case, according to a position of a process target transform coefficient in the process target sub-block.

In addition, as mentioned above, the moving image coding apparatus 2 according to the present embodiment includes an arithmetic coding device which arithmetically codes various elements of syntax indicating a transform coefficient with respect to each transform coefficient which is obtained for each frequency component by performing frequency transform on a target image for each unit domain. The arithmetic coding device includes sub-block splitting means for splitting a target frequency domain corresponding to a process target unit domain into sub-blocks each having a 4×4 size according to a predetermined definition; sub-block coefficient presence/absence flag coding means for coding a sub-block coefficient presence/absence flag indicating whether or not at least one non-zero transform coefficient is included in the sub-block with respect to the respective sub-blocks into which the frequency domain is split by the sub-block splitting means; directivity determining means for determining a directivity of a distribution of transform coefficients on the basis of a sub-block coefficient presence/absence flag in a sub-block adjacent to a process target sub-block; and context index deriving means for deriving a context index assigned to a transform coefficient presence/absence flag which is syntax indicating whether or not the process target transform coefficient is 0, in which, if coordinates of the sub-block having the 4×4 size are set to (xB,yB) (where xB is a coordinate in a horizontal direction, yB is a coordinate in a vertical direction, and the upper left side of the sub-block is set to an origin (0,0)), when a scan order applied to the sub-block is up-right diagonal scan, in a case where a determined directivity is a vertical direction, the context index deriving means derives the context index corresponding to a case where an occurrence probability of a transform coefficient is higher than in domains other than a domain formed by (0,0) to (0,3), (1,0) to (1,2), and (2,0), and in a case where a determined directivity is a horizontal direction, the context index deriving means derives the context index corresponding to a case where an occurrence probability of a transform coefficient is higher than in domains other than a domain formed by (0,0) to (3,0), (0,1) to (2,1), and (0,2).

In other words, the moving image coding apparatus 2 has a configuration corresponding to the configuration of the above-described moving image decoding apparatus 1.

Therefore, according to the moving image coding apparatus 2, it is possible to reduce a process amount related to coding and decoding of a transform coefficient in the same manner as in the moving image decoding apparatus 1.

In addition, the present invention may be represented as follows. According to an aspect of the present invention, there is a provided an arithmetic decoding device which decodes coded data which is obtained by arithmetically coding various elements of syntax indicating a transform coefficient with respect to each transform coefficient which is obtained for each frequency component by performing frequency transform on a target image for each unit domain, and includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; non-zero transform coefficient determining means for determining whether or not at least one non-zero transform coefficient is included in a sub-block adjacent to a process target sub-block on the basis of the decoded sub-block coefficient presence/absence flag; and context index deriving means for deriving a context index assigned to a transform coefficient presence/absence flag which is syntax indicating whether or not the transform coefficient is 0, in which, when a non-zero transform coefficient is not present in any of sub-blocks adjacent to the process target sub-block, on the basis of the determination result, the context index deriving means derives the context indexes which respectively correspond to a case where an occurrence probability of a non-zero transform coefficient is low, a case where an occurrence probability of a non-zero transform coefficient is high, and a case where an occurrence probability of a non-zero transform coefficient is intermediate between the high case and the low case, according to a position of a process target transform coefficient in the process target sub-block.

There is a tendency for occurrence probabilities of a non-zero transform coefficient in a process target sub-block to be different stepwise depending on circumstances of values of sub-block coefficient presence/absence flags of sub-blocks adjacent to the process target sub-block.

For example, when there are present a right adjacent sub-block which is adjacent to the right side of a process target sub-block and a lower adjacent sub-block which is adjacent to the lower side thereof, distributions of the occurrence probability are different from each other in a case where only a sub-block coefficient presence/absence flag in the right adjacent sub-block is 1 and in a case where only a sub-block coefficient presence/absence flag in the lower adjacent sub-block is 1.

In addition, the distributions of the occurrence probability being different stepwise indicates that positions where an occurrence probability of a non-zero transform coefficient is high, approximately intermediate, and low are different in a process target sub-block.

According to the configuration, depending on circumstances of values of sub-block coefficient presence/absence flags in sub-blocks adjacent to a process target sub-block, there is the derivation of context indexes which respectively correspond to a case where an occurrence probability of a non-zero transform coefficient is low, a case where an occurrence probability of a non-zero transform coefficient is high, and a case where an occurrence probability of a non-zero transform coefficient is approximately intermediate between the high case and the low case.

Consequently, it is possible to realize a context derivation pattern which is more suitable for an actual occurrence probability of a transform coefficient, and thus it is possible to improve coding efficiency.

In the arithmetic decoding device, preferably, the non-zero transform coefficient determining means determines a sub-block coefficient presence/absence flag for a right adjacent sub-block which is a sub-block adjacent to the right side of a process target sub-block and a lower adjacent sub-block which is adjacent to the lower side thereof; and, when it is determined that a non-zero transform coefficient is not present in one of the right adjacent sub-block and the lower adjacent sub-block, the context index deriving means derives the context index corresponding to a case where an occurrence probability of a non-zero transform coefficient is high, at a left end or right end position of the sub-block in an adjacent direction of a sub-block in which it is determined that a non-zero transform coefficient is not present.

In a case where a non-zero transform coefficient is present in the right adjacent sub-block, an occurrence probability of a non-zero transform coefficient tends to increase at the upper end of the process target sub-block. In addition, in a case where a non-zero transform coefficient is present in the lower adjacent sub-block, an occurrence probability of a non-zero transform coefficient tends to increase at the left end of the process target sub-block.

According to the configuration, it is possible to derive the context index corresponding to a case where an occurrence probability of a non-zero transform coefficient is high, at a left end or right end position of the sub-block in an adjacent direction of a sub-block in which it is determined that a non-zero transform coefficient is not present.

As a result, it is possible to derive a context index which is more suitable for an occurrence probability of a non-zero transform coefficient as described above.

In order to solve the above-described problems, an arithmetic decoding device according to the present invention decodes coded data obtained by arithmetically coding various elements of syntax indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a 4×4 size according to a predetermined definition; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; directivity determining means for determining a directivity of a distribution of transform coefficients on the basis of a sub-block coefficient presence/absence flag in a sub-block adjacent to a process target sub-block; and context index deriving means for deriving a context index assigned to a transform coefficient presence/absence flag which is syntax indicating whether or not the process target transform coefficient is 0, in which, if coordinates of the sub-block having the 4×4 size are set to (xB,yB) (where xB is a coordinate in a horizontal direction, yB is a coordinate in a vertical direction, and the upper left side of the sub-block is set to an origin (0,0)), when a scan order applied to the sub-block is up-right diagonal scan, in a case where a determined directivity is a vertical direction, the context index deriving means derives the context index corresponding to a case where an occurrence probability of a transform coefficient is higher than in domains other than a domain formed by (0,0) to (0,3), (1,0) to (1,2), and (2,0), and in a case where a determined directivity is a horizontal direction, the context index deriving means derives the context index corresponding to a case where an occurrence probability of a transform coefficient is higher than in domains other than a domain formed by (0,0) to (3,0), (0,1) to (2,1), and (0,2).

In the configuration, the directivity of a distribution of a transform coefficient is, specifically, as follows in a case where there are present a right adjacent sub-block which is adjacent to the right side of a process target sub-block and a lower adjacent sub-block which is adjacent to the lower side thereof.

In a case where a sub-block coefficient presence/absence flag in the right adjacent sub-block indicates that no non-zero transform coefficient is included in the right adjacent sub-block, and a sub-block coefficient presence/absence flag in the lower adjacent sub-block indicates that at least one non-zero transform coefficient is included in the lower adjacent sub-block, an occurrence probability of a non-zero transform coefficient tends to increase on the left side of the process target sub-block. In other words, in this case, the directivity of a distribution of a transform coefficient is a vertical direction.

In this case, an occurrence probability of a non-zero transform coefficient is higher in a domain formed by (0,0) to (0,3), (1,0) to (1,2), and (2,0) than in domains other than the domain.

In addition, in a case where a sub-block coefficient presence/absence flag in the right adjacent sub-block indicates that at least one non-zero transform coefficient is included in the right adjacent sub-block, and a sub-block coefficient presence/absence flag in the lower adjacent sub-block indicates that no non-zero transform coefficient is included in the lower adjacent sub-block, an occurrence probability of a non-zero transform coefficient tends to increase on the upper side of the process target sub-block. In other words, in this case, the directivity of a distribution of a transform coefficient is a horizontal direction.

In this case, an occurrence probability of a non-zero transform coefficient is higher in a domain formed by (0,0) to (3,0), (0,1) to (2,1), and (0,2) than in domains other than the domain.

Further, as a process order in a forward direction of up-right diagonal scan, in the coordinate expression, with (0,0) as a starting point, a process is applied from (0,1) to (1,0) in the upper right diagonal direction, from (0,2) to (2,0) in the upper right diagonal direction, from (0,3) to (3,0) in the upper right diagonal direction, from (1,3) to (3,1) in the upper right diagonal direction, from (2,3) to (3,2) in the upper right diagonal direction, and finally to (3,3).

In addition, in the related art, a sequence of context indexes in a backward scan order (a scan order in an actual decoding process) of the up-right diagonal scan is as follows if a context index corresponding to a case where an occurrence probability of a transform coefficient is high is 1, and a context index corresponding to a case where an occurrence probability of a transform coefficient is low is 0.

In case of horizontal direction: 0001001100110111

In case of vertical direction: 0000010011011111

As mentioned above, in a case of the horizontal direction, the number of changes from "0" to "1" is four, the number of changes from "1" to "0" is three, and thus the number of changes is a total of seven.

In addition, in a case of the vertical direction, the number of changes from "0" to "1" is three, the number of changes from "1" to "0" is two, and thus the number of changes is a total of five.

In contrast, according to the configuration, in a case where a determined directivity is the vertical direction, there is the derivation of the context index corresponding to a case where an occurrence probability of a transform coefficient is higher in a domain formed by (0,0) to (0,3), (1,0) to (1,2), and (2,0) than in domains other than the domain.

In this case, a sequence of context indexes in a backward scan order of the up-right diagonal scan is as follows if a context index corresponding to a case where an occurrence probability of a transform coefficient is high is 1, and a context index corresponding to a case where an occurrence probability of a transform coefficient is low is 0.

In case of vertical direction: 0000000011111111

Therefore, the number of changes in 0 and 1 is only one of a change from "0" to "1".

In addition, in a case where a determined directivity is the horizontal direction, there is the derivation of the context index corresponding to a case where an occurrence probability of a transform coefficient is higher in a domain formed by (0,0) to (3,0), (0,1) to (2,1), and (0,2) than in domains other than the domain.

In this case, a sequence of context indexes in the backward scan order is as follows in the same manner as above.

In case of horizontal direction: 0000001100111111

Therefore, the number of changes from "0" to "1" is two, the number of changes from "1" to "0" is one, and thus the number of changes is a total of three.

As mentioned above, according to the configuration, it is possible to minimize changes in context indexes in a sub-block when compared with the related art. Accordingly, as described above, in hardware which defines the number of repeated 0s and 1s, mounting of the hardware is simplified.

In order to solve the above-described problems, an arithmetic decoding device according to the present invention decodes coded data which is obtained by arithmetically coding various elements of syntax indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; directivity determining means for determining a directivity of a distribution of transform coefficients on the basis of a sub-block coefficient presence/absence flag in a sub-block adjacent to a process target sub-block; and transform coefficient decoding means for decoding the transform coefficients by using a scan order according to a directivity determined by the directivity determining means.

According to the configuration, it is possible to decode a transform coefficient by using a scan order according to a directivity of a distribution of a transform coefficient. Accordingly, it is possible to minimize changes in 0 and 1 in a backward scan order in a sub-block by using a scan order according to a directivity even if the following sequences of context indexes of the related.

In case of horizontal direction: 0001001100110111

In case of vertical direction: 0000010011011111

Accordingly, as described above, in hardware which defines the number of repeated 0s and 1s, mounting of the hardware is simplified.

In order to solve the above-described problems, an arithmetic decoding device according to the present invention decodes coded data which is obtained by arithmetically coding various elements of syntax indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; coefficient-present-sub-block number counting means for counting the number of sub-blocks including at least one non-zero transform coefficient for each sub-block adjacent to a process target sub-block on the basis of the sub-block coefficient presence/absence flag; and context index deriving means for deriving a context index assigned to a transform coefficient presence/absence flag which is syntax indicating whether or not the transform coefficient is 0, in which the context index deriving means derives the context index by using a sum of a coordinate in a horizontal direction and a coordinate in a vertical direction of a process target transform coefficient in the process target sub-block according to the number counted by the coefficient-present-sub-block number counting means.

According to the configuration, it is possible to derive the context index by using a sum of a coordinate in a horizontal direction and a coordinate in a vertical direction of a process target transform coefficient in the process target sub-block according to the number of sub-blocks including at least one non-zero transform coefficient.

In the configuration, the sub-block coefficient presence/absence flag is not differentiated between a right adjacent sub-block and a lower adjacent sub-block.

Accordingly, when compared with the above-described Example, it is possible to reduce the number of context derivation patterns. In addition, the comparisons in the respective patterns are all performed through a comparison between "xB+yB" and a predetermined threshold value. Further, the arrangements illustrated in FIGS. 24(*a*) to 24(*c*) are related to up-right diagonal scan, the number of changes in context indexes in a scan order in a sub-block is only one, and thus mounting thereof in hardware is simplified.

As mentioned above, according to the configuration, it is possible to achieve an effect of simplifying mounting of hardware.

In order to solve the above-described problems, an arithmetic decoding device according to the present invention decodes coded data which is obtained by arithmetically coding various elements of syntax indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a 4×4 size according to a predetermined definition; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; pattern determining means for determining a pattern of a value of a sub-block coefficient presence/absence flag which is decoded for each sub-block adjacent to a process target sub-block; and context index deriving means for deriving a context index assigned to a transform coefficient presence/absence flag which is syntax indicating whether or not the process target transform coefficient is 0, in which the context index deriving means derives the context index by using higher-order bits in 2-bit expression of each of coordinates in a horizontal direction and a vertical direction of a process target transform coefficient in the process target sub-block according to a determination result from the pattern determining means.

According to the configuration, it is possible to derive the context index by using higher-order bits in 2-bit expression of each of coordinates in a horizontal direction and a vertical direction of a process target transform coefficient in the process target sub-block according to circumstances values of sub-block coefficient presence/absence flags which are decoded for each sub-block adjacent to a process target sub-block According to the configuration, it is possible to perform a context index deriving process from input information of 4 bits. Specifically, the 4 bits are a total of 4 bits including a higher bit (1 bit) of an X coordinate in a sub-block, a higher bit (1 bit) of a Y coordinate in the sub-block, a sub-block coefficient presence/absence flag (1 bit) in an adjacent sub-block in the X direction, and a sub-block coefficient presence/absence flag (1 bit) in an adjacent sub-block in the Y direction.

In addition, since derivation of output of 0 to 2 (2 bits) from input of 4 bits is preferable, a context index deriving process can be performed through a simple bit calculation.

In order to solve the above-described problems, an arithmetic decoding device according to the present invention decodes coded data which is obtained by arithmetically coding various elements of syntax indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a 4×4 size according to a predetermined definition; and transform coefficient decoding means for decoding a transform coefficient by using a scan order in a partial domain with respect to respective partial domains each having a 2×2 size, obtained by splitting the sub-block having the 4×4 size into four domains.

According to the configuration, a transform coefficient is decoded by using a scan order in a partial domain with respect to respective partial domains each having a 2×2 size, obtained by splitting the sub-block having the 4×4 size into four domains.

As a scan order in the partial domain, upper left, upper right, lower left and lower right frequency components may be scanned in this order, for example, in a partial domain having a 2×2 size. In addition, a scan order in the partial domain and a scan order of the partial domains (partial domain units) may be applied in a nested manner. Further, an actual decoding process may be performed a backward scan order.

According to the configuration, since coordinates in a scan order (for example, coordinates of frequency components adjacent to each other in the scan order) can be prevented from being considerably changed, transform coefficients which have spatially the same kinds of characteristics as each other can be sequentially decoded. As a result, coding efficiency is improved.

In order to solve the above-described problems, an arithmetic decoding device according to the present invention decodes coded data which is obtained by arithmetically coding various elements of syntax indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; directivity determining means for determining a directivity of a distribution of transform coefficients on the basis of a sub-block coefficient presence/absence flag in a sub-block adjacent to a process target sub-block; and context index deriving means for deriving a context index assigned to a transform coefficient presence/absence flag which is syntax indicating whether or not the transform coefficient is 0, in which the context index deriving means derives the context index by using coordinates in the process target unit domain in the process target sub-block according to a directivity determined by the directivity determining means.

According to the configuration, the context index is derived by using coordinates in the process target unit domain in the process target sub-block according to a directivity of a distribution of a transform coefficient.

In a case where a horizontal edge or a vertical edge is present, non-zero transform coefficients tend to concentrate and appear in a domain of xC=0 or yC=0 in a process target unit domain (for example, a TU).

According to the configuration, since a context index corresponding to a case where an occurrence probability of a non-zero transform coefficient is high is used in a case where a probability of the presence of the horizontal edge or the vertical edge is high, it is possible to improve coding efficiency.

In order to solve the above-described problems, an arithmetic decoding device according to the present invention decodes coded data which is obtained by arithmetically coding various elements of syntax indicating a transform coefficient with respect to each transform coefficient which is obtained for each frequency component by performing frequency transform on a target image for each unit domain. The arithmetic decoding device includes sub-block splitting means for splitting a target frequency domain corresponding to a process target unit domain into sub-blocks each having a predetermined size; sub-block coefficient presence/absence flag decoding means for decoding a sub-block coefficient presence/absence flag indicating whether or not at least one non-zero transform coefficient is included in the sub-block with respect to the respective sub-blocks into which the frequency domain is split by the sub-block splitting means; adjacent sub-block coefficient presence determining means for determining whether or not at least one non-zero transform coefficient is included in each of sub-blocks adjacent to a process target sub-block on the basis of the sub-block coefficient presence/absence flag; and context index deriving means for deriving a context index assigned to a transform coefficient presence/absence flag which is syntax indicating whether or not the transform coefficient is 0, in which, in a case where at least one non-zero transform coefficient is included in sub-blocks of a predetermined number or more as a result of the determination, the context index deriving means derives the context index corresponding to a case where an occurrence probability of a non-zero transform coefficient is high, equally in the process target sub-block.

According to the configuration, there is the derivation of the context index corresponding to a case where an occurrence probability of a non-zero transform coefficient is high, equally in the process target sub-block.

As mentioned above, in a case where an occurrence probability of a non-zero transform coefficient is equally high, there is the derivation of the context index corresponding to a case where an occurrence probability of a non-zero transform coefficient is high, equally in the process target sub-block, and thus it is possible to improve coding efficiency.

An image decoding apparatus according to the present invention includes the arithmetic decoding device; inverse frequency transform means for generating a residual image by performing inverse frequency transform on a transform coefficient which is decoded by the arithmetic decoding device; and decoded image generating means for generating a decoded image by adding the residual image which is generated by the inverse frequency transform means to a predicted image which is predicted from a generated decoded image.

The image decoding apparatus with this configuration also falls within the scope of the present invention, and also in this case, it is possible to the same operations and effects as in the above-described arithmetic decoding device.

In order to solve the above-described problems, an arithmetic coding device according to the present invention arithmetically codes various elements of syntax indicating a transform coefficient with respect to each transform coefficient which is obtained for each frequency component by performing frequency transform on a target image for each unit domain. The arithmetic coding device includes sub-block splitting means for splitting a target frequency domain corresponding to a process target unit domain into sub-blocks each having a predetermined size; sub-block coefficient presence/absence flag coding means for coding a sub-block coefficient presence/absence flag indicating whether or not at least one non-zero transform coefficient is included in the sub-block with respect to the respective sub-blocks into which the frequency domain is split by the sub-block splitting means; non-zero transform coefficient determining means for determining whether or not at least one non-zero transform coefficient is included in a sub-block adjacent to a process target sub-block on the basis of the coded sub-block coefficient presence/absence flag; and context index deriving means for deriving a context index assigned to a transform coefficient presence/absence flag which is syntax indicating whether or not the transform coefficient is 0, in which, when a non-zero transform coefficient is not present in any of sub-blocks adjacent to the process target sub-block, on the basis of the determination result, the context index deriving means derives the context indexes which respectively correspond to a case where an occurrence probability of a non-zero transform coefficient is low, a case where an occurrence probability of a non-zero transform coefficient is high, and a case where an occurrence probability of a non-zero transform coefficient is intermediate between the high case and the low case, according to a position of a process target transform coefficient in the process target sub-block.

In order to solve the above-described problem, an arithmetic coding device according to the present invention arithmetically codes various elements of syntax indicating a transform coefficient with respect to each transform coefficient which is obtained for each frequency component by performing frequency transform on a target image for each unit domain. The arithmetic coding device includes sub-block splitting means for splitting a target frequency domain corresponding to a process target unit domain into sub-blocks each having a 4×4 size according to a predetermined definition; sub-block coefficient presence/absence flag coding means for coding a sub-block coefficient presence/absence flag indicating whether or not at least one non-zero transform coefficient is included in the sub-block with respect to the respective sub-blocks into which the frequency domain is split by the sub-block splitting means; directivity determining means for determining a directivity of a distribution of transform coefficients on the basis of a sub-block coefficient presence/absence flag in a sub-block adjacent to a process target sub-block; and context index deriving means for deriving a context index assigned to a transform coefficient presence/absence flag which is syntax indicating whether or not the process target transform coefficient is 0, in which, if coordinates of the sub-block having the 4×4 size are set to (xB,yB) (where xB is a coordinate in a horizontal direction, yB is a coordinate in a vertical direction, and the upper left side of the sub-block is set to an origin (0,0)), when a scan order applied to the sub-block is up-right diagonal scan, in a case where a determined directivity is a vertical direction, the context index deriving means derives the context index corresponding to a case where an occurrence probability of a transform coefficient is higher than in domains other than a domain formed by (0,0) to (0,3), (1,0) to (1,2), and (2,0), and in a case where a determined directivity is a horizontal direction, the context index deriving means derives the context index corresponding to a case where an occurrence probability of a transform coefficient is higher than in domains other than a domain formed by (0,0) to (3,0), (0,1) to (2,1), and (0,2).

In addition, an image coding apparatus according to the present invention includes transform coefficient generating means for generating a transform coefficient by performing frequency transform on a residual image between a coding target image and a predicted image for each unit domain; and the arithmetic coding device, in which the arithmetic coding device generates coded data by arithmetically coding various elements of syntax indicating a transform coefficient which is generated by the transform coefficient generating means.

The image coding apparatus with this configuration also falls within the scope of the present invention, and also in this case, it is possible to the same operations and effects as in the above-described arithmetic coding device.

APPENDIX 1

The above-described moving image coding apparatus 2 and moving image decoding apparatus 1 may be mounted and used in various elements of equipment which perform transmission, reception, recording, and reproducing of moving images. In addition, the moving images may be natural images which are captured by a camera or the like, and may be artificial images (including CG and GUI) generated by a computer or the like.

First, with reference to FIG. 48, a description will be made that the above-described moving image coding apparatus 2 and moving image decoding apparatus 1 can be used for transmission and reception of moving images.

FIG. 48(*a*) is a block diagram illustrating a configuration of transmission equipment including the moving image coding apparatus 2 mounted therein. As illustrated in FIG. 48(*a*), transmission equipment PROD_A includes a coder PROD_A1 which obtains by coding a moving image, a modulator PROD_A2 which obtains a modulated signal by modulating the coded data obtained by the coder PROD_A1, and a transmitter PROD_A3 which transmits the modulated signal obtained by the modulator PROD_A2. The above-described moving image coding apparatus 2 is used as the coder PROD_A1.

The transmission equipment PROD_A may further include a camera PROD_A4 which captures a moving image as a supply source of a moving image which is input to the coder PROD_A1, a recording medium PROD_A5 which records the moving image thereon, an input terminal PROD_A6 for inputting a moving image from an external device, and an image processor PROD_A7 which generates or processes an image. FIG. 48(*a*) illustrates a configuration in which the transmission equipment PROD_A includes all the constituent elements, but some of the constituent elements may be omitted.

In addition, the recording medium PROD_A5 may record a moving image which is not coded, and may record a moving image which is coded in a coding method for recording different from a coding method for transmission. In the latter case, a decoder (not illustrated) which decodes coded data read from the recording medium PROD_A5 according to a coding method for recording may be provided between the recording medium PROD_A5 and the coder PROD_A1.

FIG. 48(*b*) is a block diagram illustrating a configuration of reception equipment including the moving image decoding apparatus 1 mounted therein. As illustrated in FIG. 48(*b*), reception equipment PROD_B includes a receiver PROD_B1 which receives a modulated signal, a demodulator PROD_B2 which obtains coded data by demodulating the modulated signal received by the receiver PROD_B1, and a decoder PROD_B3 which obtains a moving image by decoding the coded data obtained by the demodulator PROD_B2. The above-described moving image decoding apparatus 1 is used as the decoder PROD_B3.

The reception equipment PROD_B may further include a display PROD_B4 which displays a moving image as a supply source of the moving image which is output by the decoder PROD_B3, a recording medium PROD_B5 which records a moving image, and an output terminal PROD_B6 which outputs a moving image to an external device. FIG. 48(*b*) illustrates a configuration in which the reception equipment PROD_B includes all the constituent elements, but some of the constituent elements may be omitted.

In addition, the recording medium PROD_B5 may record a moving image which is not coded, and may record a moving image which is coded in a coding method for recording different from a coding method for transmission. In the latter case, a coder (not illustrated) which codes a moving image acquired from the decoder PROD_B3 according to a coding method for recording may be provided between the decoder PROD_B3 and the recording medium PROD_B5.

In addition, a transmission medium for transmitting a modulated signal may be wireless and wired. Further, a transmission aspect of transmitting a modulated signal may be broadcast (here, indicating a transmission aspect in which a transmission destination is not specified in advance) and may be communication (here, indicating a transmission aspect in which a transmission destination is specified in advance). In other words, transmission of a modulated signal may be realized by any one of wireless broadcast, wired broadcast, wireless communication, and wired communication.

For example, a broadcasting station (a broadcasting facility or the like) and a reception station (a television receiver or the like) in terrestrial digital broadcasting are respectively examples of the transmission equipment PROD_A and the reception equipment PROD_B which transmit and receive a modulated signal in wireless broadcast. In addition, a broadcasting station (a broadcasting facility or the like) and a reception station (a television receiver or the like) in cable television broadcasting are respectively examples of the transmission equipment PROD_A and the reception equipment PROD_B which transmit and receive a modulated signal in wired broadcast.

In addition, a server (a workstation or the like) and a client (a television receiver, a personal computer, a smart phone, or the like) in a video on demand (VOD) service or a moving image sharing service using the Internet or the like are respectively examples of the transmission equipment PROD_A and the reception equipment PROD_B which transmit and receive a modulated signal in communication (typically, either a wireless or wired medium is used as a transmission medium in a LAN, and a wired medium is used as a transmission medium in a WAN). Here, the personal computer includes a desktop PC, a laptop PC, and a tablet PC. Further, the smart phone also includes a multifunction mobile phone terminal.

In addition, the client in the moving image sharing service has not only a function of decoding coded data which is downloaded from the server and displaying the data on a display but also a function of coding a moving image captured by a camera and uploading the moving image to the server. In other words, the client in the moving image sharing service functions as both of the transmission equipment PROD_A and the reception equipment PROD_B.

Next, with reference to FIG. 49, a description will be made that the above-described moving image coding apparatus 2 and moving image decoding apparatus 1 can be used for recording and reproducing moving images.

FIG. 49(*a*) is a block diagram illustrating a configuration of recording equipment PROD_C including the moving image coding apparatus 2 mounted therein. As illustrated in FIG. 49(*a*), recording equipment PROD_C includes a coder PROD_C1 which obtains by coding a moving image, and writer PROD_C2 which writes the coded data obtained by the coder PROD_C1 on a recording medium PROD_M. The above-described moving image coding apparatus 2 is used as the coder PROD_C1.

In addition, the recording medium PROD_M may be (1) built into the recording equipment PROD_C, such as a hard disk drive (HDD), a solid state drive (SSD), (2) connected to the recording equipment PROD_C, such as a SD memory card or a universal serial bus (USB) flash memory, and (3) loaded in a drive device (not illustrated) built into the recording equipment PROD_C, such as a digital versatile disc (DVD) or a Blu-ray Disc (registered trademark, BD).

In addition, the recording equipment PROD_C may further include a camera PROD_C3 which captures a moving image as a supply source of a moving image which is input to the coder PROD_C1, an input terminal PROD_C4 for inputting a moving image from an external device, a receiver PROD_C5 which receives a moving image, and an image processor PROD_C6 which generates or processes an image. FIG. 49(*a*) illustrates a configuration in which the recording equipment PROD_C includes all the constituent elements, but some of the constituent elements may be omitted.

Further, the receiver PROD_C5 may receive a moving image which is not coded, and may receive a moving image which is coded in a coding method for recording different from a coding method for transmission. In the latter case, a decoder (not illustrated) for transmission which decodes coded data which is coded in a coding method for transmission may be provided between the receiver PROD_C5 and the coder PROD_C1.

The recording equipment PROD_C may include, for example, a DVD recorder, a BD recorder, and a hard disk drive (HDD) recorder (in this case, the input terminal PROD_C4 or the receiver PROD_C5 is a main supply source of a moving image). Further, examples of the recording equipment PROD_C are also a camcorder (in this case, the camera PROD_C3 is a main supply source of a moving image), a personal computer (in this case, the receiver PROD_C5 or the image processor PROD_C6 is a main supply source of a moving image), and a smart phone (in this case, the camera PROD_C3 or the receiver PROD_C5 is a main supply source of a moving image).

FIG. 49(*b*) is a block diagram illustrating a configuration of reproducing equipment PROD_D including the moving image decoding apparatus 1 mounted therein. As illustrated in FIG. 49(*b*), reproducing equipment PROD_D includes a receiver PROD_1 includes a reader PROD_D1 which reads coded data which is written on the recording medium PROD_M, and a coder PROD_D2 which obtains a moving image by coding the coded data read by the reader PROD_D1. The above-described moving image decoding apparatus 1 is used as the decoder PROD_D2.

In addition, the recording medium PROD_M may be (1) built into the reproducing equipment PROD_D, such as an HDD, an SSD, (2) connected to the reproducing equipment PROD_D, such as a SD memory card or a USB flash memory, and (3) loaded in a drive device (not illustrated) built into the reproducing equipment PROD_D, such as a DVD or a BD.

In addition, the reproducing equipment PROD_D may further include a display PROD_D3 which displays a moving image as a supply source of the moving image which is output by the decoder PROD_D2, an output terminal PROD_D4 which outputs a moving image to an external device, and a transmitter PROD_D5 which transmits a moving image. FIG. 49(*b*) illustrates a configuration in which the reproducing equipment PROD_D includes all the constituent elements, but some of the constituent elements may be omitted.

In addition, the transmitter PROD_D5 may transmit a moving image which is not coded, and may transmit a moving image which is coded in a coding method for transmission different from a coding method for recording. In the latter case, a coder (not illustrated) which codes a moving image in a coding method for transmission may be provided between the decoder PROD_D2 and the transmitter PROD_D5.

The reproducing equipment PROD_D may include, for example, a DVD player, a BD player, and an HDD player (in this case, the output terminal PROD_D4 connected to a television receiver is a main supply source of a moving image). Further, examples of the reproducing equipment PROD_D are also a television receiver (in this case, the display PROD_D3 is a main supply source of a moving image), a digital signage (also called an electronic signboard or an electronic bulletin board; in this case, the display PROD_D3 or the transmitter PROD_D5 is a main supply source of a moving image), a desktop PC (in this case, the output terminal PROD_D4 or the transmitter PROD_D5 is a main supply source of a moving image), a laptop or tablet PC (in this case, the display PROD_D3 or the transmitter PROD_D5 is a main supply source of a moving image), and a smart phone (in this case, the display PROD_D3 or the transmitter PROD_D5 is a main supply source of a moving image).

APPENDIX 2

Each block of the above-described moving image decoding apparatus 1 and moving image coding apparatus 2 may be realized in hardware by using logic circuits formed on an integrated circuit (IC chip), and may be realized in software by using a central processing unit (CPU).

In the latter case, each of the apparatuses includes a CPU which executes commands of a program, a read only memory (ROM) which stores the program, a random access memory (RAM) on which the program is developed, and a storage device (recording medium) such as a memory which stores the program and various items of data. In addition, the object of the present invention can also be achieved by supplying a recording medium which causes a computer to read program codes (an executable program, an intermediate code program, or a source program) of a control program of each of the apparatuses which is software for realizing the above-described functions, to each apparatus, and by the computer (or a CPU or an MPU) reading and executing the program codes recorded on the recording medium.

As the recording medium, there may be the use of, for example, tapes such as a magnetic tape or a cassette tape, disks or discs including a magnetic disk such as a floppy (registered trademark) or a hard disk and an optical disc such as a CD-ROM, an MO, an MD, a DVD, or a CD-R, cards such as an IC card (including a memory card) and an optical card, semiconductor memories such as a mask ROM, an EPROM, an EEPROM, and a flash ROM, or logic circuits such as a programmable logic device (PLD) and field programmable gate array (FPGA).

In addition, each of the apparatuses is configured to be connected to a communication network, and the program codes may be supplied thereto via the communication network. The communication network is not particularly limited as long as the program codes can be transmitted. For example, the Internet, an intranet, an extranet, a LAN, an ISDN, a VAN, a CATV, a communication network, a virtual private network, a telephone line network, a mobile communication network, and a satellite communication network, may be used. In addition, a transmission medium forming the communication network is not particularly limited to a specific configuration or type as long as the program codes can be transmitted. The transmission medium may use a wired medium such as IEEE1394, a power line carrier, a cable TV line, a telephone line, or an asymmetric digital subscriber line (ADSL), and a wireless medium such as infrared rays in irDA or remote control, Bluetooth (registered trademark), IEEE802.11 wireless, High Data Rate (HDR), near field communication (NFC), Digital Living Network Alliance (DLNA), a mobile station network, a satellite line, or a terrestrial digital network.

The present invention is not limited to each of the above-described embodiments and may have various modifications recited in the claims, and an embodiment obtained by appropriately combining the technical means disclosed in the different embodiments is also included in the technical scope of the present invention.

INDUSTRIAL APPLICABILITY

The present invention can be suitably used for an arithmetic decoding device which decodes coded data which is arithmetically coded, and an arithmetic coding device which generates coded data which is arithmetically coded.

REFERENCE SIGNS LIST

1 MOVING IMAGE DECODING APPARATUS (IMAGE DECODING APPARATUS)
11 VARIABLE LENGTH CODE DECODING UNIT
111 QUANTIZED RESIDUAL INFORMATION DECODING UNIT (ARITHMETIC DECODING DEVICE)
120 TRANSFORM COEFFICIENT DECODING UNIT (TRANSFORM COEFFICIENT DECODING MEANS)
123 COEFFICIENT DECODING CONTROL UNIT (SUB-BLOCK SPLITTING MEANS)
124 COEFFICIENT PRESENCE/ABSENCE FLAG DECODING UNIT
124*a* TU SIZE DETERMINING UNIT
124*b* POSITION CONTEXT DERIVING UNIT
124*c* ADJACENT SUB-BLOCK COEFFICIENT PRESENCE/ABSENCE CONTEXT DERIVING UNIT (CONTEXT INDEX DERIVING MEANS, NON-ZERO TRANSFORM COEFFICIENT DETERMINING MEANS, PATTERN DETERMINING MEANS, DIRECTIVITY DETERMINING MEANS)
124*e* COEFFICIENT PRESENCE/ABSENCE FLAG SETTING UNIT
127 SUB-BLOCK COEFFICIENT PRESENCE/ABSENCE FLAG DECODING UNIT (SUB-BLOCK COEFFICIENT PRESENCE/ABSENCE FLAG DECODING MEANS)
127*a* CONTEXT DERIVING UNIT
127*b* SUB-BLOCK COEFFICIENT PRESENCE/ABSENCE FLAG STORAGE UNIT
127*a* SUB-BLOCK COEFFICIENT PRESENCE/ABSENCE FLAG SETTING UNIT
130 ARITHMETIC CODE DECODING UNIT
131 CONTEXT RECORDING/UPDATING UNIT
132 BIT DECODING UNIT
2 MOVING IMAGE CODING APPARATUS (IMAGE CODING APPARATUS)
27 VARIABLE LENGTH CODE CODING UNIT
271 QUANTIZED RESIDUAL INFORMATION CODING UNIT (ARITHMETIC CODING DEVICE)
220 TRANSFORM COEFFICIENT CODING UNIT
223 COEFFICIENT CODING CONTROL UNIT (SUB-BLOCK SPLITTING MEANS)
224 COEFFICIENT PRESENCE/ABSENCE FLAG CODING UNIT
224*a* TU SIZE DETERMINING UNIT
224*b* POSITION CONTEXT DERIVING UNIT
224*c* SUB-BLOCK COEFFICIENT PRESENCE/ABSENCE FLAG CONTEXT DERIVING UNIT (CONTEXT INDEX DERIVING MEANS, NON-ZERO TRANSFORM COEFFICIENT DETERMINING MEANS, DIRECTIVITY DETERMINING MEANS)
224*e* COEFFICIENT PRESENCE/ABSENCE FLAG SETTING UNIT
227 SUB-BLOCK COEFFICIENT PRESENCE/ABSENCE FLAG CODING UNIT (SUB-BLOCK COEFFICIENT PRESENCE/ABSENCE FLAG CODING MEANS)
227*a* CONTEXT DERIVING UNIT
227*b* SUB-BLOCK COEFFICIENT PRESENCE/ABSENCE FLAG STORAGE UNIT
227*c* SUB-BLOCK COEFFICIENT PRESENCE/ABSENCE FLAG SETTING UNIT
228 SYNTAX DERIVING UNIT
230 ARITHMETIC CODE CODING UNIT
231 CONTEXT RECORDING/UPDATING UNIT
232 BIT CODING UNIT

The invention claimed is:

1. A method for decoding coded data of a transform coefficient for each unit domain, the method comprising:
- decoding a sub-block coefficient presence/absence flag, for each of a plurality of sub-blocks, indicating whether or not one or more non-zero transform coefficient are included in a respective one of the plurality of sub-blocks into which the unit domain is split; and
- deriving a context index corresponding to a transform coefficient presence/absence flag indicating whether or not a transform coefficient of a target sub-block is 0, wherein when the non-zero transform coefficient is not included in either the right adjacent sub-block to the target sub-block or the lower adjacent sub-block to the target sub-block,
  - deriving the context index having a first value in a case where a sum of a horizontal coordinate and a vertical coordinate indicating a position of the transform coefficient of the target sub-block is equal to a first threshold value,
  - deriving the context index having a second value in a case where the sum of the horizontal coordinate and the vertical coordinate indicating the position of the transform coefficient of the target sub-block is greater than the first threshold and is smaller than a second threshold value, and
  - deriving the context index having a third value in a case where the sum of the horizontal coordinate and the vertical coordinate indicating the position of the transform coefficient of the target sub-block is equal to or greater than the second threshold, and
- when the non-zero transform coefficient is included in both the right adjacent sub-block to the target sub-block and the lower adjacent sub-block to the target sub-block,
  - deriving the context index having the first value regardless of the position of the transform coefficient of the target sub-block.

2. The method of claim 1, wherein the unit domain is comprised by a frame, and further comprising displaying the frame on a display.

3. An image decoding apparatus comprising a memory and a processor, wherein the processor configured to:
- decode a sub-block coefficient presence/absence flag, for each of a plurality of sub-blocks, indicating whether or not one or more non-zero transform coefficient are included in a respective one of the plurality of sub-blocks into which the unit domain is split; and derive a context index corresponding to a transform coefficient presence/absence flag indicating whether or not a transform coefficient of a target sub-block is 0, wherein when the non-zero transform coefficient is not included in either the right adjacent sub-block to the target sub-block or the lower adjacent sub-block to the target sub-block, derive the context index having a first value in a case where a sum of a horizontal coordinate and a vertical coordinate indicating a position of the transform coefficient of the target sub-block is equal to a first threshold value, derive the context index having a second value in a case where the sum of the horizontal coordinate and the vertical coordinate indicating the position of the transform coefficient of the target sub-block is greater than the first threshold and is smaller than a second threshold value, and derive the context index having a third value in a case where the sum of the horizontal coordinate and the vertical coordinate indicating the position of the transform coefficient of the target sub-block is equal to or greater than the second threshold value, and when the non-zero transform coefficient is included in both the right adjacent sub-block to the target sub-block and the lower adjacent sub-block to the target sub-block, derive the context index having the first value regardless of the position of the transform coefficient of the target sub-block.

4. The image decoding apparatus of claim 3, wherein the unit domain is comprised by a frame, and the processor is further configured to display the frame on a display.

5. The image decoding apparatus of claim 4, wherein the image decoding apparatus comprises the display.

6. The image decoding apparatus of claim 4, wherein the image decoding apparatus is one of a television, a desktop personal computer, a laptop personal computer, a phone, and a tablet.

7. A method for arithmetically encoding each element of syntax indicating a transform coefficient for each unit domain, the method comprising:

encoding a sub-block coefficient presence/absence flag, for each of a plurality of sub-blocks, indicating whether or not one or more nonzero transform coefficient are included in a respective one of the plurality of sub-blocks into which the unit domain is split; and deriving a context index corresponding to a transform coefficient presence/absence flag indicating whether or not a transform coefficient of a target sub-block is 0, wherein when the non-zero transform coefficient is not included in either the right adjacent sub-block to the target sub-block or the lower adjacent sub-block to the target sub-block, deriving the context index having a first value in a case where a sum of a horizontal coordinate and a vertical coordinate indicating a position of the transform coefficient of the target sub-block is equal to a first threshold value, deriving the context index having a second value in a case where the sum of the horizontal coordinate and the vertical coordinate indicating the position of the transform coefficient of the target sub-block is greater than the first threshold and is smaller than a second threshold value, and deriving the context index having a third value in a case where the sum of the horizontal coordinate and the vertical coordinate indicating the position of the transform coefficient of the target sub-block is equal to or greater than the second threshold value, and when the non-zero transform coefficient is included in both the right adjacent sub-block to the target sub-block and the lower adjacent sub-block to the target sub-block, deriving the context index having the first value regardless of the position of the transform coefficient of the target sub-block.

8. An image encoding apparatus comprising a memory and a processor, wherein the processor configured to:

encode a sub-block coefficient presence/absence flag, for each of a plurality of sub-blocks, indicating whether or not one or more non-zero transform coefficient are included in a respective one of the plurality of sub-blocks into which the unit domain is split; and derive a context index corresponding to a transform coefficient presence/absence flag indicating whether or not a transform coefficient of a target sub-block is 0, wherein when the non-zero transform coefficient is not included in either the right adjacent sub-block to the target sub-block or the lower adjacent sub-block to the target sub-block, derive the context index having a first value in a case where a sum of a horizontal coordinate and a vertical coordinate indicating a position of the transform coefficient of the target sub-block is equal to a first threshold value, derive the context index having a second value in a case where the sum of the horizontal coordinate and the vertical coordinate indicating the position of the transform coefficient of the target sub-block is greater than the first threshold and is smaller than a second threshold value, and derive the context index having a third value in a case where the sum of the horizontal coordinate and the vertical coordinate indicating the position of the transform coefficient of the target sub-block is equal to or greater than the second threshold value, and when the non-zero transform coefficient is included in both the right adjacent sub-block to the target sub-block and the lower adjacent sub-block to the target sub-block, derive the context index having the first value regardless of the position of the transform coefficient of the target sub-block.

* * * * *